Figure 1:
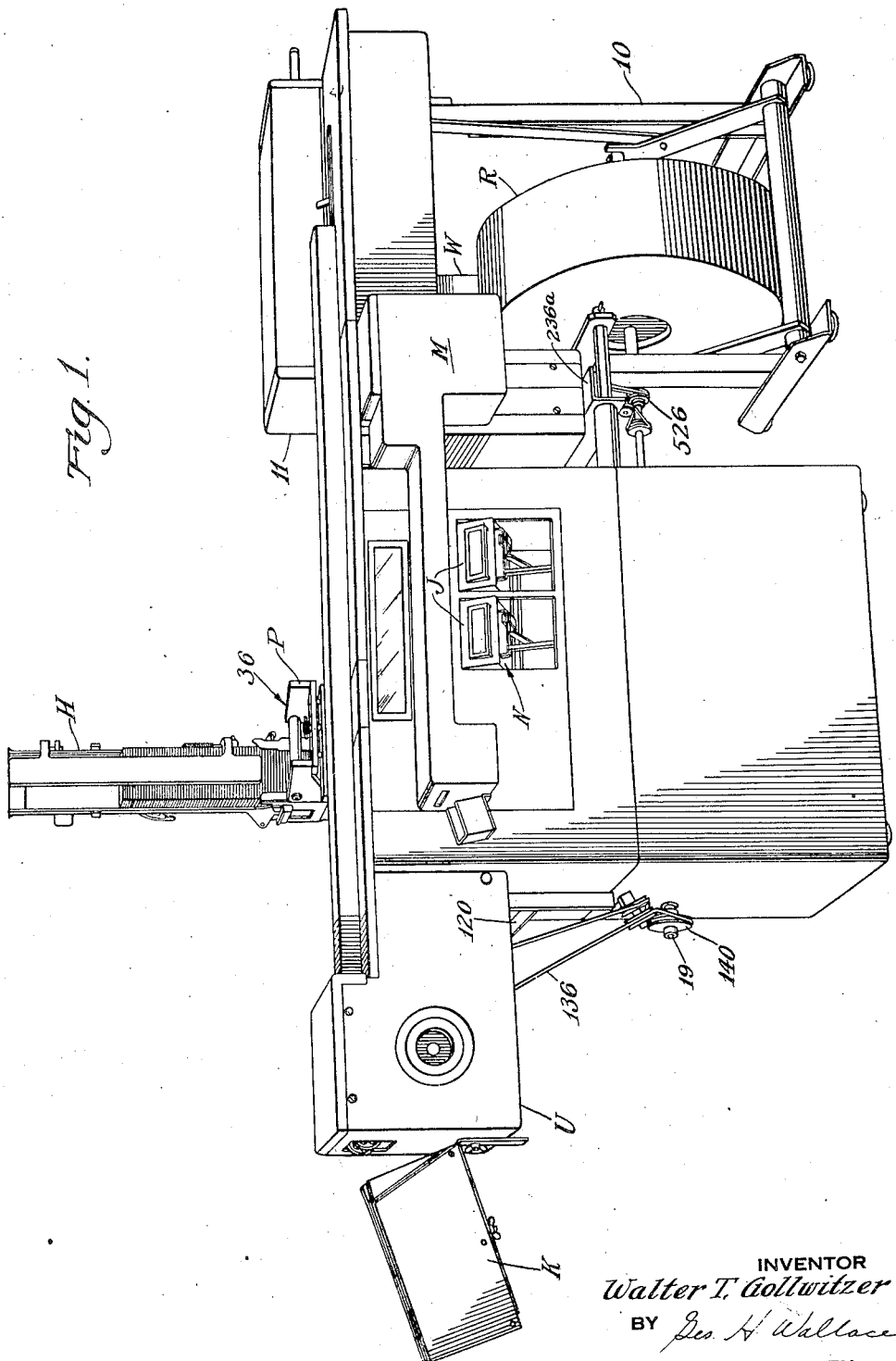

Sept. 22, 1942.  W. T. GOLLWITZER  2,296,278
CALCULATING MACHINE
Filed Jan. 9, 1940   33 Sheets-Sheet 4

INVENTOR
Walter T. Gollwitzer
BY
ATTORNEY

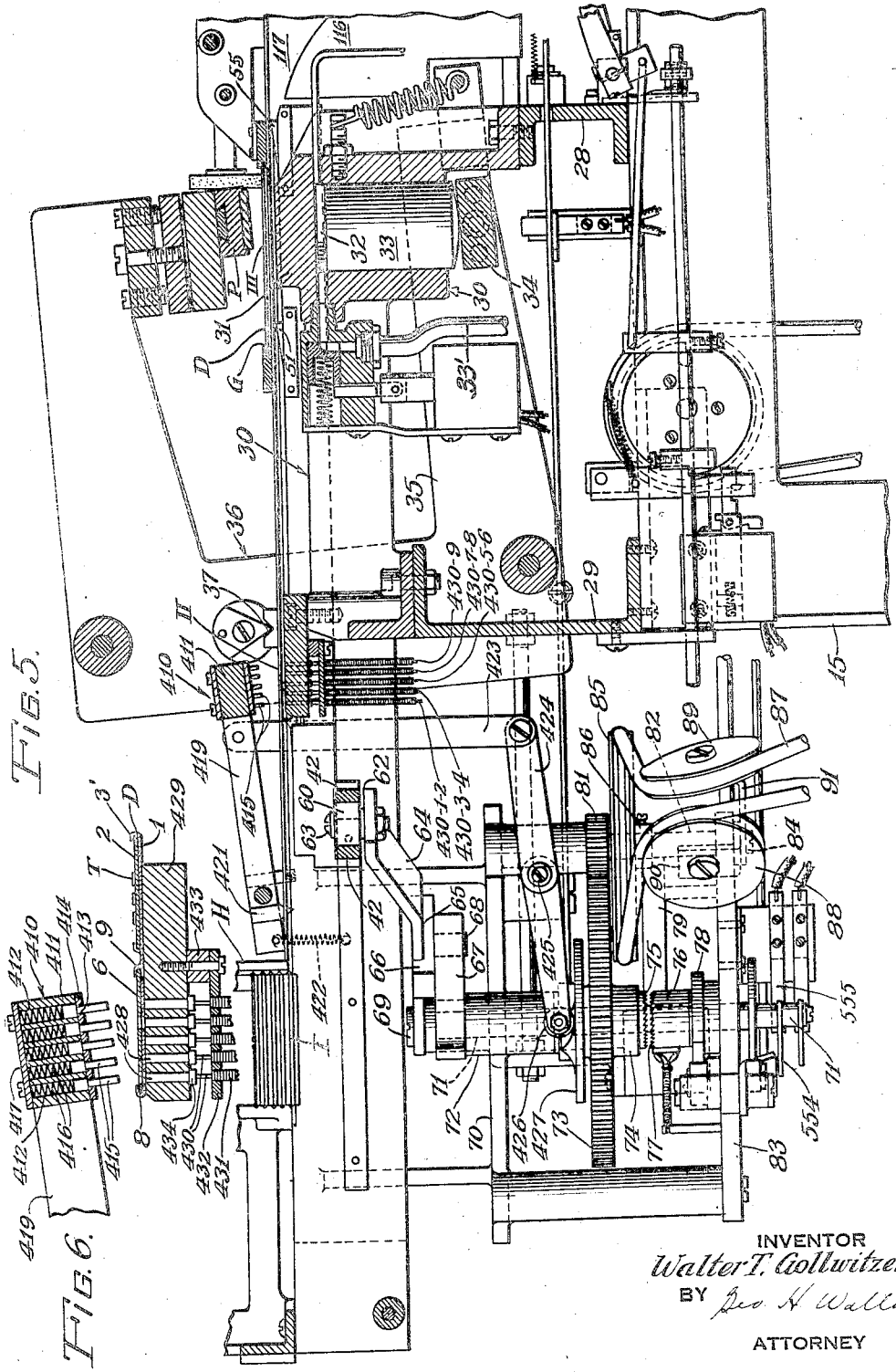

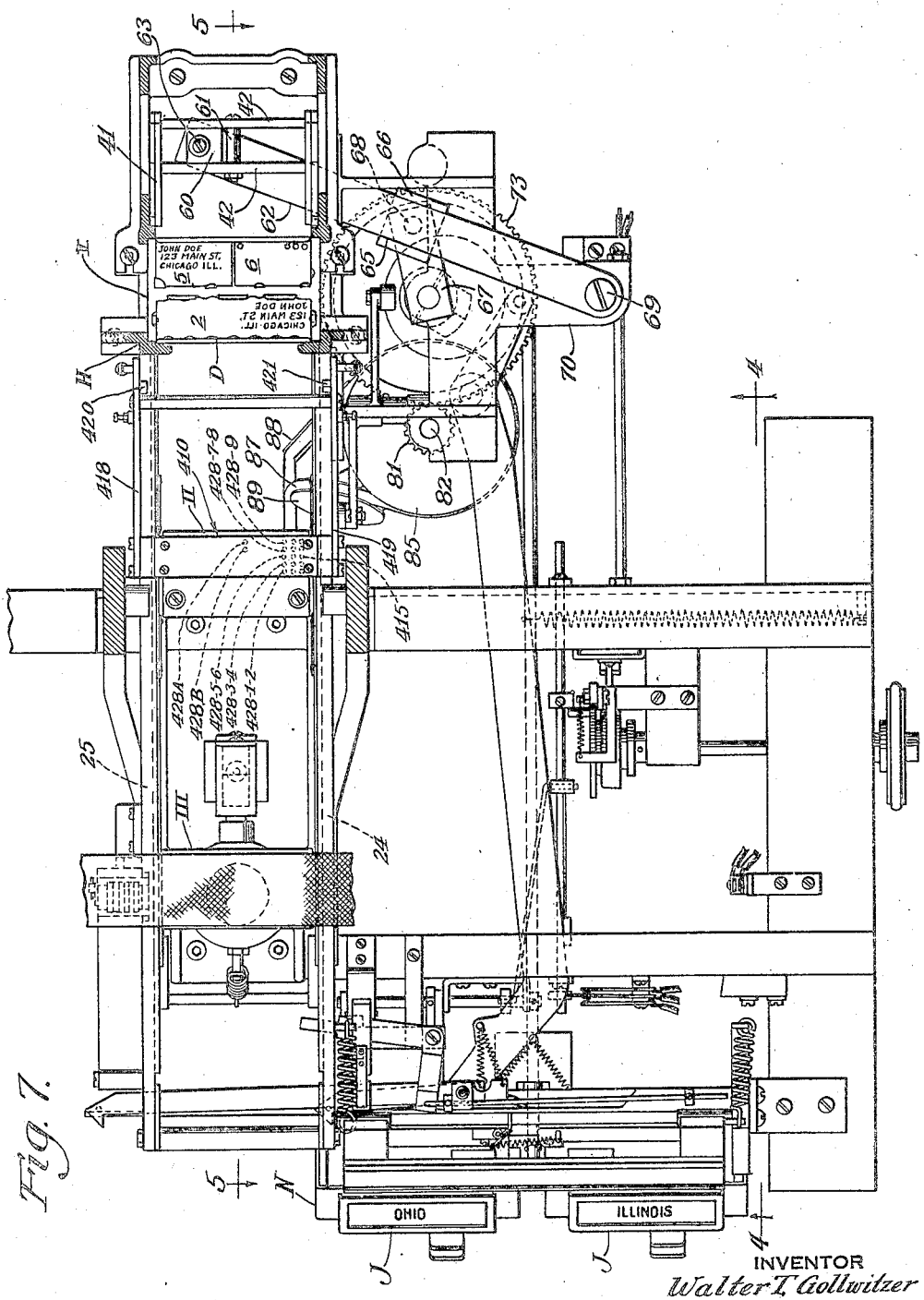

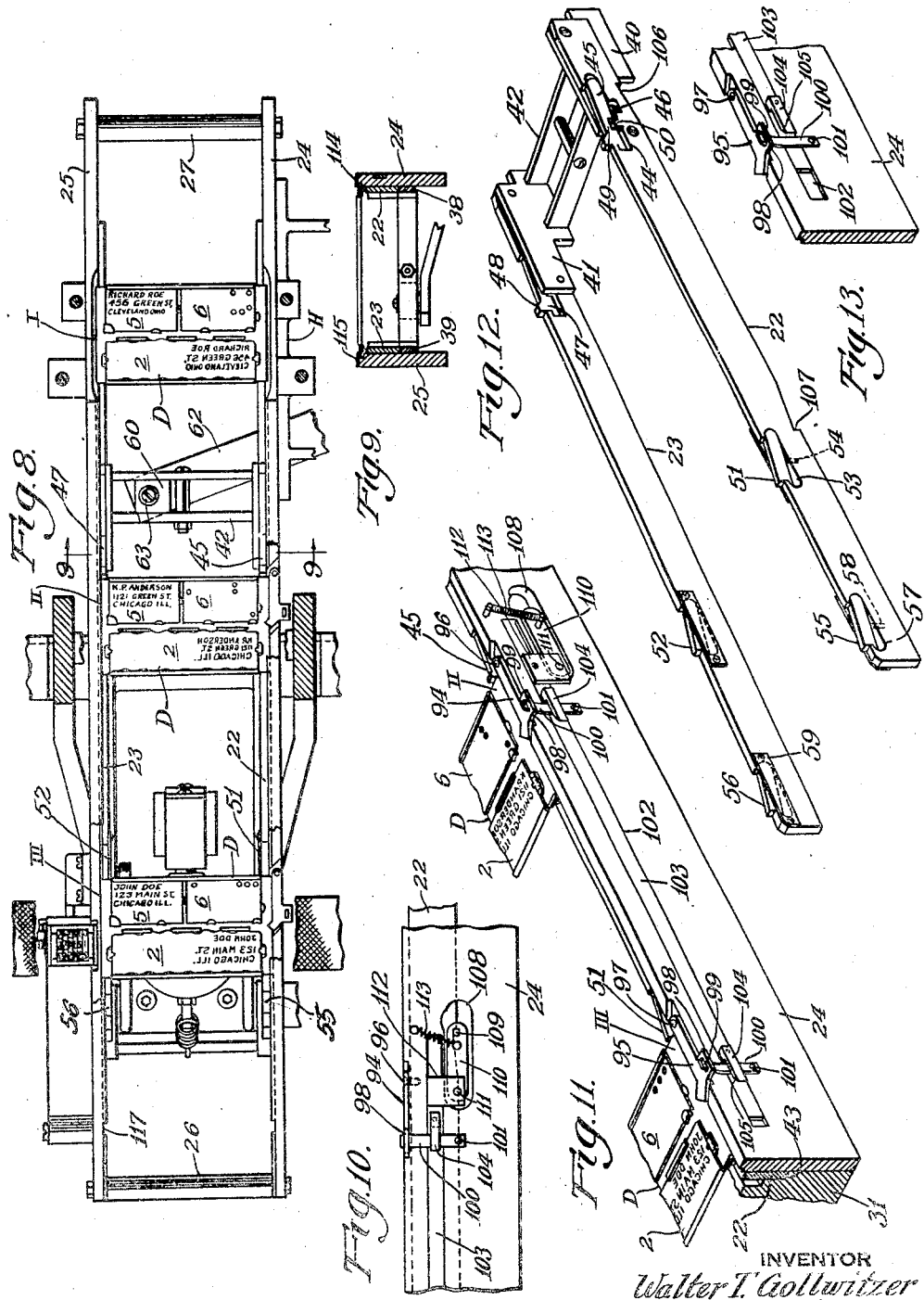

Sept. 22, 1942.   W. T. GOLLWITZER   2,296,278
CALCULATING MACHINE
Filed Jan. 9, 1940   33 Sheets-Sheet 8

Inventor:
Walter T. Gollwitzer
By: Geo. H. Wallace
Attorney

Sept. 22, 1942. W. T. GOLLWITZER 2,296,278
CALCULATING MACHINE
Filed Jan. 9, 1940 33 Sheets-Sheet 9
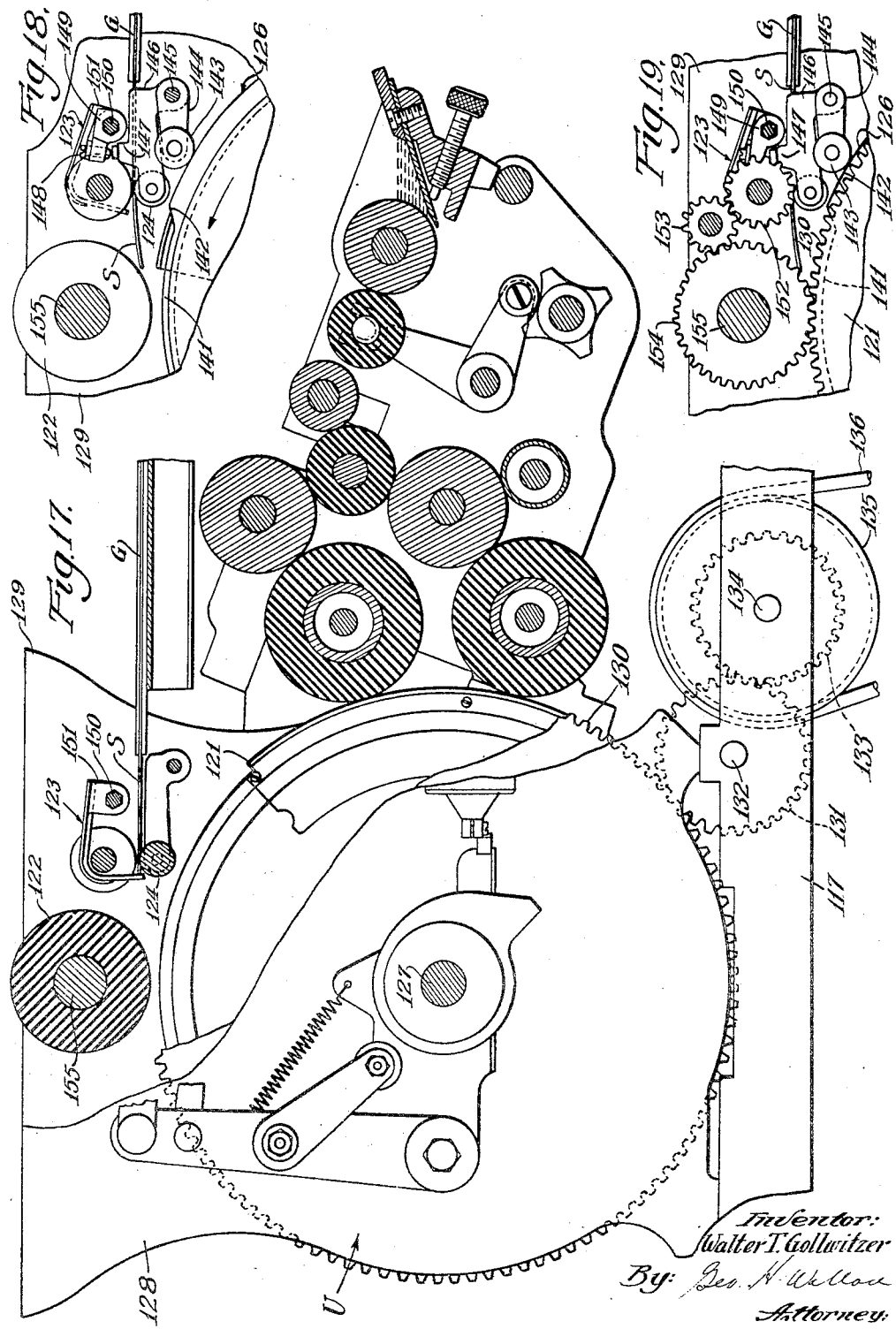
Inventor:
Walter T. Gollwitzer
By: Geo. H. Wilson
Attorney.

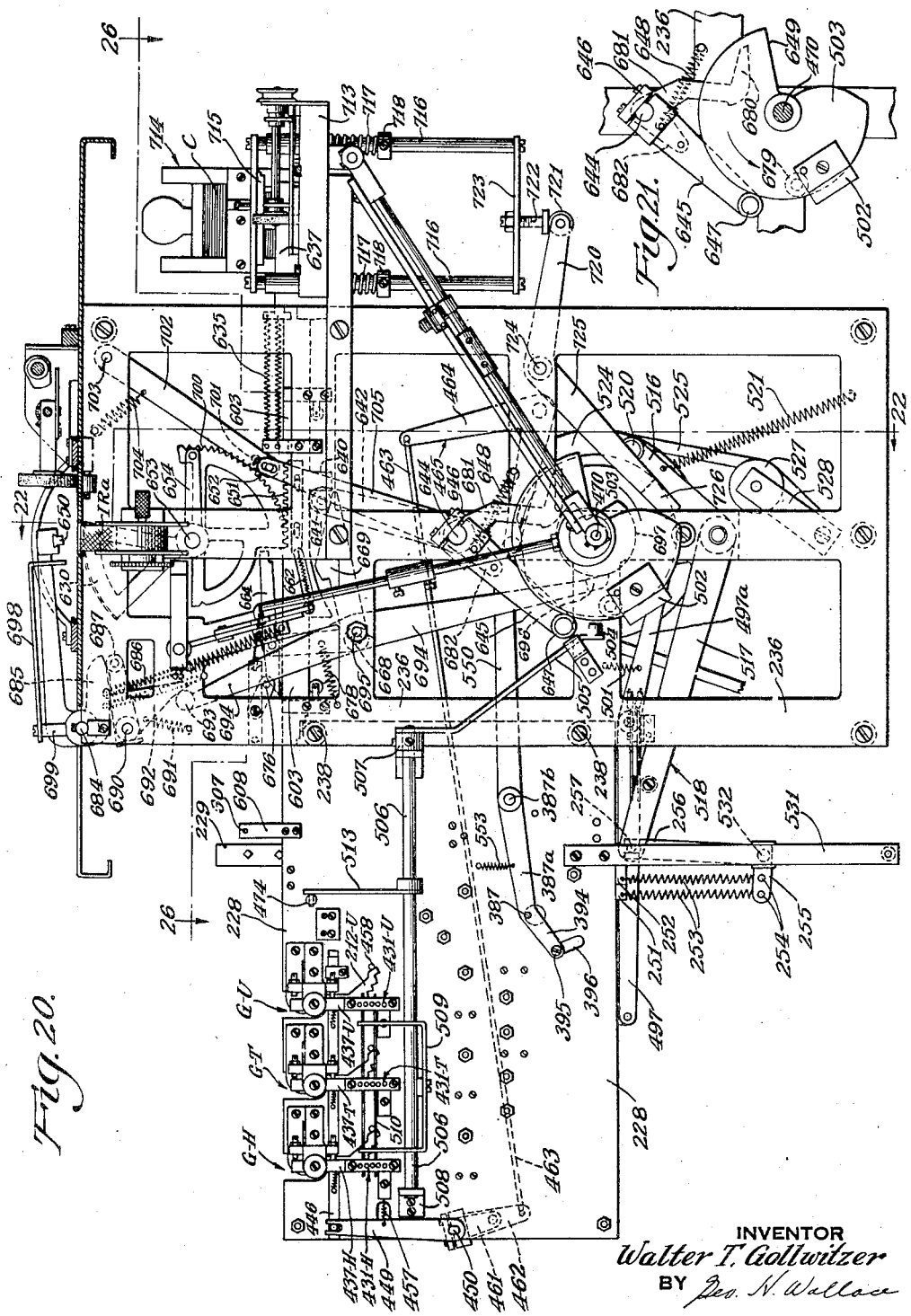

Sept. 22, 1942.   W. T. GOLLWITZER   2,296,278
CALCULATING MACHINE
Filed Jan. 9, 1940   33 Sheets-Sheet 11

INVENTOR
Walter T. Gollwitzer
BY
ATTORNEY

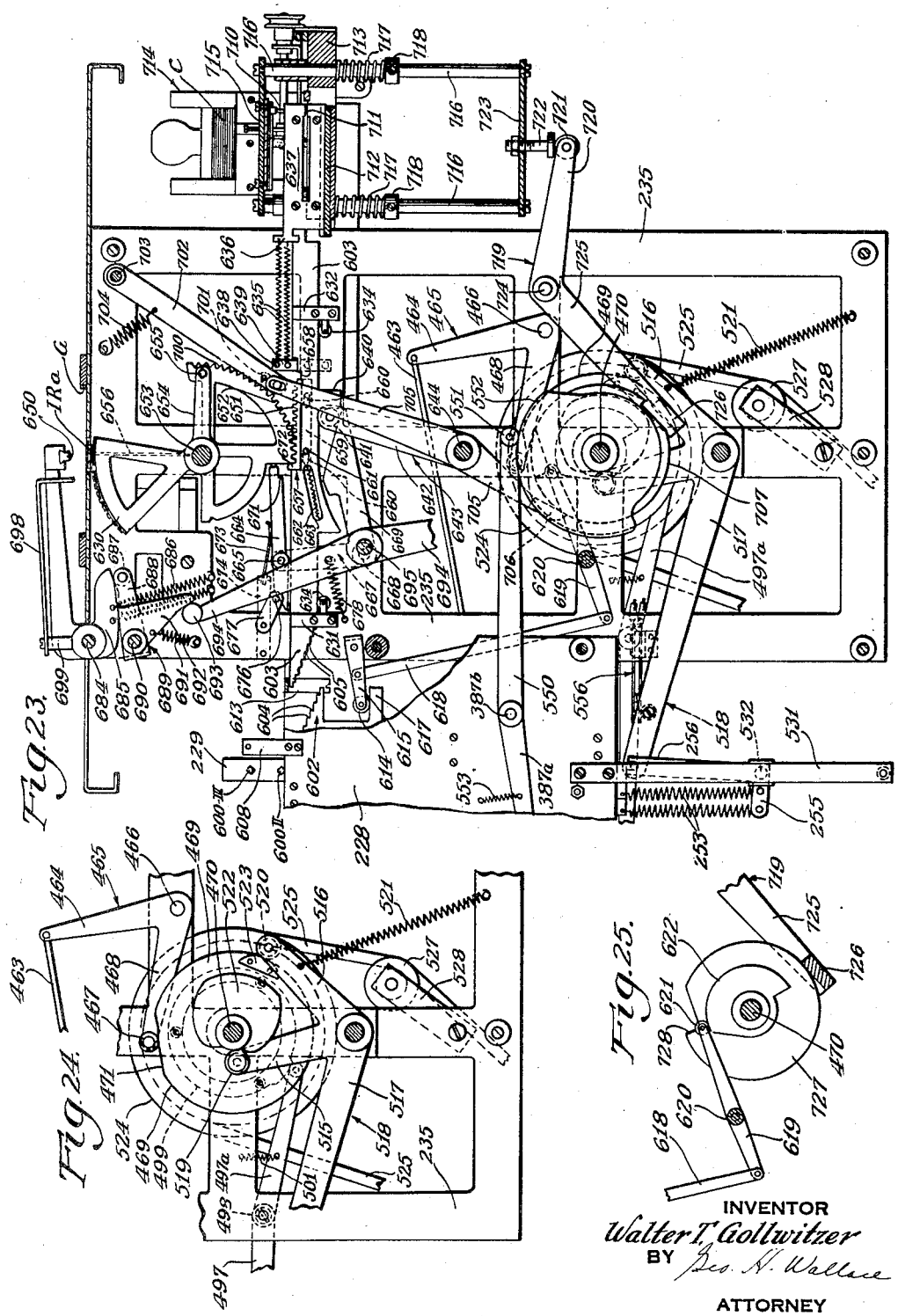

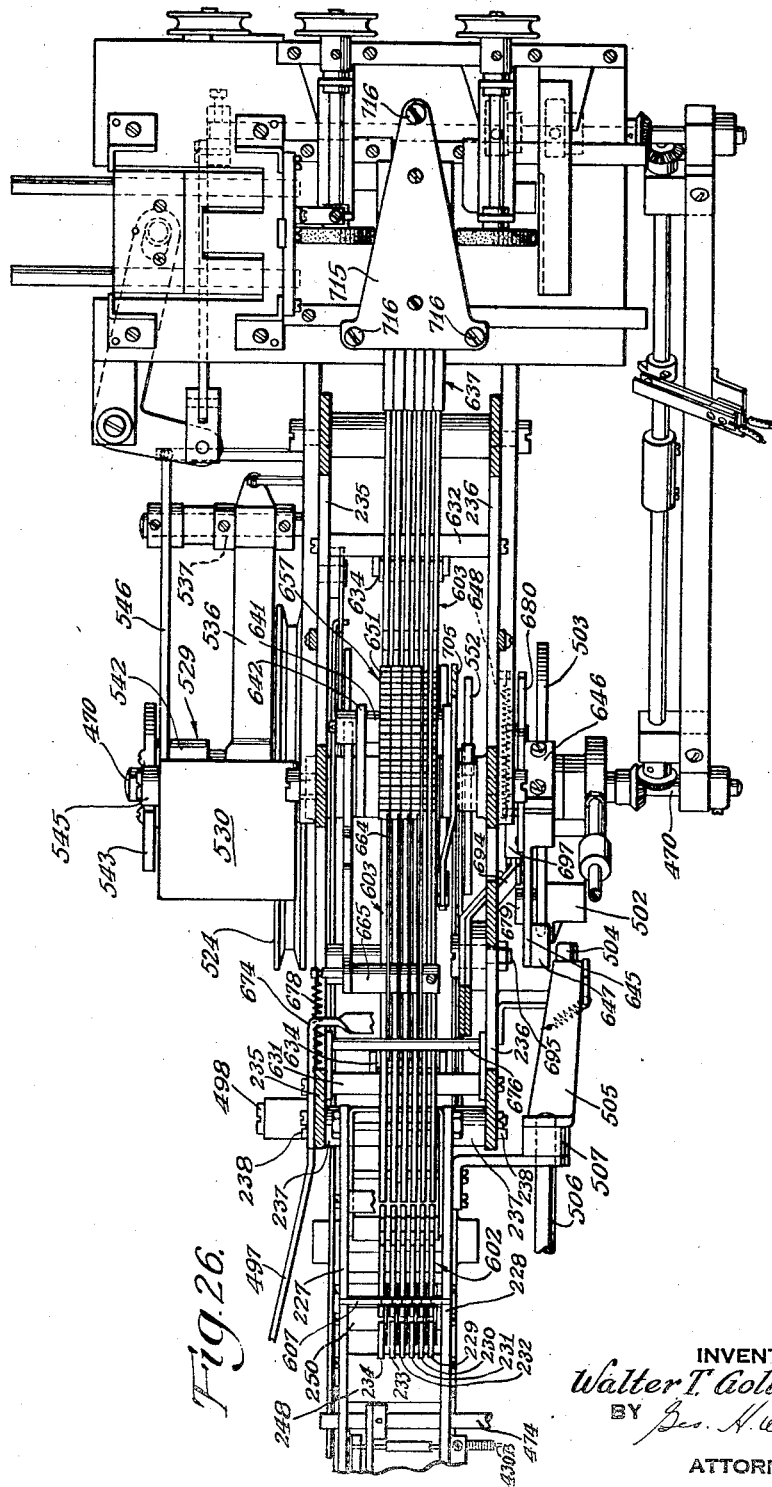

Sept. 22, 1942.　　W. T. GOLLWITZER　　2,296,278
CALCULATING MACHINE
Filed Jan. 9, 1940　　33 Sheets-Sheet 15

Inventor:
Walter T. Gollwitzer
By Geo. H. Wallace
Attorney

Sept. 22, 1942.    W. T. GOLLWITZER    2,296,278
CALCULATING MACHINE
Filed Jan. 9, 1940    33 Sheets—Sheet 17
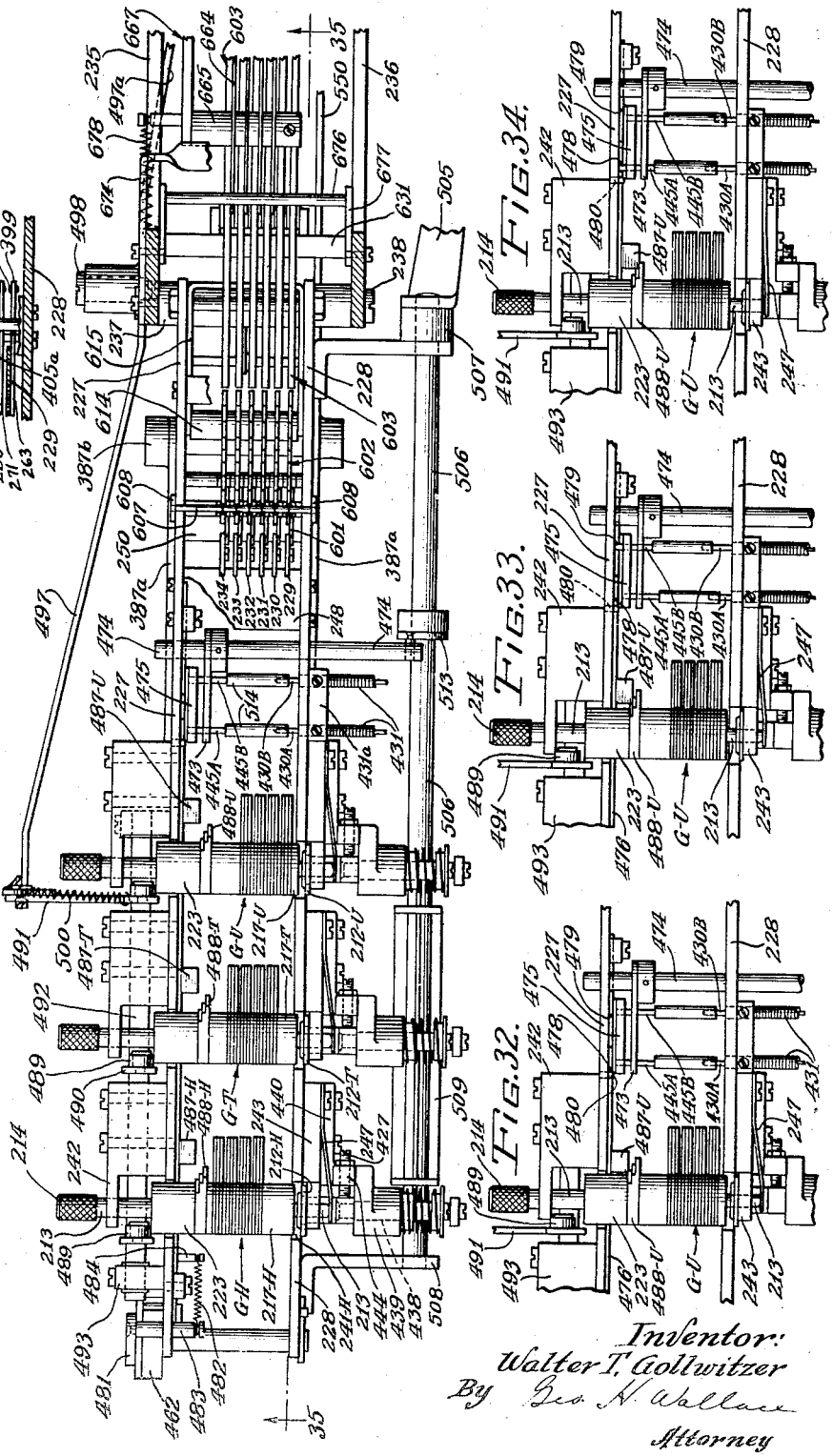
Inventor:
Walter T. Gollwitzer
By Geo. H. Wallace
Attorney

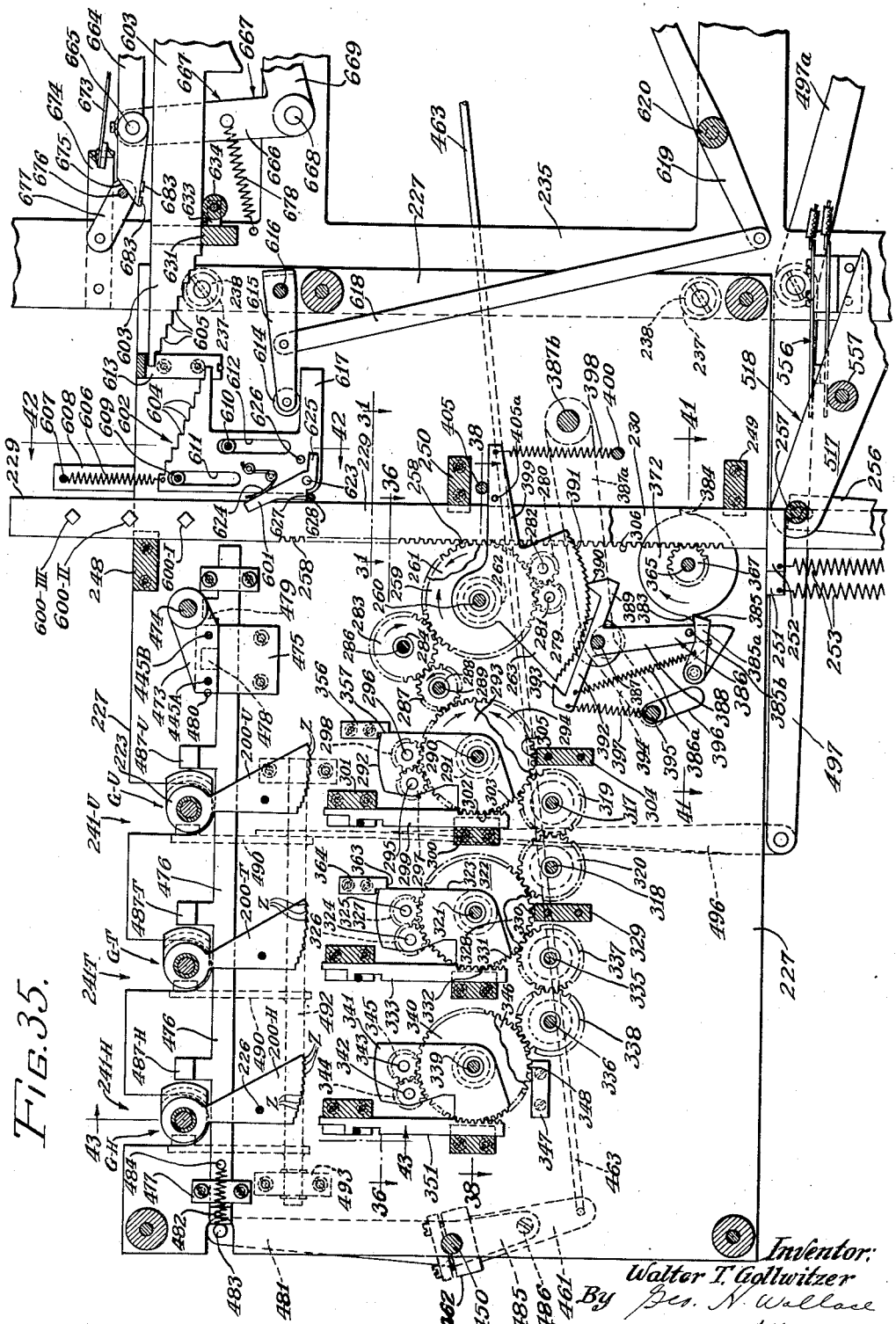

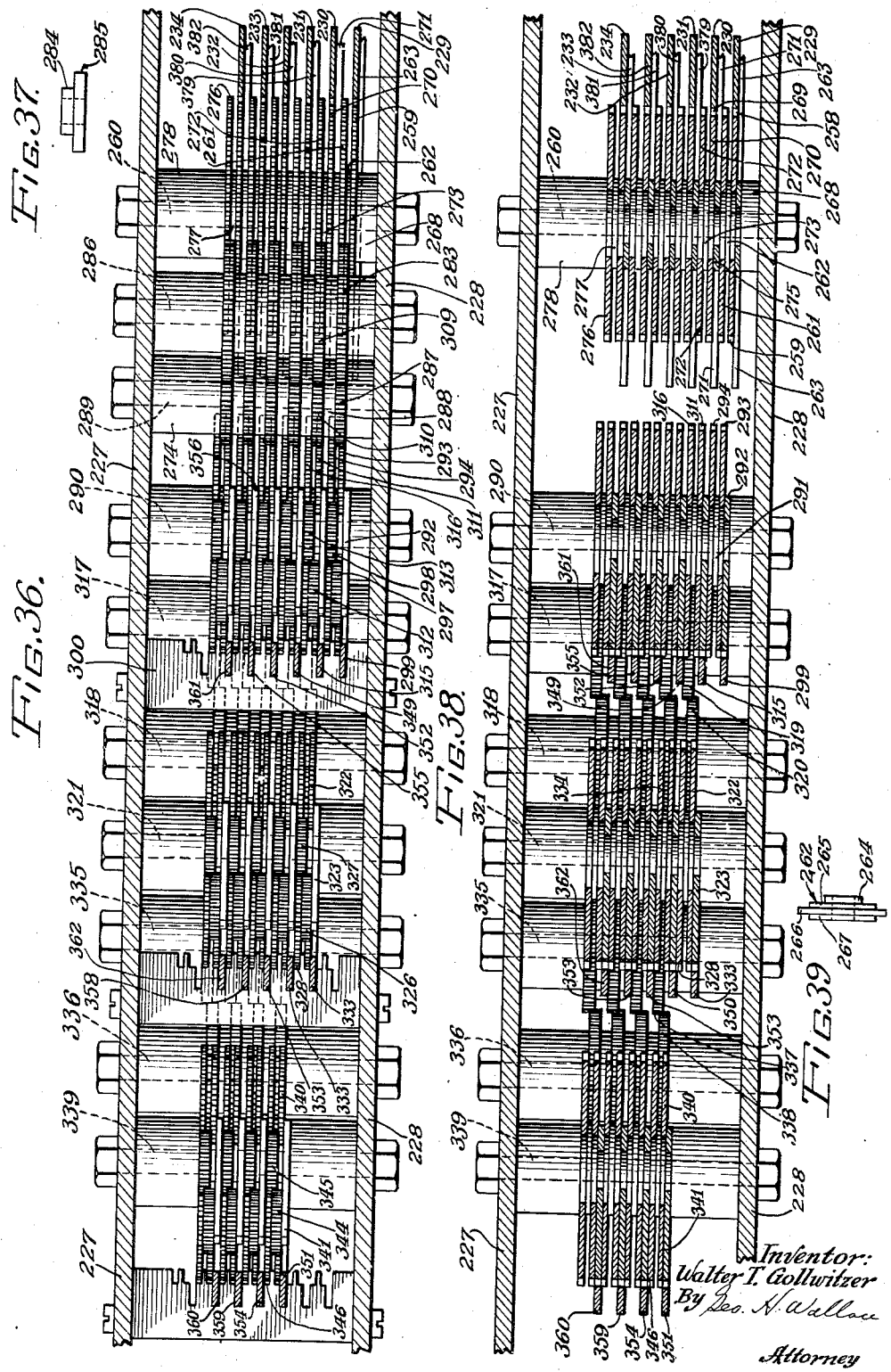

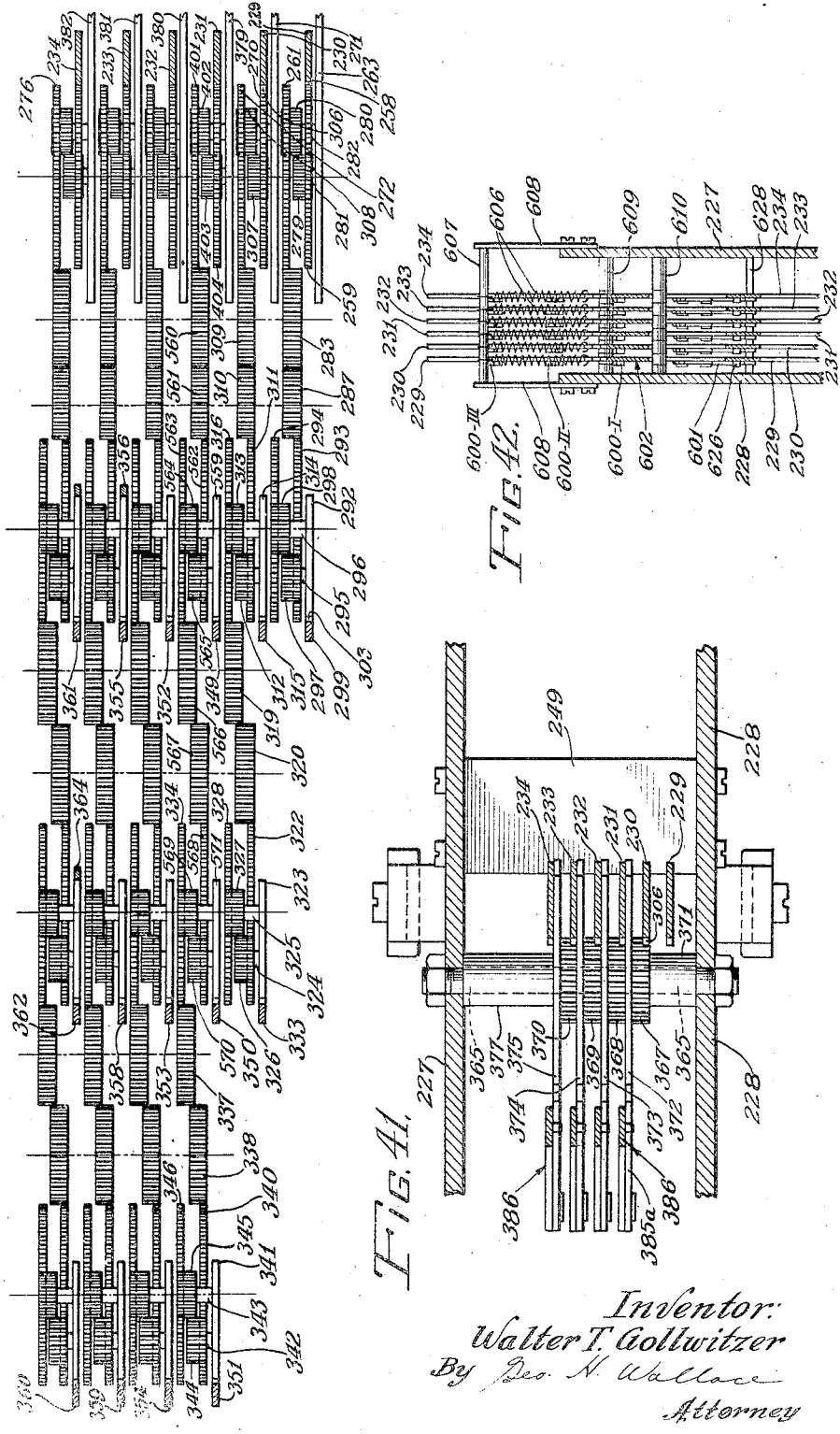

Sept. 22, 1942.  W. T. GOLLWITZER  2,296,278
CALCULATING MACHINE
Filed Jan. 9, 1940    33 Sheets-Sheet 21
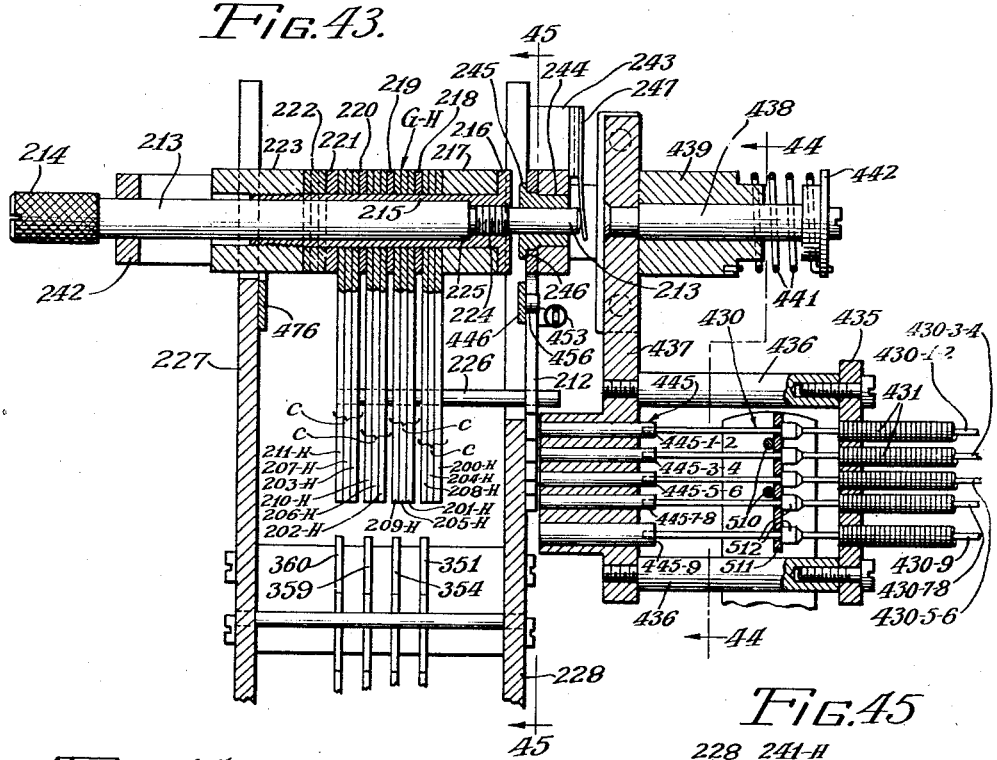
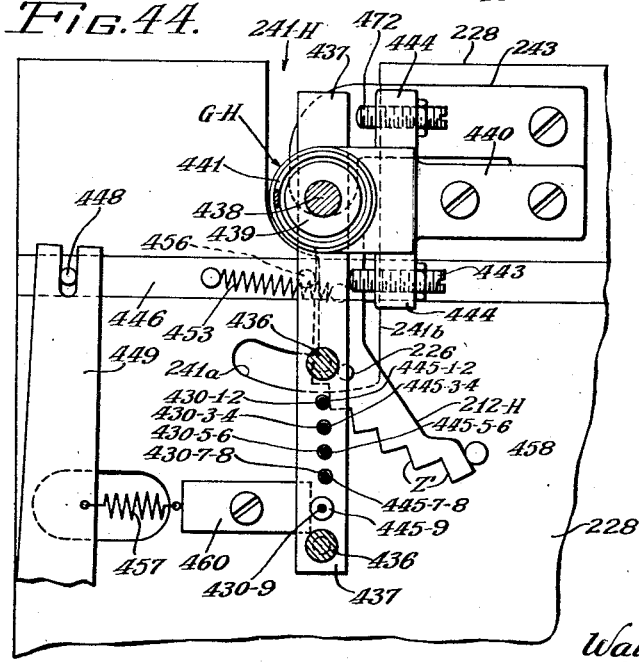
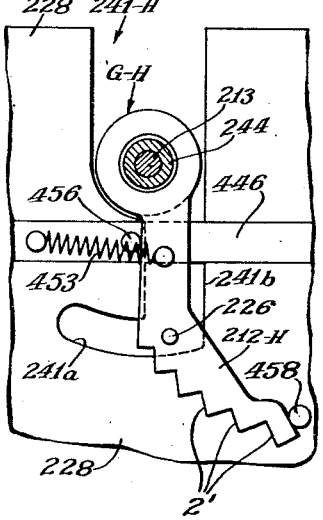
Inventor:
Walter T. Gollwitzer
By Geo. H. Wallace
Attorney Sept. 22, 1942.　　　W. T. GOLLWITZER　　　2,296,278
CALCULATING MACHINE
Filed Jan. 9, 1940　　　33 Sheets-Sheet 22

Inventor:
Walter T. Gollwitzer
By Geo. H. Wallace
Attorney

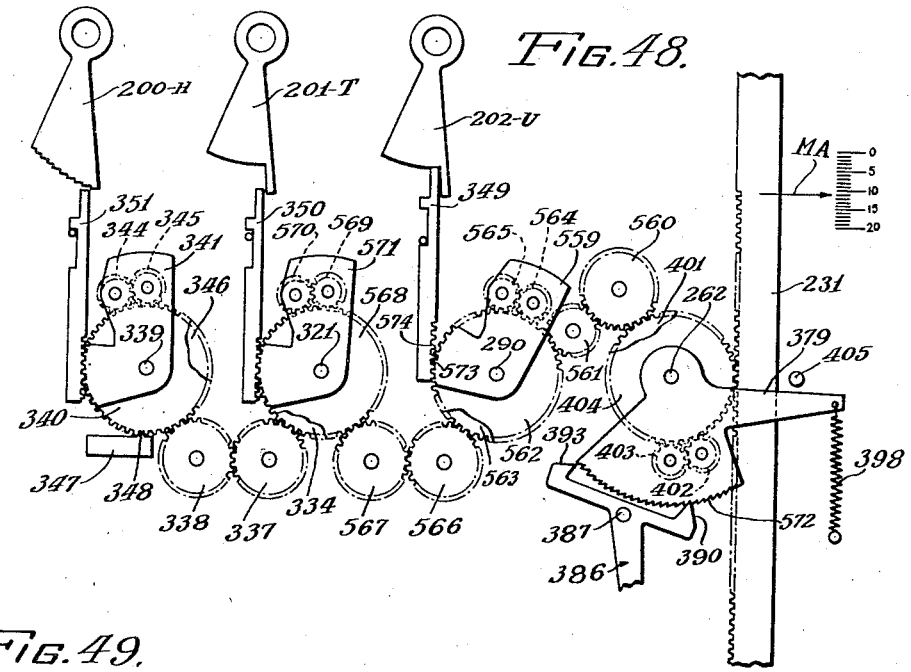
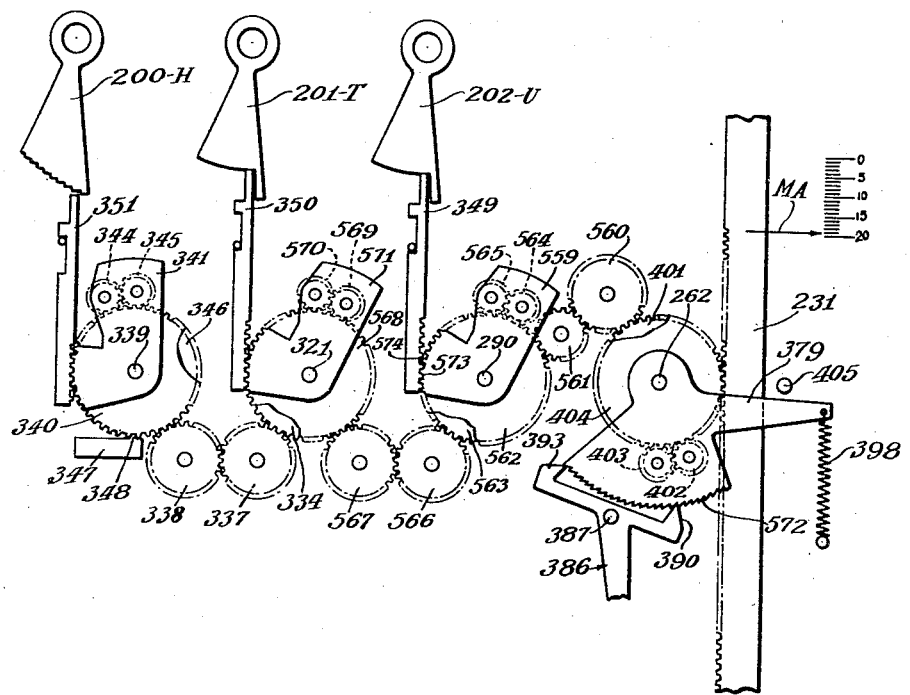

Sept. 22, 1942.   W. T. GOLLWITZER   2,296,278
CALCULATING MACHINE
Filed Jan. 9, 1940   33 Sheets-Sheet 24

Inventor:
Walter T. Gollwitzer
By Geo. H. Wallace
Attorney

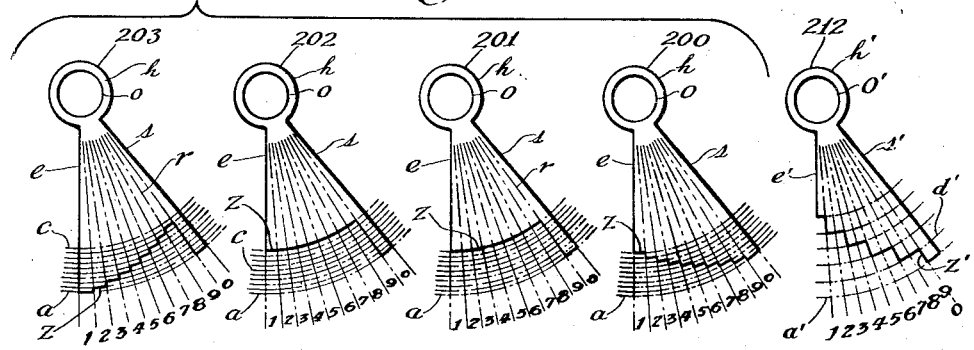
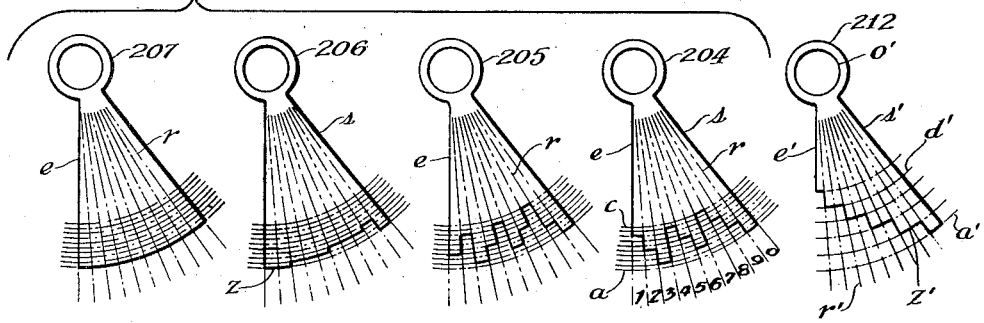
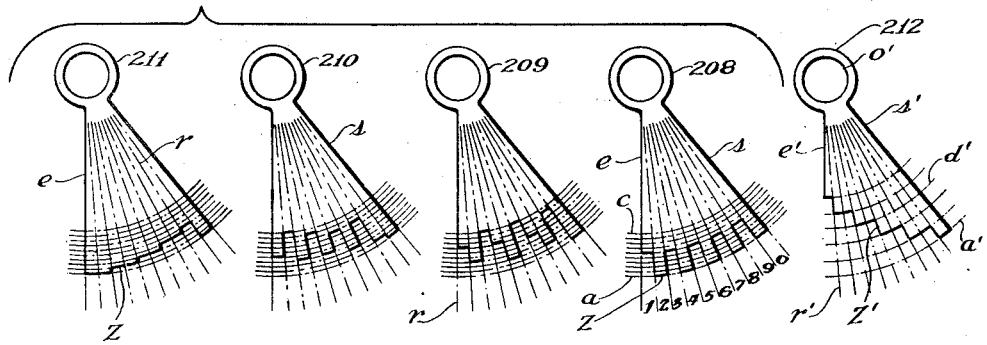

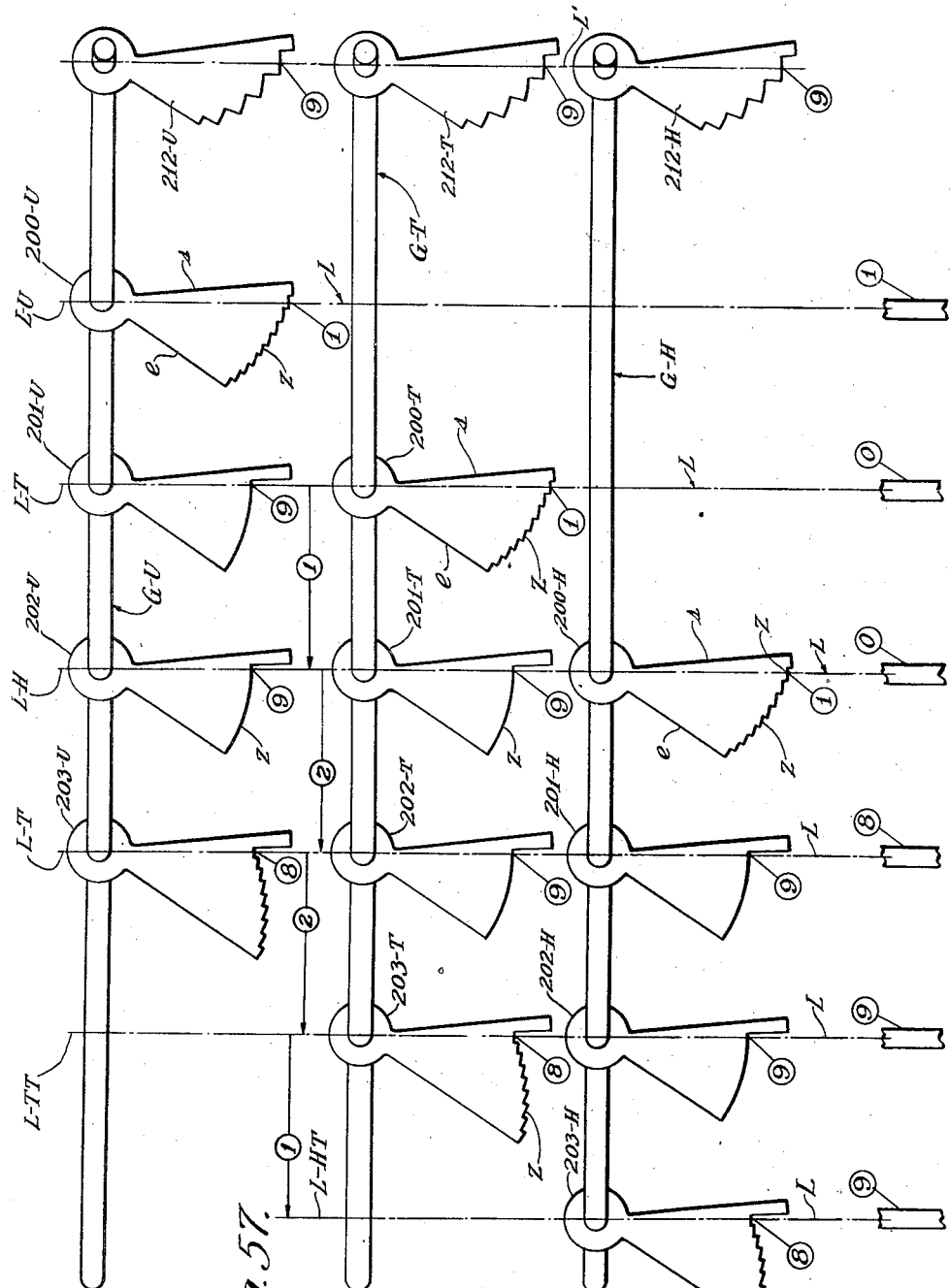

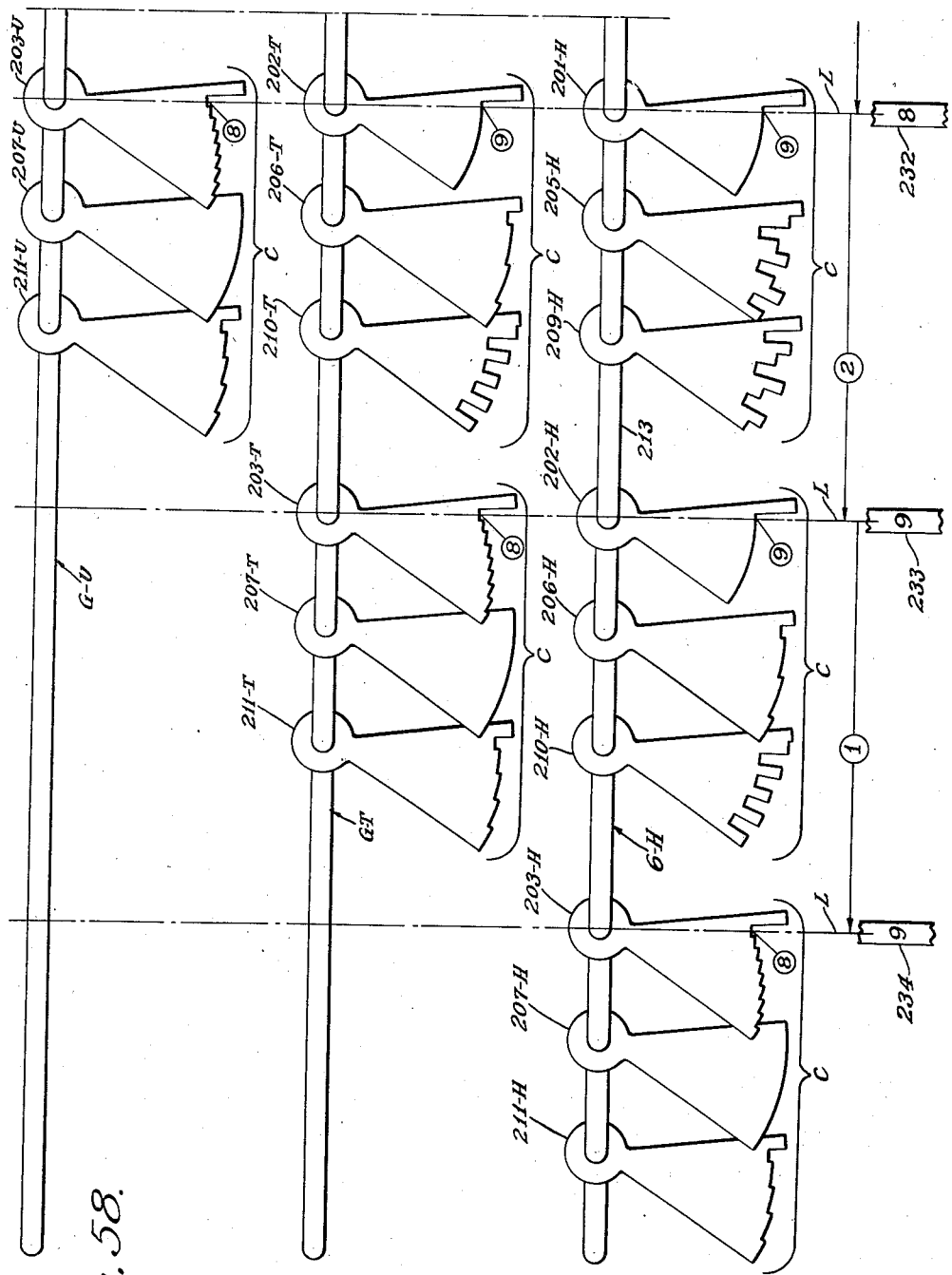

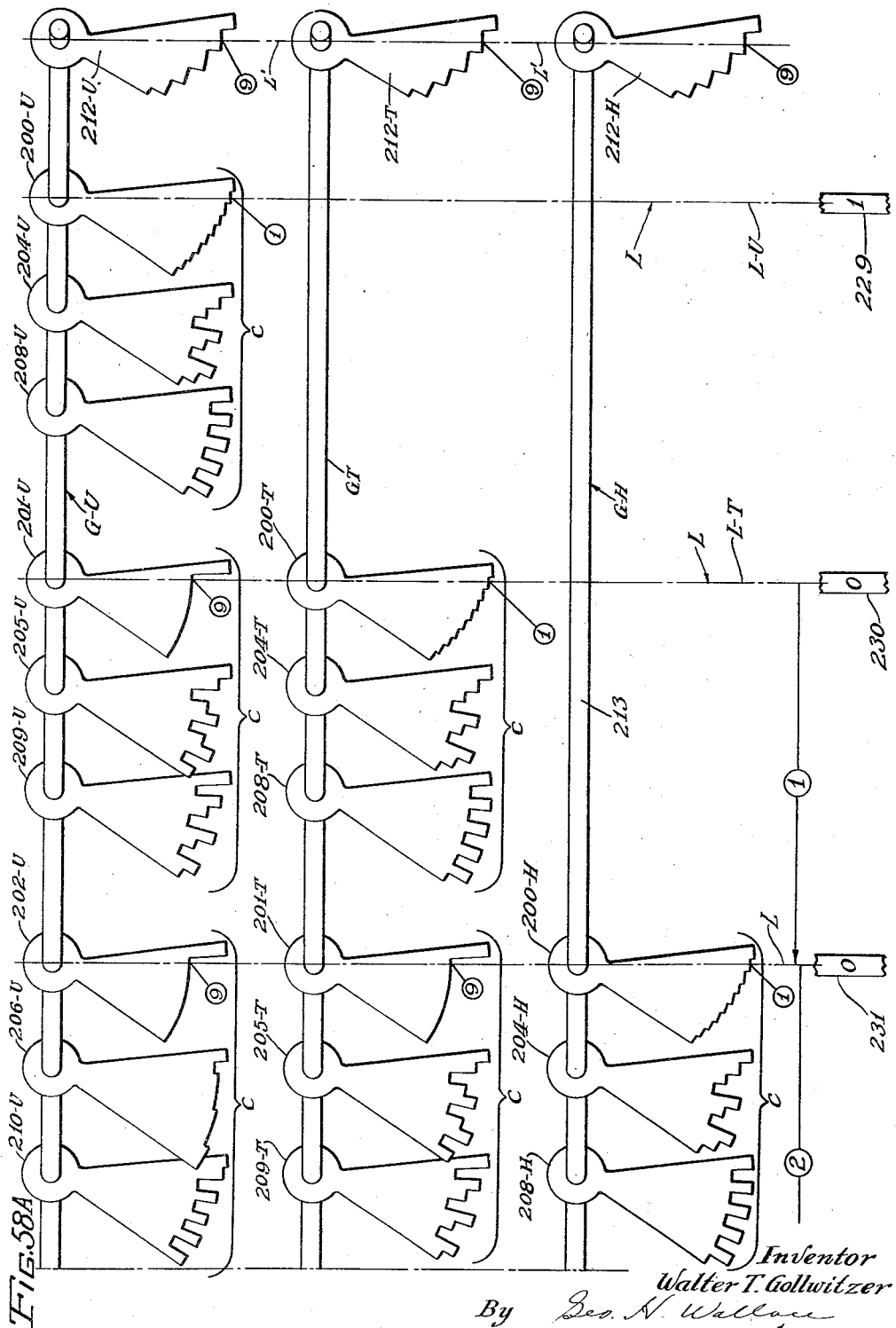

Sept. 22, 1942.   W. T. GOLLWITZER   2,296,278
CALCULATING MACHINE
Filed Jan. 9, 1940   33 Sheets-Sheet 29

Inventor:
Walter T. Gollwitzer
By Geo. H. Wallace
Attorney

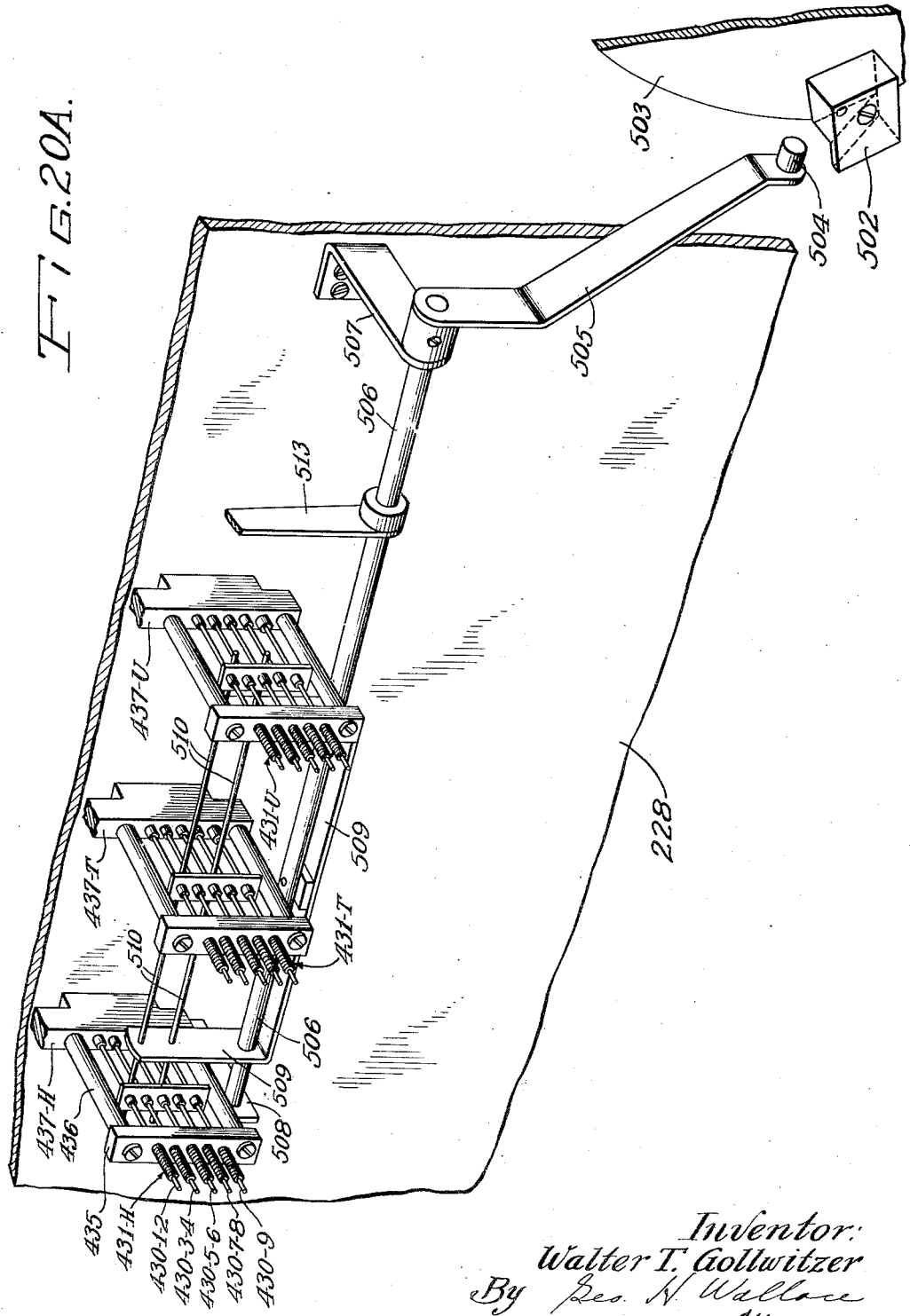

Sept. 22, 1942.  W. T. GOLLWITZER  2,296,278
CALCULATING MACHINE
Filed Jan. 9, 1940  33 Sheets-Sheet 31
FIG. 23A.
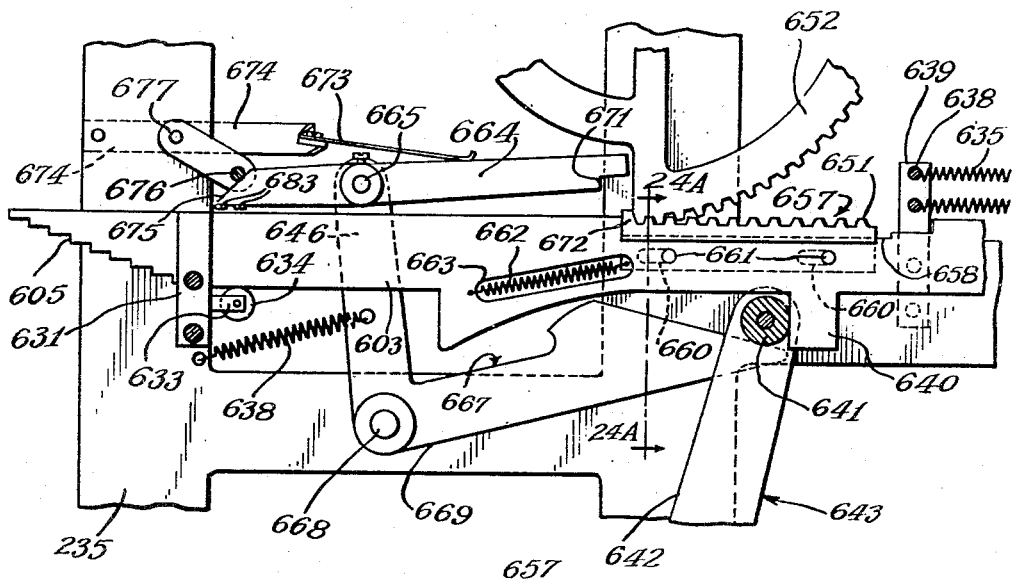
FIG. 24A.
FIG. 25A.
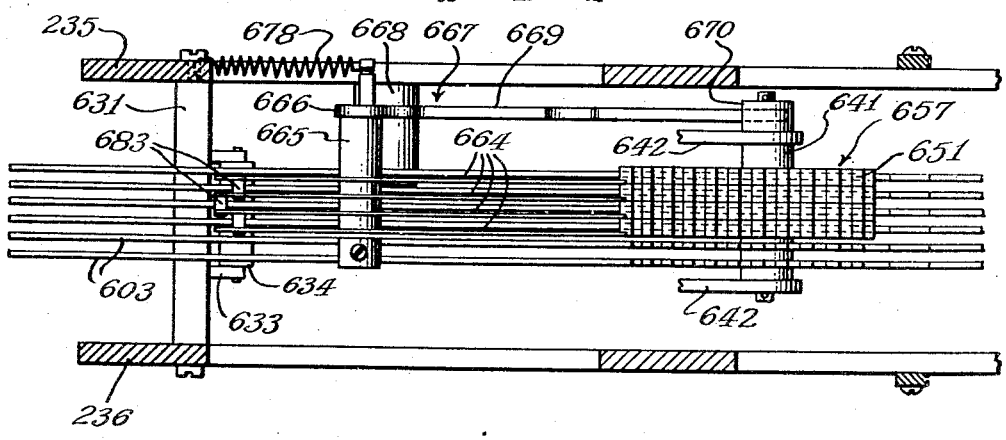
Inventor
Walter T. Gollwitzer
By Geo. N. Wallace
Attorney Sept. 22, 1942.   W. T. GOLLWITZER   2,296,278
CALCULATING MACHINE
Filed Jan. 9, 1940    33 Sheets-Sheet 32

Inventor
Walter T. Gollwitzer
By Geo. N. Wallace
Attorneys.

Patented Sept. 22, 1942

2,296,278

UNITED STATES PATENT OFFICE 2,296,278

CALCULATING MACHINE

Walter T. Gollwitzer, Euclid, Ohio, assignor to Addressograph-Multigraph Corporation, Wilmington, Del., a corporation of Delaware Application January 9, 1940, Serial No. 313,147

28 Claims. (Cl. 235—61)

This invention pertains to calculating machines and more especially to machines wherein products are ascertained and while reference will be made herein to multiplications being performed to ascertain the products, it is to be understood that a machine embodying the present invention is not a multiplying machine in the sense that full and complete multiplications are performed therein in the course of ascertaining particular products, as is done in multiplying machines of the over-and-over addition type or of the partial product type, a machine of the present invention, on the contrary, merely functioning to select representations of certain products and to then add or summarize or otherwise transfer the values so represented in the machine to means from which the final products may be printed or otherwise recorded or ascertained.

The present invention especially pertains to a calculating machine or apparatus particularly adapted for use in machines wherein business instruments, such as checks drawn on banks, public utility bills, insurance notices, invoices and the like, are prepared but, while the apparatus is particularly adapted for such usage, it will be apparent from the following description that the apparatus is capable of a wide variety of uses and that the principles of construction and operation entailed therein are susceptible of use in calculating machines of widely varying types adapted for numerous uses.

Exemplifications of machines of the kind in which the novel apparatus of the present invention is especially adapted for usage are to be found in, for example, United States Letters Patent 2,041,183, 2,083,061, 2,132,411 and 2,132,413. Usually a roll of paper is mounted in proper relation with machines of this kind and a web is withdrawn therefrom and led to the machine. Sheets cut from this web, or which are removed from a stack of pre-cut sheets stored in the machine, are fed through the machine past one or more printing positions whereas impressions are made thereon either directly from printing, printing and control, or like devices, that are sequentially fed through the machine, or from suitable printing mechanisms set up under control of printing and control or like devices or record cards or the like. Furthermore, in machines of this kind constantly reoccurring data are sometimes printed on the sheets both before and after pre-cut sheets are stacked in the machine or before the sheets are severed from a web or after such severance and ofttimes such impressions are made on the sheets both prior to and after severance thereof from a web.

The data printed on sheets, as business instruments such as those to which reference has been made, other than the constantly reoccurring data, may be conveniently classified as changeable data and variable data. The changeable data are usually those which are directly printed from printing, printing and control, or like devices and usually consist of an identification, such as a name and address, and the variable data are usually numerical accounting data, such as the amount of money to be paid pursuant to a check drawn on a bank or the amount of money due and owing a public utility, an insurance company or the like and also, sometimes, related data, and the present invention particularly pertains to the printing of such variable data in the herein described embodiment thereof.

One of the ways that has been proposed to print such variable data entails the use of printing and control devices, an example of which devices is disclosed in United States Patent 2,132,412. Such printing and control devices include, for example, embossed type characters from which impressions may be made directly and also include a perforated or other area affording control means under control of which the variable data may be printed. The use of such devices eliminates the necessity of comparing printing devices and record cards or the like in order to insure that related changeable and variable data will be printed on the same instrument. However, in most instances heretofore where it has been proposed to employ printing and control devices for producing changeable and variable data on business instruments or the like, the control means provided on the devices were direct representations of the variable data that were to be printed under control thereof. In view of this it was necessary to change the control areas of the printing and control devices each time there was a variation in the variable data. This was required not because of any limitation in the printing and control devices but rather by reason of limitations in the machines in which the printing and control devices were employed, which is to say, most such machines heretofore have not been equipped to interpolate the data represented in the control areas of the printing and control devices, or, more specifically, most such machines have not been equipped to perform computing operations based upon the data represented in the control areas of the printing and control devices.

In my co-pending application Serial No 221,841, filed July 28, 1938, I have shown and described a machine wherein data represented in the control areas of printing and control or like devices may be interpolated in such a way that computing operations are effected in the machine under control of the control means on printing and control or like devices sequentially passed through the machine. Moreover, in my co-pending application Serial No. 313,146, filed January 9, 1940, which is a division of my just referred to co-pending application, I have shown, described and claimed the particular apparatus which is operable to interpolate the data represented in the control areas of printing and control or like devices. However, in one form of the apparatus thus shown and described, it is necessary to remove certain operative parts and substitute other parts therefor each time, where the apparatus is used to ascertain products, one of the factors of the entailed multiplications changes. In another form of such apparatus, in which such need for changing operative parts is avoided, relatively long movements of certain operative parts are necessary and moreover this form of the apparatus cannot be arranged as compactly as may be the first referred to form of such apparatus. The present invention, like that disclosed in my aforesaid co-pending applications, entails the use of printing and control devices in the preparation of business instruments and the like and furthermore enables the advantageous aspects of both of the aforesaid forms of the apparatus to be realized.

A specific example of the use of printing and control devices in the preparation of business instruments is the preparation of so-called dividend checks of a corporation by means of which dividends declared and owing by the corporation are distributed to its shareholders. It is to be understood, however, when reference is made herein to the preparation of dividend checks of a corporation, that this is merely an exemplary utilization of my invention for my invention is capable of use in a wide variety of instances in which sheets are to be printed and among other instances may be cited the preparation of tax bills, public utility bills, insurance premium notices, chain store billings and allied and kindred operations. Thus, while reference is made herein to the preparation of dividend checks of a corporation, it is to be understood that my invention has, in reality a much wider field of application.

Perhaps the most frequent interpolation of data such as may be represented in the control areas of printing and control or like devices is a computing operation entailing the ascertainment of products, which, for the sake of having a convenient term, will be referred to hereinafter as multiplication, and among the important objects of this invention is to enable such multiplications to be performed under control of printing and control devices and a related object is to enable one factor of each such multiplication to be represented in the control area of a printing and control or like device and to enable the other factor to be set up under control of such printing and control or like device. In the preparation of dividend checks of a corporation the factor of the respective entailed multiplications represented in the control areas of the printing and control or like devices to be utilized in such preparation may be the number of shares of stock owned by the shareholders to whom a particular printing and control device relates, and the other factor, the dividend rate, may be included or set up in the machine to be selected under control of certain characteristics of the printing and control or like devices. In an instance where the dividend rate will remain constant for a large number of operations, multiplications in such an instance, this factor of the various multiplications may advantageously be, in effect, constantly represented in the machine and another important object of this invention is to enable this to be accomplished and a related object is to enable a plurality of such reoccurring factors to be represented in the machine in such a way that such factors may be selectively rendered effective.

Where a large number of multiplications are to be made entailing an identical amount as one factor of the multiplications, it is possible to pre-compute and represent in suitable means, as a set, the various products that will result from such multiplications and it will be apparent that if printing or other operations are performed from representations of one or more sets of precomputed products rather than from means set up as the result of individual multiplying operations, a high degree of accuracy may be attained inasmuch as operations and movements incidental to the setting up of variably settable means in multiplying and like operations may be avoided, and consequently still another important object of this invention is to enable one or more sets of representations of pre-computed products to be utilized in setting up devices from or under control of which printing or other operations are performed or from which products may be otherwise ascertained, and a related object, where more than one set of such representations is provided in the machine, is to enable such sets to be rendered effective selectively.

Where one or more sets of devices having representations of one or more sets of pre-computed products are employed, it will of course be necessary to change a set of such devices each time there is a variation in both factors of the multiplications entailed in ascertaining the set of pre-computed products represented on such a set of devices. This will occur infrequently where a large number of multiplications are to be performed in each of which the same factor is involved, but even in such instances the need for substitution will arise when there is a change in the reoccurring factor, and consequently a further object of this invention is to enable substitution of devices representative of one set of pre-computed products for another in an expeditious manner when the need so to do arises, and further objects kindred to the foregoing are to enable a plurality of such sets to be so arranged in a machine that removal and replacement thereof may be expeditiously effected and to enable but one of a plurality of such sets to be removed and replaced when desired or necessary.

While reference has been made and will hereafter be made to representations of a factor of to be performed multiplications appearing in the control area of a printing and control device, it is to be understood that my invention is not limited to the use of printing and control devices for, among the objects of the present invention, is to render operative certain devices, included in the machine, under control of variable data representations, such as perforations, embossages or the like, irrespective of the type of devices on which such representations may appear, and furthermore when reference is made to selecting representations of products under control of certain characteristics of printing and control devices, it is to be understood that such characteristics may be imparted to the devices by providing perforations therein or embossages thereon or by the use of selectively located index tabs or notches or the like or by the use of other suitable lacuna and, moreover, such selecting may be effected under control of other than characteristics of printing and control devices as, for example, record cards or the like.

In some multiplying machines, as heretofore constructed and capable of handling factors each containing more than one digit and wherein representations of pre-computed products have been employed, the system of so-called partial product multiplication has been followed and this had entailed representing the carries, incidental to the various multiplications, in one set of devices, pertaining to a given order of numbers, and the products without the carries in another set of devices pertaining to the same order of numbers, that is, two sets of devices were provided for each order of numbers of each set of pre-computed products. Thus in each and every multiplication, and particularly where a carry was entailed, at least two devices entered into the operation. Now it will be recognized that the greater the number of devices entailed in a particular operation the greater the likelihood of error and the more complicated the mechanism responsive thereto need be, and in view of this still other objects of this invention are to represent products in the machine in such a way that each and every product, that may result from all multiplications that may be performed within the capacity of a particular machine, will be represented in devices of which each pertains to but a single order of numbers; to so represent the pre-computed products of a particular set thereof, where such are to be utilized, that each and every such product resulting from the multiplication of a multiplicand by a digit in the multiplier will be represented in a set of devices in which set each device pertains to but a single order of numbers; and to so represent the pre-computed products resulting from related multiplications that the carries arising in one order of numbers will be represented in a device pertaining to the next higher order of numbers along with and as a part of the representations appearing in such device of the digits of the products accruing from multiplications in that order without the incidental carries to the order next higher to this particular next higher order.

Where multiplication is performed in longhand the various digits in a multiplicand are multiplied separately by each digit in the multiplier and the products found by such multiplications are separately set down. Those respective products thus obtained by multiplication of the various digits of the multiplicand by the various digits of the multiplier may be conveniently referred to as "intermediate products" inasmuch as these products enter into, but are not, the final product, where there is more than a single digit in the multiplier, the final product in such instances being the sum of such intermediate products including whatever carry-overs there may be incidental to the summation of the various digits in various intermediate products in corresponding orders with respect to the final product. It will be readily apparent that the number of carries entailed in summarizing such digits of intermediate products will be far less than the number of carries entailed in the digit by digit multiplication of a multiplicand by the digits of a multiplier and from this it will be seen that if representations of intermediate products are utilized in a machine and the machine operates to select the proper intermediate products and to then summarize them to thereby, in effect, perform a multiplication, the operation may be effected rapidly and accurately inasmuch as the number of movements entailed will be relatively few, and so to do, including the use of representations of intermediate products in a machine, is an important object of this invention, and a further important object is to enable a plurality of different intermediate products to be represented in a machine, and further an object ancillary to this is to permit the representations of an intermediate product to be rendered effective selectively.

Where the intermediate products represented in a machine are those ascertained by the multiplication of a reoccurring factor by a number of other factors, the selection of the proper intermediate product or products for a particular multiplication may be effected under control of the digit or digits in the other factor of the multiplications and to do this is another of the objects of this invention. However, where representations of the intermediate products ascertained by the multiplication of a plurality of reoccurring factors are represented in a machine, the particular representation of the specific multiplication must be rendered effective and so to do is still another object of this invention, and an ancillary object, where representations of intermediate products ascertained from a plurality of reoccurring factors are entailed, is to select the proper representations under control of means on the device bearing the representations of the varying factor of the particular multiplication.

It is to be remembered that in most instances the selection of the proper intermediate products does not complete a particular multiplication, this being true where there is more than one digit in both factors of the multiplication, and these are instances where the intermediate products must be added to produce the final product, and to effect such addition or summarizing of intermediate products is still another important object of this invention, especially to effect this in a novel, rapid and accurate manner.

In connection with the foregoing it should be noted that if the multiplier factor of a multiplication extends through but a single order of numbers, that is, contains but a single digit, it will only be necessary to select one intermediate product and in such an instance the intermediate product will also be the final product. However, according to my invention, an intermediate product is selected even though the multiplier factor of the multiplication extends through but a single order, and through means identical with those employed were a plurality of intermediate products are to be summarized, representations of, or better, the final product itself, is set up, that is, ascertained, and to enable this to be effected is also an object of my invention.

More specifically, further objects of this invention are to provide representations of intermediate products and to selectively dispose such representations in an operative position under control of represenations of one of the factors of a particular multiplication and means effective to select such representations from a plurality thereof; to effect such selection under control of representations of one factor of a multiplication provided in a printing and control or equivalent device and under control of selective characteristics embodied in such devices; to effect carry-overs incidental to the summarization of selected intermediate products by the same means as a part of the summarization of such intermediate products; to so set up the final product that it may be directly ascertained or may be utilized in a printing, perforating, accumulating or other operation; and to so support the devices representative of the intermediate products in the machine that a set of devices representative of one group of intermediate products may be expeditiously substituted for another group when the need so to do arises.

Additional objects of this invention are to provide representations of the various digits that may appear in corresponding orders in different intermediate products ascertained by multiplying a given multiplicand by the various digits that may appear in a given order of the multiplier in a single device or templet, as such devices are called hereinafter; to assemble those templets pertaining to such orders into what will hereinafter be called templet-gangs whereby a templet-gang is provided for each order of the multiplier; to provide sets of templets bearing representations of the digits in a particular order of all intermediate products that may be ascertained by multiplying a variety of multiplicands by the digits that may appear in a given order of the multiplier and to assemble such sets into templet-gangs, each pertaining to a given order of the multiplier; and to selectively dispose in operative position those representations of the proper intermediate product under control of the numerical value of the digit in the order of the multiplier to which a gang pertains and also under control of means on a device bearing the representation of such digit.

In those instances where the same factor enters into a large number of multiplications it is possible to provide a templet-gang including templets bearing representations of all of the intermediate products that accrue from the multiplication of the various digits in a reoccurring factor by all of the digits that may appear in the units order of the other factor of the multiplication. Another templet-gang may be provided which will include templets bearing representations of all intermediate products that will accrue from the multiplication of the various digits in the reoccurring factor by all of the digits that may appear in the tens order of the other factor. The number of templet-gangs that will be provided in any instance will be dictated by the capacity of the machine in so far as the number of digits that may appear in the aforesaid other factor (the multiplier factor in the machine as disclosed herein) of the multiplications is concerned. Thus in the instance where the factor other than the reoccurring factor is not to be more than a three-order number, three templet-gangs will be provided.

The arrangement of the templets pertaining to a particular reoccurring factor in such templet-ganges relative to each other will follow the setting down of intermediate products in longhand multiplication, which is to say that the most right-hand templet in the gang pertaining to the units order will be disposed in the position of the most right-hand digit of the final product but in so far as the gang pertaining to the tens order is concerned the most right-hand templet therein will be disposed in the first position to the left of the most right-hand digit in the final product or, in other words, in the position of the tens order of the final product, and this same arrangement progresses on for the various gangs pertaining to the hundreds and higher orders.

Now when templets are to be provided in the machine pertaining to more than a single reoccurring factor the foregoing arrangement is still followed but each templet in each position pertaining to one reoccurring factor is arranged in predetermined relation with the correspondingly positioned templet pertaining to another reoccurring factor, and this is also true if templets pertaining to three or more reoccurring factors are to be incorporated in the machine. Such arrangement of the templets at the various positions affords, at each position, what is referred to hereinafter as a templet cluster and it will be understood that the templets for each reoccurring factor are arranged in corresponding positions in the respective clusters. The arranging of templets or the equivalents thereof in the aforesaid manner is also among the objects of this invention, and further another object is to arrange the templet clusters, as aforesaid, in templet gangs, each pertaining to a given order of the variable factor of the entailed multiplications. Moreover, it is a further object to render the proper templet in each cluster thereof effective in a selective manner, and an ancillary object is to do so under control of means on the device that bears the representation of the variable factor of a particular multiplication.

It is contemplated that the templets in such templet-gangs will assume, in so far as the operative positions thereof are concerned, positions representative of zero unless, in the course of a calculating operation, the templets are positioned in locations pertaining to significant digits entailed in the multiplication being performed so that if a summation means cooperates therewith, when zero positions on the templets are at the operative positions thereof, to set up a final product, such final product will be all zeros. By reason of this arrangement it is possible to utilize in a particular multiplication only one of a plurality of templet-gangs and to employ a single summation means to set up the final product, for those templet-gangs which are not, in such circumstances, set up in positions pertaining to significant digits will be in their zero positions and will, in effect, be ineffective and hence the product derived from the single set-up gang will be the correct final product, and this also applies where but two, or any number less than all templet gangs, are not set in positions pertaining to significant digits.

Thus in view of the foregoing, still further and somewhat specific objects of this invention are to enable multiplication to be effected by utilizing templet-gangs including templets or clusters of templets bearing representations of the intermediate products that will accrue from the multiplication of the various digits of a reoccurring factor or reoccurring factors (multiplicand) of a multiplication; to selectively dispose the proper representations of a desired intermediate product in an operative position relative to a sensing means; to sense the representations of intermediate products so disposed in an operative position and under control of such sensing set up representations of the final product (such final product being the sum of the intermediate products in operative position together with any incidental carry-overs); and to sense the representations of intermediate products in an operative position and to effect carry-overs incidental to the summation of such sensed intermediate products as one continuous operation in so far as each order of the final product is concerned and to perform all such operations pertaining to different orders of the final product simultaneously.

Further objects related to the foregoing are to print ascertained final products in the course of operation of the multiplying apparatus; to enable such products to be printed on sheets or the like fed to the apparatus; to enable money values to be printed in the apparatus and to prevent raising of the printed money values; to insure the production of neat impressions by aligning the type characters entering into the printing operations in proper relation with each other; to enable records of the ascertained final products, other than the direct printing thereof, to be produced; to perforate or otherwise provide representations of the ascertained products in or on record cards or equivalents thereof; to feed and remove record cards or equivalents thereof to and from the additional record producing means in the apparatus; to insure that the printed and additional record of the ascertained products accurately correspond by utilizing identical means to effect set-up of the means for effecting production thereof; and to insure accurate positioning of operative parts in the multiplying apparatus and to particularly insure accurate and complete restoration thereof upon completion of the operative functions.

Yet further objects of the invention are to utilize a planetary gear train to effect summation of the digits in the intermediate products pertaining to a particular order of the final product; to so support the gears in such trains that the number of gears required within the capacity of the apparatus may be expeditiously accommodated therein and to enable the same supports to be employed in any event where less than a predetermined number of such gears are to be employed whereby when, for example, the final product will extend through but four orders, but four sets of such gears can be arranged in the apparatus and where, for example, the final product may extend through eight orders, eight such sets can be accommodated; to utilize rectilinearly movable members for effecting the sensing of the representations of the digits of the intermediate products; to utilize rectilinearly movable members to represent the digits to appear in the respective orders of each final product; to so interconnect the rectilinearly movable sensing and representing members that free movement of such parts and of the interconnecting means will be assured and also to insure accurate operation of such parts; and to provide a novel, efficient, positive, accurate and rapid multiplying apparatus of small and compact arrangement and also of simple and economical construction.

Other and further objects of the present invention will be apparent from the following description and claims and are illustrated in the accompanying drawings which, by way of illustration, show preferred embodiments and the principle thereof and what I now consider to be the best mode in which I have contemplated applying that principle. Other embodiments of the invention embodying the same or equivalent principle may be used, and structural changes may be made as desired by those skilled in the art without departing from the present invention and the purview of the appended claims.

Figure 2:
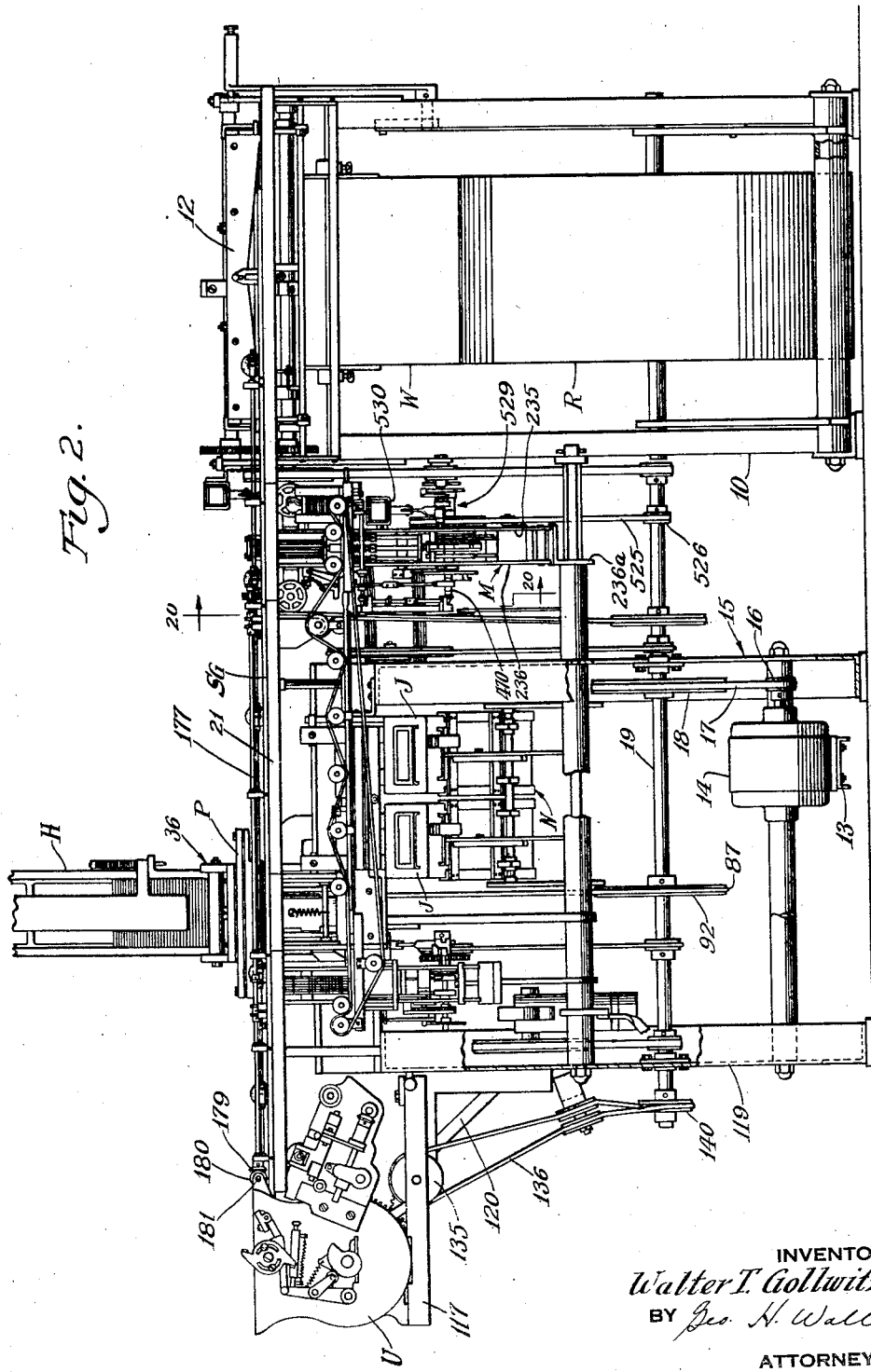
Figure 3:
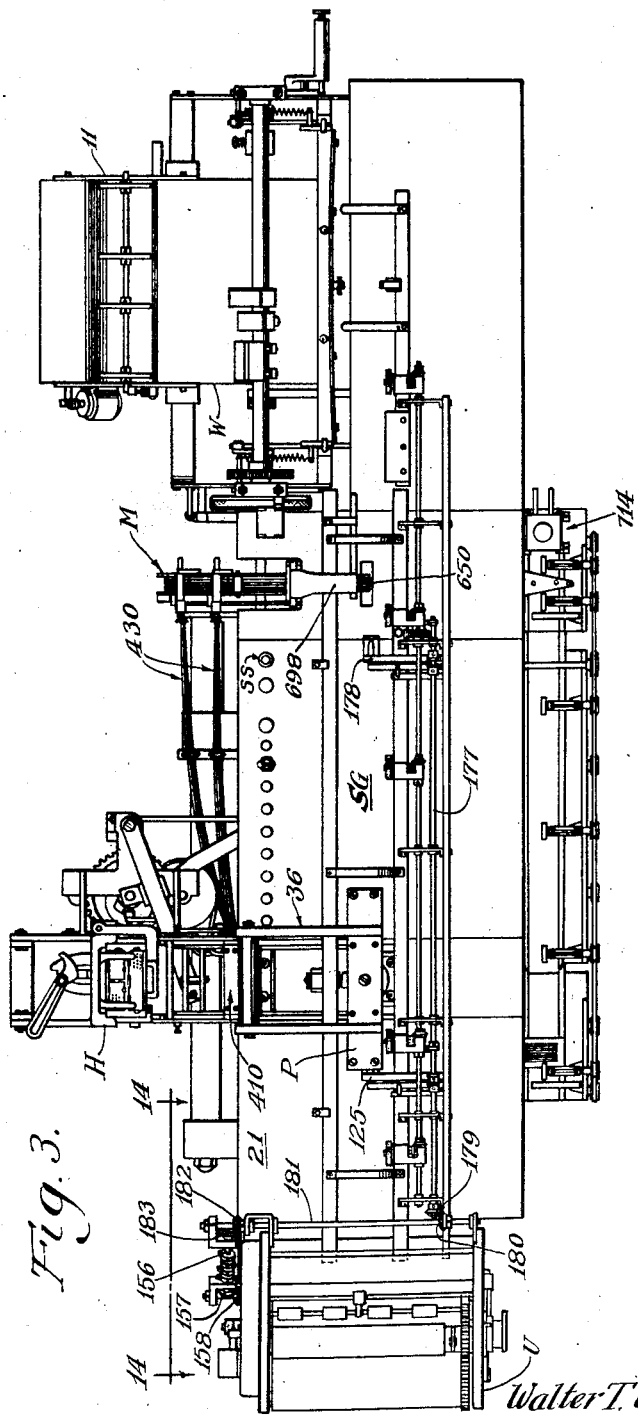
Figure 4:
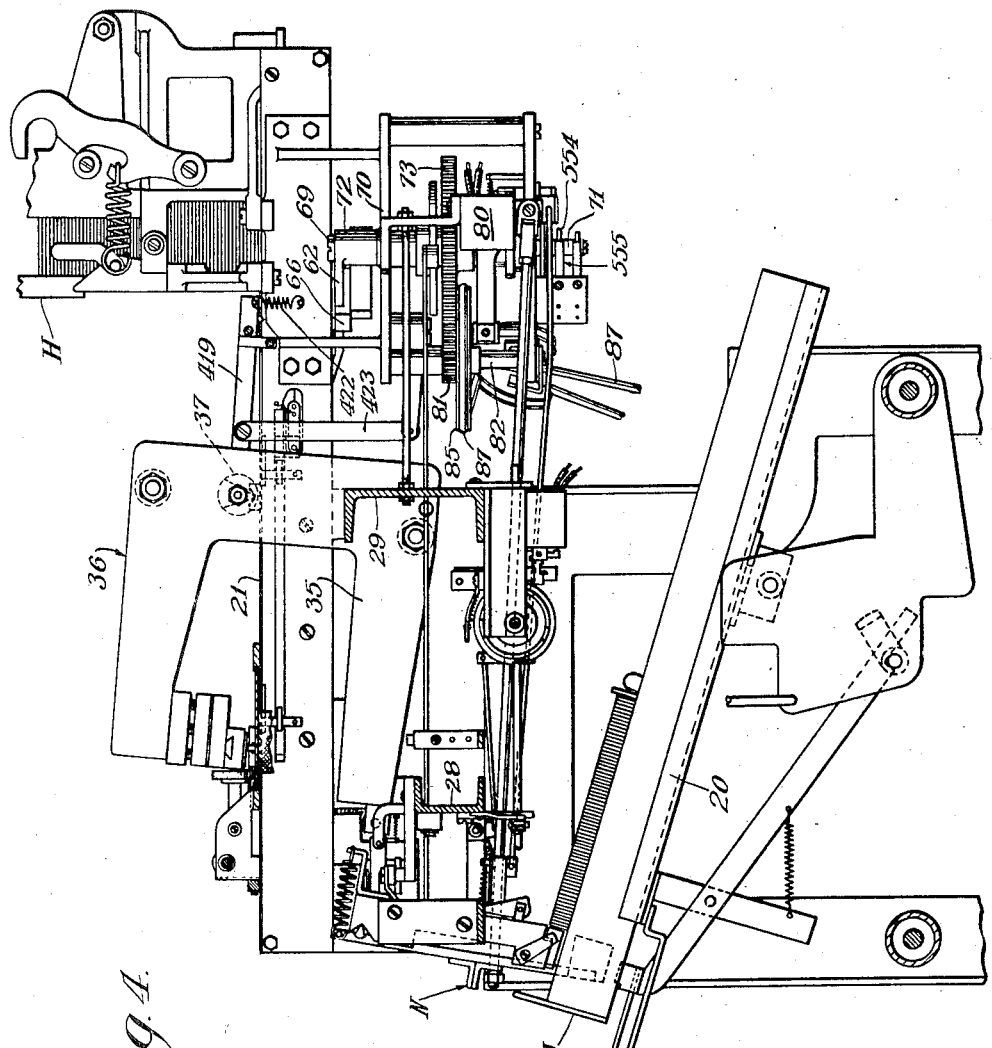
Figure 14:
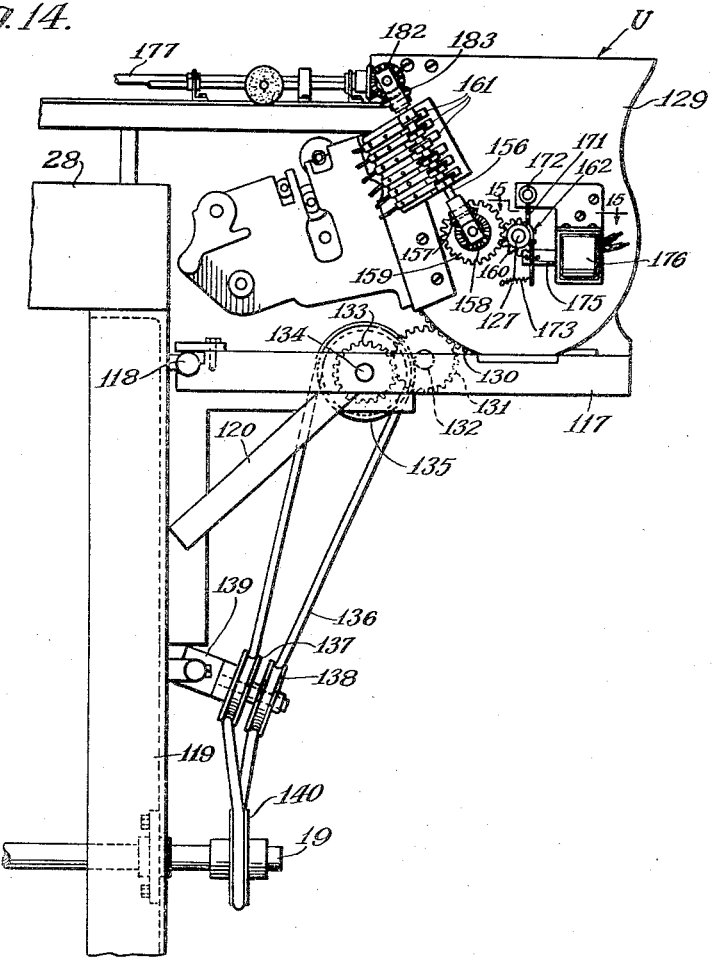
Figure 16:
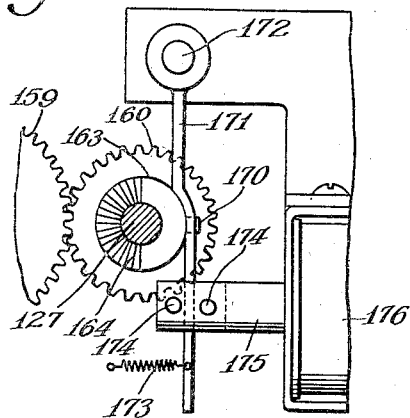
Figure 15:
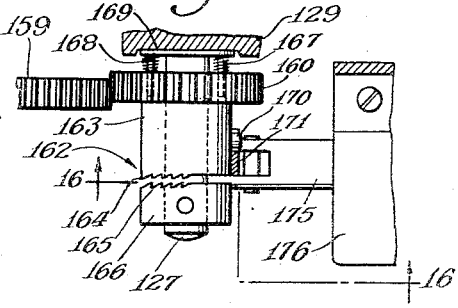
Figure 22:
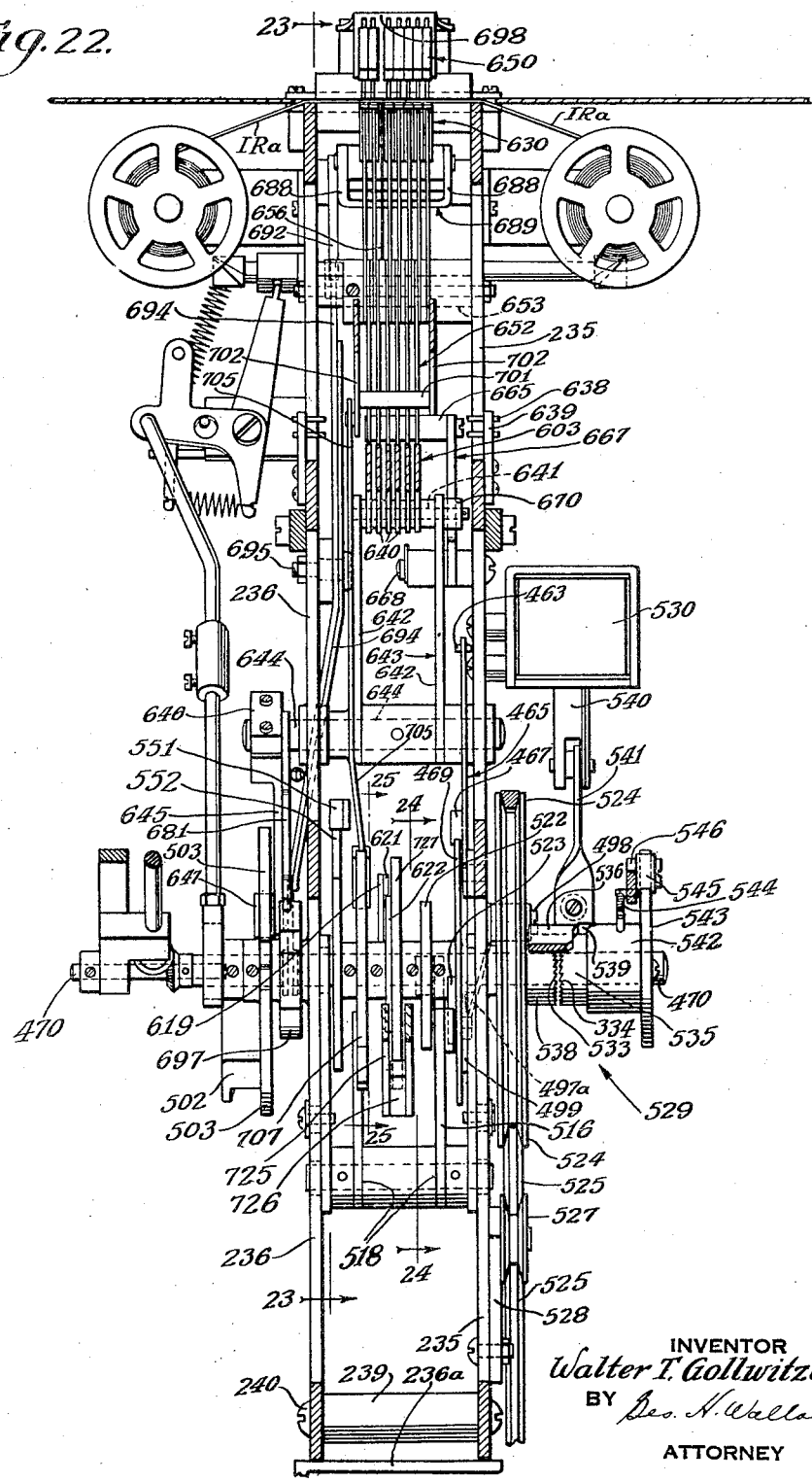
Figure 27:
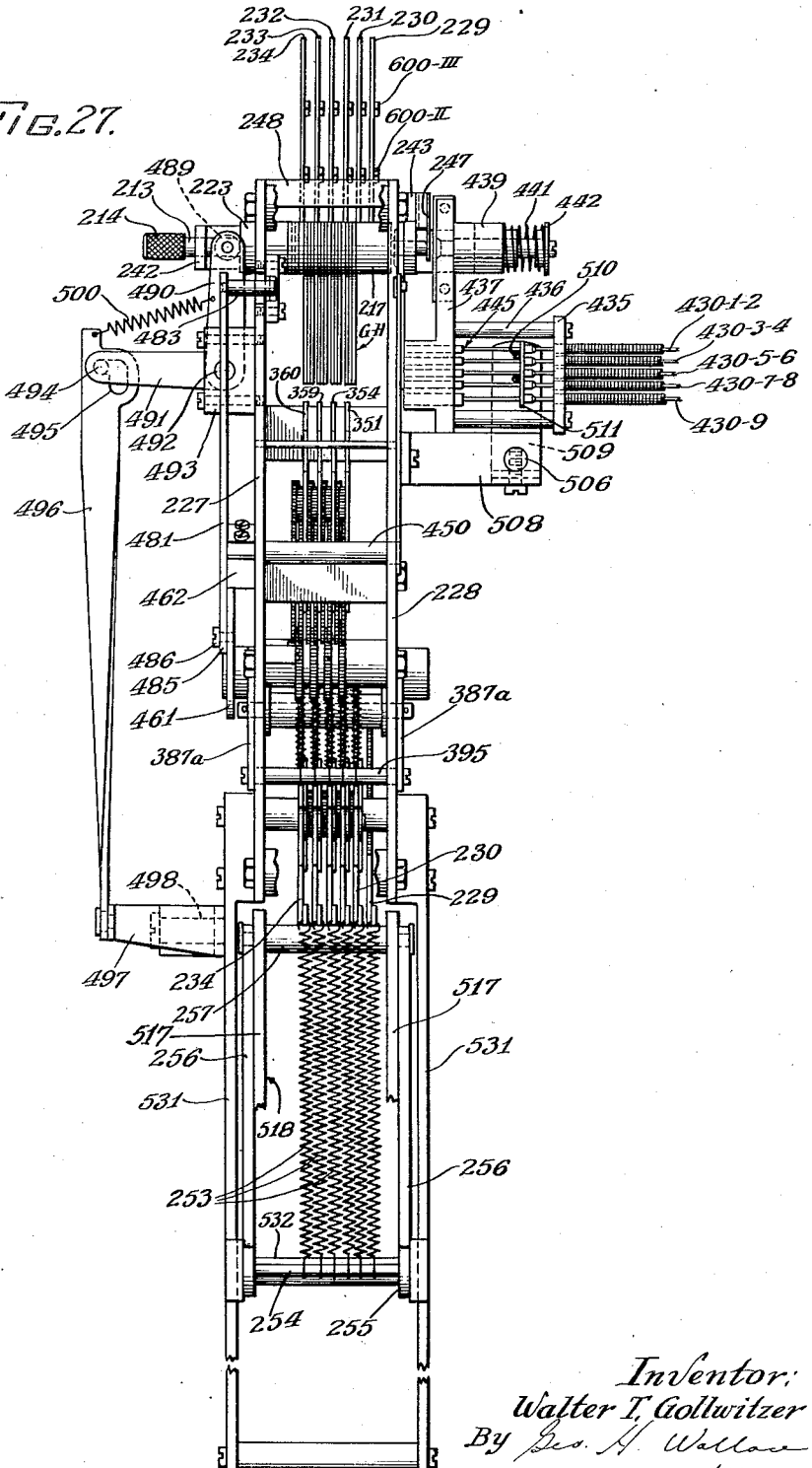
Figure 28:
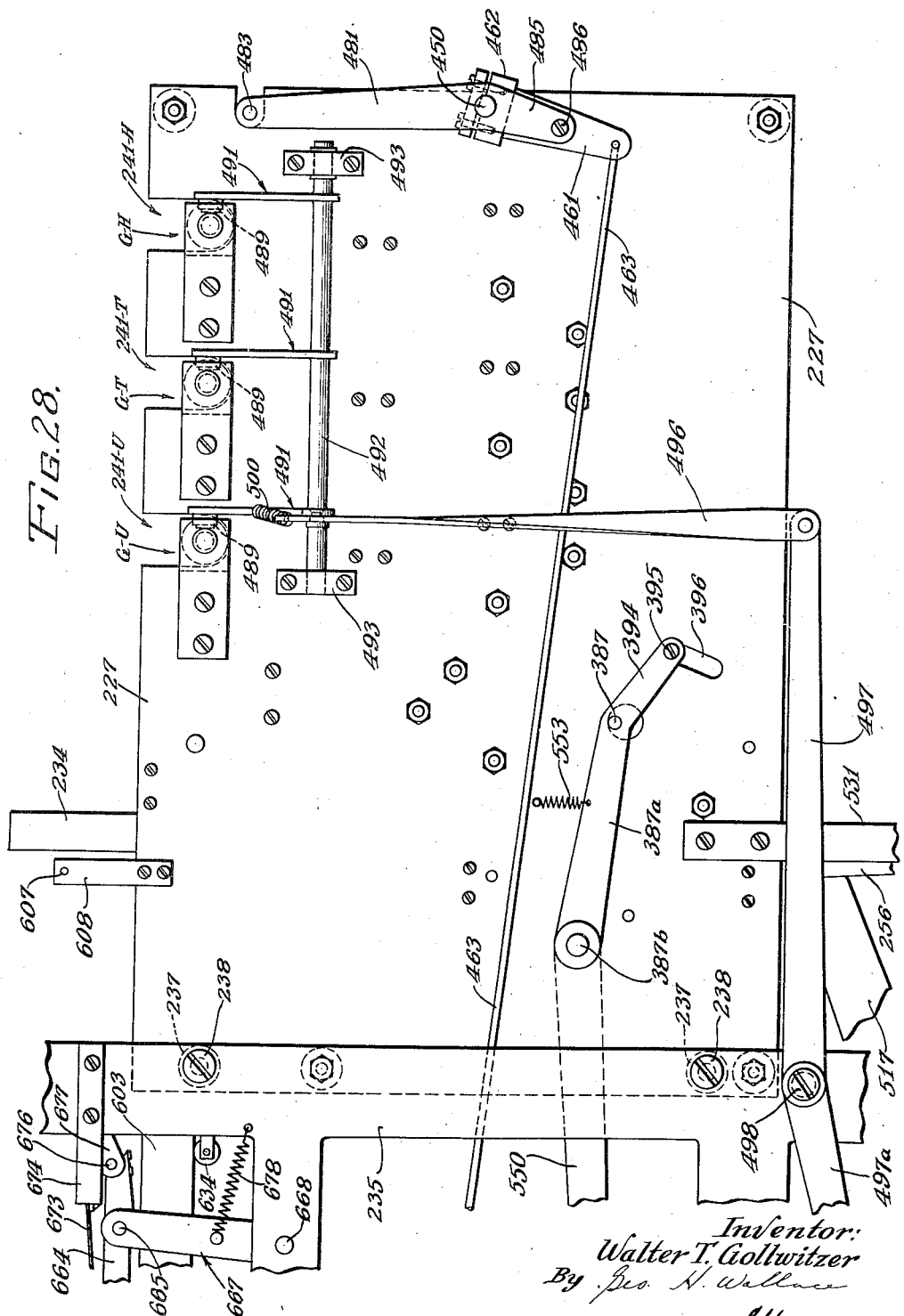
Figure 29:
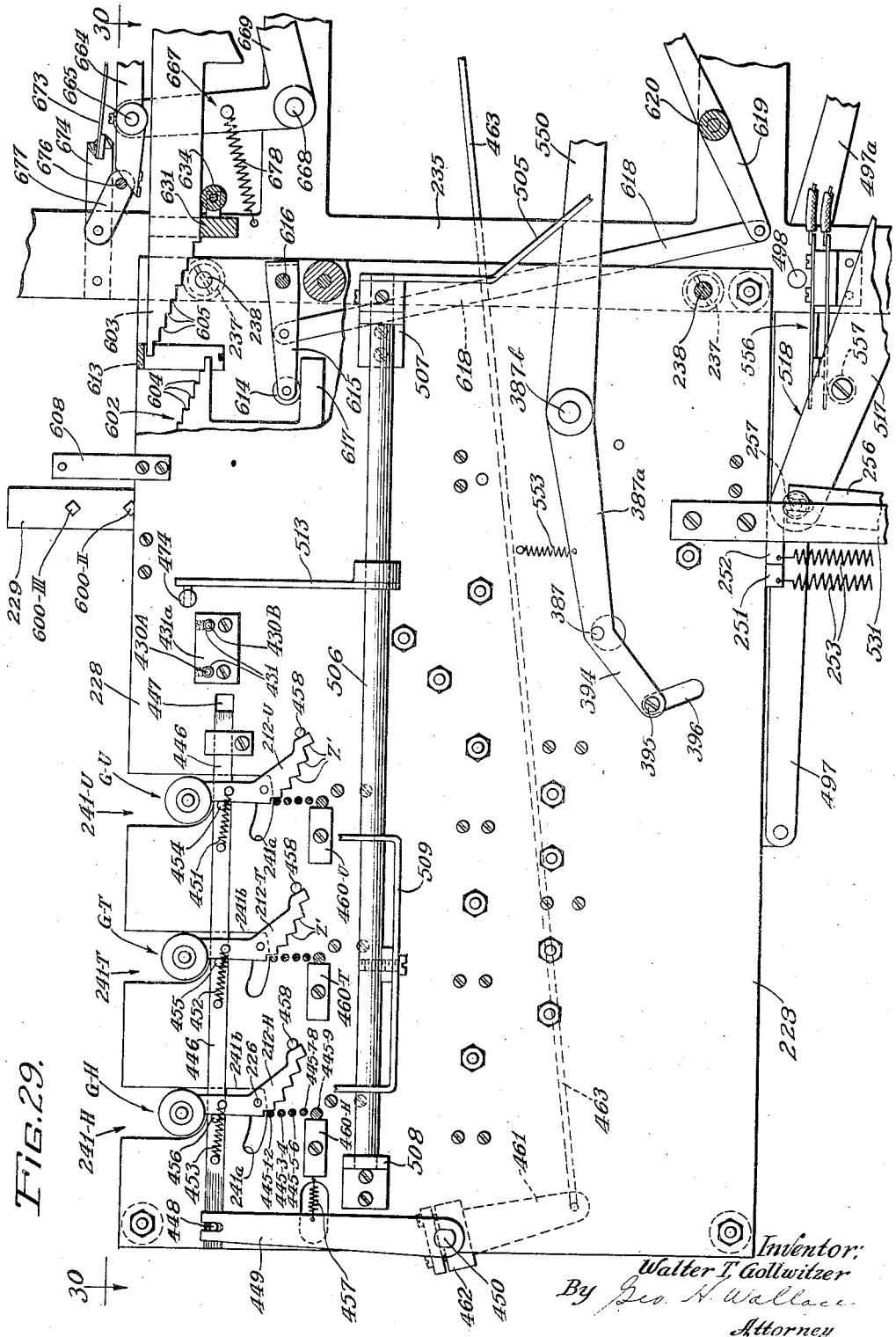
Figure 50:
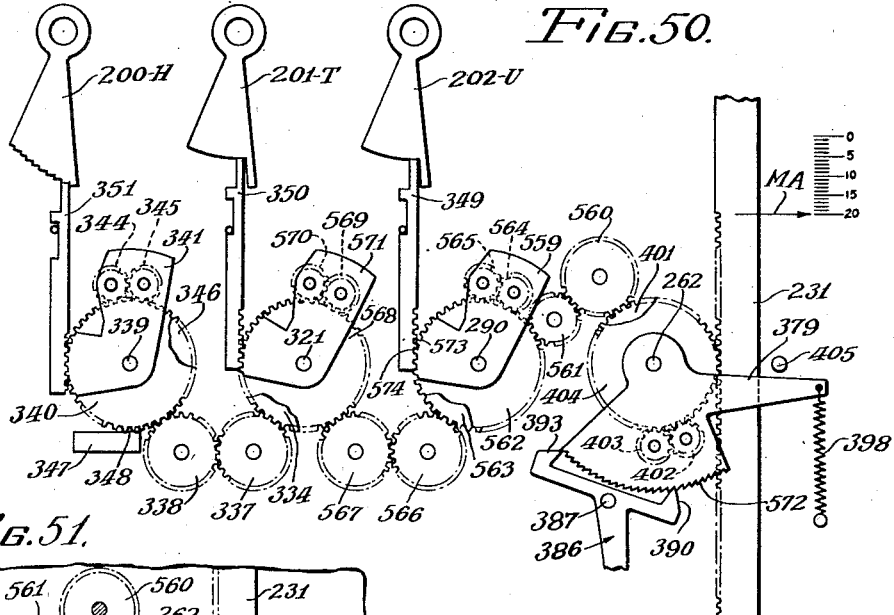
Figure 51:
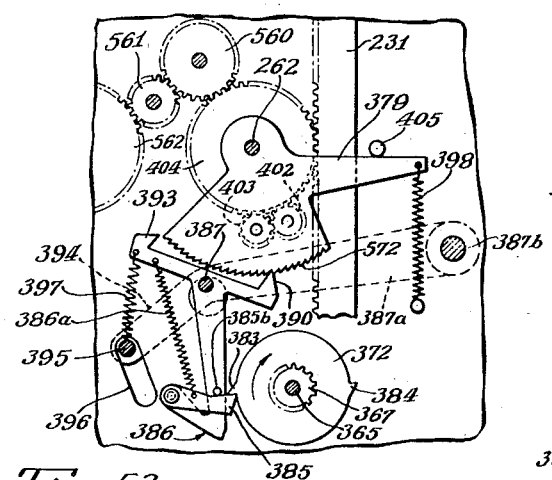
Figure 52:
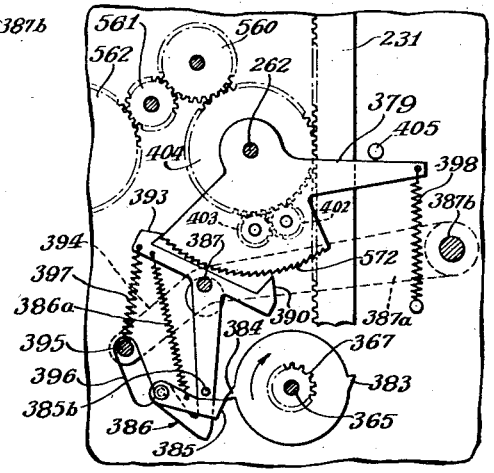
Figure 53:
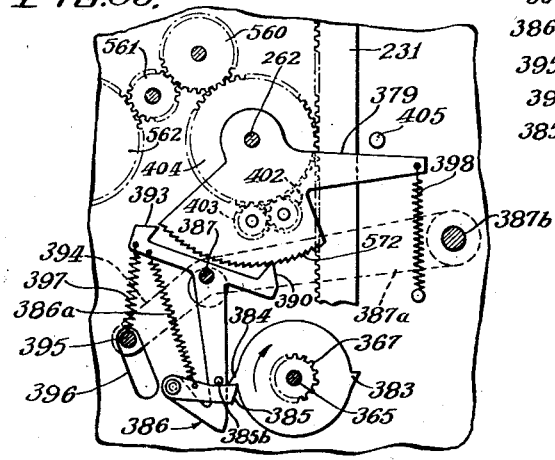
Figure 59:
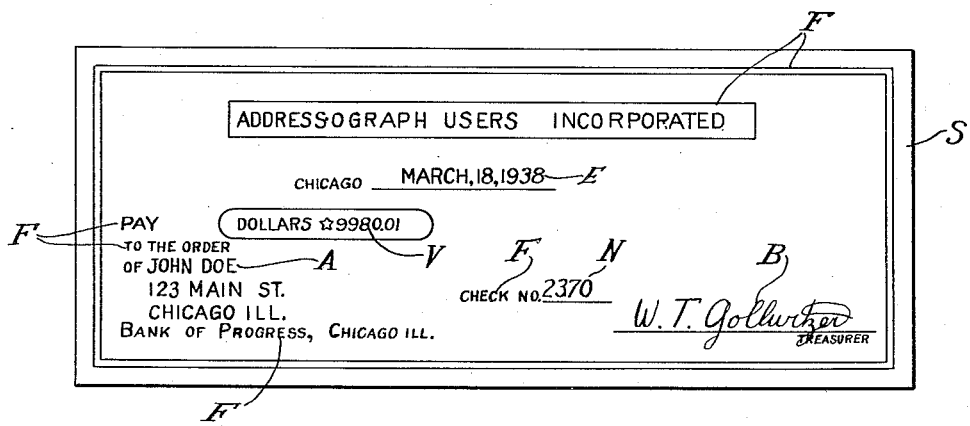
Figure 60:
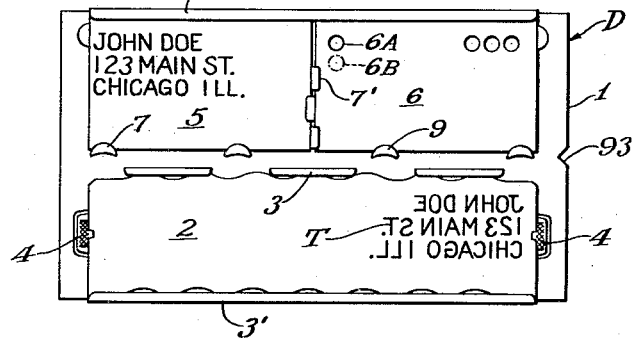
Figure 61:
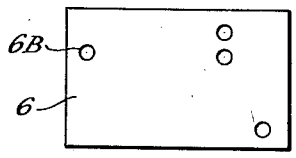
Figure 62:
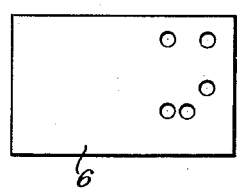
Figure 63:
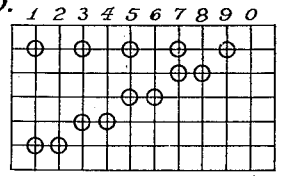
Figure 64:
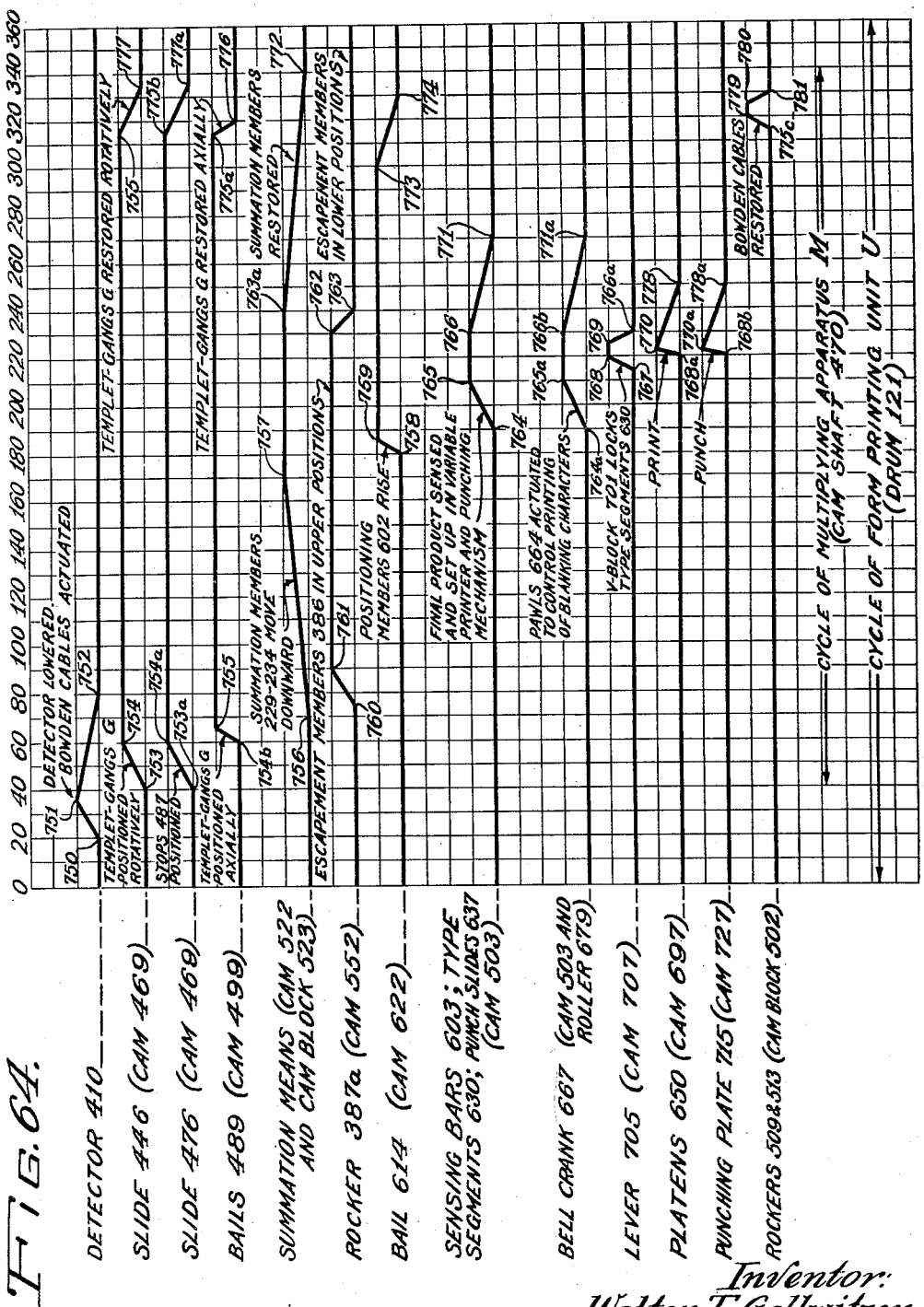

In the drawings,

Fig. 1 is a perspective view showing a typical machine in which my invention may be embodied; Fig. 2 is a front elevational view of the machine as shown in Fig. 1 with the cover plates removed; Fig. 3 is a top plan view of the machine as shown in Fig. 2; Fig. 4 is a transverse sectional view through the machine showing the drive for the printing and control devices employed in the machine shown in Figs. 1, 2 and 3 and other related mechanisms; Fig. 5 is a longitudinal sectional view taken substantially on the line 5—5 on Fig. 7; Fig. 6 is a sectional detail view illustrating a sensing means employed in the machine; Fig. 7 is a longitudinal sectional view taken immediately above the guideway through which the printing and control devices employed in the machine advance; Fig. 8 is a view similar to Fig. 5 and in which certain parts of the machine are broken away and shown in detail; Fig. 9 is a transverse sectional detail view taken substantially on the line 9—9 on Fig. 8; Fig. 10 is a fragmentary side elevational view illustrating certain mechanisms used in the means for feeding printing and control devices through the machine; Fig. 11 is a fragmentary perspective view of certain parts of the means for feeding the printing and control devices through the machine; Fig. 12 is a perspective detail view of the bars operative to feed the printing and control devices through the machine; Fig. 13 is a fragmentary view, similar to Fig. 11, showing the parts in another operative position; Fig. 14 is a side elevational view taken substantially on the line 14—14 on Fig. 3; Fig. 15 is a sectional detail view taken substantially on the line 15—15 on Fig. 14; Fig. 16 is a sectional detail view taken substantially on the line 16—16 on Fig. 15; Fig. 17 is a view partly in elevation and partly in section of the printing unit shown in Fig. 14; Figs. 18 and 19 are detail views of certain of the mechanisms included in the apparatus shown in Fig. 17; Fig. 20 is a view of the multiplying apparatus of this invention taken substantially on the line 20—20 on Fig. 2; Fig. 20A is a perspective view of the Bowden cable restoring devices shown in Fig. 20; Fig. 21 is a fragmentary detail view of a part of the driving means of the mechanism illustrated in Fig. 20; Fig. 22 is a view taken substantially on the line 22—22 on Fig. 20; Figs. 23, 24 and 25 are views taken substantially and respectively on the lines 23—23, 24—24 and 25—25 on Fig. 22; Fig. 23A is a side view, drawn to an enlarged scale, of the parts for bringing the type character for printing a blanking character into printing position; Fig. 24A is a sectional detail view taken substantially on the line 24A—24A on Fig. 23A; Fig. 25A is a plan view of the parts shown in Fig. 23A; Fig. 26 is a horizontal sectional view taken substantially on the line 26—26 on Fig. 20; Fig. 27 is a rear elevation of the apparatus shown in Fig. 22; Fig. 28 is a side elevational view looking in at the left-hand side of the apparatus shown in Fig. 27; Fig. 29 is another side elevational view in which certain parts are broken away and looking in the direction opposite to Fig. 28; Fig. 30 is a sectional view taken substantially on the line 30—30 on Fig. 29; Fig. 31 is a sectional detail view taken substantially on the line 31—31 on Fig. 35; Figs. 32, 33 and 34 are views of a portion of the apparatus shown in Fig. 30 and illustrating different alternative operating positions; Fig. 35 is a view taken substantially on the line 35—35 on Fig. 30; Figs. 35A to 35J, inclusive, are views respectively illustrating positions assumed by certain operative parts of the mechanism in representing digital values; Figs. 36 and 38 are sectional detail views taken substantially and respectively on the lines 36—36 and 38—38 on Fig. 35; Figs. 37 and 39 are elevational detail views of mountings employed in the apparatus illustrated in Figs. 36 and 38; Fig. 40 is a partially diagrammatic view of the apparatus illustrated in Fig. 36; Figs. 41, 42 and 43 are sectional detail views taken substantially and respectively on the lines 41—41, 42—42 and 43—43 on Fig. 35; Figs. 44 and 45 are sectional views taken substantially and respectively on the lines 44—44 and 45—45 on Fig. 43; Figs. 46 to 50, inclusive, are diagrammatic views illustrating operative steps in the course of operation of the summation means of the multiplying apparatus; Figs. 51, 52 and 53 are views illustrating operative steps in the carry-over mechanism constituting a part of the summation means of the multiplying apparatus; Figs. 54, 55 and 56 are views illustrating sets of templets formed to represent the intermediate products of the reoccurring factors 999, 37, and 465, respectively; Fig. 57 is a diagrammatic view illustrating the manner in which the templets of the templet-gangs are arranged with respect to each other and to the orders of the final products; Figs. 58 and 58A, when Fig. 58A is arranged at the right-hand end of Fig. 58, are views similar to Fig. 57 but showing the manner in which the templets are arranged in clusters; Fig. 59 is an elevational view of a typical business instrument produced in the machine; Fig. 60 is an elevational view of a typical printing and control device employed in the machine; Fig. 61 is an elevational view of a control card which is part of a printing and control device such as is shown in Fig. 60; Fig. 62 is an elevational view of a control card similar to that shown in Fig. 61; Fig. 63 is a chart of a code employed in representing numerical quantities on control cards such as are shown in Figs. 60, 61 and 62; and Fig. 64 is a timing chart of the multiplying apparatus.

THE PRINTING MACHINE

One machine in which my novel apparatus is adapted to be used is shown in full in Figs. 1, 2 and 3. This machine is constructed and arranged to produce dividend checks as S, Fig. 59, and is fully described in my aforesaid co-pending application, Serial No. 221,841. However, to facilitate explanation of the present invention this machine is first explained in a general way and thereafter the present invention is explained in full detail.

The dividend check produced in the illustrated machine includes constantly reoccurring data, constituting a form F, which in the present instance is the name and location of the company issuing the check, the words "Check No.," the name of the bank on which the check is drawn, and kindred data imparting characteristics to the check, including the border appearing thereon; changing data A, constituting an identification and specifically characterizing the check and, in the present instance, this is an address comprising a name, street and number, and city and state; variable data V which are the amount for which the check is to be payable; and other analogous data such as a date E, a number N and a signature B. The date and signature are the first data, in the machine as constructed, to be printed; next the variable data V are printed and thereafter the address A and number N are printed; and finally the form F is printed on the check.

In the illustrated machine, the address, or changing data A, is printed on the check directly from a printing and control device, such as the device D, Fig. 60, and the variable data V are printed under control of such a device. It is preferred to employ such printing and control devices for so to do eliminates the necessity of checking printing devices or the like against record cards or the like because the printing and control devices, such as are shown in Fig. 60, include both means from which an impression may be made directly and control means under control of which impression or other operations may be performed. It is to be understood, however, that when reference is made hereinafter to a printing and control device, save in those instances where the avoidance of checking is essential, this term is to be considered generic for, as will be apparent to those skilled in the art, while the present invention is arranged to cooperate with and be responsive to the control areas on printing and control devices it could be arranged to cooperate with and be responsive to perforations or other data representing means provided on record cards or the like. In view of this it is to be understood that while the devices will be described as printing and control devices, this term is used in the generic sense hereinafter.

The printing and control device shown in Fig. 60, which is typical of such devices, includes a carrier or, as it is called in the art, a frame 1 having, in this instance, a metallic plate 2 removably retained thereon by fixed retaining devices 3, a bead 3' at the lower edge of the frame, and yieldable or depressible retaining tongues 4. When one or the other of the tongues 4 is depressed the plate 2 may be slid endwise from the retaining devices 3 and the bead 3'. Type characters T are, in this instance, embossed in the metallic plate 2 so as to appear in relief on one face thereof and in intaglio on the opposite face, impressions being made from the relief faces of the type characters T when the printing and control device D is fed into printing relation with the platen P, Figs. 1, 2 and 3, in the machine. The printing and control device shown in Fig. 60 also bears an identification card 5 on which an impression is made from the type characters T so that the data that are thus printed from these type characters may be read easily, thus facilitating handling of the device D. This card 5 is removably retained on the frame 1 above the plate 2 thereon by suitable retaining devices 7 and a bead 8 at the top of the frame. A control card 6 is retained on the frame 1, at one side of the card 5, by the retaining devices 9, the bead 8 and retaining devices 7' interposed between the cards 5 and 6. The card 6 and underlying portion of the frame 1 are adapted to have perforations formed therein in accordance with the code shown in Fig. 63 so as to afford control means or representations of data, and such perforations or control means are utilized in the production of the variable data V on the check S in a manner that will be described hereinafter. The perforations in the control card 6 and the underlying portion of the frame 1 may be conveniently produced in a machine such as that disclosed in my co-pending application Serial No. 210,897, filed May 31, 1938.

Hereinafter a more complete description of the manner in which the card 6 and the underlying portion of the frame 1 are perforated is presented but at this time it may be well to note that when data represented by perforations in the card 6 need be changed all that need be done is to remove this card 6 and substitute another unperforated card therefor and this new unperforated card may then be perforated to afford representations of the data that are to be substituted for that which has been previously incorporated in the device D. It may be that in so doing the frame 1 will also be perforated and this will be done in all instances where the newly formed perforations are located differently than the supplanted perforations, the supplanted and unused perforations, in such instances, being covered and rendered ineffective by unperforated portions on the new card 6.

The dividend check or sheet S is severed from a web W, Figs. 1, 2 and 3, that is withdrawn from a roll R which is rotatably supported in the stand 10, which, in the machine as shown in Fig. 1, is positioned at the right-hand end of the machine. The web W is led from the roll R to suitable web withdrawing devices contained within the housing 11, such devices being shown and described in detail in my co-pending application Serial No. 239,562, filed November 8, 1938. During passage of the web through the devices in the housing 11 the date E and signature B are printed thereon in the present machine but, as will be explained, these data could be printed along with the form F if so desired. The manner in which such printing is done is described in my aforesaid co-pending application Serial No. 211,841. Subsequently a portion of the web bearing these impressions is extended beyond a severing device including the knife 12, and upon operation of this device the check or sheet S is severed from the web to be deposited in the sheet guideway SG, Figs. 2 and 3.

Once the sheet is deposited in the guideway SG it is under control of the sheet feeding and stopping devices shown and described in detail in my co-pending application Serial No. 268,182, filed April 17, 1939, now Patent No. 2,211,772, patented August 20, 1940. These devices serve first to position the sheet in association with printing means included in the multiplying apparatus M, to which this invention pertains, movement of the sheet being interrupted while an impression is made thereon in such apparatus, this impression being the variable data V, Fig. 59. The printing means in the apparatus M are set up under control of control means on a printing and control device D located at detecting position in the machine, such device having been withdrawn from the magazine H and fed into detecting position by the means shown in Figs. 8 to 13, inclusive, and which will be described more fully presently.

After the data V have been printed, the sheet bearing these data is advanced into association with the platen P whereat an impression is made directly from the type characters T on the printing and control device bearing the control means under control of which the data V on the sheet were printed, this device having, in the meantime, advanced from detecting position into printing position below the platen P. In this operation the changeable data A, the address, are printed on the sheet S.

Next the sheet feeding and stopping devices operate to feed the sheet S into the printing unit U illustrated at the left-hand end of the machine, as it is viewed in Fig. 1, and upon passing through this printing unit the form F is printed on the sheet or check S and then the sheet passes into a suitable sheet collector K.

At the start of operation of the machine a plurality of printing and control devices D is introduced into the magazine H from which the devices are withdrawn one at a time to be passed through the machine in a step-by-step manner into detecting and printing position therein. After passing through these positions the printing and control devices pass into the device collecting mechanism N that is illustrated and described in my co-pending application, Serial No. 403,272, filed July 21, 1941, this mechanism operating to direct the devices into one or the other of the drawers J in which such devices are stored when not in use and from which they are removed when they are introduced into the magazine H. The mechanism N causes the printing and control devices to pass into the particular drawer or other storage means from which they are removed when introduced into the magazine H.

It is advantageous to drive the various mechanisms employed in a machine, such as illustrated in Fig. 1, from a common source of power and to this end a bracket 13, Fig. 2, is provided which supports a motor 14 from the frame 15 of that part of my novel printing machine through which the printing and control devices D are sequentially fed. In the present instance a pulley 16 on the shaft of the motor 14 has a belt 17 directed thereabout, this belt also passing about a pulley 18 on the main drive shaft 19 that is journaled in the frame 15. Various pulleys are provided at spaced intervals along the main drive shaft 19, and the various mechanisms in the machine have belts leading therefrom to these pulleys so that these mechanisms are driven from the main drive shaft 19 and the motor 14.

Printing and control devices such as are employed in the present machine are customarily stored in drawers, trays or the like when not in use, and when these devices are passed through printing machines of the kind to which this invention pertains they are introduced into a suitable receiver in the machine and in the present instance the printing and control devices D are introduced into an upstanding magazine H, Figs. 1, 2 and 8, that is provided at the rear side of the machine and at the rear end of the printing and control device guideway, through which guideway the printing and control devices advance to printing position below the platen P.

After the printing and control devices have passed through printing position below the platen P they are reintroduced into the drawer, tray or the like from which they were removed when introduced into the magazine H. Hence in the present instance the machine is equipped with chutes as 20, Fig. 4, or the like into which a drawer or the like from which printing and control devices are removed when introduced into the magazine H, may be inserted and two such chutes are provided in the present machine. Indicating means are provided which indicate into which chute a drawer should be placed so that it will receive the printing and control devices that were removed therefrom, and placed in the magazine, and automatic means in the machine function to direct the printing and control devices into the drawer in one or the other of the two chutes.

In the present machine the lowermost printing and control device in the magazine H is removed therefrom and is fed through positions or stations in the printing device guideway, in one of which stations the control areas on the printing and control devices are sensed to effect set-up of the multiplying apparatus M and in another of which stations impressions are made directly from the type characters provided on the printing and control devices. Included in the means which withdraw the printing and control devices from the magazine and move these devices through the aforesaid stations in the machine are means which positively retain the printing devices in position in the stations into which they are moved to have operations performed thereon or therefrom.

The magazine H is supported at the rear side of the frame 15 and projects upwardly above the bed plate 21. The lowermost of the printing and control devices D in this magazine is withdrawn therefrom by the reciprocal carrier bars 22 and 23, Figs. 8 to 12, inclusive. These carrier bars are disposed between the side plates 24 and 25 which are spaced apart by spacer bars 26 and 27 located at the front and rear ends, respectively, of the side plates 24 and 25 and these side plates are rigidly supported in the frame 15 on girders 28 and 29, Fig. 5. A casting 30, carried by these girders, has an anvil 31 provided thereon, the printing and control devices resting on this anvil at the time impressions are made directly therefrom by the platen P. An impression operation of the platen P is effected each time fluid under pressure is admitted into the cylinder 32 in the casting 30 from the pipe 33' that leads from an intermittently operated pump. When fluid under pressure is admitted into the cylinder 32 the piston 33 is forced downwardly to force the bar 34, that extends between arms as 35 of the platen frame 36, downwardly. This causes the platen frame 36 to so rock about its pivotal mountings as 37 that the platen P carried thereby is forced into printing relation with the printing and control device D resting on the anvil 31.

The carrier bars 22 and 23 are supported for reciprocal movement over the inner faces of the side plates 24 and 25 by strips 38 and 39, Fig. 9, the carrier bars merely resting on the upper edges of these strips. A plate 40, Fig. 12, is fast to the inner side of the carrier bar 22 at the rear end thereof and a similar plate 41 is fast to the inner face of the carrier bar 23 at the rear end thereof. Bars 42 are secured to, as by being welded thereto, and extended between the plates 41 and 42 and serve to maintain the rear ends of the carrier bars 22 and 23 in permanent spaced relation, this spaced relation being such that the carrier bars are held in a tight sliding fit against the inner faces of the side plates 24 and 25, respectively. The anvil 31 is recessed at its sides and below the top surfaces thereof, on which the printing and control devices D rest when impressions are being made therefrom. The forward ends of the carrier bars 22 and 23 rest in these recesses as 43, Fig. 11, and in this way the forward ends of the carrier bars are supported for reciprocal movement over the inner faces of the side plates 24 and 25 and at the same time are maintained in properly spaced relation.

In the present machine the lowermost of the printing and control devices D is withdrawn from station or position I thereof, Figs. 7 and 8, in the magazine H and first comes to rest in what will be referred to hereinafter as the sensing position or station, this position or station being indicated at II, Figs. 7 and 8. In the course of movement of the printing and control devices through the machine they also come to rest in printing position above the anvil 31, which position or station is indicated at III in Figs. 7 and 8. After passing from station III over anvil 31 the printing and control devices pass into the printing and control device collecting means. It will thus be apparent that the printing and control devices come to rest in two different positions or stations after movement thereof from the magazine H.

Thus, the printing and control devices are advanced through the machine by imparting to the carrier bars 22 and 23 a stroke which is just slightly greater than the greatest distance between the stations as I and II and II and III and by so positioning or spacing the various printing and control device engaging means or pawls on the carrier bars that when these bars are in their most advanced or forward positions, the printing and control devices are located in the desired positions or stations by the pawls. This requires that the pawls be variantly spaced one from the other along the bars. Therefore, in the course of the advancing movement of the carrier bars 22 and 23 the various printing and control devices are engaged successively by the pawls or other engaging means. In the present machine, where the greatest distance the devices are to be moved is between stations II and III, the advancing movement of a device D from station II to station III is first initiated and the pawls, other than those engaging this device, move idly in such a way that the advancing movements of the other devices are initiated subsequently as determined by the distance which they are to be moved.

Suitable means are provided for engagement with the printing and control devices to effect advancing thereof from station I into and through stations II and III and for retaining the devices in a fixed position when in stations II and III. Thus, a slot 44, Fig. 12, is provided in the carrier bar 22 near the rear end thereof and a pawl 45 mounted in this slot is acted on by a spring 46 which urges the forward end of the pawl upwardly so that this end of the pawl normally extends above the top edge of the carrier bar 22. A pawl 47 is similarly mounted in the carrier bar 23, the pawls 45 and 47 being in transverse alignment. The pawls 45 and 47 serve to withdraw the lowermost printing and control device D, in station I in the magazine H, from this station and advance such device to station II. These pawls are free to pivot downwardly during the rearward movement of the carrier bars so that they will pass below the lowermost printing and control device in the magazine and then spring up behind this device into position to engage the rear edge of such lowermost printing and control device when the carrier bars 22 and 23 start to move forwardly. In order to facilitate movement of the pawls underneath the lowermost printing and control device during rearward movement of the carrier bars these pawls are beveled as indicated at 48, this serving as a cam surface to insure depression of the pawls against the action of the spring as 46.

The pawls 45 and 47 are so mounted in the slots as 44 that they are capable of movement longitudinally of the bars. Then as an incident to the first part of the forward movement of the carrier bars, at which time the pawls are engaging the lowermost of the printing and control devices in the magazine H, these pawls are forced rearwardly of the carrier bars in the slots as 44. Such rearward movement causes the notches as 49, Fig. 12, in lower edges of the pawls 45 and 47 to be moved from alignment with the projections as 50 on the lower edges of the slots as 44 and that part of each of the pawls immediately forward of these notches thereupon rests on these abutments during the forward movement of the carrier bars. By reason of the seating of the pawls on these abutments the downward force exerted by the printing and control devices D in the magazine H does not disengage the pawls from the lowermost printing and control device which is therefore fully fed out of the magazine from position I to position II by the pawls 45 and 47. When, however, the pawls move rearwardly with the carrier bars, the beveled edges 48 engage the lowermost printing and control device in the magazine H as an incident to such rearward movement and prior to the time the pawls are cammed downwardly, they are moved slightly forwardly in the slots as 44 to thereby align the notches as 49 with the abutments as 50 so that during the rearward movement of the carrier bars, the pawls may be cammed down against the action of the springs as 46 and at this time the abutments 50 pass into the recesses 49.

Another pair of pawls 51 and 52 are respectively mounted in slots as 53 in the carrier bars 22 and 23 and are acted on by springs as 54 to have the forward ends thereof projected above the top edges of the carrier bars. These pawls are spaced forwardly of the pawls 45 and 47 in an appreciable amount and in such a position that when the carrier bars come to rest in their forwardmost position these pawls will dispose a printing and control device in position III above the anvil 31. It will be understood that during the rearward movement of the carrier bars, the pawls 51 and 52 are forced downwardly against the action of the springs as 54 during the time they pass under the printing and control device in position II and that these springs reposition the pawls in device engaging position as soon as the pawls pass beyond a device in position II in the rearward movement of the carrier bars.

Another pair of pawls 55 and 56 are mounted in slots as 57 in the carrier bars 22 and 23 and are acted on by springs 58 to be urged upwardly. The pawls 55 and 56 are spaced forwardly of the pawls 51 and 52 in but a relatively short amount and in the forward or at rest position of the carrier bars these pawls are located in a position slightly forwardly of the printing and control device in position III. In fact these pawls are so disposed on the carrier bars with respect to position III that when the carrier bars are in their forward at rest position, these pawls are positioned just beyond the forward edge of the printing and control device in position III. Hence as soon as the carrier bars start to move rearwardly, the pawls 55 and 56 are pivoted downwardly as they pass under the printing and control device disposed in position III, and in the course of such rearward movement and prior to the time it is completed the pawls 55 and 56 are disposed well to the rear of the rearwardmost edge of the printing and control device in position III. However, in the course of forward movement of carrier bars 22 and 23 the pawls 55 and 56 move into engagement with the rearwardmost edge of the printing and control device in position III, which is above the anvil 31, and carry this printing and control device to the printing and control device discharge chute.

The just described pawls are retained in the aforesaid slots by plates as 59, Fig. 12, that are mounted on the inner faces of the carrier bars in alignment with the slots in which the pawls are mounted, and these plates serve to prevent inward movement of the pawls. Outward movement of the pawls is prevented by reason of the fact that the carrier bars 22 and 23 are mounted for sliding movement over and against the inner faces of the side plates 24 and 25 and the pawls engage the inner faces of these side plates to be retained in the slots in which they are mounted.

Reference has been made to reciprocation of the carrier bars 22 and 23 and this movement is imparted to the carrier bars in the following manner: A block 60, Fig. 8, is mounted between the bars 42 for reciprocal movement between the plate 41 and a spacing pin 61 that extends between the bars 42. The free end of an arm 62 extends beneath the block 60 and affords a support for said block, the block being pivotally connected to the arm as indicated at 63.

As best shown in Fig. 5, the end of the arm 62, to which the block 60 is pivotally connected, is offset upwardly, this offset portion being interconnected by an inclined portion 64 in the arm. That portion of the main extent of the arm 62 adjacent the inclined portion 64 is reciprocally mounted in a recess 65, Figs. 5 and 7, in a block 66 pivotally mounted on an arm 67, as indicated at 68. The end of the arm 62 opposite that at which the block 60 is pivotally connected is pivotally mounted as indicated at 69 on a bracket 7 Figs. 4, 5 and 7.

The block 66, the arm 67 and the pivotal connection therebetween indicated at 68 affords a scotch yoke connection for the arm 62, the arm 67 being fast to a vertical shaft 71, Fig. 5. The shaft 71 is journaled in a vertical bearing 72 that is carried by the bracket 70. A gear 73 is rotatably mounted on the shaft 71 and includes a hub 74 having clutch teeth 75 thereon. A sleeve 76 is slidably but non-rotatably mounted on the shaft 71 and includes clutch teeth 77 which are urged toward the clutch teeth 75 by springs acting between the sleeve 76 and a collar 78 rotatable on the shaft 71, the sleeve 76 being connected to the collar 78 for rotation therewith.

The clutch teeth 7t and 77 and the sleeve 76 are part of a clutch such as is disclosed in my copending application, Serial No. 239,561, filed November 8, 1938. A pin (not shown) on the sleeve 76 cooperates with a cam surface (not shown) on the arm 79 to hold the clutch teeth 77 separated from the clutch teeth 75. A solenoid 80, Fig. 4, is adapted to be energized to attract its core whereupon the cam surface on the arm 79 is retracted from cooperation with the pin on the sleeve 76 to thereby enable the clutch teeth 77 to engage the clutch teeth 75 and in this manner the gear 73 is connected to the shaft 71. The clutch including the clutch teeth 75 and 77 is a one-revolution clutch for after the solenoid 80 has been energized to enable engagement of the clutch teeth, the pin on the sleeve 76 acts to again dispose the cam surface on the arm 79 in position to be engaged by this pin near the end of a revolution so that as the pin moves over the cam surface the clutch teeth 77 are separated from the clutch teeth 75 to interrupt rotation of the shaft 71 at the end of a rotation thereof.

The gear 73 meshes with a pinion 81, Figs. 4, 5 and 7, rotatably mounted on a rod 82, Figs. 4, 5 and 7, that is driven into a socket in the bracket 70, the cross member 83, Fig. 5, being fixedly attached to the lower end of this rod as indicated at 84. A pulley 85 is also rotatable on the rod 82 and is fixedly connected to the pinion 81, the pulley 85 being mounted below the pinion, and said pulley and pinion are supported in operative position by a collar 86 secured to the rod 82.

A belt 87, Figs. 2, 4, 5 and 7, is passed about the pulley 85 and over guide pulleys 88 and 89 carried by arms 90 and 91, Fig. 5, that are secured in position at the point of interconnection of the cross member 83 with the rod 82, as indicated at 84. From the guide pulleys 88 and 89 the belt 87 passes to a pulley 92, Fig. 2, fast on the main drive shaft 19.

Thus whenever the main drive shaft 19 is rotating the pinion 81 and the gear 73 are rotating so that when the solenoid 80 is energized to cause the clutch teeth 77 to engage the clutch teeth 75, as described above, the arm 67 is caused to make a complete revolution whereupon through the connection of the arm 62 with the block 66 a reciprocatory movement is imparted to the end of the arm 62 to which the block 60 is pivoted and thereupon reciprocatory movement is imparted to the carrier bars 22 and 23 to advance the printing and control devices through the guideway therefor.

While the printing and control devices are in position II a sensing means cooperates therewith to effect set-up of the multiplying apparatus in the manner hereinafter described and it is advantageous to accurately locate the printing and control devices when it is in position II and this sensing means is to cooperate therewith. Furthermore, when the printing and control devices are in position III above the anvil 31 and impressions are being made therefrom it is desirable to firmly hold the printing and control devices in position for so to do enables accurate location of the impressions made therefrom and this also enables clear-cut impressions to be produced.

By referring to Fig. 60 it will be seen that a notch is provided in one side edge of the printing and control devices D. This notch 93 is accurately positioned with respect to the control area on the printing and control devices, as explained in United States Letters Patent No. 2,132,412, and it is also located accurately with respect to the printing plate 2 on the printing and control devices. Inasmuch as notches as 93 are accurately located with respect to other parts on the printing and control device it is possible, by locating means in the machine adapted to cooperate with these notches accurately with respect to parts in the machine adapted to cooperate with the printing and control devices, to insure that the machine parts will cooperate with the printing and control devices parts in an accurate manner. The means in the machine adapted to cooperate with the notches 93 in the printing and control devices D are, in the present instance, pawls 94 and 95, Fig. 11, the pawl 94 being positioned to cooperate with the notch in the printing and control devices at the station II and the pawl 95 being positioned to cooperate with a notch in the printing and control devices at the station III.

The pawl 94 is pivotally connected to the upper edge of the side plate 24, as indicated at 96, and the pawl 95 is similarly mounted, as indicated at 97. In order to insure seating of these pawls in the notches in which they are adapted to seat, these pawls are urged toward the edges of the printing and control devices by applying spring pressure thereon. However, these pawls are arranged in such a manner that the pressure exerted thereon may be varied so that appreciable pressure will be effective on these pawls only at the time the pawls are to be operative and at all other times, and especially when the printing and control devices are moving past these pawls, but very light pressure is applied thereon so that objectionable wear on the printing and control devices is avoided. As best shown in Fig. 11, each pawl 94 and 95 includes an ear 98 having an opening 99 therein and the free upper end of a leaf spring 100 is passed through this opening. The lower end of each leaf spring is firmly connected to the outer face of the side plate 24 as by a screw 101.

A groove 102 is provided in the outer face of the side plate 24 and a slide 103 is mounted in this groove, said slide passing behind each leaf spring 100 and these springs serve to retain the slide in the groove. A lug as 104 is fast on the slide in position to cooperate with each spring 100, each lug 104 including an overhanging portion which may pass over the outer face of the adjacent spring. The forward edge of the overhanging portion of each lug 104 is beveled, as indicated at 105, to insure passage of the overhanging portion of this lug over the outer face of the adjacent spring 100 upon reciprocation of the slide 103.

By referring to Fig. 12, it will be seen that a notch 106 is provided in the lower edge of the carrier bar 22 and that another notch 107 is provided in the lower edge of this bar forwardly of the notch 106. These notches are arranged to define oppositely facing shoulders, the shoulder defined by the rear notch 106 facing forwardly and the shoulder defined by the front notch 107 facing rearwardly. An opening 108 is provided in the side plate 24 and a pin 109, Fig. 10, projects through this opening to be engageable in the notches 106 and 107. The pin 109 is fast in a finger 110, as pivoted at 111 to the lower end of a plate 112 secured to the slide 103. A spring 113 extends between spring anchors respectively located on the side plate 24 and the finger 110 and acts on this finger to urge the pin 109 into engagement with the lower edge of the carrier bar 22.

In the latter part of the rearward movement of the carrier bar 22 the shoulder thereon defined by the notch 107 engages the pin 109 and through the finger 110 and plate 112 moves the slide 103 rearwardly, and thereupon the lugs as 104 assume the position shown in Fig. 13. This disposes the beveled edges 105 on these lugs in alignment with, but free of, the springs 100. Hence the fulcrum for each spring 100 is the screw 101 wherefore the extent of each spring between its fulcrum and the point where it applies its effective pressure is relatively elongated and by reason of this each spring exerts but very little pressure on the pawl to which it is connected. Hence, after the carrier bars attain their rearwardmost position and start to move forwardly to advance the printing and control devices in the manner above described, both the pawls 94 and 95 exert but very little pressure on the edges of the printing and control devices moving past them.

However, just before the carrier bars attain their forwardmost position, the pin 109 enters the notch 106 and engages the shoulder thereof whereby, as the carrier bars complete their forward movement, the shoulder of the notch 106 acts through the pin 109, finger 110 and plate 112 to move the slide 103 forwardly. In this movement the slide 103 moves the lugs 104 over the outer faces of the springs 100 with the result that the springs fulcrum on the lugs rather than on the screws 101. This changing in the point of fulcruming of the spring decreases the effective length and thereby substantially increases the effective pressure thereof and at the time this is effected the pawls 94 and 95 are moving into the notches as 93 in the printing and control devices in stations II and III. Therefore, effective pressure is applied on the pawls to positively seat these pawls in the notches wherefore the printing and control devices in stations II and III are accurately located, by reason of the fact that the configuration of the pawls and the notches with which they cooperate are complementary, and furthermore, the printing and control devices are firmly held in position. The slide 103 will be moved rearwardly so as to withdraw the lugs 104 from association with the springs 100 prior to the time the printing and control devices start to move forwardly in the next advancing thereof and hence the effective pressure applied on the pawls is relieved prior to the time the printing and control devices are to be moved relative thereto.

During the time the printing and control devices are being carried along by the carrier bars 22 and 23, they are held down on these carrier bars by thin strips 114 and 115, Fig. 9, respectively fastened to the upper edges of the side plates 24 and 25, these thin strips projecting inwardly beyond the inner faces of these side plates and defining the upper surfaces of the printing and control device guideway.

During rearward movement of the carrier bars at which time the pawls 51 and 52 are passing under the printing and control device in position II and the pawls 55 and 56 are passing under the printing and control device in position III the above described pawls 94 and 95 are seated in the notches 93 in the edges of the printing and control devices in these positions and this seating of the pawls together with the strips 114 and 115 insures that the printing and control devices remain in positions II and III until the rearward movement of the carrier bars 22 and 23 has been completed. However, as explained above, the spring pressure effective on the pawls 94 and 95 is relieved prior to the time the carrier bars 22 and 23 start to move forwardly and therefore when these carrier bars do move forwardly the pawls 94 and 95 are cammed out of the notches in the printing and control devices in the course of the forward movement of the carrier bars, the strips 114 and 115 preventing the printing and control devices riding upwardly away from the carrier bars as the pawls 94 and 95 are being so cammed out.

The forwardmost position attained by the pawls 55 and 56 is such that, since these pawls will be engaged with the rear edge of a printing and control device that has been located at station III, these pawls, in the course of moving into their forward position, will move the aforesaid printing and control device from position III out over the upwardly and forwardly disposed arcuate edge of the plates as 116, Fig. 5, and as this device attains this position it falls in such a way that its leading edge drops downwardly onto the aforesaid edges of the plates as 116. The plates as 116 are secured to the side plates 24 and 25 at the front ends thereof and the rearwardly disposed edges of the plates as 116 are curved for a short distance to define a throat 117 through which the printing and control devices fall, this throat constituting a printing and control device discharge chute 117 through which the printing and control devices pass to collecting means, described in detail in my aforesaid co-pending application, Serial No. 221,841, which functions to return the devices to the drawer J from which they were removed when they were introduced into the magazine H.

The capacity of the magazine H for receiving printing and control devices is preferably more than the capacity of a single drawer J, thus enabling an ample number of printing and control devices to be arranged in the magazine to insure that the machine may be continued in operation once it has been started. Hence, during a substantial portion of the operation of the machine printing and control devices from at least two drawers or other storage members will be in the machine. The drawers or other storage members are usually labeled to identify the printing and control devices that are stored therein and in order that this identification will not be disturbed, which would of course interfere with the system under which the printing and control devices are filed or arranged, it is essential that the printing and control devices pass back into the particular drawer from which they were removed and the just referred to printing and control device returning means automatically operates so as to insure this.

The multiplying apparatus to which this invention primarily pertains is particularly, though not necessarily, adapted for use in the machine shown in the accompanying drawings and when so used the apparatus as a whole is operated in timed relation with other operative parts in the machine. Moreover, the various operative parts in the multiplying apparatus are operated in timed relation with each other, such timed relation of such parts being correlated with the timing of other operative devices in the machine. The timing of the operation of the various operative devices in the machine, as well as the timing of the various operative parts in such operative devices, is under control of means associated with the form printing unit U. Thus, while the present invention primarily pertains to the multiplying apparatus and while this apparatus may be used in other ways than in the particular machine shown in the accompanying drawings, the form printing unit and its operative functions are described herein for so to do will facilitate describing the operation of the multiplying apparatus, both in so far as the operative parts included therein are concerned and in so far as the operation of the multiplying apparatus is related to the operation of other operative devices in the machine is concerned.

While constantly reoccurring data, such as the form F on the sheets S, Fig. 59, may be printed on the sheets in a wide variety of ways in the present instance I have employed a well-known printing unit, one form of which is indicated at U, Fig. 1, and which is illustrated for the purpose of the present description in Figs. 1, 2, 3 and 14 U. S. Letters Patent 816,311; 970,411; 990,207; to 19. Reference may be made to, for example, 1,031,311; 1,094,065; 1,148,940; and 1,647,560 for a disclosure of the full details of a printing unit such as the unit U.

The unit U is mounted on bars as 117, Figs. 2 and 14, in a fixed position longitudinally of these bars. The bars as 117 are mounted on a rod 118 that is carried by the upright 119 of the frame 15 and the printing unit U is prevented from pivoting about the rod 118 by a brace 120 that depends from the frame thereof and which engages the adjacent end of the frame 15 as shown in Fig. 2.

The printing means of the printing unit U includes a rotatable drum 121, Fig. 17, which, in the manner described, for example, in U. S. Letters Patent No. 816,311, patented March 27, 1906, has suitable printing members, such as type or electroplates, secured on the periphery thereof. Such printing members may be located on the periphery of the drum 121 as required and in the present instance are located on the periphery of the drum in such positions that when sheets are admitted into the bite between this drum and its cooperating platen roller 122, Fig. 17, the form F will be printed on the checks or sheets S at the proper and required positions thereon. This of course entails locating the printing members on the periphery of the drum in such locations that as the drum starts from its at rest position and a sheet starts to pass thereto from a given position, the leading edge of the sheet will engage the bite between the drum 121 and the platen roller 122 at a time when the leading printing member on the drum is spaced from the bite in the same amount as the portion of the sheet that is to receive an impression from such member, all of the foregoing being standard practice in the art and for further description reference may be made to U. S. Letters Patent 816,311 or 990,207.

Sheets are admitted into the bite between the drum 121 and the platen roller 122 from the aforesaid given position, by a gate generally indicated by 123 which in the present instance embodies a plate including a depending lip that is adapted, when it is in stopping position, to rest on a roller 124, sheets passing from the guideway through which they move to and from association with the platen P into engagement with the gate 123 when the stop finger 125, Fig. 3, is retracted from stopping position with respect to the leading edge of a sheet disposed beneath the platen P, this stop finger serving to position the sheets relative to the printing means of which the platen P is a part in a manner explained more fully hereinafter.

It will be manifest from the foregoing that th gate 123 must operate in properly timed relation with the rotation of the drum 121 in order to insure that sheets stopped by the gate will be admitted into the bite between the drum 121 and the platen roller 122 at the proper time and to this end a cam 126 is fast to one end of the drum 121, Fig. 19. This drum 121 is mounted on a shaft 127 that is journaled in the side plates 128 and 129 and is rotated in the manner now to be described.

A gear 130, Fig. 17, is fast to one end of the drum 121 and meshes with a pinion 131 that is mounted on a stub shaft 132 carried by one of the arms 117. The pinion 131 in turn meshes with a pinion 133 rotatably mounted on a shaft 134 fast in the arms as 117. A pulley 135 is also rotatably mounted on the shaft 134 and is interconnected with the pinion 133 in such a way as to enable adjustment of the position of the pulley 135 along the shaft 134 without interrupting driving connection between the pinion 133 and this pulley. An endless belt 136 is passed about the pulley 135 and over guide pulleys 137 and 138, Figs. 1, 2 and 14, mounted on a bracket 139 carried by the upright 119, and from the guide pulleys 137 and 138 the belt passes to and about a pulley 140 fast on the main drive shaft 19. It will therefore be seen that the drum 121 is driven, as are other operative mechanisms in the machine, from the main drive shaft 19.

The drum 121 is rotated continuously whenever the main drive shaft 19 is in operation and therefore the cam 126 fast on this drum also rotates continuously. This cam includes a dwell 141 and a rise 142, Fig. 18. A roller 143 mounted on an arm 144 is engageable with this dwell and rise to operate the gate 123. This is accomplished by securing the arm 144 to a shaft 145 journaled in the side plates 128 and 129 and securing an arm 146 to this shaft 145. The arm 146 has an abutment 147 thereon that is engaged by an adjusting screw 148 carried by an arm 149 which is mounted on a shaft 150 that is also journaled in the side plates 128 and 129. Brackets as 151 are also secured to this shaft 150 and the gate 123 is carried by these brackets.

Thus, whenever the roller 143 moves from the dwell 141 onto the rise 142, the gate 123 is pivoted from stopping position shown in Fig. 17 into open position shown in Fig. 18, and such elevation of the gate releases a sheet engaged therewith into the bite between the drum 121 and the platen roller 122.

The platen roller 122 is driven from the gear 130 to rotate at the same peripheral speed as the drum 121 through the gear train including the gears 152, 153 and 154, Fig. 19, which are arranged to insure rotation of the platen in the proper direction.

The shaft 155 on which the platen roller 124 is mounted is eccentric so as to support the platen roller 124 for movement toward and away from the periphery of the drum 123. Movement is imparted to this shaft through the cam and link arrangement illustrated in Fig. 2 to prevent the formation of offsets on the platen roller, this being standard construction in printing units of this kind and being described in detail in U. S. Letters Patent 1,148,940 and 1,647,560.

In Fig. 17 an arrangement is illustrated for applying ink to the impression means or printing members carried on the drum 121, such inking means also being well understood in the art, a detailed description of an inking means suitable for this purpose being set forth in U. S. Letters Patent 1,031,311.

It is to be noted that, of the various operative mechanisms provided in the machine, the only one which is constantly operated when the machine is in operation is the printing unit U and, more specifically, the drum 121 and its associated mechanisms in this unit. This drum rotates at a constant given speed which is selected according to the productive capacity desired of the machine. For example, if it should be desired that one hundred sheets, such as the checks S, Fig. 59, each bearing but a single impression of changeable data, are to be produced per minute, then the drum 121 is rotated at a speed of 100 revolutions per minute. In any event, however, the speed of rotation of the drum 121 is such that the drum will make a complete revolution each time the platen P is to be operated to make an impression so that if, for example, as in the present instance, the drum 121 is operated at the rate of 100 revolutions per minute and a sheet as the check S receives an impression only in every other operation of the platen P, then the productive capacity is fifty sheets per minute in the condition where the drum is rotating at this speed of 100 revolutions per minute. This same thing would be true if two impressions were made on this sheet and if in this instance the speed of the drum 121 were maintained at 100 revolutions per minute the productive capacity of the machine would again be fifty sheets per minute. By way of further example, if four impressions were made on each sheet and the drum speed were 100 revolutions per minute, then the productive capacity would be twenty-five sheets per minute.

From the foregoing it will be apparent that the productive capacity of the machine in so far as the number of sheets produced is concerned, is based upon the speed of rotation of the drum 121, and it is therefore advantageous to operate this drum at as high a speed as possible consistent with the production of satisfactory work in the printing unit U.

If the machine of the present invention only printed sheets such as the checks S and no proof sheets, explained hereinafter, were produced therein and but one impression of changeable data were made from each printing and control device fed into printing position below the platen P, the machine, in the nomenclature of this art, would be set for consecutive work. However, if two impressions are to be made on each sheet, such as the check S, from each printing and control device or if, as in the present instance, one impression is made from each printing and control device onto sheets S and another impression is made onto a proof sheet, then in this instance the machine is set for what is known as duplicate work. In other words, the number of impressions that are to be made from each printing and control device fed into printing position below the platen P determines whether the machine is to be set for consecutive, duplicate, triplicate, quadruplicate or other type of work, and in the present instance where two impressions are made from each printing and control device that comes to rest in association with the platen P the machine is set for duplicate work. This means that the drum 121, in the present instance, makes two revolutions for each sheet ejected from the machine but nevertheless, as will always be the case, the drum 121 makes one revolution for each impression operation of the platen P.

Thus in order to insure that sheets will pass through the machine and have operations performed thereon in such a way that sheets will be produced consistent with the type of work being performed, that is, consecutive, duplicate, triplicate, and so forth, the various mechanisms in the machine are timed to operate in accordance with the speed of rotation of the drum 121 and, in order that this may be effected, the devices which control operation of the various mechanisms in the machine are placed under control of the drum 121 and mechanisms associated therewith.

In connection with the foregoing it should be noted that in most instances heretofore where printing machines, of the class to which this invention pertains generally, were arranged to operate under conditions of consecutive, duplicate, triplicate and similar work, variations in the operative speed of the machine and variations in the time of operation of the various mechanisms provided in the machine were usually accomplished by altering gear ratios for usually the various operative mechanisms in machines of this type were operated from a common source and in timed relation with each other and usually geared interconnections were employed to insure the maintenance of proper timed relation. In contradistinction to this, in the present machine the various operative mechanisms in the machine, while in most instances deriving power from a common source, are not interconnected by gear interconnections. Instead of resorting to such a construction, each of the various operative mechanisms has an independent control for connecting the operative portions in the mechanism with the source of power and in this connection it should be noted that if so desired a separate source of power could be provided for each and every one of the various operative mechanisms in the machine, the utilization of a main drive shaft such as the main drive shaft 19 merely being an expeditious way of affording a source of power.

Since, in the present machine, the various operative mechanisms receive power through suitable controls, and more specifically clutches, provided in each of the mechanisms, and since these clutches are electrically controlled, by means of solenoids, it is possible to associate the regulating means, for the controls or clutches of the mechanisms to be timed relative to the printing unit U, directly with the printing unit U, these regulating means, in the present instance, being in the form of switches for controlling the closing of the circuit to the solenoids of the clutches. To this end a shaft 156, Fig. 14, is journaled in suitable bearings provided on the outer face of the side plate 129. This shaft has a bevel gear 157 thereon that meshes with a bevel gear 158 fast to a gear 159 that meshes with a pinion 160 rotatably mounted on the shaft 127 to which the drum 121 is fast. Cam discs as 161 are fast on the shaft 156 to be rotatable therewith and these cam discs operate the switches that control operation of various operative mechanisms in the machine.

In the present instance where the machine is set for duplicate work, as has been explained hereinabove, the ratio between the gears 160 and 159 is two-to-one and, since the ratio between the bevel gears 158 and 157 is one-to-one, the shaft 156 and the various discs fast thereon make one revolution for each two revolutions of the drum 121 and its shaft 127.

It will be remembered that the gate 123 in the printing unit U is moved to and from sheet stopping position under control of a cam 126 fast to the drum 121 and it will therefore be understood that the gate 123 is opened at predetermined times in the course of rotation of the drum 121. Now in order that sheets passing from the sheet guideways G to the gate 123 will be fed into engagement with this gate when it is in sheet stopping position, so that when the gate is elevated a sheet may be fed into the bite between the drum 121 and the platen roller 122 at the proper time, it is of course essential that the means controlling the feed of sheets to the gate 123 be operated in timed relation with the operation of this gate and it will be manifest that it is essential that such timed relation be maintained, it also being understood that the various operating mechanisms in the machine are timed to operate in definite timed relation with the means which feed or release the sheets for passage to the gate 123.

Therefore, in order to insure that definite timed relation between the operation of the gate 123 and the various other operating mechanisms in the machine will be assured, an arrangement is provided such that the angular relation between the shaft 156 and the drum 121 will always be the same at the beginning and at the end of a complete rotation of shaft 156, which is to say, such that there will exist a definite relation between a given point on a member fixed on the shaft 156 and a given point on the drum 121 and, by way of further example, the angular relation between the lobe or lobes on the cam discs as 161, and the inclination adjacent the rise 142 on the cam 126 will have a fixed value at the beginning of each and every 360 degrees of rotation of shaft 156.

This is accomplished in the present instance by providing a clutch generally indicated by 162, Figs. 15 and 16, which functions in such a manner that the shaft 156 is always connected to the shaft 127 in an identical manner. The clutch 162 in the present instance includes the gear 160 which, as stated heretofore, is rotatably mounted on the shaft 127, this gear including a hub 163 having clutch teeth 164 thereon that are urged toward clutch teeth 165 on a collar 166 fast on the shaft 127. The clutch teeth 164 are urged toward the clutch teeth 165 by springs 167 disposed about pins 168, that are fast in a disc 169 and axially slidable in the gear 160. The springs 167 are disposed between the disc 169 and the gear 160 and serve to urge the disc into engagement with the side plate 129 as well as to urge the clutch teeth 164 toward the clutch teeth 165.

A pin 170 fast in the hub 163 engages a cam surface on the plate 171, pivotally mounted as indicated at 172 and urged toward the periphery of the hub 163 by a spring 173. This arrangement affords a clutch structure equivalent to that disclosed in my co-pending application Serial No 239,561, filed November 8, 1938. The plate 171 extends between spaced pins 174 provided on the core 175 of the solenoid 176. When the solenoid is energized the plate 171 is retracted from engagement with the pin 170 and thereupon the springs 167 urge the gear 160 and hub 163 and the clutch teeth 164 on the hub toward the clutch teeth 165 on the collar 166.

Urging of the clutch teeth 164 toward the clutch teeth 165 does not necessarily promptly connect the gear 160 with the shaft 127 for, as has been explained heretofore, it is essential that the angular relation between the shaft 127 and the shaft 156 be maintained. In view of this the clutch teeth 164 are provided on but one-half of the end of the hub 163 and likewise the clutch teeth 165 are provided on but one-half of the adjacent face of the collar 166. The remaining portions of the adjacent faces of the hub and collar are flat and, until each and every one of the clutch teeth 164 are aligned with each and every one of the clutch teeth 165, the flat faces on the hub and collar prevent the clutch teeth from interengaging. When the clutch teeth are all aligned the shaft 156 is connected to the shaft 127 to rotate therewith. This can only occur at one point in the revolution of the shaft 127 and, therefore, each time the clutch teeth 164 engage the clutch teeth 165 to establish interconnection between the shafts 127 and 156, these shafts are interconnected in the same angular relation and, since the angular relation between these shafts is maintained constant, it follows that the timing of the mechanisms under control of the cam discs as 161 fast on the shaft 156 is always in the same relation with the operation of the gate 123.

The sheet feeding unit includes a cam shaft 177, Figs. 1 and 2, that controls the raising and lowering of the stop fingers 178 and 125 and the operation of means which feed the sheets, as the check S, to and from association with such stop fingers, the stop finger 178 positioning sheets relative to the printing means of the multiplying apparatus M. This cam shaft 177 must, of course, operate in timed relation with other operative devices in the machine. Hence this cam shaft has a bevel gear 179 fast thereon which meshes with a bevel gear 180 fast on the shaft 181 journaled in suitable bearings on the frame of the printing unit U. Another bevel gear 182 is fast on the shaft 181 and this bevel gear meshes with a bevel gear 183 fast on the shaft 156. The angular relation between the cam shaft 177 and the shaft 181 is always maintained constant and a definite angular relation is established between the shafts 181 and 156 at the time the gears 182 and 183 are respectively fast to these shafts and it therefore follows that the angular relation between the cam shaft 177 and the shaft 156 will be maintained constant. Thus the operative devices under control of the cam shaft 177 are also operated in timed relation with the drum 121, which is to say, the gate 123.

It is to be noted that the only geared interconnection between operative devices in the machine and the drum 121 is that established with the cam shaft 177 and therefore when the machine is initially placed in operation, which is to say, when the main motor 14 is set in operation, this motor need only pick up the drum 121. Moreover, when the clutch 162 is closed it only picks up the shaft 156 and the shafts 181 and 177, all of which parts are relatively light, and from the foregoing it will be seen that shocks incident to placing the machine of this invention in operation are reduced to a minimum, which is in contradistinction to arrangements that have heretofore been resorted to in printing machines of the above described type and wherein geared interconnections were established between various operative mechanisms in the machine for it will be appreciated that there is considerable shock incident to the picking up of a plurality of operative mechanisms interconnected by geared interconnections.

While the machine disclosed in the accompanying drawings includes many other devices which enter into the production of dividend checks, such as the check S, Fig. 59, it is believed that the foregoing description is sufficient to enable understanding of the relationship between the various operative devices in the machine and the multiplying apparatus M to which this invention primarily pertains and which will now be described, particularly since reference may be had to my co-pending application, Serial No. 221,841, for a full description of the machine.

THE MULTIPLYING APPARATUS

Reference has been made heretofore to the printing of the variable data V on the sheets, such as the check S and this is done by suitable platens from type characters on type segments mounted in the multiplying apparatus M, Figs. 20 to 58A, these type characters being selectively positioned in printing position beneath the ink ribbon IRa through which the impressions are made in the course of operation of the multiplier apparatus, which apparatus is now to be described.

*Analysis of principle employed*

In order to clearly define the nomenclature used in the following description of the multiplying apparatus, reference is made to the following example of the longhand multiplication of 999 by 999, wherein the terms hereinafter employed are associated with typical numerical data to which the terms will be applied:

```
    999—Multiplicand factor
    999—Multiplier factor
   ----
   8991—Intermediate product
  8991 —Intermediate product
 8991  —Intermediate product
 ------
 998001—Final product
```

It will be understood from the foregoing example that an intermediate product is a product which is obtained by multiplication of all of the digits in one factor (the multiplicand) by a digit in a particular order of the other factor (the multiplier). In ascertaining an intermediate product it is usually necessary to perform carry-overs. For example, in the following multiplication

```
    999
      9
   ----
   8991
``` when the 9 in the units order of the multiplicand is multiplied by the multiplier 9, the product is 81. So far as the units order is concerned the result of this multiplication is 1, it being necessary in this multiplication to carry over 8 into the tens order. Therefore in so far as the various digits that must be handled in the course of the last above example of multiplication are concerned, what is actually done is as follows:

```
    999
      9
   ----
     81
    81
   81
   ----
   8991
```

It will be seen that this multiplication entails three carry-overs but in longhand multiplication the necessary carry-overs are performed mentally rather than being set down so that, to ascertain a final product in longhand multiplication, in an instance where the multiplier extends through but a single order, no carry-overs are apparent in so far as set down digits are concerned.

However, in most instances where a two digit multiplier is entailed, for instance in the following example:

```
    999
     99
   ----
   8991
  8991
  -----
  98901
```

It will be seen that, in so far as set down digits are concerned, it is necessary to make carry-overs from the tens order, (referring to the final product) to the hundreds order and from the hundreds order to the thousands order and from the thousands order to the ten thousands order to ascertain the final product for the set down intermediate products are added with reference to orders of the final product to determine the final product and the required carry-overs are incidental to this addition.

I have found that the performance of multiplication in a machine may be effected expeditiously and accurately if intermediate products, such as those which appear in longhand multiplication, are utilized for this avoids the necessity of performing carry-overs incident to the multiplication of the various digits of the multiplicand by the respective digits of the multiplier and in my novel apparatus I utilize representations of intermediate products and summarize or add such intermediate products to ascertain the final product. The representations of intermediate products employed in my novel multiplying apparatus are provided in what will be called templets hereinafter, but it is to be understood that such representations could be afforded in a wide variety of ways without departing from the underlying principle of my invention.

In contradistinction to partial product multiplication, I provide representations of the actual intermediate products that may be ascertained in the multiplication of the various digits of the multiplicand factor by the respective digits of the multiplier factor. This is done in such a way that both the digit which is found for the particular order in which a multiplication is performed and any carry-over into this order from a multiplication in a lower order are represented by a single representation. Thus, in one form of my invention, if templets are to bear representations of the result of the following multiplication

```
    9
    9
   --
   81
``` the 1 resulting from this multiplication will be incorporated in a templet pertaining to the units order of the final product and the 8 will be incorporated in a templet pertaining to the tens order of the final product. This is in contradistinction to the practice that has heretofore been resorted to where, in an instance such as the foregoing, two templets pertaining to the units order would be provided, in one of which templets a representation of the 1 would be formed and in the other of such templets a representation of the 8 would be formed.

Another illustration of the manner in which representation of intermediate products in templets are formed in accordance with the present form of my invention is the instance where the following multiplication is performed:

$$\begin{array}{r} 99 \\ 9 \\ \hline 891 \end{array}$$

It is to be noticed that in reality this multiplication is as follows:

$$\begin{array}{r} 99 \\ 9 \\ \hline 81 \\ 81 \\ \hline 891 \end{array}$$

As in the instance above where 9 is multiplied by 9, the represenation pertaining to the 8 is to appear in a templet pertaining to the tens order of the final product but, in the immediately preceding example, in addition to this a representation of the 1 resulting from the multiplication of 9 in the tens order of the multiplicand (which in reality is 90) is also to be incorporated in this same templet. The result of this multiplication of 90 by 9, so far as the tens order of the final product is concerned is 1. However, in accordance with my invention, instead of individually representing the 8 and 1, the sum of which is to appear in the tens order of the final product, as is done in partial product multiplying apparatus, the sum of these two numbers or 9 is represented. Hence, templets formed in accordance with my invention bearing representations of the intermediate product resulting from the multiplication of 99 by 9 would bear representations of the digits 8, 9 and 1, these representations appearing in templets respectively pertaining to the hundreds, tens and units order of the final product.

Reference has been made to the templets being formed in the manner just described in accordance with the present form of my invention and this form is of the character capable of performing a large number of multiplications in which one factor is constantly reoccurring. In an instance where one factor of a large number of multiplications is constantly reoccurring it is possible to incorporate in templets representations of all of the intermediate products that may accrue from the multiplication of such a factor by all of the digits that may appear in a limited number of orders in the other factor. Then such templets may be placed under control of means responsive to representations of the digits of the varying factor of the multiplications to selectively position the various intermediate product representations on the templets in an operative position where the sensing means of a summation means, which functions to add the intermediate products and thereby ascertain a final product, will cooperate with such representations.

Furthermore, in accordance with the present invention, representations of a plurality of reoccurring factors may be provided in the apparatus and the representations pertaining to a particular reoccurring factor may be rendered operative, selectively. However, before describing this aspect of the invention, the characteristics of the portions of the apparatus pertaining to but a single reoccurring factor are described for such portions are, in principle, identical for each reoccurring factor.

Thus in the example above where 99 is multiplied by 9, 99 may be considered to be the reoccurring factor. In preparing templets for this factor representations will be formed in the templets to represent all the intermediate products ascertained upon the multiplication of 99 by the respective digits 0 to 9 and such representations are utilized by disposing in operative position only the representations of the intermediate product ascertained when the reoccurring factor is multiplied by a given digit of the other factor, representations of such a given digit being utilized for the purpose of selecting the representations to be disposed in operative position, as will be explained hereinafter.

*Templet formation*

A convenient way of affording representations of intermediate products is to utilize templets, as has been explained hereinabove. Examples of such templets are illustrated in Figs. 54, 55 and 56. Reference is first made to Fig. 54 wherein the templets 200, 201, 202 and 203 bear representations of the intermediate products ascertained when the multiplicand 999 is multiplied by the various significant digits and 0.

Each templet, in accordance with the present disclosure of my invention, initially has substantially the outline of the sector of a circle and includes a hub as $h$ having an opening as $o$ therein. Each sector initially includes an arcuate edge as $a$ which is spaced from the center of the opening $o$ a predetermined distance, and additionally each sector includes a radial edge as $e$ and a stop edge as $s$, each of these edges lying on radii intersecting each other at the center of the opening $o$. The angularity between these edges $e$ and $s$ is such that the initial edge $a$ may be conveniently divided into ten equal spaces, as by radii as $r$, each of such radii intersecting the center of the opening $o$ and crossing the edge $a$ at equidistantly spaced positions, which is to say, along the edge $a$, the radius $r$ first inwardly of the edge $e$ is spaced from this edge in the same amount as the next radius $r$ is spaced from the first radius $r$, and this continues on across the edge $a$ so that the stop edge $s$ is spaced from the ninth radius $r$ in the same amount as this ninth radius is spaced from the eighth radius $r$ which is also the amount the first radius as $r$ is spaced from the radial edge as $e$. The ten spaces into which the edge as $a$ is so divided, inwardly from the stop edge as $s$, respectively pertain to the digits 0—9—8——2—1 as these digits occur in the multiplier (the varying factor of the multiplications that are to be performed in the mechanisms shown in Figs. 7 to 65, inclusive, the other factor being reoccurring).

Additionally each sector has arcs as $c$, struck from the center of the opening $o$, extending thereacross at equally spaced intervals inwardly from the edge $a$ to define points at which step or stop edges may be formed to represent the various significant digits which may appear in intermediate products, 0 being represented on the edge $a$, the digit 1 is represented by a stop edge on the first arc $c$ inwardly of the edge $a$ while the digit 2 is represented by a step or stop edge on the next inwardmost of the arcs $c$, the remaining significant digits being respectively represented by stop edges located on the successive arcs inwardly of the aforesaid arcs, a stop edge on the inwardmost arc $c$ pertaining to the digit 9.

It is to be understood that the radii $r$ and the arcs $c$ are not actually provided on the sectors, these merely being intangible divisions in the sectors, the radii and arcs being shown in Figs. 62, 63 and 64 merely for the purpose of this description.

In order to prepare sectors such as have just been described to afford templets representing particular intermediate products, a chart is prepared. The constantly reoccurring factor, which will be the multiplicand in the present apparatus, is, of course, known and in preparing a chart this multiplicand is multiplied by zero and the various significant digits to ascertain what intermediate products will accrue when this particular multiplicand is multiplied by the various digits.

For example, where the constantly reoccurring factor is 999, the following chart is prepared:

| Digit in multiplier | Fourth templet | Third templet | Second templet | First templet |
|---|---|---|---|---|
| 1 | 0 | 0 | 9 | 9 |
| 2 | 1 | 9 | 9 | 8 |
| 3 | 2 | 9 | 9 | 7 |
| 4 | 3 | 9 | 9 | 6 |
| 5 | 4 | 9 | 9 | 5 |
| 6 | 5 | 9 | 9 | 4 |
| 7 | 6 | 9 | 9 | 3 |
| 8 | 7 | 9 | 9 | 2 |
| 9 | 8 | 9 | 9 | 1 |
| 0 | 0 | 0 | 0 | 0 |

In preparing the sectors to afford templets to represent the intermediate products, a sector is devoted to each order that may appear in the various intermediate products so that in the above instance where the intermediate products of 999 times the various digits are ascertained four sectors are utilized. One such sector, 200, pertains to the most right-hand or units order of the intermediate products, the second sector 201 to the tens order, the third sector 202 to the hundreds order, the fourth sector 203 to the thousands order. If the intermediate product extended through more than four orders of numbers additional sectors would be provided, one for each such order.

As has been stated heretofore, the spaces defined along the edge $a$ by the radii $r$ respectively pertain to the digits in the multiplier, and starting from the edge $e$ these spaces respectively pertain to the digits 1—2—3——8—9—0. Thus, for example, when the sector 200 is to be prepared reference is made to the chart and it is first ascertained what value is to be represented in the space between the stop edge $e$ and the adjacent radius $r$, which space pertains to the digit 1 in the multiplier. When reference is thus made to the chart and comparison is made across from the first digit in the multiplier to the column in which the digit to be represented in the first sector appears, it will be ascertained, in the present instance, that the digit 9 is to be represented. It has also been stated that in so far as the digits appearing in the intermediate products are concerned these are represented by stop edges disposed on the arcs $c$. It has also been explained that the inwardmost of these arcs pertains to the digit 9. Thus since the digit 9 is to be represented in the first space, which is to say, the space between the edge $e$ and the adjacent radius $r$, the material of this space is cut away inwardly of the edge $a$ to the inwardmost arc $c$ in such a way as to form a step Z representative of 9.

The material of the next space which, as has been explained, pertains to the digit 2 in the multiplier is next cut away and in this instance this material is cut away from the edge $a$ to the next to the inwardmost of the arcs $c$, which arc pertains to the digit 8 and in this way a step Z representative of 8 is defined.

This process is continued on across the various spaces and in each instance the material in the space is cut away inwardly of the edge $a$ to whatever arc pertains to the digit that is to be represented. This process is also followed in the production of the sectors 201, 202 and 203 as can be ascertained by comparing the location of steps Z on the various templets with the above chart. Of course, in commercial production of templets from sectors or the like, suitable dies or equivalent tools would be utilized and the steps or stop edges Z would not be cut individually as just described, such description being merely explanatory of the underlying principle.

In an instance where the value of both the multiplicand and the multiplier is 9, as can be seen by referring to the sector 200 and the above chart, the steps appear in regular order, this being a peculiarity of the multiplication of 9 by 9. This condition, however, does not always prevail. Thus, for example, where the reoccurring factor is 37, a chart such as the following will be prepared:

| Digit in multiplier | Fourth templet | Third templet | Second templet | First templet |
|---|---|---|---|---|
| 1 | 0 | 0 | 3 | 7 |
| 2 | 0 | 0 | 7 | 4 |
| 3 | 0 | 1 | 1 | 1 |
| 4 | 0 | 1 | 4 | 8 |
| 5 | 0 | 1 | 8 | 5 |
| 6 | 0 | 2 | 2 | 2 |
| 7 | 0 | 2 | 5 | 9 |
| 8 | 0 | 2 | 9 | 6 |
| 9 | 0 | 3 | 3 | 3 |
| 0 | 0 | 0 | 0 | 0 |

It will be noted that where the constantly reoccurring factor is 37 the intermediate products extend through but three orders when this multiplicand is multiplied by zero and the various significant digits. However, because of structural characteristics which will be explained in detail hereinafter, when templets are being prepared for use in the present apparatus four templets are always prepared. However, since no digits will appear in the fourth order, the fourth templet, the templet 207 in the present instance, is utilized but this sector is not cut away at any point inwardly of the stop edge $a$ so that it represents 0 throughout its extent.

In preparing the first templet as 204, Fig. 55, when the constantly reoccurring factor or multiplicand is 37, it will be noted that the digit 7 is to be represented in the first position on this first sector (it being understood that the first position is the 1 position in so far as the digits of the multiplier are concerned and being that position or space intermediate the edge $e$ and the adjacent radius $r$). The material of this space is cut away in this instance to the seventh of the arcs $c$ inwardly of the edge $a$ to thereby provide a step or stop edge Z representative of 7. By comparing the location of the various steps Z on the templets 204 to 207 with the respective and related columns in the above chart it will be seen that the various steps Z correspond in digital value with the chart.

By way of further example, where the constantly reoccurring factor or multiplicand is 465, a chart such as the following is prepared:

| Digit in multiplier | Fourth templet | Third templet | Second templet | First templet |
|---|---|---|---|---|
| 1 | 0 | 4 | 6 | 5 |
| 2 | 0 | 9 | 3 | 0 |
| 3 | 1 | 3 | 9 | 5 |
| 4 | 1 | 8 | 6 | 0 |
| 5 | 2 | 3 | 2 | 5 |
| 6 | 2 | 7 | 9 | 0 |
| 7 | 3 | 2 | 5 | 5 |
| 8 | 3 | 7 | 2 | 0 |
| 9 | 4 | 1 | 8 | 5 |
| 0 | 0 | 0 | 0 | 0 |

Comparison of the templets 208 to 211, Fig. 51, with this chart will show that the steps Z are formed therein to represent the required digital values.

By referring back to the above charts, which are examples of the multiplication of reoccurring factors and to Figs. 54 and 56, it will be noticed that in each and every instance the digits that are to be represented, and are represented in the first templet, are the digits which are ascertained when the digit appearing in the units order of the constantly reoccurring factor or multiplicand is multiplied by the various digits of the multiplier but without any carries that may be incidental to such multiplications. In so far as the second templet is concerned it will be noted that while this templet is to bear representations of the digits ascertained when the second digit in the constantly reoccurring factor, that is, the one in the tens order, is multiplied by the various digits of the multiplier, without any carry-overs that may accrue in such multiplications, it bears, instead of merely representations of such digits, representations of the sum of such digits and any carry-overs which may occur by reason of the multiplication performed to ascertain the digit for the corresponding position in the first templet. Hence corresponding multiplier digit positions on templets of a set pertaining to a given reoccurring factor bear representations of the actual digits that appear in the intermediate product resulting when the reoccurring factor is multiplied by a particular multiplier digit.

The specific description thus far given with reference to the preparation of the templets as 200 particularly pertains to the preparation of templets where the significant digits appear in the units order of the multiplier. It, however, should be noted that if, for example, 999 were multiplied by 90, the digits in the resulting products would be identical with those included in the above set forth chart of such multiplication except that a fifth order would appear to the right of the most right-hand order, but each and every digit appearing in such fifth or most right-hand order would be 0. The foregoing would also apply in so far as the charts pertaining to a constantly reoccurring factor of 37 and a constantly reoccurring factor of 465 or any other constantly reoccurring factor are concerned. From this it will be seen that in so far as the formation of the respective templets to represent intermediate products is concerned these templets are formed in precisely the same manner whether the significant digits appear in the units, tens, hundreds and so on orders of the multiplier, which is to say, the most right-hand templet (in which significant digits are to be represented) in any set will correspond to a similar templet in any other set and this applies to all similarly located templets in the various sets.

When sets of templets are being prepared to represent the intermediate products ascertained by the multiplication of a given multiplicand (the constantly reoccurring factor in the present machine) by zero and the significant digits that may appear in the various orders of the multiplier, as many sets of templets are prepared as there are to be accommodation for orders in the multiplier. Hence if accommodation is to be afforded for a three-order multiplier, three sets of templets are provided and these sets of templets will respectively pertain to the units, tens and hundreds order of the multiplier. As has been explained, the templets in each set will be identical, which is to say, the most right-hand templet in a particular set will correspond with the most right-hand templet in each other set, and the next to the most right-hand templet in a particular set will correspond to the next to the most right-hand templet in each of the other sets, and so on, this condition prevailing in all templet sets pertaining to a particular reoccurring factor.

If the capacity of the machine is to be such that accommodation is to be afforded for but a single reoccurring factor, then the templets in the various sets will be arranged in the manner shown in Fig. 57 and such arranging of the templets will first be explained and thereafter the manner in which the templets are arranged to accommodate more than one reoccurring factor will be explained.

The manner in which the templets are located in each set relative to each other and the manner in which templets in different sets are located relative to each other can perhaps best be explained by again referring to an example of longhand multiplication. Thus in an instance where 999 is multiplied by 999 in longhand multiplication, the various digits involved are set down in the following manner:

```
     999—Multiplicand
     999—Multiplier
     ───
    8991 —First intermediate product
   8991  —Second intermediate product
  8991   —Third intermediate product
  ───────
  998001—Final product
```

It will be noted that in longhand multiplication the first or most right-hand digit in any intermediate product ascertained is set down in alignment with the multiplier digit entering into the ascertainment of such intermediate product. The various other digits in each intermediate product are set down in successive positions to the left of the first ascertained or most right-hand digit in any intermediate product, and this is done in such a way that when the multiplier digit appears in the units order of the multiplier the various digits ascertained in the intermediate product resulting from the multiplication of the multiplicand by a digit appearing in this order are set down successively in alignment with the units, tens and hundreds orders positions in the multiplier. In reality this is but a facile way of orienting the various digits in the intermediate products relative to the orders of the final product to which they respectively pertain so that while the digits are set down in longhand multiplication in alignment with the digital order positions of the multiplier, they are, in fact, being located relative to the order positions in the final product.

It has been explained that templets produced in accordance with the present invention are arranged in sets and that each templet in each set pertains to a particular order. Thus in a set pertaining to the intermediate products ascertained when the multiplicand is multiplied by the digits that may appear in the units order of the multiplier, the most right-hand templet in the set pertains to the units order, the next templet to the left pertains to the tens order and so on. However, in a set pertaining to the intermediate products ascertained when the multiplicand is multiplied by the digits that may appear in the tens order of the multiplier, the most right-hand templet in the set pertains to the tens order, the next templet to the left pertains to the hundreds order and so on. In assembling the templets of the various sets into what will be called templet-gangs hereinafter, the templets in each gang are uniformly spaced one from the other and this spacing is uniform in the various gangs. The difference between different templet-gangs pertaining to different orders of the multiplier is the differences in location of the most right-hand templets in various gangs and the consequent difference in location of the other templets in the gangs so that when a gang is positioned in the machine the various templets therein will be properly positioned to cooperate with means pertaining to the particular order of the final product to which the templets respectively pertain.

It is to be understood that when reference is made to locating the most right-hand templet in a gang in position to pertain to the units order or to the tens order and so on, that, just as in the case of longhand multiplication, reference is being made to the orders of the final product. In Fig. 57 the various orders of the final product are represented by dot-dash lines indicated by L; the most right-hand line L in Fig. 57 pertaining to the units order of the final product, the next line L to the left pertaining to the tens order of the final product, the next line L to the left pertaining to the hundreds order of the final product and so on. The templets shown in Fig. 57 are those pertaining to the reoccurring factor of 999 and which are illustrated in Fig. 54. Furthermore, the suffix "U," "T" or "H" is added in Fig. 57 to the reference characters identifying the particular templets to respectively indicate the order of the multiplier to which the respective templet pertains. Thus the templet 200—U pertains to the units order of the multiplier while the templet 200—T pertains to the tens order of the multiplier and the templet 200—H pertains to the hundreds order of the multiplier.

The templets 200—U, 201—U, 202—U and 203—U are part of the templet-gang designated as G—U in Fig. 57, the templets 200—T, 201—T, 202—T and 203—T are part of the templet-gang designated as G—T in Fig. 57, while the templets 200—H, 201—H, 202—H and 203—H are part of the templet-gang designated as G—H. By referring to Fig. 57 it will be seen that the templet 200—U in the templet-gang G—U, which pertains to the units order of the multiplier, is located on the line L—U that pertains to the units order of the final product, the templet 200—U pertaining to the units order of the final product as has been explained hereinabove. The templet 201—U, which pertains to the tens order in the templet-gang G—U, is located on the line L—T which pertains to the tens order of the final product. The templet 202—U which pertains to the hundreds order in the gang G—U is located on the line L—H which pertains to the hundreds order of the final product, it being understood that the suffixes included after the reference character "L" identifying the order of the final product to which the particular line pertains.

In the templet-gang G—T the templet 200—T is located on the line L—T since the templet-gang G—T pertains to the tens order of the multiplier and the first significant digit that will appear in an intermediate product pertaining to the tens order of the multiplier will pertain to the tens order of the final product, this being similar to longhand multiplication as can be ascertained by reference to the last above set forth example of such multiplication. In this templet-gang G—T the templet 201—T is disposed on the line L—H which pertains to the hundreds order of the final product. It will be noted that the templets in the templet-gangs G—U and G—T, to which reference has not been made specifically thus far, are respectively located on the line L pertaining to the order of the final product to which the respective templet pertains. This also applies in so far as the various templets included in the templet-gang G—H are concerned.

It will be seen from the foregoing that in each templet set or gang the templets therein are located relative to the order of the final product to which they pertain and that the relationship in so far as location of the templets in different templet sets or gangs is concerned is such that the templets in different gangs which pertain to the same order of the final product are aligned one with the other. The particular means by which such locating of the templets in the various templet-gangs is accomplished in the present machine will be described more fully hereinafter.

It will be recalled that each templet set bears representations of every intermediate product that can be ascertained when a particular multiplicand is multiplied by zero and the significant digits that may appear in the order of the final product to which the set pertains. It has also been explained that the various templets in the various sets thereof are located relative to the order of the final product to which the respective templets pertain. Thus when a particular multiplication is to be performed, that is, when the multiplicand (the reoccurring factor) is to be multiplied by a particular digit the representations of the intermediate product resulting from such multiplication need be selectively moved into operative position so that only the proper representations will be effective and this is done by moving proper of the steps Z into operative position, such operative position being indicated in Fig. 57 by the lines L. In this connection it is to be recalled that the positions intermediate the edges e and s, Fig. 54, defined by the radii r and at which the steps Z are located, pertain to the digits of the multiplier in the order of 0, 9, 8, 7, 6, 5, 4, 3, 2, 1 inwardly away from the edge s, and this is utilized to bring about positioning of proper of the steps Z in operative position, as will now be explained.

To effect position of the steps Z on the templets when a particular multiplication is to be performed a positioning templet as 212, Fig. 54, is associated with each set of templets as 200 to 203. Such a positioning templet is produced from a sector having a configuration similar to the other sectors hereinabove described, which is to say, such a sector includes a hub h' having an opening o' therein at the center of which the radii, on which the edges e' and s' lie, intersect. This sector is also divided into spaces or positions along the arcuate edge a' by radii r' that are congruent to the radii r on the sectors as 1105. Arcs d' struck from the center of the opening o' are spaced inwardly from the edge s' at regular intervals, this spacing being greater than the spacing of the arcs c on the sectors as 200. In the case of the positioning sectors as 212 the steps which are to be effective in the operation of the apparatus are not located on the arcs d' with respect to the edge a' but rather are located on selected of the radii r' with respect to the edge e', such steps being generally indicated by Z'.

For a purpose which will be explained hereinafter and which arises by reason of the code, Fig. 63, under which representations of the multiplier are produced in the control areas of the printing and control devices as D, Fig. 60, each step Z' except the one most remote from the edge e' represents two significant digits. The first of such steps Z' located inwardly from the edge e', lies on the immediately adjacent radius r' and serves to represent the digits 1 and 2. In forming this step, the material in the area between the edge c' and the immediately adjacent radius r' is cut away to the inwardmost of the arcs d'. In forming the next of the steps Z', the material intermediate the first radius, that is, the radius immediately adjacent to the edge e', and the third radius away from this edge is cut away down to the next inwardmost of the arcs d' and the second step thus formed to lie on the third radius r' pertains to the digits 3 and 4. The next step Z' is defined by cutting away the material intermediate the third and fifth of the radii r' down to the next inwardmost of the arcs d' and thus the third of the steps Z' lies on the fifth of the radii r' and pertains to the digits 5 and 6. The next step Z' is defined by cutting away the material intermediate the fifth and seventh of the radii r' down to the next inwardmost of the arcs d' and thus the fourth of the steps Z' lies on the seventh of the radii r' and pertains to the digits 7 and 8. The next and last of the steps Z' is defined by cutting away the material intermediate the seventh and ninth of the radii r' down to the arc d' closest the edge a' and thus the fifth and last step Z' lies on the ninth of the radii r' and pertains to the digit 9. Furthermore, when this last step Z' comes to rest, under certain conditions, in an operative position in which the other edges come to rest to represent one or the other of the digits to which they pertain, this step, in effect, represents 0. Under these conditions, however, means other than those which position the other steps cause this fifth and last step to come to rest in the position in which it is representative of 0.

With regard to the just described formation of the positioning templet 1117, it should be noted that each and every positioning templet employed in the machine is identical in construction, this being due to the fact that the steps Z' defined on such templets pertain to the digits which can appear in any order of the multiplier which digits of course will always be the same.

It has been explained that the steps Z are located on the templets as 200 in definite relation with respect to the arcuate edges a to thereby represent a particular digital value, the particular value being determined by the particular one of the arcs c on which the particular step Z lies. It has also been explained that these steps Z lie in certain positions intermediate adjacent of the radii r and that these positions respectively inwardly of the edges as e pertain to the digits 1, 2, 3, 4, 5, 6, 7, 8, 9, 0, in that order. It has also been explained that the steps Z' are located on radii r' and that these steps inwardly of the edges as e' pertain, in the manner above explained, to the digits 1, 2, 3, 4, 5, 6, 7, 8, 9, 0 in that order.

Thus, if positioning templets as 212 are associated with a set of templets as 200 to 203, and if the various positions on such templets inwardly of the edges e and e' are fixed in definite relation with each other, it will be possible by locating the steps Z' in given positions, to similarly locate the positions on the templets as 200 to 203 in given positions, and it is an arrangement such as this that enables selected of the steps Z to be disposed in operative position, diagrammatically illustrated in Fig. 57 as being on the lines L.

In order that the positioning templets as 212 may be used to bring about positioning of the proper steps Z when a particular step Z' is effective in the course of operation of the apparatus, each templet set is provided with a positioning templet as 212 and the templets as 200 to 203 in the set are tied to such positioning templet in such a way that when the step Z' pertaining to the digit 1 in the multiplier is effective, the steps Z on the templets as 200 to 203 and pertaining to the digit 1 in the multiplier will be disposed in operative position and so on through the various digits in the multiplier.

If but a single group of templets pertaining to but a single reoccurring factor is to be utilized, the templets in each of the sets thereof can be tied together and to a positioning templet to afford a templet-gang in the manner shown in Fig. 52 of my above referred to co-pending application Serial No. 221,841. In the present apparatus, however, templet groups (a templet group as referred to herein including all of the templets pertaining to a particular reoccurring factor, the templets shown in Fig. 57 constituting such a group) pertaining to a plurality of reoccurring factors are employed and each templet-gang includes a set of templets from each group. This requires that all of the templets in a gang be tied together and that all of such templets be tied to the positioning templet for the gang. Hence the manner in which the templet gangs, each including sets of templets from a plurality of groups, are assembled will now be described.

*Templet gang assembly*

As explained above the manner in which the templets in a particular group are arranged relative to each other is shown in Fig. 57. This same relation between the templets of a particular group is maintained even when templets from a plurality of groups are included in the machine. It is believed that the manner in which templets of different groups are assembled can best be ascertained by reference to the diagrammatic views. Figs. 58 and 58A.

By comparing the disclosure in Figs. 58 and 58A with the disclosure in Fig. 57, it will be seen that the templets 200—U, 201—U, 202—U and 203—U pertaining to the units order of the multiplier and relating to a constantly reoccurring factor of 999 are arranged in the same relation with each other in Figs. 58 and 58A as they are in Fig. 57. Moreover, the templets 200—T, 201—T, 202—T and 203—T are arranged in the same relation with the templets 200—U to 203—U, inclusive, in Figs. 58 and 58A and in Fig. 57, which is to say, the templet 200—T is arranged in operative alignment with the templet 201—U, the templet 201—T is arranged in alignment with the templet 202—U and so on. The foregoing also applies to relation of the templets 200—H to 203—H, inclusive, with respect to each other and the templets in the group pertaining to the reoccurring factor of 999 (those templets shown in Fig. 54). Thus in so far as templets pertaining to the constantly reoccurring factor of 999 are concerned, it will be seen that an identical relationship therebetween is shown in Figs. 58 and 58A and Fig. 57.

It is to be understood that the aforesaid relationship between the templets of the group pertaining to the reoccurring factor of 999 is not peculiar to that group but is one which is representative of the relationship between the templets of any group. Furthermore, if the capacity of the apparatus was for other than the multiplication of a three order multiplicand by a three order multiplier, each group of templets pertaining to a particular reoccurring factor would contain a greater or lesser number of templets, as the case might be, and in such instances, the above described relationship between the various templets in the various groups would be maintained while being extended or restricted as required. Moreover, where, as in the case of the reoccurring factor 37, it is not necessary to form as many templets as the machine has capacity to handle, blank templets, that is, templets which represent in all positions only zero, are nevertheless provided.

In the machine as shown in the accompanying drawings, three groups of templets respectively pertaining to the reoccurring factors of 999, 37 and 465 are included in the machine. The manner in which templets are formed for these factors may be ascertained by reference to Figs. 54, 55 and 56 and the above included description thereof. Moreover, by reference to Figs. 58 and 58A it will be seen that when the templets of these groups are arranged in sets and such sets are arranged with the various templets therein located relative to each other in the above described manner, the various templets in the various groups that pertain to the units order of the final product are arranged in juxtaposition with each other as are the other templets which pertain to a particular order of the final product. Such juxtaposed templets are referred to hereinafter as a templet cluster C.

By way of further explanation and with particular reference to Figs. 58 and 58A, the templets 200—U, 204—U and 208—U constitute a templet cluster C in the templet-gang G—U, which pertains to the units order of the multiplier, the templets of this cluster pertaining to the units order of the final product. Further, the templets 201—T, 205—T and 209—T constitute a cluster C in the templet-gang G—T, which pertains to the tens order of the multiplier, the templets of this cluster pertaining to the hundreds order of the final product. Further examples of such templet clusters may be ascertained by reference to Figs. 58 and 58A.

It is to be noted that the order in which templets from the various groups are arranged in the various clusters remains constant. Thus, in the templet cluster C in the templet-gang G—U and pertaining to the units order of the final product, the templet 200—U of the group pertaining to the reoccurring factor 999 is in the most right-hand position in the cluster, the templet 204—U of the group pertaining to the reoccurring factor 37 is in the intermediate or middle position in the cluster, and the templet 208—U of the group pertaining to the reoccurring factor 465 is in the most left-hand position in the cluster, and in the cluster in the templet-gang G—H pertaining to the hundreds order of the final product the templet 200—H of the group pertaining to the reoccurring factor 999 is in the most right-hand position in this cluster, the templet 204—H of the group pertaining to the reoccurring factor 37 is in the middle position in this cluster while the templet 208—H of the group pertaining to the reoccurring factor 465 is in the most left-hand position in the cluster. This same arrangement will be found in each cluster, that is, the templet in the particular cluster from the group pertaining to the reoccurring factor 999 is always in the most right-hand position in the cluster, the templet in the particular cluster from the group pertaining to the reoccurring factor 37 is always in the middle position in the cluster while the templet in the particular cluster from the group pertaining to the reoccurring factor 465 is always in the most left-hand position in the cluster. Hence, it will be seen that the templets from a particular group thereof are always located in identical positions in the particular clusters in which the particular templets are to be disposed.

In the present apparatus each templet-gang, each of which pertains to a particular order of the final product, comprises four clusters of three templets each and a positioning templet. The templets in the various gangs are tied together so that positioning of the positioning templet results in a positioning of three intermediate products, that is, one intermediate product for each of the three reoccurring factors times the value of the digit controlling positioning of the positioning templet. However, only one of such intermediate products is actually disposed in operative position, such as represented by the lines L in Figs. 58 and 58A for prior to the time the templets are positioned under control of the positioning templets, the templet-gangs are shifted to bring only the templets of a particular group into operative position. The present apparatus is so constructed that the templets in the most left-hand group are normally in operative position and when templets of one or another of the other two groups are to be arranged in operative position the entire templet-gangs are shifted longitudinally, to the left as viewed in Figs. 58 and 58A, to bring the templets of one or the other of the other two groups of templets into operative position, the particular group of templets so positioned depending upon which of such other groups is to be effective in a particular multiplication. The manner in which a particular group of templets is selected to be operative and the manner in which the above referred to shifting of the templet-gangs is brought about is explained in detail hereinafter.

By referring to Fig. 43 the manner in which the templet clusters C and the positioning templets in the various templet-gangs are actually assembled may be ascertained, and referring to this view it will be seen that a shaft 213 is provided for supporting the templet gang G—H which pertains to the hundreds order of the multiplier, this being the particular templet-gang illustrated in Fig. 43. The shaft 213 includes a knurled head 214 and the end of the shaft 213 opposite this knurled head is passed through a sleeve 215 which has a flange 216 at the end thereof opposite the end into which the shaft 213 is first passed.

A spacing collar 217 extends along the sleeve from the flange 216 and in each templet-gang the spacing collar as 217 is of different length so as to dispose the most right-hand templet in the templet gang, as viewed in Fig. 43, in a predetermined position with respect to certain operative mechanisms in the machine, and specifically in position to be movable into the path of travel of a sensing finger in a summation means that is adapted to cooperate with the templets in the most right-hand cluster C in a particular templet-gang, such sensing finger and summation means being described in detail hereinafter. The reason for using spacing collars 217 of different lengths will be apparent if reference is made to Figs. 58 and 58A, which diagrammatically illustrate the difference in spacing between the most right-hand templet in each templet-gang and the positioning templet of the particular templet-gang, it being understood that the positioning templets occupy identical positions in each of the templet-gangs as is indicated by the dot-dash line L', Fig. 58A.

It should also be noted that it would be possible to employ spacing collars of equal length in the various templet-gangs if unneeded templets were included in the various gangs. However, as has been explained heretofore, the various templets in the templet-gangs (assuming for the purpose of the present description that each templet cluster comprises but a single templet) are arranged much in the same manner as that in which the intermediate products are set down in longhand multiplication, which is to say, in each templet-gang the most right-hand templet is in a position corresponding to the position in which the most right-hand digit in the intermediate product would be set down if a longhand multiplication were being set down. Thus in so far as the templet-gang pertaining to the units order is concerned, the most right-hand templet in that gang is aligned with the units order of the final product. However, in so far as the templet-gang pertaining to the tens order of the multiplier is concerned, the most right-hand templet in this gang is set down in position in alignment with the tens order of the final product and no templet is included in this gang in alignment with the units order of the final product, just as no digit is set down, in longhand multiplication, in alignment with the units order of the final product in so far as an intermediate product pertaining to the tens order of the multiplier is concerned.

Now again referring to Fig. 43 where the templet-gang G—H pertaining to the hundreds order of the multiplier is illustrated, the spacing collar 217 is of such length that it will dispose the most right-hand templet in the most right-hand cluster C included therein in position to cooperate with the sensing finger of the summation means pertaining to the hundreds order of the final product when this most right-hand templet in this cluster is moved into operative relation with this sensing finger, this most right-hand templet normally being out of operative position since, as explained above, it is the most left-hand templet in each cluster that is normally in operative position. Specifically, when the parts are in the at rest position illustrated in Fig. 43, the most right-hand templet 200—H in the templet-gang G—H is not in operative position for it is the most left-hand templet 208—H in this cluster that is in operative position.

All of the templets as 200—H are of uniform thickness and thus by making the spacing collar 217 of a length sufficient to dispose the templet 200—H two spaces of the potential longitudinal movement of the templet-gang G—H out of operative position when the parts are in the at rest position, the templet 200—H is arranged in its proper position in the machine since the potential longitudinal movement of the templet-gang G—H and other of the templet-gangs is equal to twice the thickness of a templet as 200—H, this being the two spaces of the potential longitudinal movement to which reference has just been made.

In assembling a templet-gang as G—H, the proper spacing collar as 217 is first arranged in abutment with the flange as 216 and then the most right-hand cluster of templets is arranged in position on the sleeve 215 with the templets in the cluster arranged in their proper order from right to left, or previously explained, which, in this instance, will entail arranging the templet 200—H in the most right-hand position, the templet 204—H in the intermediate position and the templets 208—H in the most left-hand position in this cluster, the most right-hand templet, the templet 200—H in the gang G—H, being engaged with the adjacent end of the collar as 217. With this cluster of templets thus arranged in proper position, a spacing collar 218 is arranged in engagement with the most left-hand templet of the most right-hand cluster of templets in the particular templet-gang. This spacing collar is of a predetermined length and this length is such that, in so far as the potential longitudinal movement of the templet-gang is concerned, when a templet from the cluster of templets next to left along the sleeve 215 is engaged with the face of the spacing collar opposite that engaging the most left-hand templet of the most right-hand cluster of templets, the newly positioned templet will be disposed two positions out of its operative position. In the present instance the templet 201—H is so engaged with the spacing collar 218 and the templets 205—H and 209—H are arranged in this order toward the left away from the templet 201—H. Another spacing collar 219, identical with the spacing collar 218, is then arranged in engagement with the templet 209—H and thereafter the templets 202—H, 206—H and 210—H are arranged on the sleeve 215 in that order toward the left. Then still another spacing collar 200, identical with the spacing collars 218 and 219, is engaged with the templet 210—H and the cluster of templets including the templets 203—H, 207—H and 211—H is arranged on the sleeve 215 with templets disposed in that order toward the left.

Then still another spacing collar 221 is engaged with the exposed face of the templet 211—H and thereafter the positioning collar 222 is engaged with the exposed face of the spacing collar 221. It is this positioning collar, as will be explained in detail hereinafter, in cooperation with other parts of the machine, that is effective to determine the longitudinal position of the templet-gang in its mounting so as to therefore bring the templet of the desired group in each cluster into operative position with respect to the sensing fingers of the summation means.

In order to prevent movement along the sleeve 215 of the parts thus far described as being assembled on this sleeve and to enable such parts to be handled as a unit, a clamp nut 223 is run onto a threaded portion on the end of the sleeve 215 which projects beyond the positioning collar 222, and this clamping nut is set home to tightly clamp the parts on the sleeve 215.

The end of the sleeve 215 at which the flange 216 is provided is threaded internally to receive a threaded part 224 on the end of the shaft 213 that is first passed into the sleeve 215. A shoulder is provided internally in the sleeve 215, inwardly of the threaded portion receiving the threaded part 224, and a shoulder 225 on the shaft 213, defined by reducing this end of the shaft to provide the threaded part 224, abuts the shoulder in the sleeve to thereby dispose the shaft 213 in a predetermined position longitudinally in the sleeve 215.

The positioning templet 212 of each templet-gang is mounted independently of the templets of the gang that are assembled on the sleeve as 215 and the particular manner in which this is done will be explained more fully hereinafter. However, in so far as the templet-gang G—H illustrated in Fig. 43 is concerned, it will be seen that the positioning templet 212—H of this gang has a pin 226 passed therethrough, which pin is also passed through all of the other templets of this templet-gang. The passing of this pin through all of the templets in each templet-gang serves, in so far as the particular templet-gang itself is concerned, to accurately orient the steps Z with respect to the steps Z' so that when a particular step Z' is effective to bring about positioning of the templets of the gang those steps Z affording representations on the various templets pertaining to a particular intermediate product will be disposed in operative position, the particular manner in which such positioning of the templets is brought about being explained hereinafter. In order that the part of the templet-gang G—H that is secured on the sleeve 215 may shift longitudinally to bring the templets of a particular group into operative position, the pin 226 is freely passed through the positioning templet 212—H which is so arranged in the machine, as will be explained, that it does not shift longitudinally when the other templets of this templet gang are so shifted but this pin is fast in those templets that are secured on the sleeve 215.

It will be understood that each templet-gang is assembled in the manner that has just been described and, as has been explained, the length of the particular spacing collar as 271 that is included in each templet-gang assembly is such that it will position the most right-hand templet, as the templets are viewed in Fig. 43, in its proper position. By referring to Fig. 30, the relative lengths of the spacing collars 271 included in the templet-gangs G—U, G—T and G—H may be readily ascertained, the suffix H, T or U being added to the reference character 217 in this view to indicate the spacing collars in the gangs pertaining to the hundreds, tens and units orders, respectively.

Before describing the particular manner in which the templet-gangs as G—U, G—T and G—H are mounted in the apparatus and the manner in which these templet-gangs are moved to bring selected steps Z into operative position, the frame and like parts of the multiplying apparatus will first be described so as to thereby facilitate the description of the particular location of the various templet-gangs with respect to each other and other operative parts of the apparatus.

*Templet-gang mounting*

The multiplying apparatus M in which the templet-gangs G are employed includes a pair of side plates 227 and 228, Fig. 27, between which the templet-gangs G are adapted to be mounted as well as the sensing means of the summation means that are adapted to cooperate therewith. It is, of course, desirable to arrange the multiplying apparatus M in as compact a manner as possible and in this connection it is to be noted that while this desired arrangement of the multiplying apparatus is attained in the present instance it is at the same time unnecessary to fan out parts to afford accommodations for either the means initiating movement or the means receiving movement, which latter means are set up by the multiplying apparatus. By way of example as to what is meant by this there have been instances where parts have been arranged in compact relation but where printing members receiving motion were included in such arrangements it was usually necessary to fan out the members operable to set up such printing members in order that the operable members could be accommodated. Fanning out and the like of operative parts is avoided in my novel apparatus by compactly arranging the operative parts and the means cooperating therewith and this centers in the novel arrangement of the sensing means and the summarizing means of which the sensing means are a part.

It will be recognized, when the steps Z on the templets are disposed in operative position, indicated by the lines L in Figs. 58 and 58A, that in order to ascertain the final product it is necessary, in effect, to add or summarize the digits represented by the steps Z. In summarizing such digits it will frequently be necessary to perform carry-overs from a lower to a higher order such as is necessary when the digits represented by the steps Z on the line L—T, Fig. 58A, pertaining to the tens order are added, such digits being 9 and 1, in the illustrated problem, which when added require a carry-over of 1 into the next higher or hundreds order.

To add, in effect, digits represented by steps Z on the lines L, a summation device is provided for each order of the final product, there being, therefore, such a summation device for each line L in Figs. 58 and 58A. These summation devices are mounted between the side plates 227 and 228 of the multiplying apparatus and will be described in full presently.

The disclosed multiplying apparatus is of such capacity that a three-order multiplicand may be multiplied by a three-order multiplier. The largest three-order multiplication that can be effected is 999 times 999, which results in the product 998001. This product extends through but six orders and therefore in a machine having a capacity for three-order multiplicands and multipliers there must be accommodation, in so far as the final product is concerned, for six orders. It is for this reason that six summation members or racks 229 to 234, inclusive, Figs. 27 and 36, are provided in the present apparatus, there being such a member for each order of the largest final product that need be accommodated within the capacity of the apparatus which assures that there will be a summation member for each order of every product that may be ascertained in the operation of the apparatus. The six summarizing devices, mounted between the side plates 227 and 228, cooperate respectively with the six summation members 229 to 234, as will be explained presently.

Side frames 235 and 236, Figs. 27 and 26, are provided which, at their lower ends, are secured to a bracket 236a, Figs. 2 and 22, which may be adjustably secured to the frame of the machine in which the present apparatus is included. The side frames 235 and 236 are spaced from each other in an amount greater than the spacing of the side plates 227 and 228 in the present instance so that in event it is desired to provide a multiplying apparatus having a capacity for more than six orders such multiplying apparatus, which would be wider than that shown herein, can be supported between the side frames 235 and 236. The side plates 227 and 228 are disposed between the side frames 235 and 236 and spacing collars as 237, Figs. 26, 30 and 35 are interposed between, for example, the side frame 235 and the side plate 227 and the side plate 228 and the side frame 236, these spacing collars being located at suitable positions on the side plates. Bolts as 238 are freely passed through the side frames 235 and 236 and the spacing collars as 237 and are threaded into tapped openings provided in the side plates 227 and 228, and in this manner the unit including the side plates 227 and 228 is firmly secured in the apparatus. In order to positively space and reenforce the side frames 235 and 236, spacing sleeves as 239, Fig. 22, are disposed therebetween at suitable positions and bolts as 240 are freely passed through the side frames 235 and 236 and are threaded into tapped ends of these spacing sleeves.

As stated heretofore, the present apparatus has sufficient capacity for multiplying a three-order number by a three-order number, and in order that the apparatus will be sufficiently flexible to permit accommodation for a greater or less number of orders the side frame members 235 and 236 are spaced apart so that accommodation for more than six orders in the final product is available and, of course, since the accommodation is great enough for more than six orders in the final product apparatus for handling less than six orders can be arranged therein.

It has also been explained that a templet-gang G is provided for each order of the multiplier and in the present instance where it is contemplated that multipliers extending through three orders are to be handled accommodation is afforded for three templet-gangs. Of course, if additional orders were to be provided for in the multiplier, additional templet-gangs would be included in the apparatus, one for each additional order in the multiplier to be accommodated.

It is apparent that if any multiplication is to be performed, even though the multipliers are to appear but in a single order, one templet-gang will be necessary and such templet-gang will pertain to the units order of the multiplier. Thus the present apparatus is so arranged that the templet-gang pertaining to the units order of the multiplier is accommodated in an inwardmost position in the machine of the positions whereat the templet-gangs are to be accommodated, and the templet-gangs respectively pertaining to the tens, hundreds and higher orders of the multiplier are arranged to be disposed outwardly of this inwardmost position in the order of ascendency of such orders. Thus by referring to Fig. 20 it will be seen that the templet-gang G—U, the templet-gang for the units order of the multiplier, is arranged in an inwardmost position, the templet-gang G—T for the tens order of the multiplier is arranged in a position next outwardly of the position whereat the templet-gang G—U is accommodated and the templet-gang G—H for the hundreds order of the multiplier is arranged next outwardly of the templet-gang G—T. If templet-gangs were to be provided for thousands and higher orders in the multiplier, such templet-gangs would be arranged outwardly of the place where the templet-gang G—H is accommodated.

Each templet-gang is mounted in the machine in a similar manner and the manner in which these templet-gangs are mounted in the machine is illustrated in Figs. 20, 27, 29 to 35, inclusive, 43, 44 and 45. Accommodation for the various templet-gangs is provided in the side plates 227 and 228 by forming bifurcations in the upper edges of these plates. These bifurcations as 241—U are provided in the upper edges of the side plates 227 and 228 at the position where the templet-gang G—U is to be mounted, and bifurcations as 241—T are provided in the upper edges of the side plates 227 and 228 where the templet-gang as G—T is to be mounted while bifurcations as 241—H are provided in the upper edges of the side plates 227 and 228 where the templet-gang as G—H is to be accommodated.

It will be recalled that each templet-gang is assembled as a unit on a sleeve as 215 and that each templet-gang in turn is supported by a shaft as 213. Each shaft as 213 is journaled in suitable bearings provided on the side plates 227 and 228 and each such shaft is so supported that it passes through the bifurcations as 241—H provided to accommodate the particular templet-gang carried by the particular shaft 213.

Thus in so far as the templet-gang G—H is concerned, the shaft 213 of this templet-gang has one end thereof journaled in a bearing 242, Figs. 30 and 43, carried by the side plate 227, that end of the shaft 213 adjacent the knurled head 214 thereon being journaled in this bearing. The other end of the shaft 213 is journaled in a bearing arrangement which includes a block 243 secured to the outer face of the side plate 228. An opening 244, Fig. 43, is provided in the block 243 and a bushing 245 is secured in this opening and has a bearing bore therein into which that end of the shaft 213 beyond the threaded part 224 thereon is extended to be slidably and rotatably supported therein. A shoulder 246 is formed on the periphery of the bushing 245 and the positioning templet 212—H for the templet-gang G—H is mounted on this shoulder to be movable thereabout, the positioning templet 212—H being held against displacement by being disposed between the adjacent face of the block 243 and a head on the bushing 245.

It will be understood from the foregoing description, where templets are employed that have steps Z thereon pertaining to certain intermediate products that are ascertained when a particular reoccurring factor is multiplied by the significant digits, that when it is desired to replace one group of templets pertaining to a particular reoccurring factor it is necessary to remove the templet-gang from its operative position in the machine, and the above described mounting of the templet-gang G—H is such that this templet-gang or one mounted in a similar manner may be expeditiously installed or removed from operative position. Thus when a templet-gang as G—H is to be mounted in operative position in the machine, the templet-gang will first be assembled on the sleeve 215 in the manner hereinabove described. Then such templet-gang is disposed in the bifurcation as 241—H in which it is to be arranged, vertical slots 241b, Figs. 29 and 43, being extended from the bottoms of the bifurcations 241—H in the side plate 228 to enable each pin as 226 to pass freely downwardly along the inner face of the positioning templet as 212—H until such pin is in alignment with the aforesaid opening in the positioning templet, whereupon the templet-gang is shifted to the right, as viewed in Fig. 43, to cause the pin 226 to extend through this opening.

Thereafter the shaft 213 is passed through the bearing opening in the bearing 242 and thence through the sleeve 215, and the threaded part 224 on this shaft is run into the threaded portion in the sleeve 215 until the shoulder 225 on the shaft 213 seats against the shoulder in the sleeve with which it is to cooperate. Then that portion of the shaft 213 beyond the threaded part 224 thereon is passed through the bearing opening in the bushing 245 until this end of the shaft bears against the leaf spring 247 secured to the outer face of the block 243, Figs. 30 and 43, the leaf spring 247 acting on the shaft 213 to urge the templet-gang as G—H toward the left, as viewed in Fig. 43. When the parts are in at rest position, however, means described hereinafter act on the clamp nut as 223 to urge the templet-gang as G—H against the action of the spring as 247 whereby, as explained hereinabove, the most lefthand templet in each cluster C thereof in the templet-gang is normally disposed in operative position in alignment with the sensing finger of the sensing means that is to cooperate with the templets of this particular cluster, as is described more fully hereinafter.

When the parts are at rest, the templet-gangs normally occupy a position similar to that shown in Fig. 35, in which position the steps Z on the various templets in the gang pertaining to the digit 1 in the multiplier are in alignment with the sensing finger of the sensing means that is to cooperate with the particular steps Z. To bring the step Z pertaining to the particular digit in the multiplier that appears in a to be performed multiplication into operative position, the templet-gangs are capable of being swung clockwise, as viewed in Fig. 35, this being effected in a manner that will be explained hereinafter, the templet-gang as a unit, including the shaft 213, turning in the bearing 242 and the bushing 245 at this time.

It will be understood that the templet-gangs G—T and G—U are respectively mounted in the bifurcations 241—T and 241—U in the manner just described with particular reference to the templet-gang G—H.

When a multiplication is to be performed steps Z representative of the intermediate products entailed in the particular to be performed multiplication are moved into operative position in alignment with sensing fingers of the summation means of my novel multiplying apparatus and this is effected by first aligning the templet in each cluster of a particular group with such sensing fingers, this being effected by either retaining the templet-gangs in the normal at rest position thereof or by shifting the templet-gangs longitudinally to the left as viewed in Fig. 43 under the influence of springs as 247 a distance depending upon which of the groups of templets is to be effective in a particular to be performed multiplication. Once the templets of the proper group have been aligned with such sensing fingers the templets are swung clockwise, as viewed in Fig. 35, to bring the particular steps Z that represent the particular intermediate products into alignment with the sensing fingers. However, before describing the particular means which are effective to bring about such positioning of selected of the steps Z, the summation means including the sensing fingers thereof will first be described.

*Summation means*

The summation means of the present apparatus are illustrated in Figs. 27 and 35 to 42, inclusive. Such summation means include a summation member for each order of the final product and in the course of operation of the apparatus means are effective on the summation members to move them into positions to be respectively representative of the digit that is to appear in the order of the final product to which the particular summation member pertains. The position thus attained by each summation member will be representative of the sum of digits pertaining to the order of the final product to which the particular summation member pertains plus any carry-overs from the next lower order.

It has been explained that the steps Z on templets as 200 to 203, inclusive, are, in the course of operation of the apparatus, selectively disposed in position to represent digits in the intermediate product or products ascertained in a particular multiplication, and it has been stated that such steps Z are aligned with sensing fingers of the summation means. Each summation member has one or more effective sensing fingers associated therewith, the number of effective sensing fingers associated with each particular summation member being determined by the number of steps Z that may be disposed in operative position, in the course of operation of the apparatus, to pertain to the some order of the final product as that to which the particular summation member pertains.

Thus by referring to the diagrammatic views, Figs. 58 and 58A it will be seen that in so far as the units order of the final product is concerned, it will be necessary that there be one effective sensing finger associated with the summation member 229 pertaining to the units order of the final product for in so far as this particular order is concerned it is possible to dispose a step Z on but a single templet in position to pertain to the units order of the final product. Likewise, in so far as the tens order of the final product is concerned, it is possible to dispose steps Z on two different templets in operative position, and in view of this it is necessary that two effective sensing fingers be arranged for cooperation with the summation member 230 pertaining to the tens order of the final product. Further, in so far as the hundreds and thousands orders of the final product are concerned, it is possible that, in the course of performing multiplying operations in the apparatus, steps Z on three different templets of each such order may be arranged in operative position, wherefore three effective sensing fingers need be associated with the summation members 231 and 232 that respectively pertain to the hundreds and thousands orders of the final product. In so far as the ten thousands order and the hundred thousands order of the final product are concerned, by referring to Fig. 58 it will be seen that it is necessary that two effective sensing fingers be associated with the summation member 233 pertaining to the ten thousands order and that but a single effective sensing finger be provided for cooperation with the summation member 234 pertaining to the hundred thousands order of the final product.

The effective sensing fingers, which have just been described, are mounted in the apparatus in position to cooperate with the steps Z on the templets that pertain to the order of the final product to which the summation member with which the particular sensing fingers are associated pertains. Thus the effective sensing finger that is to cooperate with the summation member pertaining to the units order of the final product is arranged in position to cooperate with those templets in the templet-gang G—U that pertain to the units order of the final product. Further, the sensing fingers that are associated with the summation member pertaining to the tens order of the final product are respectively disposed to cooperate with steps Z on the templets respectively included in the templet-gangs G—U and G—T that pertain to the tens order of the final product. Moreover, the sensing fingers associated with the summation member pertaining to the hundreds order of the final product are respectively disposed to cooperate with steps Z on those templets in the respective templet-gangs G—U, G—T and G—H that pertain to the hundreds order of the final product. The foregoing arrangement is followed through in so far as sensing fingers associated with summation members pertaining to other orders of the final product are concerned. In the machine as constructed the particular effective sensing fingers associated with the respective summation members are in substantial alignment with the summation member to which they pertain and the sensing fingers are respectively connected to the respective summation members with which they are to cooperate through gear trains.

The manner in which the various parts are so arranged in the machine can best be ascertained by reference to Figs. 35, 36, 38 and 40 wherein it will be seen that the summation members 229 to 234, inclusive, which respectively pertain to the units, tens and so on through the hundred thousands order of the final product are shown as being mounted in side by side relation. These summation members in the apparatus as constructed extend vertically and are mounted in slots afforded in combs 248, 249 and 250, Fig. 35, that extend between the side plates 227 and 228 and which are suitably secured to such side plates. The comb 248, as best shown in Fig. 35, is mounted near the upper edges of the side plates 227 and 228 while the comb 249 is mounted near the lower edges of these side plates. The comb 250 extends between the side plates 227 and 228 substantially midway in the vertical extent thereof. It will be noted that the combs 249 and 250 are disposed on corresponding sides of the summation members 229 and 234 while the comb 248 is disposed on the opposite sides of such summation members. This arrangement insures against displacement of the summation members and also affords accurate guiding of the summation members in the course of operative movement thereof.

Each summation member 229 to 234 has either a foot portion as 251 or a foot portion as 252 thereon, the foot portions as 252 being shorter than the foot portions as 251. These longer and shorter foot portions are arranged on alternate of the summation members so that one summation member is equipped with a short foot portion and the adjacent member is equipped with a long foot portion. This arrangement facilitates connecting springs as 253, Figs. 27 and 35, to the foot portions 251 and 252, the other ends of such springs being connected to pins as 254 which extend between pads as 255 respectively provided on arms as 256, described more fully hereinafter. The springs 253 serve to seat the foot portions 251 and 252 on the respective summation members 229 to 234 on a pin 257 that extends between the arms as 256 at the upper ends thereof, as best shown in Figs. 27 and 35. In a manner to be explained presently, the arms 256 and therefore the pin 257 are moved downwardly in the course of operation of the machine, whereupon certain of the summation members also start downwardly to assume positions representative of the digits in the final product to be respectively represented by such summation members.

The manner in which the various sensing fingers to which reference has been made hereinabove are operatively associated with the summation member to which they pertain can best be ascertained by reference to Figs. 35 to 42, inclusive. Each summation member has a rack thereon which, through a planetary gear train now to be explained, is connected with the sensing fingers pertaining to the particular summation member.

Thus the summation member 229, Fig. 35, has a rack 258 thereon that meshes with a gear 259 so that any movement imparted to the summation member 229 is picked up by the gear 259. The gear 259 is mounted for rotation about a shaft 260 that extends between and is carried by the side plates 227 and 228. Inasmuch as a plurality of gears as 259 are mounted for rotation about the shaft 260 and since each such gear as 259 has another gear as 261 associated therewith, I find it advantageous to mount these gears on bushings as 262, Fig. 39, a carry arm as 263 also being associated with each set of gears as 259 and 261 and also being mounted on the same bushing as that on which such gears are mounted.

Referring to Fig. 39 wherein the bushing 262 is shown in detail, it will be seen that this bushing has a shoulder 264 at one end thereof and that inwardly of this shoulder there is a shoulder 265 inwardly of which there is a flange 266 and that another shoulder 267 is formed on the bushing 262 on the side of the flange 266 formed on the bushing 262 on the side of the flange 266 opposite that on which the shoulder 265 is formed, the shoulders 265 and 267 being of equal diameter. The carry arm 263 to which reference has been made hereinabove is mounted for rotation about the shoulder 264 and the gear 259 is mounted for rotation about the shoulder 265 and the gear 261 is mounted for rotation about the shoulder 267. The shoulders 264, 265 and 267 are of a width substantially equal to the width of the part to be mounted thereon to thereby assure free rotative movement of the part. In assembling the apparatus, the gear 259 is mounted on the shoulder 265 to abut the adjacent face of the flange 266 and then the carry arm 263 is mounted on the shoulder 264, this carry arm including a hub of sufficient diameter to overlie the adjacent face of the gear 259 which is therefore retained between this hub and the flange 266. A spacing collar 268, Fig. 38, is disposed about the shaft 260 intermediate the inner face of the side plate 228 and the free end of the shoulder 264 and this spacing collar serves to retain the carry arm 263 on the shoulder 264.

Each summation member has a rack thereon corresponding to the rack 258 on the summation member 229 and each such rack, as will be explained more fully hereinafter, meshes with a gear coresponding to the gear 259, and each such gear has a carry arm corresponding to the carry arm 263 and another gear corresponding to the gear 261 associated therewith, and each such set, comprising a carry arm and two gears, is mounted on a bushing corresponding to the bushing 262. Thus the summation member 230 has a rack 269, Fig. 38, thereon that meshes with a gear 270, a carry arm 271 being associated with the gear 270 as is the gear 272. The gear 270, the summation member 271 and the gear 272 are mounted on a bushing 273 which, as stated hereinabove, structurally corresponds to the bushing 262. The shoulder on the bushing 273 which coresponds to the shoulder 264 has the carry arm 271 mounted thereon, and this disposition of this carry arm coupled with the fact that the adjacent end of the bushing 273 abuts the inner end of the bushing 262 affords an arrangement such that the hub 225 of the arm 271 serves to retain the gear 261 on the shoulder 267 and the gear 272 on the shoulder on the bushing 273 that corresponds to the shoulder 265 on the bushing 262. This same arrangement progresses on across the assembly as can be ascertained by reference to Fig. 38 so that gear 276 which is mounted on the shoulder on the innermost bushing 277 that corresponds to the shoulder 267 may be engaged by the inner end of a spacing collar 278 that extends between the adjacent end of the bushing 277 and the inner face of the side plate 227. Such an arrangement assures a substantially frictionless mounting for the various parts movable about the shaft 260 and at the same time assures accurate positioning of such parts in the machine with respect to other parts therein adapted to cooperate therewith.

As has been stated, each summation member as 229 is connected to the sensing fingers pertaining thereto through a planetary gear train, and the planetary gear train for the summation member 229 includes the gear 259 that meshes with the rack 258 on the summation member 229 and the gear 261 which is associated with the gear 259. The gears 259 and 261 are sun gears in the planetary gearing system and these gears respectively mesh with planet gears 279 and 280 which, in turn, are intermeshed. The manner in which the various gears of the planetary gearing system are intermeshed can best be ascertained by reference to the partially diagrammatic view, Fig. 40, and by reference thereto it will be seen that the gear 259 meshes with the rack 258 and with the planet gear 279, while the planet gear 279 in turn meshes with the planet gear 280 which still, in turn, meshes with the sun gear 261, it being understood that the sun gears 259 and 261 are congruent, one to the other, as are the planet gears 279 and 280. Planet gears 279 and 280 are respectively rotatably mounted on stud shafts 281 and 282 mounted in the carry arm 263, Fig. 35. The planet gear 280 is preferably counterbored in the face thereof opposite that engaged with the carry arm 263 to accommodate the head of the stud shaft 282 on which it is mounted, whereby a compact arrangement of the gear trains is assured. It is not necessary to so counterbore the planet gear 279 since there is sufficient room to accommodate the head of the stud shaft 281 on which this planet gear is mounted.

The sun gear 261, in turn, meshes with a pinion 283 that is rotatably mounted on a shoulder 284, Fig. 37, on a bushing generally indicated by 285. The bushing 285 is mounted on a shaft 286, Fig. 35, that extends between and is mounted in the side plates 227 and 228. Pinions corresponding to the pinion 283 in planetary gearing systems pertaining to other of the summation members are mounted on bushings corresponding to the bushings 285, and such bushings are mounted in side by side relation on the shaft 286 to thereby support these pinions for free rotation about this shaft, spacing collars being provided at opposite ends of such bushing assembly on the shaft 286 to properly locate the pinions as 293 longitudinally along the shaft 286.

The pinion 283, in turn, meshes with a pinion 287, which pinion and corresponding pinions in other planetary gear trains pertaining to other of the summation members are mounted on bushings 288, Figs. 35 and 36, which, in turn, are mounted on a shaft 289 extended between and carried by the side plates 227 and 228, the bushings on which pinions as 287 are mounted structurally corresponding to the bushing 285, Fig. 37. Such bushings are assembled on the shaft 289 in the same manner as that in which the bushings 285 and 262 are respectively assembled on the shafts 286 and 260, and the bushings as 288 are properly located longitudinally of the shaft 289 by having spacing collars as 274 interposed between the outermost of such bushings and the adjacent inner faces of the side plates 227 and 228.

Another shaft 290, Fig. 35, extends between and is carried by the side plates 227 and 228, and this shaft has a plurality of bushings as 291 mounted thereon, these bushings structurally corresponding to the bushing 262 shown in Fig. 39. These bushings are properly located along the shaft 290 by being engaged one with the other and by having spacing collars interposed between the outermost of such bushings and the adjacent inner faces of the side plates 227 and 228. A planetary arm 292 is mounted on the shoulder of the bushing 291 that corresponds to the shoulder 264 on the bushing 262. A sun gear 293 is mounted on the shoulder of the bushing 291 that corresponds to the shoulder 265 on the bushing 262. Still another sun gear 294 is mounted on the shoulder on the bushing 291 that corresponds to the shoulder 267 on the bushing 262. Stud shafts 295 and 296 are secured in the planetary arm 292 and respectively have planet gears 297 and 298 mounted thereon, these planet gears being intermeshed. As can best be seen by reference to the partially diagrammatic view, Fig. 40, the planet gear 297 meshes with the sun gear 293 while the planet gear 298 meshes with the sun gear 294.

Referring now to the diagrammatic view, Fig. 40, it will be seen that if the summation member 229 is caused to move downwardly the rack 258 thereon will move downwardly, whereupon the sun gear 259 will start to rotate clockwise, as viewed in Fig. 35, and this will cause the planet gear 279 to rotate counterclockwise whereupon the planet gear 280 will start to rotate clockwise which, in turn, will cause the sun gear 261 to rotate counterclockwise. This, in turn, will cause the pinion 283 to rotate clockwise which, in turn, will cause the pinion 287 to rotate counterclockwise and this, in turn, will cause the sun gear 293 to rotate clockwise, and this, in turn, will cause the planet gear 297 to rotate counterclockwise wherefore the planet gear 298 will rotate clockwise to thereby tend to rotate the sun gear 294 counterclockwise.

By referring to Fig. 35 it will be seen that the planet gears 297 and 298 are carried by the planetary arm 292 and, therefore, when in the course of transmission of movement through the gear train described the planet gear 297 starts to rotate, this planet gear will run over the teeth of the sun gear 293 unless the planetary arm 292 is held against movement. Whether or not the planetary arm 292 is held against movement at this time depends upon whether or not the sensing finger under control thereof is engaged with a step Z on the templet aligned with this sensing finger. The sensing finger under control of the planetary arm 292 is that indicated by 299, Fig. 35, which is supported, in the present instance, for vertical movement in combs 300 and 301 that extend between and are carried by the side plates 227 and 228. The combs 300 and 301 are mounted on opposite sides of the sensing finger 299 which is therefore firmly supported in position for its longitudinal movement. The sensing finger 299 includes a rack 302 that meshes with a gear segment 303 on the planetary arm 292.

Thus, through the above described gear train, the sensing finger 299 is operatively connected with the summation member 229 which, as has been explained, pertains to the units order of the final product. Furthermore, the sensing finger 299 is located in alignment with the templet-gang G—U and since the sensing finger 299 pertains to the units order of the final product it is adapted for cooperation with the templets 200—U, 204—U and 208—U, constituting the cluster C in the templet gang G—U pertaining to the units order of the final product (see Fig. 58A). As will be explained more fully hereinafter, at the time the summation member 229 is caused to move downwardly to thereby tend to rotate the planet gear 297 counterclockwise, as explained hereinabove the proper step Z on the proper one of the templets 200—U, 204—U or 208—U will be in operative alignment with the sensing finger 299 and if the step Z, which is thus disposed in operative position, does not pertain to the digit 0, the sensing finger 299 will be free to move. If the step Z in alignment with the sensing finger 299 pertains to the digit 0, the sensing finger 299 will only be free to move an amount sufficient to take care of the operative clearance afforded between the upper end of the sensing finger 299 and the outwardmost or zero steps Z on the templets adapted for cooperation therewith, and the amount of such movement to take up such operative clearance is without functional significance in so far as operation of the machine is concerned, and such slight movement will hereinafter be disregarded and it will be considered that when a step Z pertaining to the digit 0 is aligned with the sensing finger 299 this finger is held against movement.

However, if the step Z aligned with the finger 299 pertains to a significant digit, then when the summation member 229 tends to cause the planet gear 297 to rotate counterclockwise, as viewed in Fig. 35, this planet gear will run over the teeth of the sun gear 293 and in so doing the planetary arm 292 will swing, and such movement will be transmitted through the gear segment 303 to the rack 302 on the sensing finger 299 which will thereupon start to move upwardly and such upward movement will continue until the sensing finger seats on the step Z in operative position. The amount the sensing finger 299 so moves determines the amount that the summation member 229 moves downwardly.

Thus for example if the step Z in operative pertains to the digit 0 so that, in effect, the sensing finger 299 does not move, then the planet gear 297 does not run over teeth of the sun gear 293 and, as will now be explained, the summation member 229 is held against movement or, in effect, remains in its zero position.

The reason for this is that the planet gear 297 meshes with the planet gear 298 and this gear, in turn, meshes with the sun gear 294. By referring to Fig. 35, it will be seen that a block 304 is extended between and secured to the inner faces of the side plates 228 and 227. This block 304 has a tooth 305 thereon that engages between teeth of the sun gear 294 so that this gear is effectively locked against movement. Therefore, when force is applied on the summation member 229 to tend to urge this member downwardly, whereupon the various gears in the planetary train associated with this summation member are urged to rotate in the directions above described, the summation member will be held against movement unless the sensing finger 299 is free to move for the reason that the tooth 305 effectively prevents rotation of the sun gear 294 and this, in turn, prevents rotation of the planet gear 298 which, in turn, prevents rotation of the planet gear 297 which, still in turn, prevents rotation of the sun gear 293 which, as is explained hereinabove, receives motion from the pinion 287. It will be apparent, however, that if the pinion 287 is thus held against movement, the meshing of the sun gear 259 with the rack 258 will prevent this rack from moving relative to this sun gear and this will, therefore, hold the summation member 229 against movement.

However, if the sensing finger 299 is free to move by reason of the fact that a step Z representative of a significant digit is in operative alignment therewith, then the downward movement of the summation member 229 will be transmitted from the rack 258 through the gear train, as above described, to the planet gear 297 which, as explained above, will run over the teeth of the sun gear 293. However, when the sensing finger 299 seats on a step Z representative of a significant digit, the planetary arm 292 is held against movement which will prevent the planet gear 297 from moving over the teeth of the sun gear 293 and the result of this will be that the planet gear 297 will tend to rotate the planet gear 298 which, in turn, will tend to rotate the sun gear 294, but this is prevented by reason of the seating of the tooth 305, as above explained. Hence, it will be seen that it is the seating of the sensing finger 299 on a step Z on one of the templets 200—U, 204—U or 208—U that determines the position of the summation member 229.

Hence, if a step Z representative of zero is in position to be engaged by the sensing finger 299 at the time the summation member 229 tends to move downwardly which, as explained above, prevents effective movement of the sensing finger 299, then the summation member 229 is held in its at rest or zero position. However, if a step Z representative of a significant digit is in alignment with the sensing finger 299, then the summation member 229 continues to move until the sensing finger 299 seats on the step Z aligned therewith. The spacing between the initial at rest position of the sensing finger 299 and such a step Z disposed in operative position, which step Z will be representative of some significant digit, and the ratio of the gears in the train between the sensing finger 299 and the summation member 229 is proportioned to be determinative of the amount of movement of which the summation member 229 is capable.

Thus, if the step Z in operative position pertains to the digit 1, the sensing finger 299 will move but slightly before it engages the step Z in operative position and hence the summation member 229 will move but slightly, and the amount of this slight movement will be sufficient to cause the summation member to come to rest in a position indicative of the digit 1. If, however, the step Z in operative position pertains, for example, to the digit 4, then the sensing finger 299 will move four times the distance it would move if the step Z in operative position pertained to the digit 1, and the summation member 229 will correspondingly advance four times as far as it advances when the sensing finger 299 engages a step Z representative of 1, wherefore the summation member in this instance comes to rest in a position indicative of the digit 4. It is believed that it will be apparent from the foregoing that the summation member 229 moves each time in an amount equivalent to the value of whatever digit is represented by the step Z that is disposed in operative alignment with the sensing finger 299.

By referring to Fig. 58A it will be seen that it is necessary to have two sensing fingers associated with the summation member 230 that pertains to the tens order for in the course of operation of the apparatus steps Z representative of two digits may be moved into position to determine the value of the digit that is to be represented by such summation member 230.

Therefore, the summation member 230 has associated therewith a planetary gear system identical with that above described in association with the summation member 229. However, in so far as this planetary gear train is concerned, the block 304 does not have a tooth as 305 thereon engaging teeth of the sun gear corresponding to the sun gear 294 in the planetary gear train pertaining to the summation member 230.

Therefore, when the summation member 230 has force applied thereto to tend to cause it to move downwardly, the rack 306, Fig. 40, on the summation member 230 and which corresponds to the rack 258 on the summation member 229, is effective on the sun gear 270 which, in turn, is effective on the planet gear 307, and this gear is effective on the planet gear 308 to, in turn, be effective on the sun gear 272. It will be noted that the sun and planet gears to which reference is thus made correspond to sun and planet gears in the planetary train pertaining to the summation member 229. The sun gear 272, in turn, is effective on the pinion 309 which, in turn, is effective on the pinion 310, these pinions corresponding to and being mounted in the same manner as the pinions 283 and 287. The pinion 310, in turn, is effective on the sun gear 311 which, in turn, is effective on a planet gear 312 that in turn meshes with a planet gear 313. The planet gears 312 and 313, like the planet gears 297 and 298, are carried by a planetary arm 314 which corresponds to the planetary arm 292, and this planetary arm 314 is effective to urge the sensing finger 315 toward steps Z on templets operatively associated therewith.

The sensing finger 315 is aligned with templets as 201—U, 205—U, and 209—U, in the templet-gang G—U, which is the cluster of templets in this gang pertaining to the tens order of the final product. If a step Z on one of these templets pertaining to a significant digit is aligned with the sensing finger 315, this sensing finger will move until it seats on such step Z, and this will permit the summation member 230 to move into a position representative of the digital value of the step Z thus cooperating with the sensing finger 315. When the sensing finger 315 thus moves toward a step Z representative of a significant digit, the planet gear 312 rolls over the sun gear 311 which corresponds to the sun gear 293.

If, however, the step Z aligned with the sensing finger 315 pertains to the digit 0, then the sensing finger will be prevented from making any effective movement just as was the sensing finger 299 when a step Z was aligned therewith. When this condition prevails and also when the sensing finger 315 seats on a step Z representative of a significant digit, the planet gear 312 is prevented from further running over teeth of the sun gear 311 and thereupon the planet gear 312 tends to set the planet gear 313 in motion and this, in turn, tends to set the sun gear 316 in motion.

By referring to Fig. 35 it will be seen that a pair of shafts 317 and 318 are extended between and are carried by the side plates 227 and 228. These shafts have bushings thereon structurally corresponding to the bushing 285 shown in Fig. 37, and pinions as 319 and 320 are respectively mounted on these bushings to thereby be respectively carried by the shafts 317 and 318. The bushings which thus support pinions as 319 and 320 are mounted on their shafts in the same manner as that in which the bushings 262 and 265 are mounted on the shafts, as above described, and this mounting is such that pinions as 319 and 320 are disposed in proper operative position transversely between the side plates 227 and 228.

By referring to Figs. 38 and 40 it will be seen that the shafts 317 and 318 do not carry pinions as 319 and 320 in alignment with the planetary gear train pertaining to the summation member 229 for the units order of the final product. It is not necessary that such pinions be provided for it is only necessary that the summation member 229 have one sensing finger associated therewith since but one significant digit will be represented by steps Z in so far as the summation member 229 is concerned. However, as best shown in Figs. 38 and 40, the pinions 319 and 320 are arranged to cooperate with the planetary gear train pertaining to the summation member 230 for, as can be seen by referring to Fig. 58A, it is necessary that two sensing fingers be associated with the summation member 230 pertaining to the tens order of the final product inasmuch as two steps Z will be disposed in operative relation with the summation member 230 as multiplications are performed in the apparatus.

In the present instance the sun gear 316 is meshed with the pinion 319 and this pinion, in turn, is meshed with the pinion 320. A shaft 321, similar to the shaft 290, is extended between and carried by the side plates 227 and 228 and this shaft 321, like the shaft 290, has sun gears and planetary arms mounted thereon.

By referring to Figs. 35, 36 and 40, it will be seen that a sun gear 322 is mounted on a shoulder on a bushing carried by the shaft 321 and this sun gear is meshed with the pinion 320. A planetary arm 323 is also mounted on a shoulder on a bushing on the shaft 321 adjacent the sun gear 322 and stud shafts 324 and 325 are provided on this planetary arm to support planet gears 326 and 327. The planet gear 326 is meshed with the sun gear 322 and with the planet gear 327 which, in turn, meshes with a sun gear 328. A block 329, similar to the block 304, extends between and is carried by the side plates 227 and 228 and a tooth 230 on this block engages teeth of the sun gear 328 to secure this sun gear against rotative movement just as the tooth 305 on the block 304 secured the sun gear 294 against movement.

Thus whenever the sensing finger 315 seats on a step Z to prevent the planet gear 312 from running over the sun gear 311, whereupon the planet gear 312 tends to rotate the planet gear 313 and the sun gear 316 which, in turn, tends to rotate the pinions 319 and 320 and therefore the sun gear 312, the effect will be to urge the planet gear 326 to run over the sun gear 322, and when this occurs the planetary arm 323 tends to follow the planet gear 326 and through the gear segment 331 and rack 322 meshed therewith and which is on the sensing finger 333, the sensing finger 333 is urged toward a step Z in operative relation therewith. The sensing finger 333 will move toward a step Z on one or another of the templets 200—T, 204—T or 208—T in the templet-gang G—T, which are the templets of the cluster in this gang that are arranged in operative relation with the summation member 230.

If the step Z on one of the templets 200—T, 204—T or 208—T aligned with the sensing finger 333 pertains to zero, the sensing finger will be prevented from making any effective movement. Thus if both the sensing fingers 315 and 333 move into operative relation with steps Z representative of zero, then the summation member 230 will be held in its at rest or zero position. However, if the sensing finger 315 cooperates with a step Z representative of zero, but the sensing finger 333 is to cooperate with a step Z representative of a significiant digit, then the summation member 230 will be permitted to move into a position representative of whatever digit is represented by the step Z that is thus engaged by the sensing finger 333. In any event, however, as soon as the sensing finger 333 seats on a step Z the summation member 230 is brought to rest for when the sensing finger 333 so seats, the planetary arm 323 is held against movement which prevents the planet gear 326 from running over the sun gear 322 and at this time the planet gear 326 is also prevented from rotating the planet gear 327 and the sun gear 328 because the tooth 330 is effective to prevent such rotation of this sun gear.

When a step Z representative of zero is aligned with the sensing finger 333 but a step Z representative of a significiant digit is aligned with the sensing finger 315, then the summation member 230 moves into a position representative of whatever significant digit is represented by the step Z aligned with the sensing finger 315, and when this position is attained the summation member 230 comes to rest for the seating of the sensing finger 315 on the step Z representative of such significant digit tends to cause motion to be transmitted through the pinions 319 and 320 but because the sensing finger 183 will at this time be engaged with a step Z representative of zero, these pinions 319 and 320 are held against rotation which assures that the summation member 230 will come to rest.

It has been explained above that when the sensing finger 315 cooperates with a step Z representative of zero, the position at which the summation member 230 comes to rest is determined by the value of the digit with which the sensing finger 333 cooperates. It will be appreciated, however, that there will be many instances where both the sensing finger 315 and the sensing finger 333 will cooperate with steps Z representative of significant digits. In such an instance the summation member 230 starts to move downwardly and during the first part of such downward movement the planet gear 312 runs over the sun gear 311 until the sensing finger 315 seats on the step Z representative of such significant digit and thereafter, in the manner above explained, the sensing finger 333 advances toward the step Z aligned therewith. Thus in such an instance the summation member 230 comes to rest in a position representative of whatever digit is to appear in the tens order of the final product for the effect of such advance of both of the sensing fingers 315 and 333 will be to add the two significant digits represented by the steps Z respectively aligned with the sensing fingers 315 and 333.

If the steps Z thus disposed in operative position pertain to digits whose sum is 9 or less, the summation member comes to rest in a position actually representative of such digital value. When, however, the sum of digits so represented is 10 or more, then the summation member comes to rest in a position representative of whatever digital value is to appear in the most righthand order of such sum. For example, if the sum of the two digits so represented is 10, then the summation member 230 comes to rest in a position representative of zero or if the sum of the two digits thus represented is 17, then the summation member comes to rest in a position representative of 7. The reason for this, of course, is that as soon as the sum of digits represented by steps Z in alignment with the sensing fingers 315 and 333 is greater than 9, it is necessary that a carry-over be made into the next higher order, the hundreds order in this instance.

In view of the foregoing an arrangement is provided in the present mechanism for bringing about a carry-over from the tens order to the hundreds order whenever the need so to do arises in the course of advance of the summation member 230 into a position to represent whatever digit is to be represented in the tens order of the final product. The means which bring about such a carry-over are a part of the planetary gear trains that have thus far been described and will be described in full detail presently.

However, before describing the carry-over mechanism in detail, it should be noted that while but one sensing finger is associated with the summation member 229 and but two sensing fingers are associated with the summation member 230, it will be necessary to provide, in the present apparatus, which has a capacity for multiplying a three-order number by a three-order number, three sensing fingers for the summation members 231 and 232 which respectively pertain to the hundreds and thousands order of the final product.

Thus in so far as the summation member 231 for the hundreds order is concerned, this summation member has a planetary gear train associated therewith identical with that associated with the summation member 230 except that in this instance the block 329 does not have a tooth 330 associated therewith to block the sun gear 334 in this planetary gear train pertaining to the summation member 231, which sun gear 334 corresponds to the sun gear 328 in the gear train pertaining to the summation member 230.

Further in this instance two shafts 335 and 336, similar to the shafts 317 and 318, are extended between and carried by the side plates 227 and 228. These shafts 335 and 336, like the shafts 317 and 318, have bushings arranged thereon which, in turn, have pinions as 337 and 338 mounted thereon. By referring to Figs. 38 and 40 it will be seen that no pinions as 337 and 338 are provided on the shafts 335 and 336 to cooperate with the planetary gear trains pertaining to the summation members 229 and 230 for the reason that in neither of these planetary gear trains is a third sensing finger included, and pinions as 337 and 338 are only necessary where a third sensing finger is to be included in the planetary gear train. In addition to the foregoing, a shaft 339, corresponding to the shaft 321, is provided, and this shaft has planetary arms and sun gear assemblies thereon just as such assemblies were provided on the shaft 321.

Thus in the present instance a sun gear 340 is supported on the shaft 339 and is meshed with the pinion 338. Furthermore, a planetary arm 341 is associated with the sun gear 340 and has stud shafts 342 and 343 thereon which, in turn, carry planet gears 344 and 345. The planet gear 344 meshes with the sun gear 340 and with the planet gear 345 which, in turn, meshes with a sun gear 346. A block 347, corresponding to the blocks 329 and 304, extends between and is carried by the side plates 227 and 228 and has a tooth as 348 thereon which seats in teeth of the sun gear 346.

The operation of the planetary gear train associated with the summation member 231 is identical with those described hereinabove, which is to say, when force is applied on the summation member 231, the sensing finger 349 in this planetary gear train is advanced until it seats on a step Z, this finger not advancing if the step Z pertains to zero. When the sensing finger 349 is seated on a step Z, then the sensing finger 350 is capable of advancing until it likewise is seated on a step Z, this finger also not advancing when the step Z pertains to zero. When both the sensing fingers 349 and 350 are seated on steps Z, then the sensing finger 351 under control of the planetary arm 341 is capable of advancing toward a step Z, this finger also not advancing when the step Z thereon pertains to zero. In any event, when the sensing finger 351 is seated against a step Z, the summation member 231 comes to rest for the reason that the seating of the tooth 348 in teeth of the sun gear 346 prevents further movement being transmitted through the gear train when the sensing finger 351 is engaging a step Z.

The planetary gear train for the summation member 232 is structurally identical with the planetary gear train for the summation member 231, this gear train including sensing fingers 352, 353 and 354, which respectively cooperate with clusters of templets in the templet-gangs G—U, G—T and G—H, respectively.

The planetary gear train for the summation member 233 is also structurally identical with that which is associated with the summation member 231 but, while this planetary gear train includes a sensing finger 355 mounted in the combs 300 and 301 in alignment with the templet-gang G—U, such sensing finger is ineffective in so far as the present apparatus adapted for the multiplication of a three-order number by a three-order number is concerned for, as can be ascertained by reference to Fig. 58, no templets will be included in the templet-gang G—U in position to cooperate with a sensing finger located as is the sensing finger 355. Hence since the sensing finger 355 is always to be ineffective, the planetary arm carrying this sensing finger 355, which corresponds to the planetary arm 292, is positively held against movement and to this end a block 356, Fig. 35, is fixed to the inner face of the side plate 228, and this block has a lug 357 thereon against which the upper part of the planetary arm for the finger 355 is always seated. The effect of this arrangement is that when the summation member 233 is forced downwardly, the sensing finger 355 will always be held in a position corresponding to that in which it would be stopped in the event the sensing finger 355 engaged a step Z representative of zero.

The effect of this is that if the summation member 233 does move downwardly, the motion is transmitted through the planetary gear train in such a way that the sensing finger 358 of this train is the first that is free to move upwardly, this sensing finger being adapted for cooperation with templets as 203—T, 207—T and 211—T in the templet-gang G—T and moving upwardly whenever a step Z on one of such templets pertains to a significant digit but, as will be understood, this sensing finger 358 is prevented from moving in event the step Z on one of such templets and aligned with this finger pertains to zero. Once the sensing finger 358 is seated on a step Z then the sensing finger 359 of this planetary train is free to advance toward the step Z on one of the templets 202—H, 206—H or 210—H that is aligned therewith. Thus it will be seen that while the planetary train cooperating with the summation member 233 includes, in the present instance, a sensing finger adapted for cooperation with templets in the templet-gang G—U, such sensing finger is always ineffective and in the present apparatus only two sensing fingers, respectively adapted for cooperation with templets in the templet-gangs G—T and G—H, pertaining to the ten thousands order of the final product are effective.

A planetary gear train, similar to that associated with the summation member 231, is also associated with the summation member 234 but, as can be ascertained by reference to Fig. 58, in the present apparatus which is adapted for multiplication of a three-order number by a three-order number, it is only essential that there be one effective sensing finger in the planetary train for the reason that in an apparatus having such capacity there will only be one cluster of templets that pertains to the hundred thousands order of the final product.

In the present instance such cluster of templets includes the templets 203—H, 207—H and 211—H and the sensing finger 360, Figs. 36, 38 and 40, is adapted for cooperation therewith. This sensing finger 360 is mounted in the same combs as those in which the sensing finger 351 is mounted and the aforesaid cluster of templets is, as will be understood, included in the templet-gang G—H. This planetary train, however, also has sensing fingers 361 and 362 included therein, but the sensing finger 361 is rendered ineffective by having a lug on the block 356 corresponding to the lug 357 engaged with the planetary arm cooperating with this sensing finger. Likewise, the sensing finger 362 is rendered ineffective by having a lug 363 on the block 364 secured to the inner face of the side plate 228 engaged with the planetary arm pertaining to this sensing finger 362, and this lug 363 functions similarly to the lug 357 and maintains the sensing finger 362 in a position corresponding to that in which it would be arrested in event this sensing finger engaged a step Z representative of zero.

While the capacity of the present apparatus is such that it will care for the multiplication of a three-order number by a three-order number, it will be understood that this apparatus can expeditiously be arranged to have sufficient capacity to care for multiplications having a greater number of orders in either the multiplicand or the multiplier or both. For example, if four orders were to be provided for in the multiplier, another templet-gang would be mounted in bifurcations in the side plates 227 and 228 located outwardly of the position whereat the templet-gang G—H is mounted. Furthermore, the provision for a greater number of orders in the multiplier would entail providing additional clusters of templets in each of the templet-gangs G—U, G—T and G—H. This, however, would not entail a substantial change in the illustrated mechanism for it would only be necessary to eliminate lugs as 357, Fig. 35, for thereupon a properly located sensing finger, the sensing finger 355 in this instance, would be operative to cooperate with the next additional cluster of templets so included in the templet-gang G—U.

Of course, if the capacity of the apparatus is increased to accommodate more than the multiplication of a three-order number by a three-order number, it will be necessary to provide additional summation members for an increase in the capacity of the machine will mean that products ascertained will extend beyond the hundred thousands order of the final product, and it will be understood that there must be a summation member for each order of the final product into which digits may extend in multiplications within the capacity of the machine. The provision of additional summation members will also entail providing additional planetary gear trains such as have been described hereinabove in association with the summation members 229 to 234. The provision of additional planetary gear trains will entail increasing the spacing between the side plates 227 and 228, but this, as will be appreciated, is but a minor change in the construction of the apparatus.

Reference has been made hereinabove to the fact that the summation members come to rest in the course of an operation of the apparatus in a position to represent the digit that is to appear in the order of the final product to which the particular summation member pertains, and it has been explained that as the summation members move into such positions it may be that it will be necessary to effect one or more carry-overs into the order next higher than that to which the particular summation member pertains, and hence there is associated with the summation members an arrangement whereby when a summation member passes through a position representative of 9 into position representative of 10 or from a position representative of 19 into a position representative of 20 and so on, a carry-over is made into the next higher order, and the mechanism by which this is effected will now be described.

*Carry-over mechanism*

It will be understood that since representations of but a single digit will appear in so far as the units order of the final product is concerned, it will not be necessary to make carry-overs from the planetary train associated with the summation member 229 to the planetary train associated with the summation member 230. However, in so far as the summation member 230 is concerned, there will be instances where it will be necessary to make carry-overs from the planetary train pertaining to the summation member 230 to the planetary train pertaining to the summation member 231 in order that the summation member 231 will move into a position representative of the digit that is to appear in the order of the final product to which this summation member pertains. The devices provided in the apparatus to effect such carry-overs will now be described.

By referring to Fig. 35 it will be seen that the rack 306 on the summation member 230 is of greater length than it would need be if it only cooperated with the sun gear 270. This additional extent of the rack is such that the additional teeth depend below the point whereat this rack meshes with the sun gear 270 when the parts are in the at rest position thereof shown in Fig. 35. The means for effecting transfer of a carry include a gear arrangement in which there is a gear that meshes with the just described extension of the rack as 306, there being a similar extension of each other such rack.

A shaft 365, Figs. 35 and 41, is extended between and carried by the side plates 227 and 228, and pinions 367, 368, 369 and 370, Fig. 41, are mounted on this shaft to be rotatable thereabout. A spacing collar 371 is provided about the shaft 365 and extends between the inner face of the side plate 228 and the pinion 367. A cam 372 is mounted on the shaft 365 intermediate the pinions 367 and 368, and this cam is pinned or otherwise suitably secured to the pinion 367. The pinion 368 is next arranged on the shaft 365 inwardly of the cam 372 and a cam 373 is next arranged on the shaft inwardly of the pinion 368 and is pinned or otherwise suitably secured to this pinion. The remaining pinions 369 and 370 are next arranged on the shaft 365 in that order with the cams 374 and 375 arranged therebetween and secured to the outer of the pinions with which it is associated in the manner above described. A spacing collar 377 extends between the inwardmost cam 375 and the inner face of the side plate 227 whereby the parts are located properly transversely of the apparatus.

The pinion 367 is meshed with that part of the rack 306 which depends below the engagement of this rack with the sun gear 270, as explained above, and the pinions 368, 369 and 370 are respectively meshed with racks corresponding to the rack 306 on the summation members 231, 232 and 233.

Associated with each set of sun gears as 259 and 261 on the bushings as 262 is a carry arm as 263, the carry arm 271 being associated with the sun gears 270 and 272 pertaining to the summation member 230, and the carry arms 379, 380, 381 and 382 are respectively associated with corresponding sets of sun gears respectively pertaining to the summation members 231 to 234, respectively.

Each carry arm as 271 is a part of an escapement mechanism which includes the cam as 372 that has two lobes as 383 and 384 thereon. The pinion 367 is initially so meshed with the rack that when the summation member 230 is in its at rest position the lobes 383 and 384 are in what will be referred to as the zero positions thereof, shown in Fig. 35. The pinion as 367 has twenty teeth thereon and, in view of this, when the summation member as 230 has advanced sufficiently to be in its ninth position, the lobe 384, in the present instance, will have been advanced from the zero position, in which it is shown in Fig. 35, into a position adjacent the cam edge 385 on the pawl 385a pivotally mounted on the escapement member 386. Then when the summation member moves from its ninth position, which it has thus attained, into its tenth position, the lobe 384 will similarly advance and in so doing the tapered surface of this lobe will engage the cam surface 385 and thereupon pivot the escapement member 386 about the shaft 387 on which this escapement member and the escapement members for the other summation members are mounted, this shaft extending between and being carried by a pair of arms as 387a fast to a shaft 387b extended between and carried by the side plates 227 and 228.

At the time the tapered surface of the lobe 384 engages the cam surface 385, the pawl 385a is held in engagement with the pin 385b on the escapement member 386 by the spring 386a extended between spring anchors respectively provided on the pawl 385a and the arm 392, presently explained. The mounting of the shaft 387 in the arms 387a enables the shaft 387 and the parts carried thereby to be pivoted downwardly in a restoring operation, explained fully hereinafter.

The escapement members as 386 are arranged at spaced intervals along the shaft 387 and are retained in proper position thereon by spacing collars interposed therebetween and by washers arranged between the outwardmost of such escapement members and the adjacent inner faces of the side plates 227 and 228. Each escapement member as 386 is somewhat T-shaped in formation and the aforesaid pawl 385a is mounted on the stem 388 of such member. One of the arms 389 of such T-shaped members 386 has a tooth 390 thereon that normally seats in a tooth in the ratchet 391 provided on a segmental edge on a carry arm as 263. The other arm 392 of the substantially T-shaped member 386 has a tooth 393 thereon which, when the parts are in their at rest position, is disposed in a position outwardly of an end of the ratchet 391 in the direction of potential advance of this ratchet, this tooth 393 being spaced from the first adjacent tooth of the ratchet 391 in an amount substantially equal to about one-half the length of each of the teeth of the ratchet 391.

Fingers as 394, Figs. 28 and 35, depend from the arms as 387a, which arms are mounted outwardly of the side plates 227 and 228, and the fingers as 394 carry a spring anchor pin 395, which extends through slots as 396 in the side plates 227 and 228. A spring as 397 extends between the spring anchor pin 395 and the arms as 392 of each escapement member as 386, and these springs are effective to normally engage a tooth as 390 with the teeth of the ratchet as 391. When, however, a lobe as 384 engages a cam surface as 385 and pivots an escapement member as 386 about the shaft 387, the tooth as 390 is disengaged from the ratchet 391 and the tooth as 393 is disposed in position to engage the next succeeding tooth on the ratchet 391 with which it has been previously engaged or from which it has been spaced, when the parts are in their at rest position, explained hereinabove.

Thus, if the summation member 230 moves from a position representative of 9 into a position representative of 10, the lobe 384 will pivot the escapement member 386 in such a way that the tooth 393 will be engaged with the first tooth on the ratchet 391, wherefore the carry arm as 293 will be advanced clockwise, as viewed in Fig. 35, in an amount equal to one-half the distance between two successive teeth on the ratchet 391, the remaining one-half step of movement of the arm as 293 being completed by the time the summation member 230 attains a position representative of 10, by which time the lobe as 384 will have disengaged the cam surface 385 to permit the spring 397 to restore the tooth 390 into engagement with the succeeding tooth counterclockwise along the ratchet 391 from that with which it had been previously engaged. If the summation member 230 were capable of moving from a position representative of 10 into a position representative of 20, then as it moved from the position representative of 19 into the position representative of 20 the lobe 383 would effect the above described operation of the escapement member 386 whereby the carry arm as 263 would be advanced clockwise, as viewed in Fig. 35, in an amount equal to the length of one of the teeth of the ratchet 391.

Thus each time the summation member 230 moves from the position representative of 9 into a position representative of zero which may be, for example, in so far as the actual values are concerned, from a position representative of 9 into a position representative of 10 or from a position representative of 19 into a position representative of 20 or from a position representative of 29 into a position representative of 30, and so on, the carry arm 379 in the hundreds order is advanced clockwise, as viewed in Fig. 35, the length of a tooth as 391 thereon.

At the time the carry arm 379 advanced clockwise, as viewed in Fig. 35, the length of one of the teeth 391 thereon, in the manner just explained, the spring as 253 effective on the summation member 231 pertaining to the hundreds order caused this summation member to advance in an amount equal to one digit, for advance of the member 379 is assured by reason of the spring as 398 which extends between an outwardly projected arm as 399 on the carry arm 379 and the spring anchor pin 400 that extends between and is carried by the side plates 227 and 228. A spring as 398 is provided for if the sensing fingers in the planetary gear train associated with the summation member as 231 have not yet seated at a time when a carry-over is to be made to the summation member 231, it is desired that such carry be effected at once without awaiting the seating of such sensing fingers. Of course, if the sensing fingers have seated at the time a carry is to be made to the summation member 231, then the gears of the planetary gear train from the sun gear 401 on, Figs. 36 and 40, will be held against movement.

In any event, as the carry arm 379 advances as above described, the planet gears 402 and 403 thereon rotate, and the planet gear 402 runs over the sun gear 401 either, as explained above, because this sun gear is held against movement or by reason of the effect of the spring 398 and the aforesaid advance of the carry arm 379 causes the planet gear 403 to rotate the sun gear 404 which meshes with the rack as 306 on the summation member 231 and it is this that advances the summation member 231 in an amount equal to the value of one digit for this is as much as the carry arm 379 moves by operation of the escapement comprising the teeth 390 and 393.

When the carry arms as 379, Fig. 40, are in their normal at rest positions, as is the carry arm 263 shown in Fig. 35, they bear against the pin 405 which extends between and is carried by the side plates 227 and 228. When the carry arms as 379 in the hundreds and higher orders are advanced in the manner described hereinabove with respect to the carry arm 379, the arms as 399 of these carry arms move away from the pin 405. However, inasmuch as no carries are to be effected into the two lowest orders in the present form of construction, the carry arms 263 and 271 in these orders are fixed in their normal positions by a pin 405a, Figs. 35 and 31, secured to the side plate 228. After the final settings of the summation members as 229 have been ascertained in a manner explained hereinafter and these members are to be returned to their at rest or zero positions, it is also necessary to restore any carry arms as 379 which have been so advanced that the arms as 398 thereof are disengaged from the pin 405 and this is effected in the following manner.

At a predetermined time in the cycle of operation, explained more fully hereinafter, the arms as 387a are pivoted counterclockwise slightly, as viewed in Fig. 35, to disengage the shaft 387 from the upper edges of the openings in the side plates 227 and 228 and against which this shaft normally engages to be accurately positioned, the specific manner in which this is effected also being explained hereinafter. When this is done the substantially T-shaped members 386 carried by the shaft 387 are pivoted counterclockwise as viewed in Fig. 35, about the shaft 387 by action of the springs 397 extending between the arms 392 of the members 386 and the pin 395 carried by the arms 387a, and when this is done the teeth as 393 are pivoted clear of the ratchets as 391 but the teeth as 390 remain in engagement with these ratchets. This operation will occur prior to the time the summation members as 229 start to move upwardly to return to their normal at rest positions and the shaft 387 will be retained in its lowered position, above described, until the summation members attain their upper position. During such upward movement of the summation members any sun gear as 404, Fig. 40, that has been rotated to effect an advance of the summation member with which it cooperates will be rotated to thereby rotate the planet gear as 403 meshed therewith wherefore the associated planet gear as 402 will also rotate, and these gears rotate in a direction opposite to that in which they rotated to bring about the advance of the summation member or, in other words, to effect the carry, and this rotation of these gears continues until the arm as 389 of any advanced carry arm reengages the pin 405. Of course, when the arms as 389 reengage the pin as 405, then the carry arms are restored to their normal at rest position. Subsequent to the time the summation members attain their uppermost position the shaft 387 is raised into engagement with the upper edges of the openings in the side plates 227 and 228 through which it is extended and the parts are therefore restored to normal position and are ready for the next operation.

Obviously during the return movement of the summation members 229 to their upper position the cam members as 372 will be rotated back toward their at rest or zero positions and in such movement either or both of the lobes 383 and 384 may move into engagement with the pawl 385a, and at this time it will be the radial edges of these lobes which engage the pawl. Such engagement of these edges will pivot the pawl 385a away from the pin 385b against the effect of the spring 386a but as soon as one or the other of the lobes 383 or 384 has advanced beyond a position in which it will engage the pawl 385a the spring 386a will restore this pawl into engagement with the pin 385b. Thus it will be seen that in a restoring operation of the summation members as 229 the various parts of the carry-over mechanism are restored to their normal at rest or zero positions.

It may be desirable in order to insure proper positioning of the sensing fingers and carry arms on restoration thereof to restore the summation members as 229 slightly beyond their zero positions. Hence the arrangement is such that when a lobe as 383 of each carry cam is brought back to its zero or at rest position it is in reality moved slightly beyond its true zero position so that the radial edge thereon engages the pawl as 385a and slightly pivots it away from the pin 385b. Care is taken, however, not to move the lobe as 383 sufficiently to disengage it from the pawl as 385a. With the parts so disposed the initial movement of the cam as 372 merely permits the pawl 385a to move into engagement with the pin 385b and this, as explained above, insures that an unwanted carry will not be effected at the initiation of an operation.

*Final product indicating means*

In the present apparatus where the capacity of the machine is such that a three-order number may be multiplied by a three-order number, the maximum operation a summation means will be called upon to perform will be the addition of three nines, plus a carry of two from the next lower order, in so far as any particular order of the final product is concerned so that under no circumstances will a summation member as 229 be moved into a position indicative of an amount greater than 29. Each such summation member as 229 pertains to but a single order of the final product and when positioned represents but a single digit. Thus, when it is stated that a summation member as 229 is set to represent a number as 29, it is to be understood that in reality only the digit appearing in the right-hand order of such a number will be represented by the summation member while the digit in the left-hand order will have been carried over into the next higher order to be, in effect at least, represented by the summation member for such next higher order. Hence, as a summation member or receiver as 229 advances from a position in which it would represent 9 to a position in which it should represent 10, in which position it will only really represent 0, a carry of 1 is made into the next higher order.

Numbers as 29 may be said to fall in notations and the number 29 falls in what may be called the third notation, the numbers 0 to 9 constituting the first of such notations, the numbers 10 to 19 constituting the second of such notations, and the numbers 20 to 29 constituting the third of such notations. Thus when the summation members or receivers as 229 come to rest at the end of a summation operation thereof, they are in position to represent a number in one or another of the aforesaid notations. Because of this, each of the receivers as 229 is provided with three vertically spaced index stops or lugs 600—I, 600—II, 600—III, Fig. 35. The stops as 600—I are selectively moved into operative position, in the course of operation of the receivers on which they are provided, to represent numbers falling in the first of the above explained notations, the stops as 600—II are moved into operative position to represent numbers falling in the second of the above explained notations, and the stops as 600—III are moved into operative position to represent numbers falling in the third of the above explained notations. Of course, the stop 600—II or 600—III on each receiver indicates by its position, when operative, only the digit appearing in the right-hand order of the number it is set to represent, the value appearing in the left-hand order, if any, of such a number having been carried over into the next higher order as such stop moves into such operative position.

In the present machine, even though the final products are manifested by the positioned receivers as 229 at the end of a summation operation thereof, other means are set up to manifest and produce records of such final products. Thus, in the present machine the stops 600—I, 600—II and 600—III are selectively moved into operative position with respect to the sensing fingers as 601 of the indicating and positioning members 602 which cooperate with sensing bars 603 that are operative to effect set-up of the means for producing records of the final products which the receivers as 229 and the index stops thereon are set to represent, such record producing means being fully described hereinafter.

Each indicating and positioning member 602 is provided with a series of digit-representing steps 604 which are adapted to cooperate with a complementary series of steps 605 provided on the ends of the corresponding sensing bars 603. The various steps 604 on each member 602 in the present instance respectively pertain to the digits 1 to 9 and 0, and each of the members 602 is supported to be vertically movable in such manner as to dispose selected of the steps 604 in horizontal alignment with the steps 605 on the aligned sensing bar 603. Vertical movement is imparted to the members 602 by springs as 606 which are extended between said members and a rod 607 carried by the uprights as 608 attached to the side plates 227 and 228, Figs. 35 and 42, the members 602 being guided in such vertical movement by fixed shafts 609 and 610 which are extended through slots 611 and 612, respectively, in the members 602, and also by combs 613 which are extended between the side plates 227 and 228 and which further aid to prevent the members 602 from being deflected out of their normal lines of vertical movement.

Normally the members 602 are retained in their lowermost positions against the action of the springs 606 by a roller 614, hereinafter referred to as a bail, which is carried at the end of an arm 615 pivotally mounted on a shaft 616 carried between the side plates 227 and 228, the roller or bail 614 cooperating with shoulders 617 on the members 602. A link 618 is pivotally connected to the arm 615 intermediate the ends thereof and to the end of a lever 619, Figs. 25 and 35, pivotally connected to the side frame member 235 of the multiplying apparatus M as indicated at 620. The other end of the lever 619 carries a roller 621 which rides on the surface of a cam 622 fast on the cam shaft 470 of the multiplying apparatus M, the roller 621 being maintained yieldingly in contact with the periphery of the cam 622 by the action of the spring 606 acting on the positioning members 602, Fig. 35.

It has been stated hereinabove that the sensing fingers 601 on the indicating and positioning members 602 cooperate with stops as 600—I on the receivers as 229. Each finger 601 is pivotally connected to its corresponding member 602 as indicated at 623 and is yieldingly urged outwardly in position to cooperate with the stops as 600—I by a leaf spring 624 when the member 602 has been retracted away from its home position by its spring 606. The outward displacement of each sensing finger as 601 under the influence of a leaf spring as 624 is limited by engagement of a lug 625 on the finger 601 with a pin 626 secured to the member 602, which pin thereby limits counterclockwise movement of the finger 601, as viewed in Fig. 35.

When each member 602 is restored to its home position by downward movement of the bail 614, in a manner to be described, it causes a shoulder 627 on the sensing finger 601 to engage a stationary rod 628 carried between side plates 227 and 228, such engagement of the rod 628 with the shoulders 627 of the various sensing fingers 601 occurring shortly prior to the time the members 602 are fully restored by the bail 614. Continued downward movement of the members 602 to their fully restored positions forces the fingers 601 to be rocked about their pivots 623 against the influence of their springs 624 so that the sensing fingers 601 are disposed out of vertical alignment with the index stops as 600—I on the receivers as 229 when the members 602 have reached their home positions. Thus, so long as the positioning members 602 are retained in their lowermost positions, shown in Fig. 35, by the bail 614, none of the index stops 600—I, 600—II or 600—III on each of the receivers as 229 can engage its cooperating sensing finger as 601 when the receivers as 229 are moved downwardly to be set up to represent or manifest a final product.

When the parts are in their at rest positions shown in Fig. 35, the stop 600—I and finger 601 are so spaced from each other that when the finger 601 is lifted away from the fixed rod 628 and is swung outwardly by the leaf spring 624, at the initiation of upward movement of the positioning member 602 in the course of sensing a final product, said finger will engage the stop 600—I in the event the receiver 229 is set to represent or manifest a digital value from zero to nine. The stops 600—I and 600—II are so spaced relative to each other and to the finger 601 when the parts are in their at rest positions shown in Fig. 35, that if a value from 10 to 19 is entered in the receiver 229, then when the positioning member 602 is released to the action of its spring 606 in the course of sensing a final product, it can cooperate only with the stop 600—II. Similarly, if the entry is included within the range of values 20 to 29, the finger 601 cooperates only with the stop 600—III.

Engagement of a sensing finger 601 with any of the stops 600—I, 600—II or 600—III tends to cause this finger to be rocked counterclockwise about its pivot 623, as viewed in Fig. 35, but such rocking movement of the finger 601 is prevented by engagement of the lug 625 thereon with the pin 626 on the member 602. The member 602 is therefore prevented from vertical movement under the influence of its spring 606 upon engagement of the sensing finger 601 with one of the stops as 600—I on the receiver as 229. The greatest amount of displacement of the member 602 from its home position occurs when the quantity entered in the receiver as 229 is the first value in the particular notation within which it falls, for example, 0, 10, or 20. Under such a condition the member 602 is permitted to move upwardly until the most right-hand step 604 thereon, as viewed in Fig. 35, is in horizontal alignment with the most left-hand step 605 of the cooperating sensing bar 603. On the other hand if the number falls at the end of a notation, for example, 9, 19, or 29, a stop 600—I, 600—II or 600—III will be so positioned with respect to the sensing finger 601 that the member 602 is permitted to rise but a limited distance and until the steps 604 thereon are spaced nine digital positions horizontally from the respective steps 605 aligned therewith. For values intermediate these extreme quantities in any notation, the index stops on the receiver as 229 are so positioned with relation to the sensing finger 601 that the member 602 is adjusted by a corresponding position intermediate the positions in which it represents the digits 0 and 9.

It will be seen from the foregoing that I have provided only one indicating and positioning member 602, having steps representative of values in but one notation, for each order of the final product and that to enable representation of digital values beyond the first notation I have provided stops as 600—II and 600—III on each receiver as 229, the stops as 600—I being utilized in representing numbers falling in the first notation. This eliminates the need for employing a plurality of positioning members each having sets of steps as 604, such as would be required if the positioning members 602 were directly connected to the receivers as 229. Moreover, the capacity of the apparatus may be readily increased by merely affording additional stops as 600—I and 600—II and so forth, over and above those which I have shown and described herein.

*Multiplier digit and group representation and detection*

In the following description of the control cards and the detecting means utilized in the machine and the manner in which setting up of the multiplying apparatus is effected under control thereof, the terms "multiplier" and "reoccurring factor" are employed to designate the two factors entering into a to be performed computation. The reoccurring factor is in the nature of a fixed multiplicand which may enter into a series of product-ascertaining operations as a constant factor thereof. A limited number of templet groups each pertaining to such a reoccurring factor are available in the machine, and the setting up of a particular templet group and of the reoccurring factor corresponding thereto is effected under control of a class designation afforded in control cards of the same series or class. The multiplier, in contradistinction to the foregoing, is a variable factor pertaining only to the record represented on an individual control card, and, in itself, has no group or class characteristic. The result ascertained under joint control of a selected reoccurring factor and a particular variable factor or multiplier is termed a product.

As has been explained with reference to Fig. 54, the various steps Z on the templets as 200, 201, 202 and 203 defined between the radii $r$, are related to the steps Z' disposed on the radii $r'$ on the positioning templets as 212. It has also been explained that each step Z' on the positioning templets pertains to two digits in the multiplier and the reason for this can be ascertained by reference to Fig. 63 which is a chart of the code under which the control areas 6 of the printing and control devices D, Fig. 60, are perforated for use in the present machine to effect selections of the digits in the multiplier.

By referring to Fig. 63 it will be seen that each of the odd digits 1, 3, 5 and 7, in accordance with the code, is represented by two perforations while each of the even digits 2, 4, 6 and 8 and the odd digit 9 is represented by a single perforation, the perforation representative of 9 cooperating with another perforation when the odd digits 1, 3, 5 and 7 are to be represented.

The code shown in Fig. 63 requires five potential positions in columns in which perforations may be made. If a perforation is made in a column in the lowermost of any of such five potential positions, the various potential positions being indicated at the intersections of the horizontal and vertical lines in Fig. 63, as well as at the uppermost of such positions, then the digit 1 is represented. However, if a perforation is made in such lowermost position and no perforation is made in the uppermost position, the digit 2 is represented. To continue, if a perforation is located in the next to the lowermost and in the upper position in a column, the digit 3 is represented, but the omission, in such an instance, of a perforation at the uppermost position affords a representation of the digit 4. The digit 5 is represented by a perforation in the medial position in a given column and a perforation in the uppermost potential position in this column, but the omission of a perforation at this uppermost position with a perforation at the medial position affords a representation of the digit 6. Perforations in the next to the uppermost and the uppermost positions in any column represent the digit 7, but a perforation in this column in the next to the uppermost position, in the absence of a perforation in the uppermost position, affords a representation of the digit 8. A perforation in only the uppermost position affords a representation of the digit 9. Only the significant digits are represented by perforations and the absence of a perforation in any particular column denotes zero.

The printing and control device D illustrated in Fig. 60, which, in the operation of the machine described in detail hereinafter, will be the first to pass through the machine, is perforated to represent 999 so that three perforations are provided in the uppermost positions of the three most right-hand columns on the card 6 on this printing and control device. However, the card shown in Fig. 62 is perforated, as may be ascertained by reference to the code shown in Fig. 63, to represent 345. The card 6 shown in Fig. 61 is perforated to represent 702, and it will be noted that the second of the columns on this card is devoid of perforations which, as has been stated, is indicative of zero.

In addition to controlling the selection of the digits of the multiplier factor, the card 6 on each device D controls the selection of a particular group of templets pertaining to a predetermined reoccurring factor, and inasmuch as three such groups of templets can be accommodated in the illustrated form of the invention, as is explained hereinabove in connection with Figs. 58 and 58A, there has been provided on the control card 6 an area in which suitable indicia can be afforded for, in effect, selecting one of three available reoccurring factors, which in the present instance comprise the factors 999, 37 and 465. It will be understood, however, that any or all of these factors may be varied by replacing the groups of templets pertaining thereto with templet groups pertaining to the chosen factor or factors, as has been explained, and that while the illustrated machine has been provided with groups of templets pertaining to the reoccurring factors 999, 37 and 465, templet groups pertaining to other reoccurring factors can be incorporated in machines embodying the present invention.

The selection of the templet group pertaining to the reoccurring factor which is to be effective in the multiplying operation of the machine is accomplished according to the presence or absence of perforations as 6A or 6B in the most left-hand column of the control card 6, as viewed in Fig. 60. Thus, for example, if a perforation 6A is present the templets in the group pertaining to the reoccurring factor 999, which group comprises the templets 200—U, 201—U, 202—U, 203—U, 200—T, 201—T, 202—T, 203—T, 200—H, 201—H, 202—H, and 203—H, Figs. 58 and 58A, are respectively positioned in alignment with the summation lines L representative of the orders of the final product, in a manner to be explained presently. If, however, no perforation as 6A is present in the card 6 but a perforation is present at the position 6B, indicated by broken lines, the templets in the group pertaining to the factor 37, which group comprises the templets 204—U, 205—U, 206—U, 207—U, 204—T, 205—T, 206—T, 207—T, 204—H, 205—H, 206—H and 207—H, are respectively disposed in alignment with the lines L. If there is neither a perforation 6A nor a perforation 6B present in the control card 6, the templets in the group pertaining to the reoccurring factor 465, which group comprises the templets 208—U, 209—U, 210—U, 211—U, 208—T, 209—T, 210—T, 211—T, 208—H, 209—H, 210—H and 211—H, are respectively disposed in alignment with the lines L. A kindred arrangement would be afforded if selection from among more than three groups of templets was required.

It can be seen from the foregoing that the control card 6 on each printing and control device D bears representations of the digits in the multiplier factor according to the code shown in Fig. 63, and also bears a representation which may comprise either a perforation 6A or a perforation 6B or a blank at both of the positions where these perforations may be located, for, in effect, selecting the reoccurring factor to be effective. However, while identical multiplier digit representations on two or more of the cards 6 always pertain to a particular digit, the representations which control selection of a reoccurring factor do not directly relate to any definite numerical values. For example, a perforation in the position 6A on the card 6 might, in one set-up of the templets in a machine, select a reoccurring factor 999, but in another set-up of the machine it might effect selection of an entirely different reoccurring factor, inasmuch as the groups of templets employed in different machines and the arrangements thereof will rarely be the same. Similarly, a perforation in the position 6B might in one machine control selection of a reoccurring factor 37 and in another machine effect selection of a different reoccurring factor, since the requirements of persons or organizations using these machines will vary. Likewise the absence of perforations at both positions 6A and 6B might in one instance signify that a reoccurring factor 465 is to be utilized and in another instance denote a different reoccurring factor.

The designations afforded by the presence or absence of perforations as 6A and 6B on the control cards 6 may thus constitute classification indicia having a fixed relation to the system of classifying records employed by the user of the machine. In the illustrated embodiment of the invention, which is particularly adapted for the computation of dividends issued by a corporation, such classification designations may be indicative, for example, of the kinds of stock held by the shareholders, such as "Class A Preferred," "Class B Preferred," and "Common" stock. Ordinarily, each of these classes has a different dividend rate, and a perforation as 6A in the control card 6 of the printing and control device D, pertaining to a particular shareholder, may indicate a Class A dividend rate; a perforation at 6B may indicate a Class B rate; while no perforations could denote the Common rate. All shareholders whose printing and control devices bear the same class designation will therefore receive dividends which are the products of the particular reoccurring factor in that class multiplied, in effect, by the respective share holdings.

Numerous other examples could be cited in this and other fields where machines embodying this invention can be advantageously utilized, and it will be recognized from the foregoing that in each such application the machine will function to perform, in effect, multiplications of variable factors by reoccurring factors selected according to a predetermined classification. Furthermore, it will be manifest that a given class designation afforded by the presence or absence of perforations as 6A or 6B on a control card 6 does not necessarily refer to any particular numerical value of the reoccurring factor. For instance, a corporation may change the dividend rates on all its classes of stock. To accommodate such a change in rates, the groups of templets, Figs. 85 and 85A, formerly utilized would be replaced by other groups of templets formed in accordance with the new rates. Hence, although the class designations of the printing and control devices D may remain the same, the reoccurring factors or rates which they respectively represent may be changed by the incorporation of the new groups of templets in the apparatus.

When printing and control devices D are withdrawn from the magazine H and come to rest in position II, Figs. 5 and 7, in the course of the step by step advancing movement thereof through the printing and control device guideway, these devices are in a position for cooperation with the detector mechanism which ascertains the value of the multiplier, the digits appearing in the various orders of such multiplier determining which steps Z on the templets in the templet-gang pertaining to the same order of the multiplier are to come to rest in operative position in so far as rotative movement thereof is concerned, and the detector mechanism also ascertains the class designation for determining which of the groups of templets is to be placed in position to be sensed by the sensing fingers of the summation means.

The detector to which reference has just been made is generally indicated by 410 in Figs. 5, 6 and 7 and comprises a block 411 which has a plurality of columns of openings 412 therein, Fig. 7, there being five openings 412 in each column. Restricted openings 413, Fig. 6, are provided in a plate 414 secured to the bottom of the block 410 and headed sensing pins 415 project through these restricted openings. Springs 416 are disposed in the openings 412 and act on the heads of the pins 415 to normally project the pins beyond the openings 413, a plate 417 acting as a reaction abutment for the springs 416 and the plate 414 being engaged by the heads of the pins to limit outward movement thereof.

When a printing and control device D is in position II, Figs. 5, 7 and 8, the columns of sensing pins 415 are aligned with the columns in cards 6 in which perforations may be formed under the code shown in Fig. 63 and there are as many columns of sensing pins 415 as there are to be active columns on the cards 6. In the present instance where multiplication is confined to multiplication in no more than three orders in the multiplier, but three columns of sensing pins 415 are provided (see Fig. 7) for cooperation with the perforations in the cards 6 representative of the digits of the multiplier, inasmuch as such perforations will appear only in the three most right-hand columns on the cards 6, as such cards are viewed in Fig. 60; and an additional pair of sensing pins 415 is provided for cooperation with the positions on the cards 6 at which perforations as 6A or 6B may be afforded to, in effect, control selection of the reoccurring factor.

The block 411 is mounted between a pair of arms 418 and 419, Fig. 7, which are provided with knife edges 420 and 421, Figs. 5 and 7, near their rear ends which seat in substantially V-shaped notches respectively formed in the side plates 25 and 24 of the printing and control device guideway. Springs as 422 act on the arms 418 and 419 and normally urge the sensing pins 415 upwardly out of their operative position.

A link 423, Figs. 4 and 5, is pivotally connected to the arm 419 and one end of a medially mounted lever 424, Fig. 5, is pivotally connected to the lower end of this link 423, the lever 424 being pivotally mounted as indicated at 425 on the bracket 70. A roller 426 is provided at the other end of the lever 424 and under the effect of the springs as 422 this roller is urged toward a face cam 427, Fig. 5, fast on the shaft 71. In the course of rotation of the shaft 71, which is brought about by the engagement of the clutch teeth 75 with the clutch teeth 77, Fig. 5, a rise on the cam 427 engages the roller 426 and thereupon the lever 424 is so pivoted that the link 423 is moved downwardly to thereby bring the sensing pins 415 into cooperating relation with the card 6 on the printing and control devices D disposed at position II. In the course of such downward movement those sensing pins 415 which do not move into alignment with perforations in the card 6 come to rest on the face of this card and are forced upwardly against the action of the springs 416. Those pins however which move through perforations in the card 6 come into cooperation with the devices which bring about setting up of the multiplier in the multiplying mechanism M.

The devices with which sensing pins 415 so cooperate include push pins 428, Fig. 6, mounted in a block 429 carried by the casting 30. There are as many columns of push pins 428 as there are columns of sensing pins 415 and each push pin 428 is respectively aligned with a sensing pin 415. Thus, when a sensing pin 415 passes through a perforation in a card 6 on a printing and control device at position II, it moves into engagement with a push pin 428 and under the influence of a spring 416 pushes the aligned push pin 428 downwardly. As shown in Fig. 5, three columns of the push pins 428 having five pins per column have been provided for cooperating with the three columns of sensing pin 415 that are adapted to sense the perforations in the cards 6 representative of the digits of the multiplier, and a pair of push pins 428A and 428B has been provided for cooperating with the sensing pins 415 that are adapted to sense the presence or absence of perforations as 6A or 6B on the cards 6 to, in effect, control selection of a reoccurring factor.

Connection between the sensing device 410 and the multiplying mechanism M is established through Bowden cables for so to do affords the required flexibility in the mounting of the various parts of my machine in operative association with each other for, as will be understood, varied lengths of Bowden cables may be employed and inasmuch as these cables are flexible they may be directed as required.

In the present instance, the ends of the Bowden cables 430 that are to receive movement are respectively aligned with the push pins 428, as shown in Fig. 6, these ends of these cables being maintained in proper relation with these push pins by having the casings 431 of the cables secured in a supporting plate 432 carried by a block 433 secured to the underside of the block 429. Each Bowden cable is slightly longer than the distance between the push pins that impart movement thereto and the devices in the multiplying apparatus M receiving movement from the cables, and therefore each push pin 428 is provided with a head 434 so that when the push pins are in their normal at rest position with the Bowden cables effective thereon these pins are firmly seated against the bottom of the block 429 in which the push pins are mounted.

*Selection of intermediate product representations*

The result of the movement imparted to the Bowden cables in the manner just described, in the course of the detection of the multiplier representations, is to set up the related intermediate product representations in operative relation with the sensing fingers of the summation means. To this end, the ends of the casings 431 of the Bowden cables opposite the ends thereof connected to the plate 432, Fig. 6, and which are allocated to the multiplier digit sensing pins, are allocated to the multiplier digit sensing pins 415 and corresponding push pins 428 are secured in a plate as 435, Fig. 43, that is carried by posts as 436 secured to an arm 437, Figs. 43 and 44, carried by a pin as 438 journaled in a bearing as 439 carried by a plate as 440, Figs. 30 and 44, that is fast to the bearing block 243 on the side plate 228, which bearing block, as stated, carries the templet-gang G—H pertaining to the hundreds order. It should be noted that the Bowden cable ends and the parts associated therewith shown in Figs. 43 and 44 pertain to the hundreds order templet-gang and, while these parts are now described in detail, it is to be remembered that similar arrangements are provided for the units and tens orders templet-gangs.

The bearing 439 is shouldered, as shown in Fig. 43, and a torsion spring 441, disposed about this shouldered portion, has one end thereof anchored in the bearing 439, the other end of this spring being anchored in a collar 442 fast on the pin 438. The torsion spring 441 is placed under tension so that it constantly tends to unwind and it thereby acts on the arm 437 to tend to pivot it counter-clockwise, as viewed in Fig. 44. This action of the spring 441 is limited by a stop screw 443, Fig. 44, mounted in a plate 444 that is carried by the plate 440, the position of the stop screw 443 being accurately adjusted in a manner that will be described presently.

It will be understood that there is a Bowden cable 430 attached to each push pin 428, Fig. 6, and it will be remembered that the push pins 428 are arranged in columns. The column of push pins 428 arranged below the most right-hand column of a card 6, as this card is viewed in Fig. 60, pertains to the units order of the multiplier as do the Bowden cables 430 cooperating with the push pins in this column. The push pins 428 aligned with the next column to the left on the card 6 pertain to the tens order of the multiplier as do the Bowden cables cooperating with these push pins, and the push pins 428 aligned with the next column to the left or the third from the right-hand end, as viewed in Fig. 60, pertain to the hundreds order of the multiplier as do the Bowden cables cooperating with this column of push pins.

There is an arm 437—U, Fig. 20, (which corresponds to the above described arm 437) in which the casings 431—U for the Bowden cables 430—U are fast, positioned for cooperation with the templet-gang G—U that pertains to the units order of the multiplier; there is an arm 437—T, having casings 431—T anchored therein, in association with the templet-gang pertaining to the tens order of the multiplier; while there is an arm 437—H having casings 431—H anchored therein, in association with the templet-gang pertaining to the hundreds order of the multiplier, this being the above described arm 437.

Referring to Figs. 6 and 43, it will be seen that there is a Bowden cable 430—1—2 which leads from the push pin 428 that is the lowermost push pin in the column of push pins pertaining to the hundreds order. There is also a Bowden cable 430—3—4 that leads from the push pin 428 in the next lowermost row in the column pertaining to the hundreds order and, additionally, there is a Bowden cable 430—5—6 that leads from the push pin 428 in the medial row in the column of push pins pertaining to the hundreds order, and there is also a Bowden cable 430—7—8 that leads from the push pin 428 in the next to the uppermost position in the hundreds order, while the Bowden cable 430—9 leads from the push pin 428 aligned with the uppermost position in the hundreds order. The suffixes added to the reference character 430 immediately preceding designate the digits in the multiplier to which the particular cable pertains, for if the push pin 438 engaged by any one of these cables is pushed by a sensing pin 415 that passes through an opening in the card C, then the particular Bowden cable pushed indicates one or the other of the two digits to which it pertains, it being understood that under the code illustrated in Fig. 63 where an odd digit 1, 3, 5 or 7 is to be indicated that the Bowden cable 430—9 is also pushed. In the absence of a pin 415 pushing a push pin 428 aligned with the Bowden cable 430—9, the pushing of any one of the other Bowden cables indicates the even digit 2, 4, 6 or 8.

Now, for example, if the sensing pins 415 pass through perforations in the card 6 shown in Fig. 62, the Bowden cables 430—3—4 and 430—9 pertaining to the hundreds order would be pushed to designate the digit 3; the Bowden cable 430—3—4 pertaining to the tens order would be pushed, but since the Bowden cable 430—9 would not be pushed in this instance the digit 4 would be indicated; and the Bowden cables 430—5—6 and 430—9 would be pushed as far as the units order is concerned to indicate the digit 5. Such pushing of the Bowden cables either singly or in pairs cooperates with the positioning templets as 212 to dispose the steps Z on the templets in the templet-gang, of which the particular positioning templet is a part, in operative position, and those steps Z pertaining to whatever digit is represented by pushed cables are disposed in operative position to lie on the vertical center plane of the templet mounting, which is to say, these steps are disposed on the lines L, Figs. 58 and 58A, and the manner in which this is effected is as follows:

Referring to Fig. 43, it will be seen that each Bowden cable 430 leads into a pin as 445, the pins 445 being slidably journaled in an enlarged portion at the lower end of the arm 437. The uppermost of the pins as 445 is designated at 445—1—2 and the succeeding of the pins 445 downwardly have suffixes associated therewith designating the digits to which they pertain. It will be noted that the lowermost pin 445—9 is larger in diameter than the other of the pins and this is utilized to determine whether, depending upon conditions arising when one of the other pins is also pushed, an odd or even digit is designated. The pushed of the pins 445 cooperate with the steps Z' on the positioning templet 212 to dispose the positioning templets and therefore the other templets in the templet-gangs in operative position to represent whatever digits appear in the intermediate product found upon multiplication of the reoccurring factor by the multiplier digit represented by the pushed of the pins 445. In order that this will be accurately brought about it is of course essential that the templets of each templet-gang be normally and accurately disposed in a normal at rest position and this is effected in the following manner:

A slide 446, Figs. 20, 29, 44 and 45, is slidably mounted in a slot 447 in the side plate 228 and has a pin 448 provided in its end that extends into a bifurcation in the end of an arm 449 that is fast on a shaft 450 journaled in the side plates 227 and 228. A spring 451 extends between the slide 446 and the positioning templet 212—U of the templet-gang pertaining to the units order of the multiplier; a spring 452 extends between the positioning templet 212—T and the slide 446, and a spring 453 extends between the positioning templet 212—H and the slide 446. The spring 451 pulls the positioning templet 212—U into engagement with a stop pin 454 on the slide 446, while the spring 452 pulls the positioning templet 212—T into engagement with a stop pin 455 on the slide 446, and the spring 453 pulls the positioning templet 212—H into engagement with a stop pin 456 on the slide 446. In the just described manner an operative connection between the slide 446 and the positioning templets of the various templet-gangs is established through the springs 451, 452 and 453 and the pins 454, 455 and 456.

A spring 457 acts on the arm 449 and tends to pivot this arm in such a direction that it acts on the pin 448 to urge the slide 446 toward the right, as viewed in Fig. 29. The templet-gangs G are so mounted in position that the steps thereon in their ascending order face toward the left in Fig. 29. When the spring 457 acts to urge the slide 446 toward the right, the slide acts through the stop pins engaged with the associated positioning templets to dispose the various templets in the templet-gangs in their normal at rest positions, these positions being very slightly beyond the positions thereof pertaining to the digit 1 in the multiplier to afford clearance for the pins as 445 in their operative movement, as will be described presently. When the templets in the various templet-gangs are urged into their normal at rest positions they engage stop pins as 458 which are fast in the side plates 227 and 228, these stop pins projecting slightly beyond the outer face of the side plate 228 to afford stops for the positioning templets which are mounted outwardly of this face.

Now again referring to the card shown in Fig. 62, when the cables 430—3—4 and 430—9, Figs. 6 and 43, pertaining to the hundreds order of the multiplier, are pushed by reason of sensing pins 415 passing through perforations to push the push pins 428 aligned with these cables to push the pins 445—3—4 and 445—9, it should be noted that such pushing occurs at a time when the templets in the various templet-gangs are engaged with the stop pins as 458, or in other words when the templets are in their at rest positions.

When the enlarged pin 445—9 is pushed at this time it moves into cooperative relation with the edge of a block 460, Fig. 44, that is mounted on the side plate 228, the particular block 460 shown in Fig. 44 being designated as 460—H in Fig. 29 and pertaining to the hundreds order. This block (as well as similar blocks pertaining to the units and tens orders) is disposed in such position on the side plate 228 that when the large pin 445—9 pertaining to the hundreds order is pushed inwardly it will just clear the edge of the block, this also being assured by the engagement of the arm 437 with the stop screw 443. It is only after the enlarged pin has had time to engage the edge of the block 460 that the arm 449 is rocked to move the slide 446 toward the left as viewed in Fig. 29, this being effected in the manner now to be described and being the movement that results in disposing the templets, or better the proper steps Z thereon, in operative position.

An arm 461, Figs. 28 and 29, is adjustably secured to the shaft 450 by a clamp block 462, and one end of a link 463 is connected to arm 461, the other end of this link being connected to the arm 464, Figs. 20, 23 and 24, of a bell crank lever 465 that is pivotally mounted as indicated at 466 on the side frame member 235. A roller 467 is carried by the other arm 468 of this bell crank and under the influence of the spring 457, Fig. 29, is urged into engagement with the periphery of the cam 469 that is fast on the multiplying mechanism cam shaft 470. When the parts are in their at rest positions the roller 467 rests on a dwell 471, Fig. 24, on the cam 469. Very shortly after the cam shaft 470 is set in rotation, in a manner to be described, the roller 467 rides off the dwell 471 onto the periphery of the cam and it is this that moves the slide bar 446, Fig. 29, in the above described manner whereupon, through the springs 451, 452 and 453, the templet-gangs pertaining to the units, tens and hundreds orders, respectively, are swung clockwise, as viewed in Fig. 29, and this brings the steps Z' on the positioning templets of these templet-gangs into cooperating relation with pushed of the pins 445 to thereby set up the templets.

It will be recalled that the templets in the templet-gang associated with each positioning templet 212 are connected to said positioning templet for rotative movement therewith by a pin 226, Figs 43, 44 and 45. In order to accommodate such movement of the pins 226 with the respective positioning templets 212, arcuate slots as 241a are provided in the side plate 228.

Now in so far as the hundreds order of the card 6 shown in Fig. 62 is concerned, the pin 445—3—4 was pushed as well as the pin 445—9 and, as stated, the pin 445—9 is engaged with the block 460—H. Thus as the positioning templet 212—H moves clockwise as above described, the second step thereon moves into engagement with the pushed pin 445—3—4, it being understood that the various pins 445 are respectively aligned with the steps Z' on the positioning templets of corresponding values, that is, which pertain to similar digits. When the second step Z' on the positioning templet 212—H engages the pushed pin 445—3—4 the templets in the templet-gang pertaining to the hundreds order come to rest with the steps Z thereon, pertaining to the intermediate product found when the multiplier is the digit 3 in the hundreds order, in operative position.

By referring to the card shown in Fig. 62 it will be seen that in so far as the tens order is concerned the enlarged pin 445—9 will not be pushed but only the pin 445—3—4 because an even digit is designated in the tens order in the card shown in Fig. 62 and therefore there is no perforation in the card through which a sensing pin 415 may pass to cause the pin 445—9 for the tens order to be pushed. In this instance, the enlarged pin is not pushed forwardly to engage the block as 460—T, Fig. 29, and hence when the templet-gangs swing clockwise, as above described, the second step on the positioning templet 212—T moves into engagement with its cooperating pin 445—3—4 and upon engagement of this step with this pin the arm 437—T, Fig. 20, pertaining to the tens order is pivoted in a clockwise direction. Such pivoting movement is limited by a stop screw as 472, Fig. 44, carried by the plate 440 which also carries the stop screw 443. It will be recalled that when the second step Z' on the positioning templet 212—H engaged its associated pushed pin 445—3—4, the pin 445—9 was engaging the associated block 460 and hence the arm 437 was prevented from pivoting and it remained in engagement with the associated stop screw 443. However, when the second step Z' on the positioning templet 212—T engaged its associated pushed pin 445—3—4 the arm 437—T swung into engagement with the associated stop screw 472 because the associated pin 445—9 was not pushed forwardly to engage the associated block 460. Thus the positioning templet 212—T can move a greater distance than did the positioning templet 212—H and this results in positioning the positioning templet 212—T and the other templets in its templet-gang in such a location that the steps Z on such other templets pertaining to the digit 4 are disposed in operative position as above described.

It will be seen from the foregoing that the arms as 437, Fig. 44, are disposed either in engagement with the stop screw 443 or the stop screw 472 when positioning templets 212 are cooperating with pushed pins 445 and that the arm 437 is therefore capable of angular displacement, the magnitude of which is regulated by the positions of the stop screws 443 and 472. This angular displacement is equal to the angular displacement of one step Z from another on segments as 200 along the arcs c, Fig. 54. It will be seen from this that it is the angle subtended by movements of the arms as 437 between the stopping positions defined between locations of the screws 443 and 472 that ordinarily determines whether the odd or even digit represented by a particular sensing pin is to be effective in locating the steps Z on the templets in operative position.

In connection with the foregoing, reference is again made to Fig. 44 and to the block 460. Where a step Z pertaining to a digit 9 of the multiplier is to be disposed in operative position, the large pin 445—9, only, is pushed in, and the final step Z' on the positioning templet 212, Figs. 43 and 44, pertaining to the digits 9 and 0, moves against the pin 445—9, which is in engagement with the block 460; hence further movement of the templet 212 and its associated templet-gang is prevented, and thereby the templet-gang is positioned in accordance with the multiplier digit 9.

It will be recognized that there will be instances where a significant digit will not appear in some particular order of the multiplier and in such an instance no push pin 428, Fig. 6, would be pushed and as a result none of the pins 445, Figs. 43 and 44, would be pushed forward. In such an instance however the templet-gangs are swung as above described and the step Z' on the positioning templet 212, which would normally engage the enlarged pin 445—9, engages the block 460. The engagement of this step Z' with this block positions the templets in the templet-gang associated with this particular positioning templet in such location that the steps Z thereon representative of zero are disposed in operative position which is effective to prevent operation of the summation means in so far as these particular templets are concerned.

*Selection of templet group*

It has been explained hereinabove that each templet-gang as G—H, Fig. 43, includes three sets of templets, each of which sets, in effect, pertains to a particular reoccurring factor. Each set of templets, such as 200—H, 201—H, 202—H, Figs. 43, 58 and 58A, is so arranged on its pin 213 in relation to every other set of templets included in the same templet-gang, that those templets which pertain to the same order of the final product are located in juxtaposition to each other to form clusters C of three templets. It has also been explained that when a particular set of templets pertaining to the desired reoccurring factor is to be rendered operative, the several templets in that set are aligned with corresponding sensing fingers such as sensing fingers 351, 354, 359, 360, Fig. 43. This entails positioning the entire templet-gang as G—H in a direction transverse to the plane of rotative movement of the positioning templet 212 associated therewith so that the desired set of templets may be placed in positions to be sensed by the aforesaid sensing fingers, and thereby selection of correspondingly positioned templets in the various clusters C for operation is effected.

Thus, if the reoccurring factor is 999, then, in the illustrated machine, the templet gang G—H, Fig. 43, must be shifted in the aforesaid transverse line of movement in an amount sufficient to align the templets 200—H, 201—H, 202—H and 203—H, respectively, with the sensing fingers 251, 254, 259 and 360 of the summation means. The templet-gangs G—T and G—U, Fig. 30, are shifted in the same direction and in an equal amount as is the templet-gang G—H so that correspondingly positioned templets in all the clusters C of the several templet-gangs are adjusted to sensing position, and such templets comprise the most right-hand templets in the clusters C, as viewed in Fig. 43.

If, in the present form of the invention, the reoccuring factor 37 is selected, in a manner to be described presently, the templet-gangs G—H, G—T and G—U are shifted in an amount sufficient to bring the middle templet in each cluster C into position to be sensed. If the reoccurring factor is 465, the most left-hand templet in each cluster C (as viewed in Fig. 43) is disposed in position to be sensed.

Such longitudinal displacement of the several templet-gangs in accordance with the reoccurring factor which is to be effective is controlled by the presence or absence of indicia as the perforations in the positions designated 6A and 6B in the control card 6, Fig. 60. Referring to Figs. 6 and 7, there are two push pins 428A and 428B which cooperate with corresponding sensing pins 415 that are so located in the detector block 411 that they respectively sense the presence or absence of perforations at the positions 6A and 6B on a control card 6 when a printing and control device D is at the sensing station II in the printing and control device guideway. The push pins 428A and 428B are respectively attached to the ends of Bowden cables 430A and 430B, the other ends of these cables being secured to pins 445A and 445B, Figs. 30 and 35, which are guided for reciprocatory movement in suitable openings provided in a plate 473 attached to a rod 474 and like openings in an offset portion of a block 475 secured to the side plate 227. The casings 431 of the Bowden cables 430A and 430B are fastened to a block 431a, Fig. 29, secured to the outer face of the side plate 228.

A slide 476 is supported for reciprocatory horizontal movement transversely of the axes of the templet-gangs by suitable brackets 477 secured to the side plate 227 and said slide extends through the space between the offset portion of the block 475 and the side plate 227. The slide 476 is provided with lugs 478 and 479 which, when the slide 476 is in its normal position, are spaced to the right of the pins 445A and 445B, as viewed in Fig. 35 in different amounts. If there is neither a perforation 6A nor a perforation 6B in the control card 6, Fig. 60, the push pins 428A and 428B, Fig. 7, remain in their inoperative positions when the card 6 is sensed and hence neither of the Bowden cables 430A nor 430B is actuated, and the pins 445A and 445B remain in their retracted positions shown in Fig. 32 out of the line of movement of the lugs 478 and 479 in the slide 476. Hence, under these conditions, when the slide 476 is shifted to the left, in a manner to be explained presently, neither of the pins 445A or 445B can engage the lugs 478 and 479 and movement of the slide 476 to the left is limited by the stationary stop 480 fastened in the side plate 227.

Shifting movement is imparted to the slide 476 by a rock arm 481 which is yieldably connected to the slide 476 by a spring 482, said spring being anchored to a pin 483 in the end of the arm 481 and to the pin 484 in the slide 476 and serving to normally maintain the end of the slide 476 in engagement with the pin 483. The rock arm 481 is pivotally mounted on the shaft 450 and is provided with a depending arm 485, Figs. 28 and 35, that is connected to the rock arm 461, previously referred to, by a screw 486. Thus, whenever the arm 461 is actuated by the link 463 to thereby rock the arm 449, Fig. 29, and shift the slide 446 for rotatively positioning the templet-gangs in accordance with the multiplier factor, as has been described hereinabove, the arm 481, Figs. 28 and 35, is likewise rocked to thereby shift the slide 476 to the left as viewed in Fig. 35.

It has been noted that if no perforation as 6A or 6B is present on the control card 6, Fig. 60, of the printing and control device D at sensing position, the slide 476 is permitted to shift, under the influence of the spring 482 when the arm 481 is rocked, until the lug 478 thereon engages the stationary stop 480. Slide 476 carries a series of abutments 487—H, 487—T, 487—U. Each abutment as 487—U is associated with a corresponding templet-gang as G—U and when the slide 476 has been permitted to advance so that the lug 478 thereon engages the stop 480, as shown in Fig. 32, the abutment as 487—U is disposed adjacent the spacing sleeve 223 of the templet-gang as G—U. Likewise the abutments 487—H and 487—T are disposed adjacent the spacers 223 of their corresponding templet-gangs G—H and G—T. Each templet-gang as G—U is provided with a block as 488—U having a series of steps thereon, and when the slide 476 is so positioned that the abutments as 488—U are in their extreme left-hand positions, as viewed in Fig. 35, said abutments are disposed in position to cooperate with the first of the steps on the blocks as 488—U when the templet-gangs as G—U are freed to the action of their leaf springs 247, Fig. 32, in a manner to be described. When the first step on a block as 488—U engages the abutment as 487—U, the templet-gang G—U is so positioned that the most left-hand of the templets in each of the clusters C, as viewed in Fig. 43, are disposed in sensing position; or in other words in the present apparatus, the templet sets pertaining to the reoccurring factor 465 are rendered operative when no perforations as 6A or 6B are present in the control card 6.

It will be recalled that the pins as 226, Fig. 43, which connect their respective templet-gangs to the corresponding positioning templets 212 for rotative movement therewith, are fast to the templets of the gang G but are slidable in suitable openings in the positioning templets 212. This enables each templet-gang G to be shifted axially and at the same time remain connected to its positioning templet through the pin 226 so that there is a positive connection afforded in so far as rotative movements of these parts are concerned.

If a perforation 6B is present in the control card 6, the Bowden cable 430B, Fig. 33, is actuated to place the pin 445B in position to engage the lug 479 on the slide 476 when the latter is freed to the action of its spring 482. This is effective to so position the abutments as 487—U on the slide 476 that the second step on the blocks as 488—U engages said abutments when the templet-gangs as G—U are released to the action of their springs 247. This so positions the various templet-gangs that the middle templet in each cluster C, Fig. 43, is disposed in sensing position; which is to say, that when a perforation 6B is present in the control card 6, the templet sets pertaining to the reoccurring factor 37 are rendered operative.

If a perforation 6A is present in the control card 6, the Bowden cable 430A, Fig. 34, is actuated to dispose the pin 445A in position to engage the lug 478 on the slide 476 when this slide is operated in the manner just described. This disposes the abutments as 487—U in position to engage the third of the steps on the blocks as 448—U of the templet-gangs as G—U when the templet gangs are freed to the action of their springs 247 and this is effective to position the most right-hand of the templets in each cluster C, as viewed in Fig. 43, in sensing position. Hence, when a perforation 6A is present in the control card 6 the templet sets pertaining to the reoccurring factor 999 are rendered operative in the present apparatus.

Each templet-gang as G—H, Fig. 43, is normally retained in the positions shown in Fig. 30 against the action of its spring 247 by a ball 489 which is in engagement with the end of the spacer 223 of the templet-gang. Each ball 489 is carried on the end of a rock arm 490, Fig. 27, which is fast on a rock shaft 492, Fig. 28, journaled in bearings 493 attached to the side plate 227. The shaft 492 is provided with a rock arm 491, Fig. 27, having a pin 494 at the outward end thereof, which pin normally seats in the horizontal portion of an inverted L-shaped slot 495 provided near one end of a link 496, which link is connected at its lower end to a lever 497. A spring 500 extended between an end of the link 496 and one of the rock arms 490 tends to maintain the pin 494 in the position in the slot 495 just described and as shown in Fig. 27.

The link 496 is made of relatively thin and flexible material, and when it is necessary to remove a templet-gang as G—H from the machine, for example, for the purpose of changing the groups of templets to provide different reoccurring factors, the link 496 is bent outwardly against the action of the spring 500 to dispose the pin 494 on the arm 491 in the vertical portion of the slot 495 to thereby enable the rock arm 491 and shaft 492 to be rocked counterclockwise, as viewed in Fig. 27, thereby withdrawing the ball 489 from the end of the spacer 223 of the templet-gang as G—H to thereby relieve the pin 213, Fig. 43, of the templet-gang G—H of the tension normally exerted upon it by the leaf spring 247. This facilitates the unscrewing of the pin 213 inasmuch as the threaded portion 224 thereof will not be subjected to the stress which is normally present when the bail 489 is in engagement with the end of the templet-gang. Preferably, a ninety-degree twist is imparted to the link 496 to prevent buckling thereof when it is actuated to restore the templet-gangs, in a manner to be explained.

Link 496 is pivotally connected at its lower end to one end of an offset arm of a lever 497 pivoted at 498 to the side frame member 235. The other arm 497a of the lever 497 carries a cam follower which is in engagement with the periphery of a cam 499 on the cam shaft 470, Fig. 24, said cam follower and cam being maintained yieldingly in engagement by the tension of the leaf springs 247 of the templet-gangs and by a spring 501 attached to the arm 497a and anchored in the frame member 235. Normally the follower on the arm 497a is in engagement with a rise on the cam 499 to thereby maintain the templet-gangs as G—H in their extreme right-hand positions, as viewed in Fig. 27, against the action of their springs 247. As the cam shaft 470 is rotated in the course of an operation of the multiplying apparatus M, the follower on the lever arm 497a moves off the rise on the cam 499 to thereby cause the lever 497 to be rocked counterclockwise as viewed in Fig. 24, or clockwise, as viewed in Fig. 28, thereby withdrawing the bails 489 from the ends of the templet-gangs G and enabling the leaf springs 247 of the several templet-gangs to urge the templet-gangs to the left as viewed in Fig. 27. As the cam 470 completes its revolution the follower on the arm 497, Fig. 24, rides up on the rise of this cam to thereby push the link 496, Figs. 27 and 38, upwardly and actuate the bails 489 to restore the templet-gangs G axially.

It has been explained that when the roller 467 carried by the arm 468 of the bell crank 465, Fig. 24, moves off the dwell 471 and onto the periphery of the cam 469, the link 463, Figs. 24, 28 and 29, is pulled to thereby swing the arms 449 and 481 against the action of the restoring spring 457, Fig. 29, and this is effective to shift the slides 446 and 476, Figs. 29 and 35, to the left, as there shown. Such shifting of the slide 446 frees the positioning templets 212—U, 212—T, and 212—H and connected templet-gangs G—U, G—T, and G—H, respectively, to the action of the springs 451, 452, and 453 on the slide 446, for positioning the templet-gangs rotatively in accordance with the settings of those pins 445 which are responsive to multiplier digit representations in the control card as 6, Figs. 60, 61, or 62. Shifting of the slide 476, Fig. 35, in the manner just described, under the influence of the spring 482 on the rock arm 481, enables the slide to be positioned in accordance with the settings of the pins 445A and 445B, which pins are responsive to class designations such as the perforation 6A in the card 6, and such positioning of the slide 476 and abutments 487—U, 487—T, and 487—H carried thereby determines the transverse or axial positioning of the templet-gangs G for selecting a particular templet group, this having the effect of selecting a particular reoccurring factor.

The slides 446 and 476, are maintained in their aforesaid operative positions for a predetermined time and until the roller 467 again rides onto the dwell 471 of the cam 469, Fig. 24. This permits the spring 457 to act upon the rock arm 449 and shaft 450 and swing said arm and said shaft clockwise, as viewed in Fig. 29, to thereby swing the rock arm 481 clockwise, as viewed in Fig. 35. Such restoring movement of the rock arms 449 and 481 moves the slides 446 and 476 to the right and back to their normal positions shown in Figs. 29 and 35. As slide 446 is restored, the pins 454, 455, and 456 carried thereon engage the positioning templets 212—U, 212—T, and 212—H, respectively, and thereupon the templet-gangs are swung to their normal at rest positions, such return swinging movement being limited by engagement of the positioning templets 212 with the stationary stop pins 458. The normal inoperative position to which each templet-gang is restored is slightly beyond the position thereof corresponding to the digit 1, to provide clearance for the pin 445—1—2 in the event it is pushed in during the succeeding pin setting operation.

*Intermediate product representation selection and templet group selection operation*

To summarize, the templet-gangs are first operated, to be selectively positioned, rotatively under control of the multiplier factor representations in said card, and then axially under control of the classification data in the control card 6, and are subsequently restored axially and rotatively by the cams 499 and 469, respectively, Fig. 24. Slightly subsequent to this restoration of the templet-gangs to their normal at rest positions, a block 502 on the cam 503, Figs. 20, 20A and 21, which cam is fast on the cam shaft 470, moves into engagement with a roller 504 carried by an arm 505, Fig. 20A, fast on a shaft 506 which has one end journaled in a bearing 507 carried by the side plate 228. The other end of this shaft is journaled in a bracket 508, Figs. 20, 27 and 29, also secured to the outer face of the side plate 228.

A double-armed rocker 509 is fast on the shaft 506 and carrries pins 510, Figs. 20, 20A, 27 and 43, which extend across one face of plates 511 hung on the Bowden cables 430 that pertain to the various orders of the multiplier, each Bowden cable in these sets having an abutment as 512, Fig. 43, fast thereon, these abutments being disposed on the face of each plate 511 opposite that engaged by the pins 510. A single-armed rocker 513 fast on the shaft 506 is loosely and pivotally connected at its free end to the rod 474, Figs. 29 and 30, slidably mounted in the side plates 227 and 228. It will be recalled that the rod 474 carries the plate 473 in which are slidably mounted the pins 445A and 445B attached to the Bowden cables 430A and 430B which are responsive to the class designations in the control cards 6, Figs. 60, 61 and 62. The pins 445A and 445B have enlarged portions or abutments 514, Fig. 30, disposed intermediate the Bowden cables 430A and 430B, respectively, and the plate 473. The engagement of the block 502 with the roller 504 rocks the shaft 506 and the rockers 509 and 513 thereon in such a manner that the pins 510, Fig. 43, engage the plates 511 and force these plates into engagement with the abutments 512, and the plate 473, Fig. 30, engages the abutments 514, wherefore all of the Bowden cables 430 are forced back into zero position and in so doing any push pins 428, Fig. 6, which were pushed downwardly in the preceding detecting operation are restored

Drive for the multiplying apparatus

Two arms 515 and 516, Fig. 24, formed on one of the arms 517 of a rocker 518 (see Figs. 22 and 27) carry cam followers 519 and 520, a spring 521 extending between the arm 516 and the adjacent side frame member 235 and urging the cam follower 519 toward the periphery of the cam 522 fast on the cam shaft 470 of the multiplying apparatus M. A block 523 is provided on the side face of the cam 469 that is mounted on the cam shaft 470 adjacent the cam 522 and as the parts move into their at rest positions this block engages the cam follower 520 and in so doing pivots the rocker 518 to dispose the shaft 257 carried thereby in the position in which it urges the summation members as 229 into their upper positions described hereinabove to insure proper positioning of all the sensing fingers of the summation means associated with the various receivers in their respective zero positions.

Power is imparted to the main cam shaft 470 of the multiplying apparatus M through a pulley 524, Figs. 22 and 24, rotatably mounted on the shaft 470 by a belt 525 that passes about this pulley and about a pulley 526, Fig. 2, fast on the main drive shaft 19, a pulley 527 on the arm 528, Figs. 23 and 24, acting on a pass of the belt between these pulleys to serve as a belt tightener. A suitable one-revolution clutch, generally designated 529 in Figs. 22 and 26, is utilized to effect engagement of the pulley 524 with the cam shaft 470, and a solenoid 530 controls the operation of the clutch 529. A satisfactory clutch for this purpose is shown in detail in Figs. 23 to 25 of my co-pending application Serial No. 313,146 and is fully described in said application.

Referring again to Fig. 22, the pulley 524 is provided with a hub 538 having clutch teeth 533. A sleeve 535, slidably but non-rotatably mounted on shaft 470, carries clutch teeth 534 which are adapted to mesh with the clutch teeth 533. A cam plate 536, pivotally mounted on a stub shaft 537, Fig. 26, normally rests on the periphery of the hub 538 and by its camming action on a pin 539 fast in the sleeve 535, it maintains the clutch teeth 533 and 534 separated so that cam shaft 470 cannot be driven by the pulley 524. The core 540 of the solenoid 530 has an arm 541 pivotally connected thereto, and when this solenoid is energized to retract the arm 541, a lug on this arm engages the cam plate 536 to thereby withdraw the plate from the pin 539. A sleeve 542 is rotatably mounted on the sleeve 535, and is yieldably connected to a positioning cam 543 fast on the shaft 470 by a spring 544 which is normally under tension.

When sleeve 535 is released, in the manner just described, the spring 544 becomes effective to urge a cam surface on the sleeve 542 against the pin 539 to thereby urge the sleeve 535 to the left, Fig. 22, and engage the clutch teeth 534 with the teeth 533. Cam shaft 470 thereupon takes rotation with the pulley 524, and in the course of such rotation of the sleeve 536 the pin 539 disengages the lug on the plate 541 from the end of the cam plate 536 and the plate 536 then drops down and again rests on the surface of the hub 538.

Toward the end of a complete rotation of the cam shaft 470 the pin 539 on the sleeve 535 rides onto the cam surface of the plate 536 and the clutch teeth 533 and 534 are thereupon urged apart and the sleeve 542 is arrested. A roller 545 carried on a spring-urged arm 546 pivotally mounted on the stub shaft 537, Fig. 26, cooperates with the positioning cam 543 and when the clutch teeth 533 and 534 have been disengaged at the end of a complete revolution of the cam shaft 70, the roller 545 drops into a dwell in the cam 543 and thereby accurately centers the cam shaft 470. This slight additional movement of the shaft 470 and positioning cam 543 after the clutch teeth have been urged apart and the sleeve 542 arrested places the spring 544 under tension for the purpose stated hereinabove.

Thus, when the solenoid 530 is energized, in a manner to be explained, the clutch 529 effects engagement of the pulley 524 with the cam shaft 470 for one revolution of the cam shaft. In the course of rotation of the cam shaft, those summation members 229 to 234, inclusive, Fig. 27, which are to move, start to move downwardly. To this end a rise on the cam 522, Figs. 23 and 24, engages the cam follower 519 and thereupon the rocker 518 is pivoted in such a direction that the shaft 257, Figs. 27 and 35, starts to move downwardly and therefore the springs 253 act on the foot portions 251 and 252 to urge the receivers as 229 downwardly.

The pads 255, Figs. 20, 23 and 27, which carry the pins 254 to which the lower ends of the springs 253 are attached (the upper ends of these springs being connected to the feet of the summation members 229 to 234, inclusive, as aforesaid), are mounted for vertical sliding movement in a frame 531 (see also Fig. 27) which depends from the side plates 227 and 228, and the lower ends of the arms 256 are pivotally connected at 532 to these pads. The upper ends of the arms 256 are provided with bifurcations in which the shaft 257 is seated, the shaft 257 and arms 256 being maintained in engagement with each other by the tension of the springs 253.

Hence, as the rocker 518 is pivoted by the cam 522, to thereby lower the shaft 257 and force the arms 256 and pads 255 downwardly, each summation member as 229 of a summation means, including sensing fingers aligned with templets having steps Z thereon representative of significant digits in operative position, will move downwardly, but each summation member as 229 of a summation means in which the sensing fingers are aligned only with templets having steps Z representative of zero in operative position or whose sensing fingers are held against movement by blocks as 356, Fig. 35, in a manner as described hereinabove, will be prevented from moving downwardly so that the springs 253 associated with such summation members will merely stretch as the shaft moves downwardly. Furthermore, when every sensing finger associated with a particular summation member is seated, further movement of this summation member with the shaft 257 is interrupted and thereafter, as the rocker 518 completes its downward rocking movement controlled by the cam 522, the springs 253, connected to summation members whose further movement is arrested, merely stretch. The cam 522 includes a dwell that causes the summation members to remain in the positions so attained, in which positions, as has been explained, the summation members represent the digit of the final product in the order to which the particular summation member pertains, until the summation members have been sensed, in a manner to be explained, to enable set-up of means from which the final product is ascertained.

Later, as the cam 522 returns to its normal at rest position, shown in Fig. 24, in the course of rotation of the cam shaft 470, the shaft 257 moves upwardly and in the course of such upward movement engages the foot portions on those summation members that are out of zero position and moves these summation members back into their zero positions, the block 423 engaging the cam follower 520 near the end of the return movement of the cam 469 and forcing the shaft 257 into the upper position which assures that each summation member and its associated sensing fingers return to their zero positions. In the operation of the machine, the templet-gangs G are returned to their normal at rest positions under control of cams 469 and 499, Fig. 24, as has been described hereinabove, before such restoration of the summation members is completed.

When the summation members as 229 are in their upper positions, hereinabove referred to as their zero positions, these summation members are in reality in a position slightly beyond their true zero positions, this affording clearance for the various operative mechanisms associated therewith and included in the summation means of which each summation member is a part.

The rocker arms 387a, which carry the pivot pin or shaft 387 on which the escapement members 386 of the carry-over mechanism are mounted, are fast on the rock shaft 387b which has a rock arm 550, Fig. 23, secured thereto. The arm 550 carries a cam follower 551, and springs as 553 acting on the arms 387a tend to urge the follower 551 toward the periphery of a cam 552 fast on the cam shaft 470. However, follower 551 is normally maintained in spaced relation to the periphery of the cam 552, such spacing being insured by engagement of the shaft 387 with the upper edges of the openings in the side plates 227 and 228 through which this shaft extends.

When restoration of the carry-over mechanism is to be effected, along with restoration of the remainder of the summation means, as has been explained hereinabove, the shaft 387, Fig. 35, must be lowered slightly to disengage the teeth as 393 of the escapement members 386 from the ratchets as 391 of the carry arms as 263, but without disengaging the teeth as 390 from the ratchets as 391. To this end, the cam 552, Fig. 23, is provided with a rise which, at the proper time during rotation of the cam shaft 470, engages the roller 551 and rotates the arms 550 and 387a counterclockwise, as viewed in Fig. 23, against the action of the springs 553, to thereby effect lowering of the shaft 387, Fig. 35, and thus enable the escapement members 386 to function merely as detents during the restoration of the carry arms and associated planetary gear trains, this serving to prevent the summation members from being released to the action of their springs as 253 before the foot portions of these members are engaged by the restoring shaft 257.

The solenoid 530, Fig. 22, which controls the clutch 529 on the cam shaft 470 of the multiplying apparatus is energized in timed relation with the rotation of the shaft 71, Fig. 5, which shaft, it will be recalled, drives the mechanism that feeds the printing and control devices D from the magazine H. To this end, an arm 554 is provided on the shaft 71, and a switch 555 which is in circuit with the solenoid 530, Fig. 22, is mounted to be actuated by the arm 554 at a predetermined time in the rotation of the shaft 71. Closure of switch 555 momentarily, as it is engaged by the arm 554, energizes the solenoid 530 to thereby operate the clutch 529 and initiate a complete rotation of the cam shaft 470 of the multiplying apparatus.

It has been mentioned hereinabove that the solenoid 80, Fig. 4, which controls the clutch for the shaft 71 is energized under control of a timing switch as 161, Fig. 14, that is operated by a cam mounted on a timing shaft 156, which shaft is operated in timed relation with the form printing unit U. Hence it will be seen from the foregoing that the means for feeding the printing and control devices D and the drive for the cam shaft 470 of the multiplying apparatus M are all operated in timed relation with the operation of the form printing unit U, as are the other operative mechanisms in the machine.

To insure that operation of the machine will not continue if the summation members as 229 are improperly restored, a safety switch 556, Figs. 29 and 35, is mounted on the frame member 235 to be engageable by a pin 557 attached to the adjacent one of the arms 517 that carry the shaft 257 upon which the summation members as 229 are seated when in normal position. The pin 557 closes the switch 556 only when the arms 517 have ascended sufficiently to fully restore the summation members to their aforesaid zero positions. As is more fully explained in my copending application 221,841, referred to hereinabove, failure of the switch 556 to close at the proper time in the operation of the machine, thereby indicating that the summation members have not been properly restored to their zero positions, results in the deenergization of the solenoid 176, Figs. 14, 15 and 16, and release of the clutch 162 controlled thereby, it being recalled that this clutch controls operation of the timing switches 161 which govern automatic operation of the machine.

Briefly, the solenoid 176 is normally maintained energized by a holding circuit that is under the joint control of the safety switch 556, Fig. 35, and a certain one of the timing switches 161. The timing switch which so controls this holding circuit is periodically opened at the time in each cycle of operation of the multiplying apparatus M when the summation members should be fully restored, and if, at such time, the switch 556 is also open, indicating an abnormal condition, this holding circuit is broken and the timing switches 161 cease functioning, as has just been described, and therefore the automatic operation of the machine is suspended at the end of that particular cycle of operation. If, however, the summation members are returned to their zero positions to thereby close switch 556 at the same time said one of the timing switches 161 is opened, the aforesaid holding circuit is not broken, and automatic operation of the machine therefore continues.

*Operation of summation means*

The manner in which the summation means function as well as the carry-over mechanisms associated therewith can probably best be ascertained by referring to Figs. 46 to 50 which are diagrammatic views of the summation means pertaining to the hundreds order of the final product. In Figs. 46 to 50 these means are disclosed as performing the operation entailed in the multiplication of 999 by 999.

When a multiplication is to be performed, the various templet-gangs G are rotated into selected positions under control of the digits appearing in the various orders of the multiplier, each templet-gang being positioned rotatively according to the value of the digit in the order of the multiplier to which it pertains, and the several templet-gangs are also selectively positioned axially under control of the class designation which is to govern the particular computation to be performed, the foregoing positioning operations being effected in the manner described hereinabove. Such positioning of the templet-gangs disposes steps Z thereon in position for cooperation with the sensing fingers of the planetary gear trains associated with the summation members in the various orders.

Figure 46:
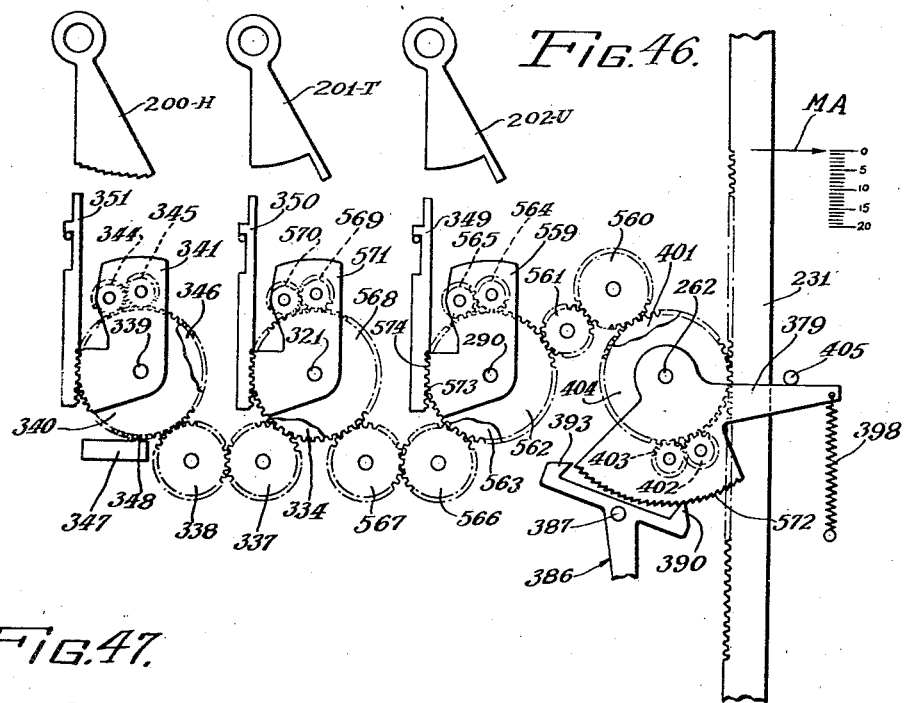

In the multiplication of 999 by 999, as may be readily ascertained by reference to the following longhand example of such multiplication:

```
      999
      999
     ----
     8991
    8991
   8991
   ------
   998001
``` in so far as the hundreds order of the final product is concerned, a step Z on the templet 202—U representative of 9 is to be disposed in position to cooperate with the sensing finger 349, a step Z on the templet 201—T representative of 9 is to be arranged for cooperation with the sensing finger 350, a step Z on the templet 200—H representative of 1 is to be arranged for cooperation with sensing finger 351, this positioning of these templets being shown in Figs. 47 to 50, the position of these templets prior to this, that is, the at rest position thereof, being shown in Fig. 46. Prior to the time the operation of summarizing the digits represented by the above positioned steps Z is initiated, the summation member 231, the planetary arms 559, 511 and 341 and the respective sensing fingers 349, 350 and 351 thereon and the carry arm 379 are disposed in the positions shown in Fig. 46 (see also Fig. 40).

The summarizing operation is initiated by causing the summation member 231 to move downwardly, this being effected by the spring 253, Fig. 35, effective thereon and being under control of the cam 522, Fig. 24, as aforesaid. At the start of the operation the tooth 390 on the escapement member 386 is engaged with a tooth of the ratchet 572 on the carry arm 379. Thus, when the summation member 231 starts downwardly, the carry arm 379 is held against movement and therefore downward movement imparted to the summation member 231 is transmitted from the member 231 through the sun gear 404 and planetary gears 403 and 402 to the sun gear 401 and thence to the pinions 560 and 561. The pinion 561 drives the sun gear 562 to thereby impart rotation to the planetary gear 565 meshed therewith and this causes the planetary gear 564 which is meshed with the planetary gear 565 to run over the teeth of the sun gear 563 and hence the planetary arm 559 which carries the planetary gears 564 and 565 rotates clockwise, as viewed in Figs. 46 and 47, about its axis 290.

Figure 47:
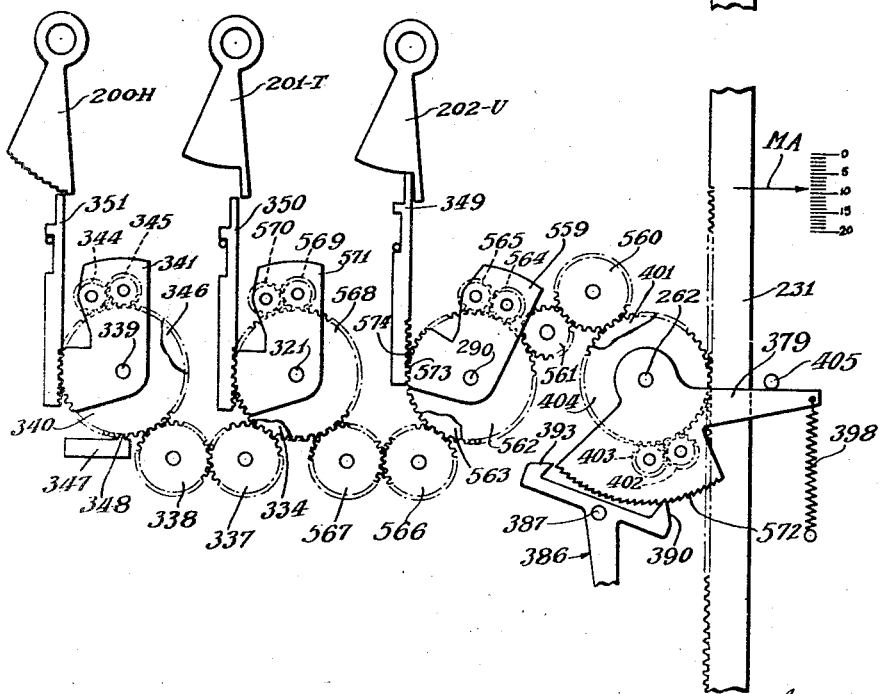

The planetary arm 559 has a rack 573 thereon which is meshed with a rack 574 on the sensing finger 349 so that clockwise rotation of the arm 559 serves to drive the finger 349 upwardly, as viewed in Fig. 47, until the finger 349 engages the step Z on the templet 202—U aligned therewith. Now if the digit represented by the step Z aligned with the finger 349 had been zero, the just described movement which is imparted to the sensing finger would only have been sufficient to take up the operating clearance between the edge a, Fig. 54, of the segment 202—U and the finger 349, which movement is not sufficient for the summation member 231 to move to a position in which it would represent a significant digit. However, since the step Z aligned with the finger 349 is disposed on the inwardmost of the arcs c, Fig. 54, of the templet 202—U, which represents the digit 9, the sensing finger 349, in this operation, continues to move until it engages this step and in so moving this finger and the summation member 231 move the equivalent of nine units since a step disposed on the inwardmost of the arcs c on any templet pertains to the digit 9, as has been explained hereinabove.

In order to indicate the movement of the summation member 231, as controlled by the setting of the sensing fingers as 349 on steps Z in operative position, a marking arrow MA is shown on the summation member 231 in Figs. 46 to 50 and a scale is shown associated therewith, it being understood that this is solely for the purpose of this description. As shown in Fig. 46, when the summation member 231 is at rest, prior to the initiation of its downward movement, the arrow MA is aligned with zero position on the aforesaid scale. When the sensing finger 349 has been advanced to the position shown in Fig. 47, in which it is in engagement with the step Z on the templet 202—U aligned therewith, the arrow MA will have advanced from 0 to 9 position on the associated scale. Thus the summation member 231 is in a digital position representative of 9 in Fig. 47.

By referring to Figs. 58 and 58A it will be seen that in the multiplication of 999 by 999 the templets 201—U and 200—T in the tens order of the final product are positioned to bring steps Z thereon representative of the digits 9 and 1, respectively, into sensing position along the summation line L—T; while the templets 202—U, 201—T and 200—H in the hundreds order of the final product display the digits 9, 9 and 1, respectively, along the summation line L—H as aforesaid. Hence both the summation members 230 and 231, Figs. 35, 40 and 47, in the tens and hundreds orders, respectively, move synchronously not only until the first sensing fingers in the associated summation means seat on aligned steps Z but also thereafter because all of the sensing fingers of these summation means will not yet be seated in the present example of the multiplication of 999 by 999. After the summation member 230 attains its ninth position, it continues to move toward its tenth position and in so doing the rack 306 thereon acts through the pinion 367 to so position a carry cam 372 that the escapement pawl 386 associated with the hundreds order summation means is actuated, first clockwise and then counterclockwise, as viewed in Fig. 47, to enable the carry arm 379 to be displaced rotatively clockwise in the amount of one tooth on the ratchet 572 thereon, the position attained by the carry arm 379 as the result of this movement being illustrated in Fig. 48.

The various steps entailed in performing the aforesaid carry-over entering operation are illustrated in detail in Figs. 51, 52 and 53. In Fig. 51 the carry cam 372 is shown in its normal position prior to the time it has been actuated by movement of the summation member 230, Fig. 35. As the pinion 367 and cam 372 are advanced by the rack 366 in the course of downward movement of the summation member 230 from a position representative of 0 to one representative of the digit 9, the lobe 384 of the cam 372 moves into a position where it engages the pawl 385a pivotally mounted on the escapement member 386. Then as the summation member 230 continues to move downwardly, inasmuch as the total value of the digits in the tens order of the product is 10, the lobe 384 pushes against the tapered surface of the pawl 385a and urges said pawl against the pin 385b on the escapement member 386 and the escapement member 386 is thereupon cammed outwardly or clockwise, as shown in Fig. 52. This causes the tooth 390 on the escapement member 386 to be pivoted about the shaft 387 from out of engagement with the ratchet 572 on the carry arm 379 while at the same time the tooth 393 of the escapement member 386 moves in position to engage the edge of the first tooth of the ratchet 572. The carry arm 379 advances clockwise, as viewed in Fig. 52, a distance of a fraction of a tooth on the ratchet 572, being restrained against further movement for the time being by the tooth 393 which is now in engagement with the edge of the first tooth of the ratchet 572. As the carry cam 372 advances from a position representative of the digit 9 to that representative of 10 or 0, the lobe 384 thereon moves out of engagement with the pawl 385a, as shown in Fig. 53, and the tooth 393 of the escapement member 386 is pivoted downwardly out of engagement with the first tooth on the ratchet 572, while the tooth 390 of the escapement member 386 moves back into position to engage the tooth on the ratchet 572 next succeeding the tooth with which it was previously in engagement. The entry of the carry digit is now complete and the carry arm 379 is in the position shown in Figs. 53 and 48.

When the sensing finger 349 contacted the step Z on the templet 202—U aligned therewith, further upward movement of this sensing finger was prevented and thereafter the rotative movement imparted to the sun gear 562 by the pinion 561 was transmitted through the planetary gears 565 and 566 mounted in the now stationary planetary arm 559 to the sun gear 563. Pinion 565 is thereupon driven by the sun gear 563 and in turn drives the pinion 567 to thereby drive the sun gear 568, Figs. 48 and 40, clockwise, as viewed in Fig. 48. Rotation of the sun gear 568 is transmitted through the planetary gear 570 to the planetary gear 569, which latter gear then runs over the teeth of the sun gear 334 and causes the planetary arm 571 to be rotated clockwise about its axis 321, as viewed in Fig. 48. Sensing finger 350, which is geared to the planetary arm 571, thereupon starts to ascend toward the aligned step Z on the templet 201—T.

The positions in which the parts are shown in Fig. 48 are those which they occupy at the instant the summation member 230, Fig. 35, has been advanced ten digital positions. It will be recalled that when the summation member 230 advanced from its ninth digital position to its tenth digital position, a carry-over was effected into the hundreds order, this being manifested by advance of the carry arm 379 clockwise as viewed in Fig. 48, in an amount equal to one tooth on the ratchet 572 thereof. Such release of the carry arm 379 for one digital step of movement enables the summation member 231 to be moved in an amount representative of a single digit. It has been explained that the sensing finger 349 advanced in an amount sufficient to enable the summation member 231 to move through nine digital positions. When the summation member 230, Fig. 5, in the tens order has reached a position indicative of the digital value 10, the sensing finger 350 in the hundreds order summation means will have advanced through one digital position starting from its true zero position, inasmuch as the preceding sensing finger 349 in the planetary gear train of which finger 350 is a part was moved through only nine digital positions. Thus, the digital values 9 and 1 which are represented by the positions of the sensing fingers 349 and 350, as shown in Fig. 48, plus a carry-over entry of 1 from the tens order constitute a total entry, thus far, of all into the summation member 231, this being indicated by the position of the arrow MA on the scale.

Sensing finger 350 continues to advance until it engages the step Z on the templet 201—T aligned therewith, which in the present example is a step representative of the digit 8. Hence the sensing finger 350 will have moved through eight digital positions from the position in which it is shown in Fig. 48 into the position shown in Fig. 49 wherein it is in engagement with the aligned step Z in the templet 201—T and therefore the arrow MA is positioned at the digital value of 19 on the scale, this being the sum of 11 plus 8.

Further advancing movement of the sensing finger 350 now ceases and rotative movement imparted to the sun gear 568 by the pinion 567 is transmitted through the planetary gears 570 and 569 mounted in the now stationary planetary arm 571 to the sun gear 334, which last gear in turn drives the pinions 337 and 338 to thereby impart rotative movement to the sun gear 340. Rotation of the sun gear 340 drives the planetary gear 343 to thereby drive the planetary gear 346 and cause the latter to run over the teeth of the sun gear 336. Planetary arm 361 thereupon commences to rotate clockwise, as viewed in Fig. 49, and drives the sensing finger 351 upwardly. The step Z on the templet 200—H which is aligned with the sensing finger 351 is, in the present example, representative of the digital value 1. Hence the sensing finger 351 advances through but one digital position from the position in which it is shown in Fig. 49 to that in which it is shown in Fig. 50 wherefore the summation member 231 advances through an additional step of movement and the arrow MA is advanced from 19 to 20 on the scale. As has been explained, the sun gear 346, Figs. 50 and 40, is blocked by a tooth 348 in the block 347, Fig. 35. Therefore the sun gear 346 cannot rotate when the sensing finger 351 and planetary arm 361 are arrested, and the summation member 231 is thereupon arrested in its downward movement so that the spring 253 attached to the foot of this summation member merely stretches as shaft 257, Fig. 35, continues to descend to the limit of downward movement thereof.

Thus, the total of the digits in the hundreds order of the final product appearing in the intermediate products set up by the templet-gangs G is 20. This necessitates a carry-over entry of 2 into the thousands order summation member 232, Fig. 40. This carry-over entry is accomplished as an incident to the summing up of the digits in the hundreds order and in a manner similar to that in which the carry-over entry was effected into the hundreds order summation member 231, as explained hereinabove. In the case of the carry-over entry into the thousands order, however, the escapement member as 386 in this order is actuated twice by the lobes as 383 and 384 of the carry cam 373, Fig. 41, which cam is driven by the summation member 231. This results in the carry arm 380, Fig. 40, in the thousands order being displaced two digital positions from its normal position to thereby effect the carry entry of 2 into the summation member 232.

The positioning or arresting of movement of the summation members as 231, in the above described manner, in selected of vertical positions, to be representative of the digits in the respective orders of a to be ascertained final product, controls the position of the recording means including the type segments as 630 and associated punches in a manner and for the purposes that will now be explained. First it should be noted, however, that it is the operation of the summation means associated with each summation member that determines the vertical positioning thereof, such operation of the summation means being determined by the positions at which the sensing fingers therein are held in at rest position or come to rest in the course of movement of a summation member as 231. It has also been explained that the sensing fingers, except those pertaining to carries, engage steps Z on templets in various ones of the templet-gangs, it being remembered that each templet-gang pertains to an order of the multiplier. Thus, each summation means performs an operation like that effected by addition in longhand multiplication wherefore, in effect, the operation of the present apparatus closely resembles longhand multiplication.

When the summation members 229 to 234, inclusive, have been set up to indicate the final product, the positioning members 602, Fig. 35, are released to the action of their springs 606, in the manner explained hereinabove, to be selectively positioned in accordance with the settings of the various summation members, the sensing fingers 601 on the members 602 cooperating with the index stops such as 600—I, 600—II, or 600—III on the summation members as 229 for this purpose. In this connection it should be stated that the springs 606 which act upon the members 602 have a relatively weaker action than do the springs as 253, when the latter are stretched after urging the summation members as 229 downwardly to the limits of movement thereof determined by the cooperation of the sensing fingers of the summation means with the steps Z on the templets. Therefore, the engagement of the fingers 601 on the members 602 with the index stops on the summation members as 229 does not disturb the settings of the latter members. The settings of the positioning members 602 determine the operative positions which the sensing bars 633 that cooperate therewith will occupy when setting-up of the variable printer and punching mechanism of the multiplying apparatus is to be effected in the manner to be presently described. However, before explaining the operation of this setting-up means, a description will first be given of the manner in which the summation means and associated parts are restored during the zeroizing operation thereof.

When the summation is to be restored, the shaft 257, Fig. 35, is elevated in the manner described hereinabove, for the purpose of restoring the summation members as 229 to their zero positions. However, prior to such restoration of the summation members as 229, the escapement members 286 are all pivoted downwardly as has been explained, to withdraw the teeth as 383 thereof from the ratchets as 572, Fig. 46, of the carry arms as 379 without disengaging the teeth as 390 from the ratchets 572. This enables the carry arms to be restored and at the same time prevents the summation members as 231 from being drawn down by the springs 253 and forcibly striking against the restoring shaft 257, such as might occur if the escapement members 386 were completely withdrawn from engagement with the carry arms as 379. The carry arms 263 and 271, Fig. 36, in the units and tens orders, respectively, are fixed permanently in the positions as shown in Fig. 35 by a pin 405a, shown also in Fig. 31, as aforesaid, inasmuch as no carry entries are effected into the units or tens order.

As the summation members as 229, Fig. 46, are restored to their upper or zero positions, the various gears and pinions in the planetary gear train associated with each summation member are driven in directions the reverse of those in which they were driven when the steps Z on the templets were being sensed by the sensing fingers of the summation means. The carry arms as 379 are the first members of the summation means to be restored, being returned into engagement with the pin 405. Thereafter the sensing fingers and planetary arms are successively restored in the same sequence in which they were rendered operative during the product-sensing operation. Thus, referring to Figs. 46 to 50, the sensing finger 349 and planetary arm 559 are first returned to their normal positions as shown in Fig. 46 and thereafter the sensing fingers 350 and 351 and their respective planetary arms 571 and 341 are successively restored.

The foregoing zeroizing operations takes place in each of the summation means as the summation members are returned to their zero positions and to insure that all the sensing fingers are firmly seated in their normal positions, the shaft 257 is imparted a slight momentary additional upward movement by the cam block 523, Fig. 24, acting upon the cam follower 520 as has been explained.

The positioning members 602, Fig. 35, are restored downwardly to their normal at rest positions concurrently with the restoration of the summation members as 229 upwardly to their zero positions. In the course of such movements of the positioning member 602 and the summation members as 229 relative to each other, the index stops as 600—I, 600—II or 600—III on the summation members may engage the sensing fingers 601 on the positioning members but such engagement of the index stops with the sensing fingers is in this instance of no effect for each sensing finger 601 is capable of being yieldingly rocked or snapped clockwise, as viewed in Fig. 35, about its pivot 623 against the action of its leaf spring 624; and hence the positioning members 602 and the summation members 229 to 234, inclusive can be restored concurrently. When, however, the summation members are moved downwardly with respect to the positioning members 602 during the intermediate product-sensing operation, it is essential that the sensing fingers as 601 be out of the path of movement of the index stops as 600—I, inasmuch as the sensing fingers 601 are limited in their counterclockwise rocking movement about their pivots 623 by the pins as 626 on the positioning members 602. To this end, as has been explained hereinabove, the positioning members 602 are restored downwardly until shoulders 627 on the sensing fingers 601 strike the stationary rod 628 so that the sensing fingers 601 are thereby caused to assume the positions as shown in Fig. 35 whereby the ends of these fingers are normally maintained out of the line of movement of index stops as 600—I during sensing movement of the summation members as 229.

*Sensing of the final product*

Mention has been made that positioning members as 602, Fig. 35, are provided for cooperation with the index stops 600—I, 600—II and 600—III on the summation members as 229, and that the digit-representing steps 604 thereon are selectively positioned for cooperation with similar steps 605 on the sensing bars 603 in accordance with the settings of the summation members as 229, the aforesaid disposition of the steps on the members 602 in operative positions representative of significant digits resulting from the seating of sensing fingers of the above described summation means on aligned steps Z of the templets, this all having been described previously.

It is the inter-engagement of the steps 604 and 605 that determines the positions assumed by the sensing bars 603, such positioning of the sensing bars representing a digital count. It will be understood that there are as many sensing bars 603 as there are positioning members 602 and therefore summation members as 229, each sensing bar being aligned with the positioning member cooperating with a particular summation member.

The sensing bars 603 are mounted in comb blocks 631 and 632, Fig. 23, these comb blocks being mounted between the side frames 234 and 235. The comb blocks have as many slots therein as there are sensing bars 603, there being six such bars in the present instance, as shown in Fig. 26. The slots in the comb bars are deeper than the vertical height of the sensing bars 603 and mounted on each comb block is a bracket as 633, Fig. 35, in which a roller as 634 is journaled, the upper part of the peripheries of such rollers lying above the bottom of the slots in the comb blocks so that the sensing bars as 603 ride on these rollers. The leading ends of the bars 603 are further guided in the combs 613 which guide the positioning members 602.

The sensing bars 603 are urged toward the positioning members 602 by springs as 635, Fig. 23, one end of each such spring being connected to a lug 636 on a punch slide 637 engaging the sensing bar 603, as described hereinafter, and the other end of each spring being connected to a pin as 638 carried by blocks as 639 secured to side frames 234 and 235. A lug 640 depends from each sensing bar 603 and engages a roller 641, mounted between the arms as 642 of a rocker 643 that is fast on a shaft 644 journaled in the side frames 234 and 235. An arm 645, Figs. 20 and 21, is fast on the shaft 644 outwardly of the side frame 236, this arm 645 being adjustably connected to the shaft 644, as shown best in Fig. 21, by a clamp plate 646. A cam follower 647 is carried by the arm 645 and is urged into engagement with the periphery of the cam 503 by a spring 648 extended between the arm 645 and a spring anchor on the side frame 236. The cam 503 is fast on the cam shaft 470 and, as best shown in Fig. 21, includes a substantially radially extending edge 649 which extends through the cam substantially to the hub thereof and provides a sharp drop on this cam.

In the course of operation of the machine the shaft 470 rotates counterclockwise, as viewed in Fig. 21, and when the edge 649 moves into alignment with the roller 647 the spring 648 causes the shaft 644 to be rotated counterclockwise, as viewed in Figs. 20 and 21, and upon such counterclockwise movement of this shaft the roller 641 starts to move to the left, as viewed in Figs. 20 and 23, and thereupon the springs as 635 start to move the sensing bars 603 in a direction such that the steps 605 are moved into cooperating relation with the steps 604.

If the positioning member 602 aligned with a particular one of the sensing bars 603 is in its uppermost position, (see Fig. 35A) it is representative of 0 and therefore the leading one of the steps 605 on this sensing bar 603 engages the leading of the steps 604 on the aligned positioning member 602 immediately after the sensing bars 603 are freed to the action of the springs 635 with the result that only the operating clearance between these steps is taken up. The movement incidental to this is not sufficient to cause the sensing bar to assume a position representative of a significant digit wherefore the sensing bar remains in its normal or at rest position which is indicative of 0.

Figure 35A:
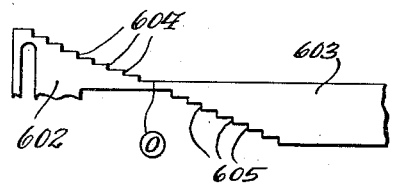
Figure 35F:
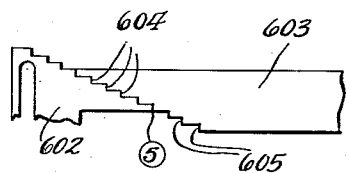
Figure 35B:
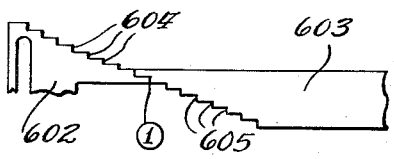
Figure 35G:
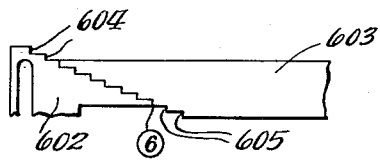
Figure 35C:
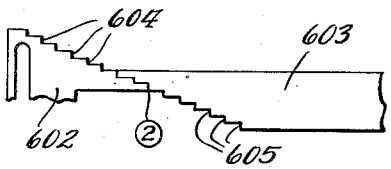
Figure 35H:
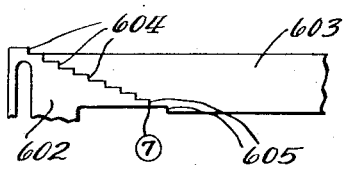
Figure 35D:
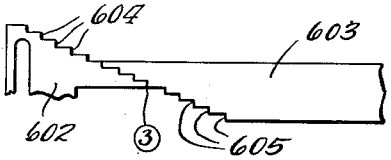
Figure 35I:
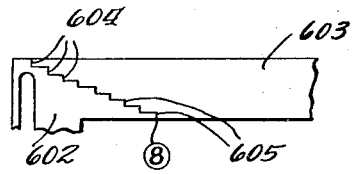
Figure 35E:
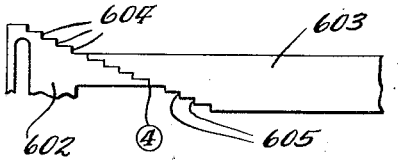
Figure 35J:
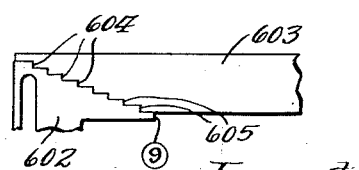

If, however, the aligned positioning member has been moved into a digital position representative of 1, (see Fig. 35B) then the second of the steps 604 thereon is in position to cooperate with the leading step 605 on the sensing bar 603 and the engagement of these two steps arrests the sensing bar in a digital position representative of 1, such cooperation of the parts being shown in Fig. 35B. Now as the positioning member is positioned farther downwardly in positions representative of succeeding significant digits, the leading step of the steps 604 moves successively farther below the position in which it may be engaged by the leading step 605 and in such event the leading step of the steps 605 engages succeeding ones of the inward steps of the steps 604. Depending upon how the steps 604 and 605 move into cooperative relation, the sensing bar 603 is arrested in positions representative of the digits, such cooperation of the steps being such that the sensing bar 603 successively comes to rest in positions representing significant digits in ascending sequence as more inwardly disposed of the steps on both the member 602 and the bar 603 interengage, the magnitude of downward movement of the associated summation members and therefore the index stops carried thereon determining the particular digital value in each instance. Positive interengagement of the steps 604 and 605 in various digit representing positions is assured by providing a plurality of such steps in each series thereof. The specific manner in which such steps interengage to afford different digital positionings of the sensing bar 603 is illustrated in Figs. 35A to 35J, inclusive.

When a summation member moves downwardly in such an amount that it is in a position representative of ten, or twenty, digits, then the leading step 604 on the positioning member 602 moves up into alignment with the leading step 605, as has been explained hereinabove, and in this instance again the aligned sensing bar 603 is prevented from moving forward and is maintained in its zero position. However, the cooperation of the other of the steps 604 on the positioning member 602, with the steps 605 on the aligned bar 603, in accordance with the units components of digital values in the higher notations entered in the summation member, again arrests this bar in positions representative of significant digits depending upon which of the steps 604 or 605 interengage in each instance.

*Setting up and printing means of the variable printer*

It is the disposition of each sensing bar 603 in a digit representing position that positions the digit printing type characters on the type segments 630 in printing relation with the platens 650, the operation of the platens 650 printing the variable data V on the sheets S from type characters on the type segments 630. Positioning of the type characters on the type segments 630 in printing position is effected through racks 651, Fig. 23, slidably mounted, for the purpose to be explained presently, on each of the sensing bars 603 but connected thereto through pin and slots connections, gear segments 652 meshing with these racks. The gear segments 652 are mounted on the shaft 653 for pivotal movement thereabout. Each type segment 630 includes an arm 654, Fig. 23, which has an enlarged opening therein at the free end thereof through which a screw 655 is freely passed, such screw being tapped into an adjacent gear segment 652, this arrangement connecting the respective type segments and gear segments and affording adjustment therebetween to insure that the digit printing type characters on the type segments will be aligned in proper printing relation with the platens 650 when the related sensing bar is disposed in its various digital positions and also to insure proper alignment of the blanking character printing type characters, as will be explained. The arrangement is such that when the connected sensing bar 603 is in its 0 position the type character on the connected type segment 630 for printing 0 will be in printing position, the type segments pivoting clockwise, as viewed in Fig. 23, to successively bring the type characters for printing the digits 1 to 9 into printing relationship with the platens 650.

In the present instance the variable data V which is printed on the sheets S is a sum of money which, of course, includes two orders of cents and in the present instance four orders of dollars, the illustrated multiplying apparatus M being capable of printing only in six orders. A pin 656, Figs. 22 and 23, is fast in one of the collars on which the type segments pivot and the upper end thereof lies in the printing plane of the type characters on the type segments 630 and serves to print a period (.) between the tens order of cents and the units order of dollars.

Now it is always desirable to print zeros in so far as cents are concerned when no significant digit appears in these orders, but in those instances where the sum of money does not extend into as many orders of dollars as there are type segments for printing orders of dollars, there being four such type segments in the present instance, it is desirable that blanking characters as stars or dollar signs be printed in those orders higher than that in which the first significant digit appears. In the present instance all type segments 630 from which digits in an order of dollars may be printed bear such a blanking character in a position on the type segments beyond the zero type character thereon and means are provided for bringing these blanking characters into printing position when the need so to do arises.

It has been noted that the blanking character printing type characters are located in a position beyond zero position which requires, to position these characters in printing position, movement of the type segments 630 in a direction opposite to that in which such segments move to dispose the significant digit printing type characters in printing position. However, if the sensing bars 603 were moved from their zero positions, in the direction required to bring the blanking character printing type characters into printing position, then punching means, described hereinafter and which are set up by the sensing bars, would be incorrectly positioned. Hence in order to permit the type segments 630 to be moved in the direction required to bring the blanking character printing type characters into printing position without requiring corresponding movement of the sensing bars 603, the following arrangement is provided.

The racks 651, with which the gear segments 652 mesh, and which gear segments operate to position the type segments, are mounted on the sensing bars 603 for limited movement relative thereto, in a direction such that when a rack moves along the sensing bar on which it is mounted the associated gear segment acts to position the blanking character on the associated type segment 630 in printing position. To this end the lower edges of the blocks 657, Figs. 23A and 24A, on which the racks 651 are formed, are slotted as indicated at 657'. Slots 658 are provided in the upper edges of the sensing bars 603 and the slots in the bottoms of the blocks 657 embrace the bottoms of such slots so that the blocks 657 are movable along the sensing bars 603 between the ends of the slots 658. Each block 657 also includes a depending leg 659, Fig. 24A, which overlies one face of the associated sensing bar 603 and which has slots 660 therein. Pins 661 extend through the slots 660 and in cooperation with the slot in the lower edge of the block 657 hold the block against displacement.

The blocks 657 are normally held in the position shown in Figs. 23, 23A and 24A by springs 662 that are mounted in slots 663 provided in the sensing bars 603. When a blanking character is to be disposed in printing position the associated block 657 is moved against the action of the connected spring 662 but at all other times the springs 662 retain the blocks 657 in such position that the blocks move with the sensing bars as if they were integral parts thereof.

The means which position the blanking characters in printing position include pawls as 664, Figs. 23, 23A, 25A and 26, such pawls being provided for only in orders that pertain to dollars, it being understood that blocks 657 are provided only for such orders, the racks 651 being directly provided in the sensing bars 603 for the orders pertaining to cents wherein 0, rather than a star or other blanking character, is printed. The pawls 664 are pivotally mounted on a shaft 665, Figs. 23, 23A, 25A and 35, carried by an arm 666, of a bell crank lever, generally indicated by 667, Figs. 23 and 23A, that is mounted on a stub shaft 668 carried by the side frame 235. The arm 669 of the bell crank lever 668 has a cam surface thereon with which there is aligned a roller 670, Figs. 22, 24A and 25A, that is mounted on the shaft carrying the roller 641, Fig. 23, which shaft is mounted at the upper ends of the arms 642 of the rocker 643 and which rocker, as stated heretofore, is pivoted counterclockwise, as viewed in Figs. 23 and 23A, when the roller 647, Fig. 21, travels down the edge 649 of the cam 503. Shoulders 671, Fig. 23, on the pawls 664 are urged toward lugs 672 on the racks 651 on the sensing bars 603 by the teeth of a comb spring 673 that is carried by a bracket 674, Figs. 23A and 26, secured to the side frame 235. When the parts are in at rest position, however, the tapered ends 675, Fig. 35, on the pawls 664 engage a pin 676 carried by the bracket 677 mounted on the frame 235, Fig. 23A.

The shoulders 671, Fig. 23, and the lugs 672 are so spaced and located with respect to each other that when any dollar sensing bar 603 is moved into a position representative of a significant digit the lug 672 on the rack 651 on this bar is disposed, to the left as viewed in Figs. 23 and 23A, beyond a position in which the shoulder 671 on the aligned pawl 664 can engage such lug. When, however, a sensing bar remains in its zero position, the lug 677 on the rack 651 on this bar remains substantially in the position shown in Figs. 23 and 23A, in which position the shoulder 671 on the aligned pawl 664 may engage therewith unless this pawl is rendered inoperative in a manner that will be described presently.

Each shoulder 671 is adapted to cooperate with a lug 672 on the aligned sliding block 657 of the corresponding sensing bar 603 in the event that such sensing bar remains in zero position at a time in the cycle of operation when it should have attained a position representative of a significant digit, and such interrelation in timing of the parts is attained by reason of the fact that the roller 670, Fig. 22, is mounted on the same rocker 643, Fig. 23, as that which permits the spring 635 to move the sensing bars 603. This roller 670 acts on the cam surface of the arm 669 to pivot the bell crank lever 667 against the action of its retaining spring 678 in an amount sufficient to disengage the tapered ends 675 of the pawls 664 from the pin 464 and thereby enable the teeth of the comb spring 673 to seat the shoulders 671 on the lugs 672 on the racks 651 on the sensing bars 603 that are in zero position at the time described above. If a shoulder 671 is seated on a lug 672 the roller 670 continues to move across the cam surface on the arm 669 and in so doing pivots the bell crank 667 in such a manner that the engaged lug and rack of which it is a part is moved to the right, as viewed in Figs. 23 and 23A. Such movement of the rack acts through the aligned gear segment 652 to pivot the connected type segment 630 counterclockwise, as viewed in Fig. 23, which brings the type character for printing the blanking character into printing position with the aligned platen 650, there being a dwell on the cam surface of the arm 669 which retains this type character in this printing position until an impression has been made therefrom.

It will be recognized that when the pawls 664 operate to move the racks 651 in a direction such that a blanking character will be brought into printing position, the power necessary for effecting this may be derived from the spring 648, Fig. 21. If the pawls 664 were moving several of the racks 651, the spring 648 would need overcome the effect of the several springs 662, Fig. 23. In order to avoid making the spring 648 sufficiently strong to enable this to be accomplished, I have provided an arrangement whereby, at a time when the pawls 664 will be moving racks engaged thereby, direct drive may be imparted to the rocker 643 to enable the necessary number of the racks 651 to be moved. To this end a roller 679, Fig. 21, is provided on the cam 503 and at the time the racks should be moved by the spring 648 this roller moves into engagement with a foot portion 680 on an arm 681, pivotally mounted on the shaft 644 and having an arm 682 fast to the arm 645. The roller 679 remains in engagement with the foot portion 680 for a period of time sufficient to effect the necessary rearward movement of any racks 651 engaged by the shoulders 671 of pawls 664, and when the racks have been moved into the rearward position to be attained thereby, which is to say, at the time the roller 670 is on the dwell of the cam surface on arm 669, the roller 679 moves from the foot portion 680 and again places the rocker 643, Figs. 20 and 23, under control of the spring 648 and the cam 503. The spring 678, Figs. 23 and 26, acts on the bell crank 667 to maintain the cam surface on arm 669 in engagement with the roller 670 and insures proper positioning of the bell crank 667 and therefore the pawls 664 in the various operative positions attained by these parts in the operation of the machine.

In an instance where an amount such as 103.65 is to be printed, pawls 664 will act in the just described manner to dispose the type segments pertaining to orders above the hundreds order of dollars in such position that the blanking characters thereon will cooperate with the aligned platens 650, and if some means were not provided for suppressing the action of the pawls 664 the type segment pertaining to the tens order of dollars would be moved by the pawls to dispose the blanking character thereon in printing position. Therefore, in such an instance where a zero is to be printed in an order below the highest order in which a significant digit appears the pawls 664 aligned with the sensing bars 603 pertaining to such lower orders are rendered ineffective. To this end each pawl 664 has a lug 683, Figs. 10A, 12A and 35, thereon which extends beneath the pawl pertaining to the next lower order. Now it will be understood that when a lug 672 on a rack 651 passes beyond a position in which the shoulder 671 on the aligned pawl 664 can seat thereon, then the lower edge of the pawl seats on the top edge of the associated lug 672 and is therefore maintained in what may well be called an upper position. When any such pawl is retained in such an upper position the lug 683 thereon engages the underside of the pawl cooperating with the sensing bar 603 pertaining to the next lower order, this progressing on down to and including the units order of dollars from any pawl cooperating with any sensing bar pertaining to any order above the units order of dollars. The engagement of these lugs 683 with the underside of these pawls 664 holds all of such pawls 664 in an upper position and prevents the shoulders 671 thereon from seating on their cooperative lugs 672 and therefore those type segments pertaining to orders of dollars below the highest order in which the significant digit appears remain with their type characters from which zero may be printed in position to have zeros printed therefrom. No lug 663 is provided on the pawl pertaining to the units order of dollars and no pawls 664 are aligned with the sensing bars pertaining to cents. Therefore zero will always be printed by the type characters on the type segments 630 pertaining to cents when these type segments are not set to print significant digits.

After an impression has been made from the type characters on the type segments disposed in printing relation with the platens 650, in a manner to be described presently, the sensing bars 603 and the type segments 630 are returned to their normal at rest or zero positions and in the present instance this is effected by engagement of the roller 679, Fig. 21, with the arm 645, this occurring in so far as the timing of the machine is concerned shortly after the roller 679 has moved from engagement with the foot portion 630. When the roller 679 engages the arm 645, it drives the rocker 643 in a clockwise direction, as viewed in Fig. 23, and in so doing causes the roller 641 to engage the depending lugs 640 and return the various sensing bars 603 and the type segments 630 slightly beyond their normal at rest, which is to say, zero positions. As the roller 679, Fig. 21, moves past the arm 645, the roller 647 on this arm drops back onto the periphery of the cam 503 and thereby accurately locates the sensing bars 603 and type segments 630 in their zero positions.

The pawls 664 are returned to a normal at rest position out of engagement with the racks 651 in the course of movement of the rocker 667 clockwise, as viewed in Fig. 23, and in the course of such movement the tapered ends 675, Fig. 35, on these pawls ride into engagement with the pin 676 which causes the pawls to ride up into the position shown in Fig. 23, which is the at rest position thereof.

When type characters on the type segments 630 are disposed in printing position they are located with respect to the platens 650, there being a platen 650 in alignment with each type segment. These platens are mounted for pivotal movement about a shaft 684, as has been previously stated. Each platen 650 includes an arm 685, Fig. 23. Springs 686 extend between these arms and are anchored to the side frames 235 and 236, these springs serving to urge the arms 685 into engagement with a roller 687 mounted between the arms 688, Fig. 22, of a rocker, generally indicated by 689. The rocker 689 is pivoted on a shaft 690, Fig. 23, that extends between the side frames 235 and 236 and springs as 691 are effective thereon to urge the arm 692 on this rocker into engagement with an abutment 693 at the upper end of a lever 694 that is pivotally mounted on a stub shaft 695, Fig. 20, carried by the side frame 236. The lever 694 has a cam follower 696, Fig. 23, at the lower end thereof and the action of the spring 691 urges this cam follower into engagement with the periphery of a cam 697 fast on the cam shaft 478.

In the course of rotation of the cam shaft 478 a substantially radial edge of the cam 697 moves into alignment with the cam follower 696 and thereupon the platens 650 are freed to the action of the springs 686 that so act on the arm 685 thereof that the platens are snapped toward the type characters on the type segments 630 in printing position to strike a sharp blow and thereby make a clear impression from these type characters through the ink ribbon IRa, thus printing the variable data V on the check S disposed therebelow, the check having been so disposed by operation of the sheet feeding means disclosed in my co-pending application Serial No. 268,182, filed April 17, 1939, which application is a division of my aforesaid co-pending application Serial No. 221,841. When the cam follower 696, Fig. 20, rides back onto the circular periphery of the cam 697, the platens 650 are restored to their upper at rest position. A comb 698, Figs. 20, 22 and 23, mounted on a block 699 carried by the side frames 235 and 236 is arranged to have the platens 650 positioned in the slots between the teeth thereof, and this serves as a guide for the platens 650 in the movement thereof to effect a printing operation.

It is of course desirable that the impression of the variable data V on a check S be neatly effected and to this end it is advantageous to accurately align the various characters for printing these data one with the other. To this end notches 700, Figs. 20 and 23, are provided in the face of their gear segment 652 beyond the extent of the gear teeth therein and these notches are accurately located with respect to the type characters on the type segments 630, the uniform spacing of the type characters and notches and the adjustable inter-connection between the type segments 630 and the gear segments 652 afforded by the screw 655 enabling this to be effected. A substantially V-shaped block 701, Figs. 22 and 23, extends between and ties together with arms as 702 of a rocker that is pivotally mounted on the shaft 703 and which rocker is acted on by a spring 704 that urges an apex on the V-shaped block 701 toward the notches 700. Arms 702 are connected by a pin and slot connection to the upper end of a lever 705 which is mounted for pivotal movement about the shaft 644 and has a cam follower 706 at the lower end thereof which, under the influence of the spring 704, is urged into engagement with the periphery of a cam 707.

At a time in the cycle of operation after the type characters on the type segments 630 have been disposed in printing relation with the platens 650 and prior to the time these platens are freed to the action of the springs 686, a substantially radially extending edge on the cam 707 moves into alignment with the cam follower 706 and thereupon the spring 704 snaps the apex on the V-shaped block 701 into the V-shaped notches 700 related to the type characters in printing position, and since all of these notches are engaged by the same straight edged member and since, as has been stated heretofore, these notches are accurately positioned with respect to the type characters, it follows that the type characters on the type segments 630 are brought into accurate alignment one with the other so that a neat impression may be made therefrom.

The punching mechanism

In the present instance the sensing bars 603 not only set up the type segments 630 so that an impression can be made from these type segments of an amount determined by an operation of the multiplying mechanism M, but these sensing bars also control the setting up of punch slides 637, Fig. 23, which are part of a punching mechanism for producing perforated records concurrently with the production of printed records by the variable printer of the multiplying apparatus. The punching mechanism is fully disclosed in my aforesaid co-pending application, Serial No. 221,841, and reference may be had thereto for a detailed description.

Briefly, the punching mechanism comprises a plurality of the punch slides 637, each such slide having a lug 636 thereon to which the springs 635, mentioned hereinabove, are attached. Each lug 636 has a depending portion which seats in a complementary recess in the sensing bar 603 as shown in Fig. 23. Hence, each punch slide 637 is positioned in accordance with the setting of its sensing bar 603. A punch 710 is mounted in a suitable vertical guideway in each punch slide 637 and is normally maintained in raised position by suitable yielding means so that the lower end of the punch 710 does not protrude into the slot 711 formed in the slide 637. The punch slides 637 are supported for horizontal movement with the sensing bars 603 by a bed plate 712 secured to the frame 713 of the punching mechanism.

At the proper time in the operation of the machine, after the sensing bars 603 have been selectively positioned in accordance with the product ascertained by the multiplying apparatus M, a card C is fed from a suitable card magazine 714 by suitable feeding mechanism, not completely shown herein but disclosed in said copending application 221,841, and is advanced to be positioned in the slots 711 of the punch slides 637. Inasmuch as the punch slides 637 are selectively positioned in accordance with the seating of the sensing bars 603 and type segments 630, the punches 710 mounted in these slides are aligned with index point positions in the card disposed therebelow which are representative of the numerical amount represented by the settings of the sensing bars 603. Inasmuch as no blanking characters are employed in the punching mechanism, as has been explained hereinabove, the punches 710 are positioned in accordance with true numerical values and hence in each order of digits above the highest order in which a significant digit appears there will be a punch 710 aligned with an index point position in the card which is representative of zero.

A plate 715 is mounted on vertical posts 716 above the heads of the punches 710. The posts 716 are mounted in the frame 713 of the punching mechanism for vertical reciprocatory movement therein and compression springs 717 are disposed between fixed collars 718 on the posts 716 and the frame 713. The springs 717 tend to force the posts 716 and plate 715 downwardly but are normally restrained from so doing by a lever 719, one arm 720 of which carries a roller 721 that is in engagement with an adjustable stud 722 fast in a plate 723 to which the lower ends of the posts 716 are secured. The lever 719 is pivotally connected to the frame 235, as indicated at 724, and an arm 725 of this lever carries a cam follower 726, Fig. 25, which is urged against the periphery of a cam 727 on the cam shaft 470 by the action of the springs 717, Fig. 23. The cam 727 is provided with a dwell having a radial edge 728 therein.

In the course of operation of the machine, after the punch slides 637 have been positioned under control of the multiplying apparatus M, the radial edge 728 moves into alignment with the cam follower 726 and thereupon the lever 719 and posts 716 are freed to the action of the compression springs 717. This causes the plate 715 secured to the posts 716 to descend and force the punches 710 to penetrate the card which is disposed in the slots 711 of the punch slides 637.

As the cam follower 726, Fig. 25, moves back onto the circular portion of the cam 727, the plate 715 and punches 710 are elevated to enable the card to be fed away from the punching station.

It can be seen from the foregoing that the multiplying apparatus M controls the production of punched record cards as well as printed record sheets. The record cards which have thus been prepared can be conveniently utilized to control other machine operations, such as printing a duplicate of the record produced by the variable printer onto a proof sheet at the addressing station in the machine, or such cards can be utilized in other machines to control operation thereof.

OPERATION OF THE MACHINE

In the following description of machine operation reference is made particularly to the illustrated embodiment of my invention in which, in addition to the multiplying apparatus, a number of other machine units are provided, for example, the web withdrawing and severing means, platen P, and form printing unit U, all of these machine units being required for the production of a complete record sheet such as S, Fig. 59. The description, however, will be chiefly directed to the operation of the multiplying apparatus M and only such references will be made to the operation of other units of the machine as are essential to an understanding of my invention.

It will be assumed, for purposes of illustration, that the first printing and control device D to pass through the sensing position in the machine is that shown in Fig. 60, this device D having a control card 6 provided with perforations therein representative of a multiplier factor of 999 (this being the number of shares of stock owned by the stockholder whose name appears on the identification card 5) and a perforation 6A which indicates that the group of templets allocated to the first class of stockholders is to be selected. The second printing and control device D to pass through sensing position will be one which has a control card 6 perforated as illustrated in Fig. 61, this card having perforations therein representative of the quantity 702 for the number of shares of stock and a perforation 6B which designates the second class of stockholders. The third printing and control device D to be sensed will be that having a control card 6 perforated as shown in Fig. 62, which is to say, having perforations representative of the quantity 345 for number of shares of stock and having neither a perforation 6A or a perforation 6B therein to thereby indicate the third class of stockholders.

Prior to setting the machine into automatic operation, and as is explained more fully in my co-pending application, Serial No. 221,841, referred to hereinabove, the web withdrawing and severing means is operated to sever a sheet S from the web W led from the roll R, Figs. 1 and 2. In this operation the date E and signature B, Fig. 59, are printed on the sheet S. After being severed from the web W the sheet S is fed through the sheet guideways G, Figs. 3 and 23, to a position beneath the platens 650 of the multiplying apparatus M. Likewise, in this preliminary operation of the machine, the first printing and control device D, Fig. 60, is fed from station I in the magazine H to the sensing station II, Figs. 5 and 7, where it is disposed in position to have the control card 6 sensed by the detector 410 in a subsequent machine operation.

To initiate automatic operation of the machine, the solenoid 176, Fig. 14, is energized under control of a start-stop switch SS, Fig. 3, and a holding circuit is thereupon established and maintained for this solenoid so long as normal operation of the machine continues. Energization of solenoid 176 effects engagement of clutch 162, and this sets the timing cam shaft 156, Fig. 14, into rotation for governing automatic machine operation. At the initiation of such operation, the machine performs certain of its functions idly, and following this the functions become effective in an operative sequence.

One of the first effective machine functions to be performed is that of retracting the carrier bars 22 and 23, Figs. 8 and 12, of the printing and control device feeding mechanism rearwardly or to the right, as viewed in Fig. 8, so that the pawls 48 and 49 thereon may be positioned to the rear of the second printing and control device D in position I at this time and to dispose the pawls 51 and 52 behind the first printing and control device D in position II.

As shown in Fig. 64, the timing chart illustrating the times of operation of parts included in the multiplying mechanism M, rearward movement of the carrier bars 22 and 23 is initiated at the point 750 at which time the detector 410, Fig. 5, starts its downward movement and those sensing pins 415, Fig. 6, of the detector 410 which are aligned with perforations in the control card 6 descend through such perforations and act upon the corresponding push pins 428 to thereby actuate the Bowden cables 430 attached thereto. Inasmuch as the first device D bears a class-representing perforation 6A, the Bowden cable 430A, Figs. 30, 33 and 35, is actuated to effect positioning of the slide 476 in the first of its selected positions so that the abutments 487 thereon are in position to co-operate with the inwardmost steps on the blocks 488 of the templet-gangs G. Concurrently with such sensing of the class designation, the multiplier factor representations are sensed, and in this operation the pins 445—9, Figs. 29 and 44, associated with each of the templet-gangs G—U, G—T and G—H, are pushed in to control setting up of the templet-gangs rotatively in accordance with the digit 9, it being recalled that the multiplier factor is 999, such pushing of the pins as 445—9 being completed by the time the point 751 is attained.

Once the Bowden cables 430 have been selectively positioned by the sensing pins of the detector 410, they retain such operative positions until restored to their normal positions by subsequent actuation of the rockers 509 and 513, Fig. 20. Hence when the Bowden cables have been operatively positioned, restoration of the detector 410 to its upper position shown in Fig. 5 may be initiated, this being initiated in the illustrated embodiment of the machine and as shown on the timing chart, Fig. 64, at the point 751, it being completed at the point 752. The templet gangs G are now positioned rotatively in accordance with the multiplier factor 999 and are moved axially to their extreme left-hand positions, as viewed in Fig. 43, whereby the most right-hand templet in each cluster C is disposed in sensing position, these templets constituting the first group which, in the illustrated set-up of the machine, pertains to the reoccurring factor 999 or $9.99 per share.

In so far as the timing of the just referred to operations is concerned, rotative movement of the templet-gangs is initiated at point 753, Fig. 64, immediately after the lowering operation of the detector 410 has been completed and concurrently with this, that is, at the point 753a, the stops 487 for determining the axial movement of the templet-gangs are set in operation. Rotative movement of the templet-gangs is completed by the time the point 754 is attained and at the point 754a, the stops 487 are disposed in the positions to be occupied thereby. Consequently, at the point 754b, axial movement of the templet-gangs is initiated, and this movement is completed by the time the point 755 is attained, wherefore the templet-gangs are so arranged that the particular steps Z thereon that are to be operative in the operation being carried out in the machine are disposed in operative position.

Subsequent to the aforesaid restoration of the detector 410 to its normal position shown in Fig. 5, the carrier bars 22 and 23 of the printing and control device feeding mechanism start to move forwardly to advance the first printing and control device D which was at sensing position II to the printing position III beneath the platen P and to advance the second printing and control device which was in position I to sensing position II.

The summation means of the multiplying apparatus M is set in operation as soon as sufficient time has elapsed to enable steps Z on the templets to be disposed in operative position and, in the illustrated embodiment of the invention, the summarizing movement of the summarizing means is initiated at the point 756 which, as can be seen by reference to Fig. 64, is a point in the matter of timing closely following the point 755 at which point 755, in the timing operation of the machine, the steps Z are in operative position. When the summarizing means is thus set in operation the intermediate products set up in sensing position by the selected of the groups of templets in the templet-gangs G are sensed and the digits in the various orders of the final product are summarized, carry-overs resulting from such operation being effected as an incident thereto. The summation members 229 to 234, inclusive, Figs. 27 and 35, are positioned in accordance with the sum of the intermediate products represented by set up of the templet-gangs G—U, G—T and G—H and sensed by the summation means by the time the point 757 is attained, for the elapse of time between the points 756 and 757 is sufficient to enable the summation members to complete the longest movement of which they are capable. As soon as such movement of the summation members has been completed at the point 757, as stated, and at the point 758 very closely following, in point of time, the point 757, the positioning members 602 are released and are selectively positioned under control of the summation members to represent the final product 998001, in the particular operation being described, such movement of the positioning members 602 being completed by the time the point 759 is attained.

Inasmuch, as stated above, carry-overs are made while a summarizing operation is in progress, it is essential that the escapement members 386 of the carry-over means be conditioned for operation so that in the event the need for a carry arises, such members may operate to effect the carry. Thus, at the point 760, very closely following in point of time the point 756, at which time the summation members are set in operation, the escapement members 386 start to move to their upper position, and this position is attained by the time the point 761 is reached, the escapement members remaining in this upper position until the point 762 is attained, at which time the escapement members 386 are restored to their lower position where they serve as detents rather than escapement members, such position being attained by the time the point 763 is reached.

It will be noted that the escapement members 386 are restored to their lower position to serve as detents concurrently with the initiation of a restoring movement of the summation members, such restoring movement being initiated at the point 763a. Thus, between the points 757 and 763a, during which time the summation members dwell in their set-up position, it is necessary that whatever product the positioning members 602 are set to represent be sensed in order to set up the means under control of such positioning of the positioning members 602.

Hence, when the positioning members 602 of the summation means have been selectively positioned in accordance with the ascertained final product, which position is attained at the point 759, as hereinabove explained, the sensing bars 603 may be released to be selectively positioned in accordance with the settings of the positioning members 602. Thus, in a point of time very shortly after the time at which the point 759 is attained and at the point 764, the sensing bars 603 may be set in operation to bring the steps 605 thereon into cooperation with the previously positioned steps 604 on the positioning members 602, this movement of the sensing bars 603 being completed by the time the point 765 is attained. In the course of such movement of the sensing bars 603, the type segments 630 of the variable printer and the punch slides 637, Fig. 23, are selectively positioned. It will be recalled that the pawls as 664, Fig. 23A, which are effective to bring about printing of blanking characters, where this is necessary, or to enable the printing of zeros, where this is necessary, as explained hereinabove, need to be set in operation at the same time as that in which the sensing bars 603 are set in operation, and to this end, at the point 764a, the pawls 664 are set in operation to either dispose the shoulders as 671, Fig. 23A, in position to engage the abutment 672 or to permit the pawls to ride on the racks 661, such positioning of the pawls being completed by the time the point 765a is attained, for by this time the sensing bars as 603 will have come to rest.

The sensing bars 603 remain in the positions in which they are thus disposed until the point 766 is attained and, in the time interval between the points 765 and 766, such positioning of the type segments and punch slides has been effected so that the variable printer and the punching mechanism may be operated in the present instance, to respectively print the ascertained quantity 998001 representative of the amount of the dividend $9,980.01 onto the first sheet S, Fig. 59, and to perforate a card C in accordance with this quantity. The type segments 630 will be disposed in the positions to be occupied thereby by the time the point 765 is attained and shortly thereafter in point of time, namely, at the point 767, the V-shaped block 701, Fig. 23, starts to move toward the notches 700 and by the time the point 768 is attained, this block will be seated in these notches to thereby accurately line up the type members in printing position, as explained hereinabove. The block 701 remains seated in the notches 700 until the point 769 is attained and, in the time interval between the points 768 and 769, printing from the set-up characters on the type segments 630 and the punching operation are effected. Thus, as soon as the block 701 is seated in the notches 700 and, namely, at the point 768a, the platens 650 are released to make an impression from the set-up type characters and, at the point 768b, operation of the punch plate 715, Fig. 23, and therefore the punches, is initiated. As explained hereinabove, both the platens and the punches operate rapidly and therefore by the time the points 770 and 770a have been attained, the printing and punching operations will be complete.

As can be ascertained by reference to the timing chart, Fig. 64, the time interval between the points 768 and 769, during which time the block 701 remains seated in the notches 700, is of sufficient length to enable both the printing and punching operations to be effected. Hence, at the point 769, by which time the aforesaid operations will be completed, the retraction of the V-block 701 is initiated, and this retraction is completed by the time the point 766a is attained. When the point 766a is attained, the V-block 701 is completely retracted from the notches 700 and, therefore, at the point 766, restoring movement of the sensing bars as 603 and consequently of the type segments 630 and punch slides 637 may be initiated, and such restoration is completed by the time the point 771 is attained, restoration of the pawls as 664, Fig. 23A, also being effected in the time interval between the points 766b and 771a. It will be recollected that the escapement members 386 are returned to lower position to serve as detents by the time the point 763 is attained and hence, at the point 763a, restoration of the summation members may be initiated, for by this time the set-up of the summation members will have been utilized, and it will be noted that restoration of the summation members is initiated in point of time at the point 763a very shortly after restoration of the sensing bars 603 and associated mechanisms is initiated at the point 766.

Restoration of the summation members is completed by the time the point 772 is attained and in the interval between the points 763a and 772, while the summation members are being restored to their normal at rest position, the positioning members 602 are restored to their normal at rest position, such restoration being initiated at the point 773 and being completed by the time the point 774 is attained.

Once restoration of the summation members has been initiated, the templet-gangs may be restored to their normal at rest position as also may be the stops as 487. Thus restoration of the templet-gangs, rotatively, as initiated at the point 775, and axial restoration thereof, is concurrently initiated at the point 775a, such axial restoration being effected by the time the point 776 is attained. Also concurrently with the initiation of restoration of the templet-gangs, restoration of the stops 487 is initiated at the point 775b, and restoration of the templet-gangs rotatively is completed by the time the point 777 is attained, and concurrently therewith, at the point 777a, the restoration of the stops 487 is completed.

It is to be noted that as soon as the printing and punching operations are completed at the points 770 and 770a, respectively, restoration of the platens 659 and the punching plates 715 is initiated, such restoration being completed, in so far as the platens are concerned, by the time the point 778 is attained and, in so far as the punches and punching plates 715 are concerned, by the time the point 778a is attained.

As soon as restoration of the templet-gangs is initiated at the points 778 and 775a, restoration of the Bowden cables may be initiated by engagement of the cam surface on the block 592, Fig. 20A, with the roller 594 and, in point of time, this is initiated at the point 775c concurrently with the initiation of restoration of the templet gangs.

Restoration of the Bowden cables is brought about by movement of the rockers 509 and 513, Fig. 20A, away from the side plate 228, and such movement of these rockers is initiated, in point of time, at the point 775c and is completed by the time the point 779 is attained, and at this time restoration of the Bowden cables is finished. The rockers 509 and 513 dwell in the position thus attained until the point 780 is attained, at which time restoration thereof to their normal at rest position, shown in Fig. 20A, is initiated, and this is completed by the time the point 781 is attained.

As a result of the foregoing operations, as stated hereinabove, the amount of type characters on the type segments 630 is printed on the sheet S which was disposed in the variable printer of the multiplying apparatus M and this sheet is thereafter advanced by the sheet feeding means toward printing position beneath the platen P, Fig. 3, in the sheet guideway SG.

Furthermore, the card C which was perforated in accordance with the ascertained final product in the course of the above described operation is ejected from the punching mechanism and is either advanced to another position in the machine in which it may control a proof-printing operation, as described in my co-pending application, Serial No. 221,841; or the like, or is ejected to a suitable collector if it is not to be so utilized. When the first sheet S is advanced to the printing station beneath the platen P, the web-withdrawing and severing means are again operated to sever a new sheet S from the web W and this second sheet is fed into position to be subsequently printed upon by the variable printer of the multiplying apparatus M.

The platen P of the printing machine is now operated under control of the timing switches 161, Fig. 14; and the changeable data A, Fig. 59, which in this instance comprises the name and address of the stockholder to which the first printing and control device D, Fig. 60, pertains, are printed upon the first sheet S. Also in this printing operation the number N is stamped upon the sheet S, Fig. 59. When the changeable data A and the number N have been thus printed upon the first sheet S, the platen P is raised and the sheet S is fed away from beneath the platen and is thereafter introduced into the form printing unit U where the form F is imprinted upon the sheet, the sheet being then discharged into the collector K, Fig. 1.

The second printing and control device D carrying the control card 6, shown in Fig. 61, is now in sensing position. Inasmuch as this control card 6 bears a class-representing perforation 6B therein, the middle templet in each of the clusters C of the various templet-gangs, Fig. 43, is positioned to be operative, such templets comprising the second group, it being recalled that in the present set-up of the machine this group pertains to the reoccurring factor 37. The card 6 in Fig. 61 likewise bears perforations representing the variable factor or multiplier 702; hence the multiplying apparatus M is now operated under control of this card 6 to ascertain the sum of the intermediate products corresponding to a multiplier factor of 702 and a reoccurring factor 37, and this ascertained result is printed upon the second sheet S by the variable printer.

Concurrently with printing of the variable data V upon the second sheet S the platen P may be operated to effect a proof-printing operation in which the changeable data A in the first printing and control device D, Fig. 60, which is still in printing position III at this time, are transferred to a proof sheet along with a reproduction of the variable data V which were printed on the first sheet S, such reproduced data V being printed under control of the punched card C which was produced as an incident to printing of the variable data V on the first sheet S.

When the foregoing printing operations have been effected, the second sheet S is advanced to printing position beneath the platen P. The printing and control device feeding mechanism is operated to discharge the first printing and control device D from position III to be later introduced into a selected one of the drawers J, Fig. 1; the second printing and control device D bearing the control card 6, Fig. 61, is advanced to printing position III; and the third printing and control device bearing the control card 6, Fig. 62, is advanced to sensing position II.

The changeable data A and number N are now printed upon the second sheet S by the platen P, the data A being directly printed from the second printing and control device D which is now in printing position III. The second sheet S is then fed to the form printer U where the form F is printed thereupon and is thereafter discharged to the collector K. Also, a third sheet S is severed from the web W and is advanced to the variable printer of the multiplying apparatus M.

The control card 6, Fig. 62, borne by the third printing and control device D does not bear a perforation 6A and 6B thereon, this being indicative of the third class of stockholders. The multiplier factor or number of shares of stock is represented by perforations which are indicative of the quantity of 345. Hence the third group of templets, which group in the present embodiment pertains to the reoccurring factor 465, is selected for operation and is positioned in accordance with the digits of the multiplier 345. The variable data printed on the third sheet S by the variable printer of the multiplying apparatus M, therefore comprise the ascertained product of 465 times 345.

Concurrently with printing of the variable data V upon the third sheet S, the platen P operates to print changeable data A from the second printing and control device D onto the proof sheet, and the variable data V which were ascertained under control of the second printing and control device D are likewise printed on the proof sheet under control of the punched card bearing these data. The second printing and control device D is thereupon discharged from printing position III and the third printing and control device bearing the control card 6, Fig. 62, is advanced from sensing position II to the printing position III, while the fourth device D is advanced from position I to position II. The third sheet S is advanced to printing position beneath the platen P to receive the changeable data A from the third printing and control device D which is now in position III.

Subsequent operation of the machine takes place in a manner similar to that described hereinabove, the completed record sheets S being produced in synchronism with the passage of printing and control devices D through the machine.

SUMMARY

It is believed that it will be apparent from the foregoing description that the machine of the present invention represents an improvement over previous machines, examples of which are shown in U. S. Letters Patent 2,041,183, 2,083,061, 2,132,411 and 2,132,413, and in my co-pending applications Serial Nos. 221,841 and 313,146, all of which have been referred to hereinabove.

For example, the production of business instruments such as dividend checks of a corporation has been materially expedited by the provision of a plurality of sets of intermediate product-representing templets for each order of the multiplier or like variable factor in the multiplying apparatus M of the machine. Each such set is so arranged with respect to the other set or sets in that order that it pertains or is allocated to a predetermined class or group designation in the record-bearing instrumentalities, such as control cards, to which the multiplying apparatus is responsive. Thus, accommodation has been made for, in effect, affording a selection from among a plurality of available reoccurring factors, of which there is one for each class of shareholders for whom the dividend checks are being prepared, and in any particular set-up of the machine each distinct group or class designation in the control cards or the like effects the selection of a certain reoccurring factor. However, it will be manifest, from the foregoing specification, that while in a particular set-up of the machine each class designation relates to a definite reoccurring factor, such set-up may be expeditiously altered by rearranging the templet groups with respect to each other or by replacing any or all of them with other templet groups, in the convenient manner described hereinabove, whereby in different set-ups of the machine or in different machines the same class designation will usually denote different reoccurring factors.

Moreover, it is deemed apparent that while the illustrated form of multiplying apparatus has a capacity for variable factors extending into three orders, and affords a selection from among three reoccurring factors, the capacity may be conveniently increased or decreased, and provision can be made for more or less than three reoccurring factors, without departing from the ambit of my invention.

The multiplying apparatus M of the machine is in its essential nature an intermediate product-summarizing means, which is to say, that there is no multiplication, as such, performed by the machine, but the pre-computed intermediate products are selected under joint control of a class-representing indicium and the variable factor representations. A representation of an intermediate product is thus set up in each order of the variable factor, such intermediate product being the long-hand product of the particular reoccurring factor selected according to the class designation, times the digit in that order of the variable factor or multiplier, and the summation means thereupon sums up the intermediate products thus manifested to thereby manifest the final product. Moreover, the multiplying apparatus, while being of compact, simple and economical construction, nevertheless preserves the advantages of both a single reoccurring factor multiplier and a universal multiplier, which is to say, it is adapted to, in effect, perform multiplications entailing multi-digit factors at a rate comparable with the usual speed of operation of printing machines such as those to which this invention relates, and it affords a selection of both factors, each from among a plurality of factors of like character.

My invention can obviously be adapted for use in types of work other than the preparation of dividend checks; for example, it may be employed in billing or tax assessment work. Furthermore, while it specifically relates to what are known as straight multiplying machines, it will be understood that I do not wish to confine myself to such applications, and by way of illustration the machine can be adapted for what is known as sliding rate scale multiplication such as is required in public utility billing. Thus, each templet-gang may pertain to a certain rate step or block, and in such event the "reoccurring factor" incorporated in the templets in each set within the gang would be the rate for that rate step according to one of a number of available rate schedules or classifications, such as "Domestic," "Class A Commercial," "Class B Commercial," and so on. Corresponding sets in the several templet-gangs would not, however, be based on the same "reoccurring factor," inasmuch as there is a different rate for each rate step in this type of work. The variable factor by which the selected rate in each rate step is to be, in effect, multiplied comprises so much of the total quantity of commodity consumption for the billing period as falls within the particular rate step.

The foregoing arrangement is particularly advantageous for use in public utility systems wherein the rate steps or blocks are the same for all classes of consumers but the rates themselves vary. For instance, "Domestic" rates might be 7¢ per kilowatt-hour for the first 32 kilowatt-hours (first block), 5¢ per kilowatt-hour for the next 64 kilowatt-hours (second block) and 3¢ per kilowatt-hour for all consumption over 100 kilowatt-hours (the sum of the first and second blocks); whereas "Class A Commercial" might denote a rate of 4¢ per kilowatt-hour for the first block, 3¢ per kilowatt-hour for the second block, and 2¢ per kilowatt-hour for the remainder. One or more templet-gangs in the multiplying apparatus could be allocated to quantities falling within the first block, another or further templet-gangs to the second block, and still another or still further templet-gangs to the third block. One set of templets in the gang or gangs for the first block would pertain, for example, to the "Domestic" class of consumers, having the 7¢ rate for that block, and another set would be for the "Class A Commercial" consumers having the 4¢ rate for that block, and so on. Similarly, in the second block, there would be a "Domestic" templet set for the 5¢ rate, and a "Class A Commercial" set for the 3¢ rate; and in the third block there would be a "Domestic" templet set for the 3¢ rate and a "Class A Commercial" set for the 2¢ rate.

The control cards would then be perforated each with the class designation for the particular consumer and with the first step, second step, and third step consumption quantities of such consumer for the billing period. A "Domestic" class-representing perforation would then effect a selection of the "Domestic" group of templets, and so on, and thereby the machine could function to, in effect, calculate the charge for each rate step and summarize these charges to obtain the total consumption charge for the billing period. The foregoing, therefore, exemplifies uses to which a machine constructed according to my invention can be put, other than for straight multiplication.

The multiplying apparatus also represents an improvement in that the templet-gangs thereof are all mounted in positions where access can be conveniently had thereto for purposes of replacement, and the summation means is so arranged that the sensing members thereof are all moved in the same direction for ascertaining the sum of the intermediate products represented on the templets. The final product indicating means provides for continuous linear movement of the summation members in a given direction in the course of summarizing the intermediate products, and this is accomplished without duplication of the more bulky parts, such as the positioning means on the members 602, Fig. 35.

The planetary summation means affords a very compact yet highly flexible structure, as can be appreciated from the plan views in Figs. 36 and 38. The sun gears and planet arms associated with each templet-gang are, in each instance, mounted on a common shaft, and the sensing fingers which are operatively connected to these planet arms are guided in a common comb block. If the capacity of the multiplying apparatus is to be increased to accommodate reoccurring factors extending into more than three orders, additional sun gears and planet arms can be mounted on each of the aforesaid shafts, this merely necessitating providing spacers of smaller length of the shafts, and the additional sensing fingers are guided in said comb blocks.

However, while the illustrated form of the machine utilizes a mechanical intermediate-product representing and summarizing means, advantages kindred to those now available can be had by resort to an electrical apparatus having the same general features, such as that of ascertaining the final product by the mere selection, sensing and summing up of pre-computed intermediate products.

Thus while I have illustrated and described a selected embodiment of my invention it is to be understood that it is capable of variation and modification and I therefore do not wish to be limited to the precise details set forth but desire to avail myself of such changes and alterations as fall within the purview of the following claims.

I claim:

1. In an apparatus for ascertaining the final product of two factors, a summation means having means associated therewith bearing representations of numerical values, detecting means movable from a selected position toward each representation of a numerical value, means for setting said summation means in operation to advance said detecting means into operative engagement with said numerical value representing means, said summation means including an element which in a summation operation may move through a distance representative of a numerical value greater than ten, and sensing means for manifesting the value represented by the final position of said element and including a first sensing member shiftably related to said element and capable of being selectively associated with said summation element in one relation when the position of said element indicates a numerical value of less than ten and in another relation when the value indicated is more than ten, cooperating sensing abutments on said element and said first sensing member for establishing said relations selectively as determined by the position of said element, and a second sensing member cooperable with said first sensing member in either of such relations to sense and indicate the significant value of the numerical value indicated by the position of said summation element.

2. In an apparatus for ascertaining final products and wherein summation means is provided including carry-over means and a summation element for each order of the final product movable through distances representative of numerical values including those in excess of ten, a member movable in the same direction as said summation element, cooperating means on said member and said one element for positioning said member in one relation to said element when said element positionally represents a numerical value of less than ten and in another relation when said element positionally represents a numerical value of between ten and nineteen, means operable to establish one such relation between said member and said element upon the completion of a summation operation by said element, and means operable thereafter to cooperate with said member to sense the significant digital value of the numerical value positionally represented by said element.

3. In an apparatus for ascertaining final products wherein settable means is provided respresentative of intermediate products entering into a product ascertaining operation, sensing means cooperable with said settable means to sense the digital values represented in any particular setting thereof, summation means including a movable summation element for each order of the final product and operable to add the digital values sensed by the sensing members pertaining to that order to positionally indicate the sum of such values in that order, each of said summation elements having means operable when the element has moved through the predetermined distance representative of the number of units in that order required to equal one unit of the next higher order to introduce a carry-over of one into the summation element of the next higher order, and each of said summation elements being movable through at least twice said predetermined distance, a final sensing member for one of said summation elements and an intermediate sensing member for said one summation element, cooperating abutment means on said intermediate sensing member and said one summation element operable to associate said intermediate sensing member with said one summation element in one relation when said one summation element has moved less than said predetermined distance and in another relation when said one summation element has moved more than said predetermined distance, and means on said intermediate sensing member adapted for cooperation with said corresponding final sensing member to manifest in said final sensing member the digital value of that order of the final product of a product ascertaining operation.

4. In a product-ascertaining machine having summation means including a movable summation element for each order of the final product operable to positionally represent the digital value of the significant digit of that order of the final product and having means associated with each summation element operable when such element has moved the predetermined distance representative of the number of units in that order required to equal one unit in the next higher order to introduce a carry-over of one unit into the summation movement of the summation element of said next higher order, and wherein said summation elements are each movable through several times said predetermined distance, the combination of sensing means for one order of the final product having a final sensing member operable to perform its sensing operation within a predetermined range, a plurality of abutments on said summation member spaced said predetermined distance from each other, and an intermediate sensing element for said summation element having abutment means normally out of cooperative association with any one of said abutments of its summation element capable of establishing any one of a plurality of different relations of the intermediate sensing element with its summation element, said intermediate members in any of its said relations to its summation element being operable to cooperate with its final sensing member to manifest to the final sensing member a single significant digital value of the numerical value positionally represented by its summation element, and means operable to place the abutment means of said intermediate sensing element in cooperative relation with one of said abutments of its summation member so that said intermediate sensing element is positioned within the predetermined sensing field of its final sensing member.

5. In a machine for ascertaining the product of two factors, said machine having summation means including a movable summation element for each order of the final product operable to positionally represent the digital value of the significant digit of that order of the final product and having means associated with each summation element operable when such element has moved the predetermined distance representative of the number of units in that order required to equal one unit in the next higher order to introduce a carry-over of one unit into the summation movement of the summation element of said next higher order, and wherein said summation elements are each movable through several times said predetermined distance, the combination of sensing means having a final sensing element pertaining to one order of the final product, and operable to perform its sensing operation within a predetermined field, and an intermediate sensing member for the summation element of said one order adapted for cooperative association with its summation element in a plurality of different relations spaced said predetermined distance apart, said intermediate member in any of its said relations to its summation member being operable to cooperate with its final sensing member to manifest to the final sensing member the significant digital value of the numerical value positionally represented by its summation element, and means operable upon completion of the summation movement of said summation element to place said intermediate sensing member in the one of said relations to its summation member wherein it is positioned within the predetermined sensing field of its final sensing member.

6. In a machine for ascertaining the final product of two factors wherein one factor may be any one of a plurality of reoccurring factors and the other factor of which is variable, the combination of a plurality of templet-gangs, one for each order of the variable factor, each of said gangs including a plurality of groups of templets bearing representations of the intermediate products resulting from the multiplication of the plural reoccurring factors by each digit which may appear in the corresponding order of the variable factor, and each group including one templet for each order of the intermediate product represented thereby, the templets of the several groups of each gang being arranged in templet clusters, each cluster of which includes one templet from each group and the templets in each such cluster pertaining to the same order of the intermediate products represented by the groups of templates to which they belong, means supporting said templet gangs for shifting movement of each templet-gang in two directions, means operable to impart controlled shifting movement to all of said templet-gangs in one of said directions in accordance with the reoccurring factor which is to enter into a particular computation, and separate means operable concurrently with said shifting movement in said one direction for imparting and governing shifting movement of the individual templet-gangs in said other direction in amounts varying in accordance with the digital values of the corresponding orders of the variable factor.

7. In a product ascertaining machine for ascertaining the final product of any one of a plurality of reoccurring factors by a digitally selective factor, the combination of a plurality of templet gangs each pertaining to an order of the selective factor and each gang bearing representations of all the intermediate products obtainable by multiplying the several predetermined reoccurring factors by the selective digits which may appear in the order of the selective factor to which the gang pertains, means removably supporting said gangs for limited and controlled movement along two angularly related paths, releasable means securing said gangs in said supporting means, means for actuating said gangs in such movement along one of said paths including a spring means urging each of said gangs in one direction along said one path, and a positive actuator normally acting on each gang and maintaining each gang in a tensioning relation to its spring means, each such actuator including a manually releasable lost motion connection whereby the tension of the associated spring means may be released for dismounting the associated templet gang.

8. In a product ascertaining machine for ascertaining the final product of a reoccurring factor by a digitally selective factor, the combination of a plurality of templet gangs each pertaining to an order of the selective factor and each gang bearing representations of all the intermediate products obtainable by multiplying the predetermined reoccurring factor by the selective digits which may appear in the order of the selective factor to which the gang pertains, means removably supporting said gangs for limited and controlled movement along a predetermined path, releasable means securing said gangs in said supporting means, means for actuating said gangs in such movement along said path including spring means urging said gangs in one direction along said path, and positive actuating means normally acting on said gangs and maintaining each gang in a tensioning relation to said spring means, said actuating means including manually releasable lost motion means connection whereby the tension of the spring means may be released for a gang mounting operation.

9. In a product ascertaining machine for ascertaining the final product of a reoccurring factor by a variable factor, the combination of a plurality of templet gangs each pertaining to an order of the variable factor and each gang bearing representations of all the intermediate products obtainable by multiplying the reoccurring factor by the digits which may appear in the order of the variable factor to which the gang pertains, means removably supporting each of said gangs for movement in accordance with the digital value of the variable factor in the order to which each gang pertains, stop means for controlling such movement including one control element movable with each gang and which is permanently associated with said supporting means to be movable thereon, and cooperating means operable when a gang is mounted in said supporting means to establish a predetermined interlocked relation with the said one control element which pertains to the newly mounted gang.

10. In a product ascertaining machine for ascertaining the final product of a reoccurring factor by a variable factor, the combination of a plurality of templet gangs each pertaining to an order of the variable factor and each gang bearing representations of all the intermediate products obtainable by multiplying the reoccurring factor by the digits which may appear in the order of the variable factor to which the gang pertains, means removably supporting each of said gangs for movement along a predetermined path in accordance with the digital value of the variable factor in the order to which each gang pertains, stop means for controlling such movement including one control element movable with each gang and which is permanently associated with said supporting means to be movable thereon, each of said last mentioned control elements having a positioning opening therein, and a pin mounted on each gang adapted, when a gang is mounted in said supporting means, to engage with the said opening the corresponding one of said control elements to interlock the gang and the control element for movement in unison along said path.

11. In a product ascertaining machine for ascertaining the final product of any one of a plurality of reoccurring factors by a variable factor, the combination of a plurality of templet gangs each pertaining to an order of the variable factor and each gang bearing representations of all the intermediate products obtainable by multiplying the several predetermined reoccurring factors by the digits which may appear in the order of the variable factor to which the gang pertains, means removably supporting said gangs for limited and controlled movement along two angularly related paths, releasable means securing said gangs in said supporting means, means for controlling each of said gangs in such movement along one of said paths including one control element which moves along said one of said paths in unison with its gang and which is permanently associated with said supporting means so as to be restrained against movement along the other of said paths, and cooperating means on each of such elements and its associated gang providing an interlocked connection between each element and its associated gang to afford movement of the interlocked parts in unison along said one path while permitting shifting of each gang along its other path.

12. In a product ascertaining machine having settable means representative of intermediate products resulting from the multiplications of two factors, summation means having means for sensing the represented intermediate products and including a movable summation element for each order of the final product, and means controlling the movement of each such summation element in accordance with the sensed representations of the digits of the intermediate products in the order of the final product to which such summation element pertains, said controlling means for one of said summation elements including a carry over means comprising an escapement mechanism having a ratchet and an escapment member, means for restoring said summation elements to normal position, and means acting to render said escapement mechanism operable with a ratchet and pawl action during such restoring operation.

13. In a product ascertaining machine, settable means representative of intermediate products entering into the determination of the final product of two factors, summation means for each order of the final product including means operable to sense and accumulate the numerical values pertaining to that order of the final product and represented in said intermediate products, each of said summation means including a summation element controlled by the sensing means of its order and operable to positionally represent the numerical values pertaining to that order, actuating means operable upon said summation elements with a yielding force to move said summation elements through the varying distances determined by their associated sensing means, a restoring member for said summation elements operable to restore said elements to normal positions, carry-over mechanism associated with one of said summation elements and including a controlling escapement device, and means operable to disable said escapement device during restoring movement of said restoring member to permit such restoring movement of said one summation element, said last mentioned means acting to render an element of said escapement device operative with a ratchet and pawl action during such restoring movement to restrain said one summation element against movement by said yielding force at least until said one summation element is operatively engaged by the restoring member.

14. In a product ascertaining machine having settable means representative of intermediate products resulting from the multiplications of two factors, summation means having means for sensing the represented intermediate products and including a movable summation element for each order of the final product, and means controlling the movement of each such summation element in accordance with the sensed representations of the digits of the intermediate products in the order of the final product to which such summation element pertains, said controlling means for one of said summation elements including a carry-over means comprising an escapement mechanism having a ratchet and a cooperating escapement member, means for restoring said summation elements to normal position, means providing a shiftable pivot supporting said escapement member, means operable to maintain said shiftable pivot in a normal position during summation operation of said summation means and to shift said pivot to a different position during restoring of said summation element, and means operable when said pivot is thus shifted to rock said escapement member about said pivot and thereby disable the same.

15. In a product ascertaining machine having settable means representative of intermediate products resulting from the multiplications of two factors, summation means having means for sensing the represented intermediate products and including a movable summation element for each order of the final product, and means controlling the movement of each such summation element in accordance with the sensed representations of the digits of the intermediate products in the order of the final product to which such summation element pertains, said controlling means for one of said summation elements including a carry-over means comprising an escapement mechanism having a ratchet and an escapement member, cam means comprising a cam member and a cooperating cam follower, means operable to actuate said cam in timed relation to the movement of the summation element of the order next lower than said one summation element, said follower being operatively associated with said escapement member, and said cam member and follower member being arranged to actuate said escapement member only during a normal summation movement of the summation element from which the cam member is actuated, and said cam member and said follower member being ineffective to actuate said escapement member during a return movement of the summation element from which said cam member is driven.

16. In a record controlled apparatus for ascertaining the product of any one of a plurality of reoccurring factors when multiplied by a variable factor and wherein the reoccurring factors are selectable by designations thereof in the record and wherein the digits in an order of the variable factor are selectable by representations thereof in the record, means operable to sense the designation of the reoccurring factor in each record, means operable to sense the digits in an order of the variable factor in each record, groups of settable members arranged to respectively pertain to corresponding reoccurring factors and settable under control of the means sensing the designations of such factors, each of said groups of members including representations of the respective intermediate products that may result from multiplication of the reoccurring factor to which the group pertains by each of the digits that may appear in an order of the variable factor, means under control of the means sensing the representations of the digits of the variable factor for setting in operative position representations of intermediate products of a selected reoccurring factor when multiplied by the sensed digits of the variable factor, sensing elements positioned to sense the representations of intermediate products disposed in operative position and operable to move a distance proportionate to the value of the representation to be sensed thereby in a given operation, a planetary gear system associated with each sensing element, a summation element, geared interconnections between the planetary gear systems and the summation element, and reaction means against which said geared interconnections and said planetary systems may react upon movement of any sensing element whereby the combined movement of the sensing elements is transmitted through the planetary systems and the geared interconnections to the summation element to thereby dispose it in final product representing position.

17. In a record controlled apparatus for ascertaining the product of any one of a plurality of reoccurring factors when multiplied by a variable factor and wherein the reoccurring factors are selectable by designations thereof in the record and wherein the digits in an order of the variable factor are selectable by representations thereof in the record, means operable to sense the designation of the reoccurring factor in each record, means operable to sense the digits in an order of the variable factor in each record, a plurality of clusters of settable members, there being a member in each cluster pertaining to a particular reoccurring factor, such members constituting a group thereof, means interconnecting the clusters for conjoint movement, the members in each group bearing representations of the respective intermediate products that may result from multiplication of the reoccurring factor to which the group pertains by each of the digits that may appear in an order of the variable factor, means mounting said interconnected clusters for movement along intersecting paths, means under control of the means sensing the representations of the digits of the variable factor for setting in operative position representations of the intermediate products of the reoccurring factors ascertained upon multiplication of such factors by the sensed digit of the variable factor, said last-named means being operative to move said clusters along one of the intersecting paths thereof, means under control of the means sensing designations of the reoccurring factors and operable to dispose the groups in operative position along the other of said intersecting paths to thereby dispose in operative position only the representations on the members in the group pertaining to the reoccurring factor whose designation is sensed by the means sensing such designations, sensing elements positioned to sense the representations of intermediate products disposed in operative position and operable to move a distance proportionate to the value of the representation to be sensed thereby in a given operation, a planetary gear system associated with each sensing element, a summation element, geared interconnections between the planetary gear systems and the summation element, and a reaction means against which said geared interconnections and said planetary systems may react upon movement of any sensing element whereby the combined movement of the sensing elements is transmitted through the planetary systems and the geared interconnections to the summation element to thereby dispose it in final product representing position.

18. In a record controlled apparatus for ascertaining the product of any one of a plurality of reoccurring factors when multiplied by a variable factor and wherein the reoccurring factors are selectable by designations thereof in the record and wherein the digits are in order of the variable factor are selectable by representations thereof in the record, means operable to sense the designation of the reoccurring factor in each record, means operable to sense the digits in an order of the variable factor in each record, groups of settable members arranged to respectively pertain to corresponding reoccurring factors and settable under control of the means sensing the designations of such factors, each of said groups of members including representations of the respective intermediate products that may result from multiplication of the reoccurring factor to which the group pertains by each of the digits that may appear in an order of the variable factor, means under control of the means sensing the representations of the digits of the variable factor for setting in operative position representations of intermediate products of a selected reoccurring factor when multiplied by the sensed digits of the variable factor, sensing elements positioned to sense the representations of intermediate products disposed in operative position and operable to move a distance proportionate to the value of the representation to be sensed thereby in a given operation, a planetary gear system associated with each sensing element, a summation element pertaining to a particular order of the final product to be ascertained, a planetary gear system operable to advance the summation element when actuated by reason of a carry from the order of the final product next lower than that to which the summation element pertains, geared interconnections between the planetary gear systems and the summation element, and reaction means against which said geared interconnections and said planetary gear systems may react upon movement of any sensing element or the carry-over planetary gear system whereby the combined movement of the sensing elements and the carry-over planetary gear system is transmitted through the planetary gear systems and the geared interconnections to the summation element to thereby dispose it in final product representing position.

19. In a record controlled apparatus for ascertaining the product of any one of a plurality of reoccurring factors when multiplied by a variable factor and wherein the reoccurring factors are selectable by designations thereof in the record and wherein the digits in an order of the variable factor are selectable by representations thereof in the record, means operable to sense the designation of the reoccurring factor in each record, means operable to sense the digits in an order of the variable factor in each record, a plurality of clusters of settable members, there being a member in each cluster pertaining to a particular reoccurring factor, such members constituting a group thereof, means interconnecting the clusters for conjoint movement, the members in each group bearing representations of the respective intermediate products that may result from multiplication of the reoccurring factor to which the group pertains by each of the digits that may appear in an order of the variable factor, means mounting said interconnected clusters for movement along intersecting paths, means under control of the means sensing the representations of the digits of the variable factor for setting in operative position representations of the intermediate products of the reoccurring factors ascertained upon multiplication of such factors by the sensed digit of the variable factor, said last-named means being operative to move said clusters along one of the intersecting paths thereof, means under control of the means sensing designations of the reoccurring factors and operable to dispose the groups in operative position along the other of said intersecting paths to thereby dispose in operative position only the representations on the members in the group pertaining to the reoccurring factor whose designation is sensed by the means sensing such designations, sensing elements positioned to sense the representations of intermediate products disposed in operative position and operable to move a distance proportionate to the value of the representation to be sensed thereby in a given operation, a planetary gear system associated with each sensing element, a summation element pertaining to a particular order of the final product to be ascertained, a planetary gear system operable to advance the summation element when actuated by reason of a carry from the order of the final product next lower than that to which the summation element pertains, geared interconnections between the planetary gear systems and the summation element, and reaction means against which said geared interconnections and said planetary gear systems may react upon movement of any sensing element or the carry-over planetary gear system whereby the combined movement of the sensing elements and the carry-over planetary gear system is transmitted through the planetary gear systems and the geared interconnections to the summation element to thereby dispose it in final product representing position.

20. In a record controlled apparatus for ascertaining the product of any one of a plurality of reoccurring factors when multiplied by a variable factor and wherein the reoccurring factors are selectable by designations thereof in the record and wherein the digits in an order of the variable factor are selectable under control of representations thereof in the record, means operable to sense the designation of the reoccurring factor in each record, means operable to sense the digits in an order of the variable factor in each record, groups of settable members arranged to respectively pertain to corresponding reoccurring factors and settable under control of the means sensing the designations of such factors, each of said groups of members including representations of the respective intermediate products that may result from multiplication of the reoccurring factor to which the group pertains by each of the digits that may appear in an order of the variable factor, means under control of the means sensing the representations of the digits of the variable factor for setting in operative position representations of intermediate products of a selected reoccurring factor when multiplied by the sensed digits of the variable factor, denominational groups of sensing means comprising sensing elements movable to sense value representations disposed in operative positions and operable to move distances corresponding to the values represented by selected groups of members, denominational differential gearing systems each originating in a reaction means and terminating in a summation element, said differential gearing systems having intermediate elements thereof operatively connected to said sensing elements of corresponding denominations whereby movement of the summation elements imparts movement to said sensing elements toward sensing relation with the value representations disposed in operative position to thereby position the summation elements in final product representing position.

21. In an apparatus for ascertaining the product of any one of a plurality of reoccurring factors when multiplied by a variable factor, a first selecting means for selecting the reoccurring factor to enter into an operation of the machine, a second selecting means operable to select the digits in an order of the variable factor, groups of settable members arranged respectively to pertain to corresponding reoccurring factors and settable under control of said first selecting means, each of said groups of members including representations of the respective intermediate products that may result from multiplication of the reoccurring factor to which the group pertains by each of the digits that may appear in an order of the variable factor and there being a single member in each denominational order of a group for representing values entering in the computation of a corresponding denominational digit of the final product, means under the control of said second selecting means for setting in operative position groups bearing representations of the intermediate products of a selected reoccurring factor when multiplied by the digits of the selected variable factor, sensing elements positioned to sense the representations of intermediate products disposed in operative position and operable to move a distance corresponding to the value of the representations to be sensed thereby in a given operation, a differential gear system associated with each sensing element, a summation element, geared interconnections between the differential gear systems and the summation element, and reaction means against which said geared interconnections and said differential gear systems may react upon movement of any sensing element whereby the combined movement of the sensing elements is transmitted through differential systems and the geared interconnections to the summation element to thereby dispose it in final product representing position.

22. In a final product ascertaining apparatus having summation means wherein a summation element for each order of the final product is movable variably through distances representative of values from one to at least twenty-nine, and wherein carry-overs incident to such movement of each summation element are transmitted to the summation element of the next higher order, the combination of read-out means for each summation element comprising an intermediate sensing means adapted to sense different representation elements on the summation element for every ten units of value represented by the summation element, a sensing abutment on said intermediate sensing means cooperating with said representation elements on said summation element and operable to locate said intermediate sensing means with respect to its summation element selectively as determined by the position of the summation element, value representing elements on said intermediate sensing means, and a final sensing member movable along a predetermined path for sensing the significant digital value positionally represented by the intermediate sensing means as determined by the said summation element.

23. In a multiplying mechanism wherein a final product is obtained by a single operation of a summation means, a plurality of gangs of representing members, one gang for each denominational order of the multiplier and each gang including a plurality of groups of digital representing members mounted in predetermined relation with each other in the gang and the members of each group jointly bearing representations of all single digit multiples of a given multi-digit multiplicand, the number of members in each group being equal to the number of possible digits in the multiples which the group represents, means supporting the digital representing members of each gang in a displaced denominational relation with respect to denominationally related members of the other gangs so that the representations on the denominationally related members of the different gangs represent digits pertaining to the same denominational order of the final product, control means for said plural gangs for selecting groups of representing members in each gang corresponding to a given multiplicand value, and control means for each gang of members assembled in fixed relation with the digital representations on the respective members of the gang and positionable in accordance with the value of the digit in the related order of the multiplier to dispose the representations of the multiples of the multiplicand in a selected group corresponding to said multiplied digit in operative relation with respect to the summation means and with respect to representations on denominationally related members in other of the gangs likewise positioned in accordance with the value of the given multiplicand, and in accordance with the multiplier digits to which such other gangs respectively pertain.

24. A mechanism according to claim 23 wherein the representing members of the several groups of a gang are arranged in clusters comprising members of the same denominational significance.

25. In a templet gang for use in a multiplying apparatus wherein bearing means are provided for shiftably and interchangeably mounting such a templet gang, a control element for such a templet gang permanently mounted in predetermined relation to such bearing means for movement along a path parallel to the path of shifting movement of a templet gang mounted in the bearing means, said templet gang comprising a plurality of amount representing members and a supporting member upon which said amount representing members are fixed in predetermined relationship, a journal carrying said supporting member mounted in said bearing means, said amount representing members having amount representing abutments thereon disposed in a plurality of similar rows allocated one to each digit which may appear in an order of a multiplier and the abutments in each row being representative of the multiplicand multiples of a predetermined multiplicand times the digit to which the row is allocated, and means included in the templet gang and assembled in fixed relation thereto and adapted as the supporting member is mounted on said journal and bearings to interlock with the adjacent control element to lock the templet gang to said control element for movement conjointly with the control element.

26. In an apparatus for ascertaining the final product of two factors, a summation means controlled by a plurality of instrumentalities bearing representations of numerical values, detecting means movable from a selected position toward each representation of a numerical value, means for setting said summation means in operation to advance said detecting means into operative engagement with said numerical value representing means, said summation means including a summation element which in a summation operation may move through a distance representative of more than one notation, abutments formed on said summation element and spaced apart thereon in the direction of movement of said element a distance representative of one notation, sensing mechanism for manifesting the units value represented by the final position of said element and including a sensing means having one part thereof movable along a path generally parallel to the path of summation movement of said summation element and having another part thereof shiftable in a path parallel to and movable laterally of said path into position for engagement with said abutments selectively in accordance with the number of full notations through which said summation element has moved, and means for moving said sensing mechanism upon completion of the setting of said summation element, said other part moving laterally into the path of said abutments when said sensing mechanism is displaced from normal position.

27. In an apparatus for ascertaining the final product of two factors, a summation means controlled by a plurality of instrumentalities bearing representations of numerical values, detecting means movable from a selected position toward each representation of a numerical value, means for setting said summation means in operation to advance said detecting means into operative engagement with said numerical value representing means, said summation means including a summation element which in a summation operation may move through a distance representative of more than one notation, abutments formed on said summation element and spaced apart thereon in the direction of movement of said element a distance representative of one notation, sensing mechanism for manifesting the units value of the total value represented by the final position of said element including a pivoted arm supported for movement with said sensing mechanism along a sensing path generally parallel to the path of movement of said summation element, said arm having an abutment face thereon for engagement with the abutments on said summation element, means operable to shift said sensing mechanism along said sensing path, means effective to hold the abutment on said arm out of the path of the abutments on the summation element when the sensing mechanism is in its normal position, and means to rock said arm about its pivot to place the abutment face of said arm in position to engage one of said abutments when said sensing mechanism is moved out of its normal position, said means for shifting the sensing mechanism being operable following the setting of the summation element.

28. In a multiplying apparatus for ascertaining the product of two multidigit factors of which the multiplicand is constant and the multiplier is selective, an open edged frame comprising a pair of side plates supported in substantially rigid spaced relation to each other, a plurality of pairs of aligned bearings mounted on said plates along one open edge of the frame, there being one pair of aligned bearings for each order of the multiplier, a plurality of sets of settable amount representing members each having amount representing abutments disposed in a plurality of similar rows allocated one to each of the significant digits and zero and the abutments in each row being representative of the intermediate product resulting from multiplication of a predetermined multidigit multiplicand times the digit to which such row is allocated, there being one such set for each order of the multiplier, means mounting said sets in said bearings on said frame for individually controlled shifting movement and with said sets denominationally displaced with relation to each other, a plurality of summation means one of which is allocated to each order of the largest final product to be ascertained by said multiplier, each of said summation means comprising a differential gear train mounted between said side plates and each of said differential gear trains having a reaction member at one end and a summation member at the other end, shafts mounted in said plates for supporting the elements of the summation gear trains and spacing means thereon to maintain the summation gears in aligned relation, sensing elements operatively associated with intermediate elements of said gear trains to provide an individual sensing element for sensing cooperation with the abutments in each set, supporting and guiding means on said plates for guiding said sensing elements in alignment with related gear trains and abutments, all of said sensing elements being shiftable toward said one open edge of said frame into sensing cooperation with the sets to which they are respectively allocated, and carry-over mechanism associated with the differential gear trains of certain of said orders and operatively associated with and controlled by the summation member of the next lower order.

WALTER T. GOLLWITZER.

CERTIFICATE OF CORRECTION.

Patent No. 2,296,278.

September 22, 1942.

WALTER T. GOLLWITZER.

It is hereby certified that error appears in the printed specification of the above numbered patent requiring correction as follows: Page 48, second column, line 48, for the word "takes" read --take--; page 61, second column, line 55, claim 17, strike out "a" before --reaction--; line 69, claim 18, for "are in" read --in an--; and that the said Letters Patent should be read with this correction therein that the same may conform to the record of the case in the Patent Office.

Signed and sealed this 1st day of December, A. D. 1942.

(Seal)

Henry Van Arsdale,
Acting Commissioner of Patents.